United States Patent
Motoishi et al.

(10) Patent No.: US 9,827,494 B2
(45) Date of Patent: Nov. 28, 2017

(54) ELECTRONIC DEVICE AND EXTERNAL STRUCTURE CONFIGURED TO ATTACH TO OR DETACH FROM THE ELECTRONIC DEVICE

(71) Applicant: Sony Corporation, Tokyo (JP)

(72) Inventors: Takuya Motoishi, Tokyo (JP); Yuki Kubota, Tokyo (JP); Ryo Yamamoto, Chiba (JP); Masaaki Kato, Chiba (JP); Hirotaka Yamamoto, Kanagawa (JP); Kazushi Sakuma, Chiba (JP); Junichi Kanai, Tokyo (JP); Masahiro Takihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/368,672

(22) PCT Filed: Dec. 17, 2012

(86) PCT No.: PCT/JP2012/082668
§ 371 (c)(1),
(2) Date: Jun. 25, 2014

(87) PCT Pub. No.: WO2013/103082
PCT Pub. Date: Jul. 11, 2013

(65) Prior Publication Data
US 2014/0376182 A1    Dec. 25, 2014

(30) Foreign Application Priority Data

Jan. 6, 2012 (JP) ................................. 2012-001682

(51) Int. Cl.
*G06F 1/16* (2006.01)
*A63F 13/54* (2014.01)
(Continued)

(52) U.S. Cl.
CPC .............. *A63F 13/54* (2014.09); *A63F 13/23* (2014.09); *A63F 13/24* (2014.09); *A63F 13/92* (2014.09);
(Continued)

(58) Field of Classification Search
CPC .... G06F 1/1632; G06F 1/1669; G06F 1/1681; G06F 1/1679; F16M 11/041; F16M 11/06; F16M 11/12; F16M 11/121
(Continued)

(56) References Cited

U.S. PATENT DOCUMENTS 6,702,604 B1 * 3/2004 Moscovitch ........ B60R 11/0235
248/121
7,991,935 B2 * 8/2011 Ho ......................... G08C 17/02
340/12.54
(Continued)

FOREIGN PATENT DOCUMENTS

JP    11-307957 A    11/1999
JP    2000-115314 A    4/2000
(Continued)

OTHER PUBLICATIONS

International Search Report from International Publication PCT/JP2012/082668 dated Mar. 12, 2013.

*Primary Examiner* — Hoa C Nguyen
*Assistant Examiner* — Christopher L Augustin
(74) *Attorney, Agent, or Firm* — Chip Law Group

(57) ABSTRACT

Provided is an external structure configured to be attached to or detached from an electronic device having a concave portion formed on a surface of a housing, and a connection connector provided in a position of the concave portion receding from the surface of the housing, the concave portion having a cross-sectional shape enabling locking of the external structure, the external structure including a first (Continued)

fitting unit configured to be fitted to the connection connector.

14 Claims, 190 Drawing Sheets

(51) Int. Cl.

| | | |
|---|---|---|
| *F16M 11/10* | (2006.01) | |
| *F16M 11/38* | (2006.01) | |
| *F16M 13/00* | (2006.01) | |
| *F16M 11/04* | (2006.01) | |
| *F16M 11/06* | (2006.01) | |
| *A63F 13/23* | (2014.01) | |
| *A63F 13/24* | (2014.01) | |
| *A63F 13/92* | (2014.01) | |
| *A63F 13/98* | (2014.01) | |

(52) U.S. Cl.
CPC .......... *A63F 13/98* (2014.09); *F16M 11/041* (2013.01); *F16M 11/06* (2013.01); *F16M 11/10* (2013.01); *F16M 11/105* (2013.01); *F16M 11/38* (2013.01); *F16M 13/00* (2013.01); *G06F 1/166* (2013.01); *G06F 1/1624* (2013.01); *G06F 1/1626* (2013.01); *G06F 1/1632* (2013.01); *A63F 2300/1043* (2013.01); *F16M 2200/065* (2013.01); *G06F 2200/1633* (2013.01); *Y10T 403/70* (2015.01)

(58) Field of Classification Search
USPC .............. 361/679.27–679.29, 679.41–679.44
See application file for complete search history.

(56) References Cited

U.S. PATENT DOCUMENTS

| | | | |
|---|---|---|---|
| 8,391,000 B2 | 3/2013 | Saito et al. | |
| 8,462,494 B2* | 6/2013 | Chen ................. | F16M 11/041 361/679.3 |
| 8,472,168 B2* | 6/2013 | Su ..................... | G06F 1/1626 361/679.01 |
| 8,619,416 B2* | 12/2013 | Lim ................... | G06F 1/1632 361/679.41 |
| 8,699,222 B2 | 4/2014 | Saito et al. | |
| 2005/0205745 A1* | 9/2005 | Lee .................... | F16M 11/046 248/371 |
| 2005/0213298 A1* | 9/2005 | Doherty ............. | G06F 1/1632 361/679.44 |
| 2007/0097617 A1* | 5/2007 | Searby .............. | F16M 11/041 361/679.4 |
| 2009/0213536 A1* | 8/2009 | Lewandowski .... | G06F 1/1632 361/679.43 |
| 2011/0266230 A1* | 11/2011 | Carnevali .......... | E05B 17/2038 211/26 |
| 2011/0297711 A1* | 12/2011 | Yu ..................... | A45F 5/00 224/272 |
| 2012/0061530 A1* | 3/2012 | Chen ................. | F16M 11/10 248/122.1 |
| 2012/0155014 A1* | 6/2012 | Tachibana .......... | G06F 1/1632 361/679.41 |
| 2012/0212900 A1* | 8/2012 | Hung ................. | G06F 1/1632 361/679.41 |
| 2012/0295462 A1* | 11/2012 | Villarreal ........... | H01R 13/6275 439/304 |

FOREIGN PATENT DOCUMENTS

| | | |
|---|---|---|
| JP | 2000-286564 A | 10/2000 |
| JP | 2003-283629 A | 10/2003 |
| JP | 2006-019539 A | 1/2006 |
| JP | 2011-065616 A | 3/2011 |

* cited by examiner

FIG. 1
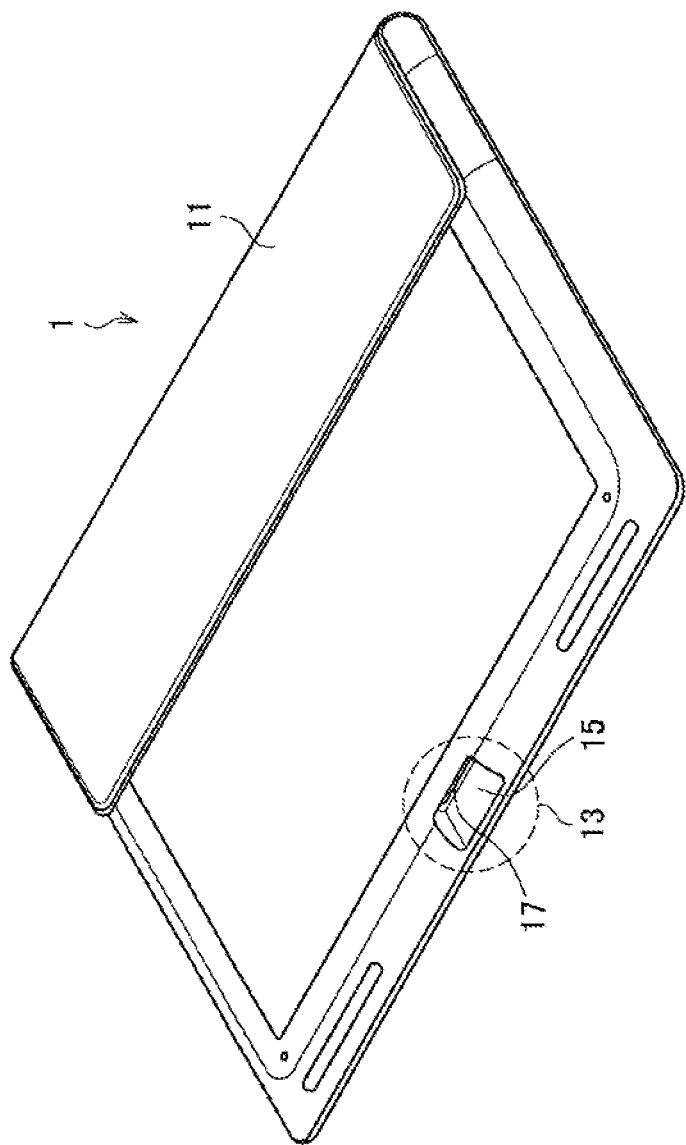
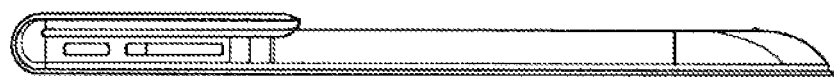

FIG. 2D

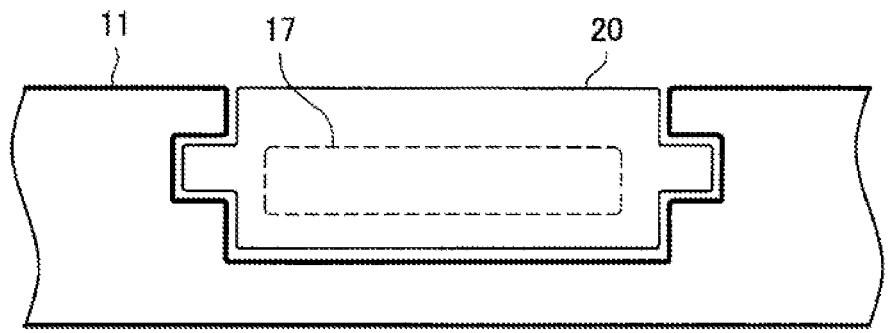

FIG. 3

| | SIGNAL NAME | OVERVIEW, PURPOSE, ETC. |
|---|---|---|
| SIGNAL SYSTEM | HDMI | FOR HDMI OUTPUT |
| | USB | USB2.0 & USB3.0 |
| | Audio | Digital Audio OR ANALOG OUTPUT |
| POWER SOURCE SYSTEM | DCIN | POWER INPUT |
| | DCOUT | FOR EXTERNAL POWER SUPPLY |
| CONTROL SYSTEM | DETECT | FOR CONNECTION DETECTION |
| | AD | FOR COUNTERPART IDENTIFICATION |
| | UART | FOR COMMAND CONTROL |
| | DCOUTRQ | FOR DCOUT OUTPUT CONTROL |
| OTHERS | GND, ETC. | GND OR reserve, ETC. |

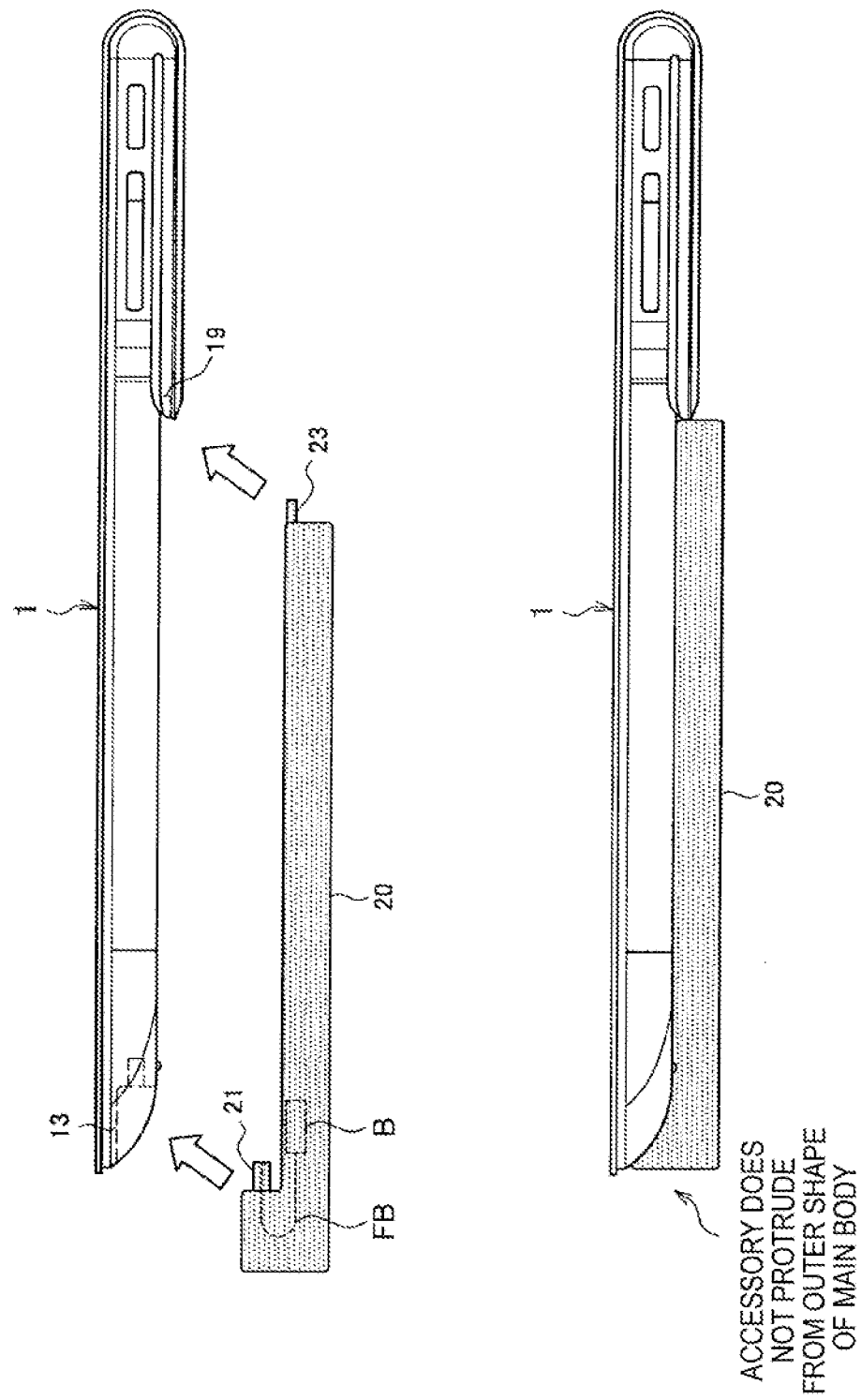

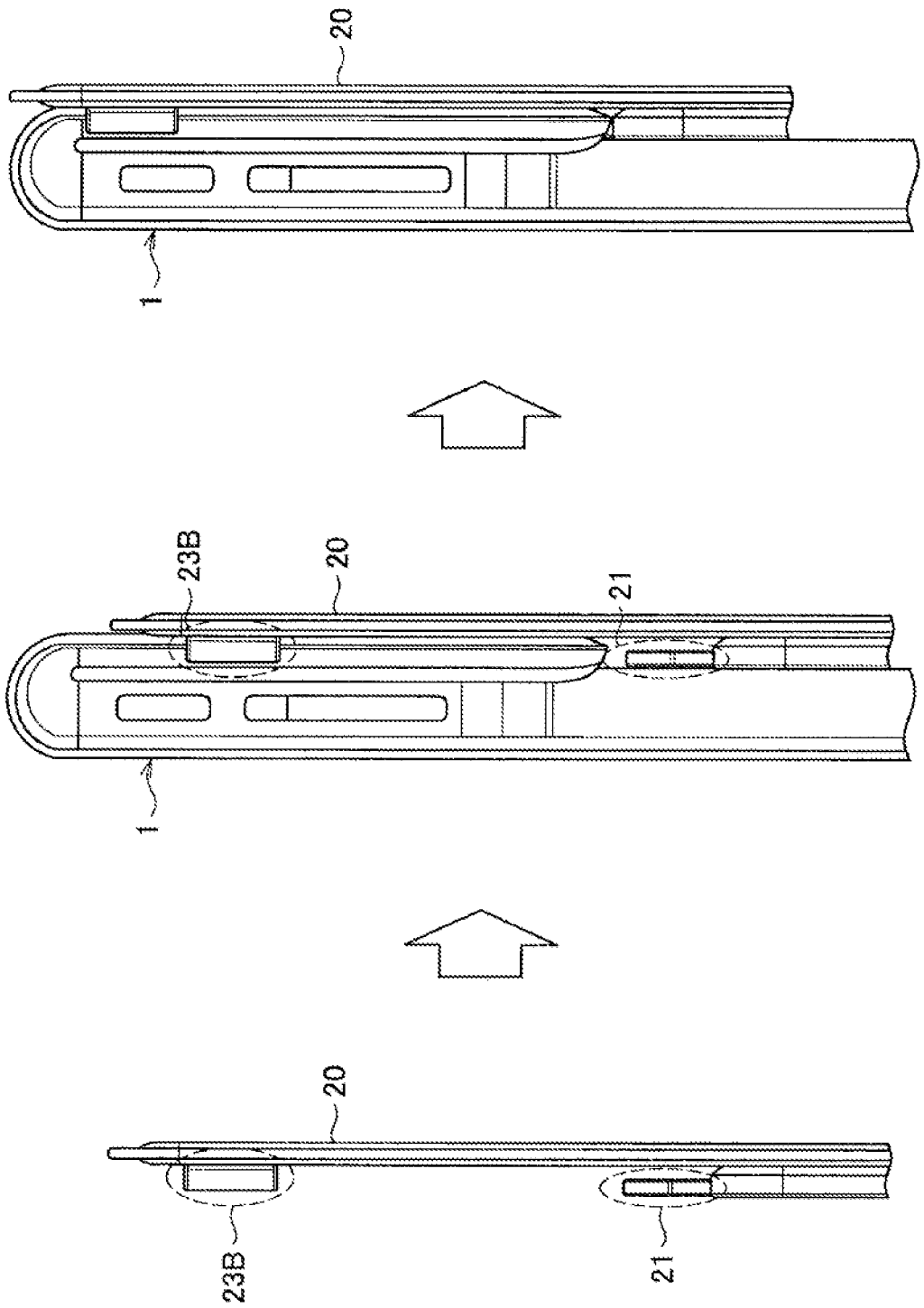

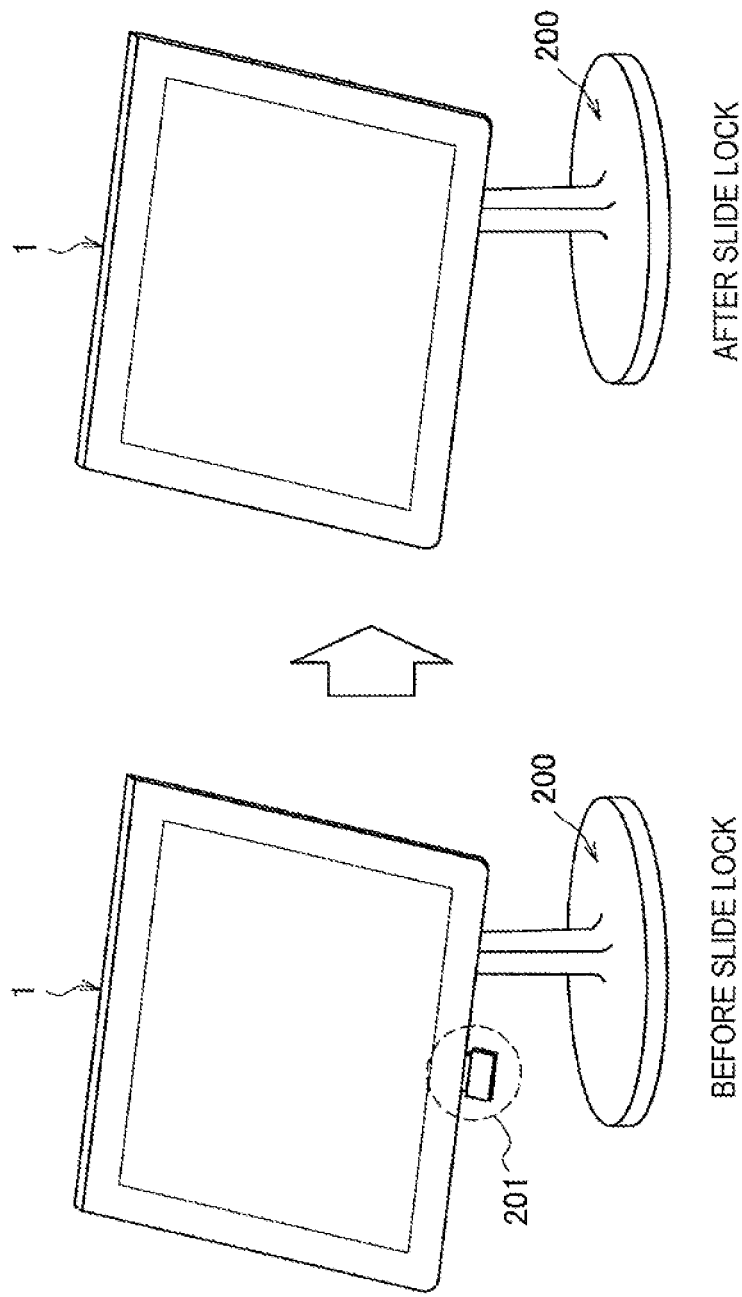

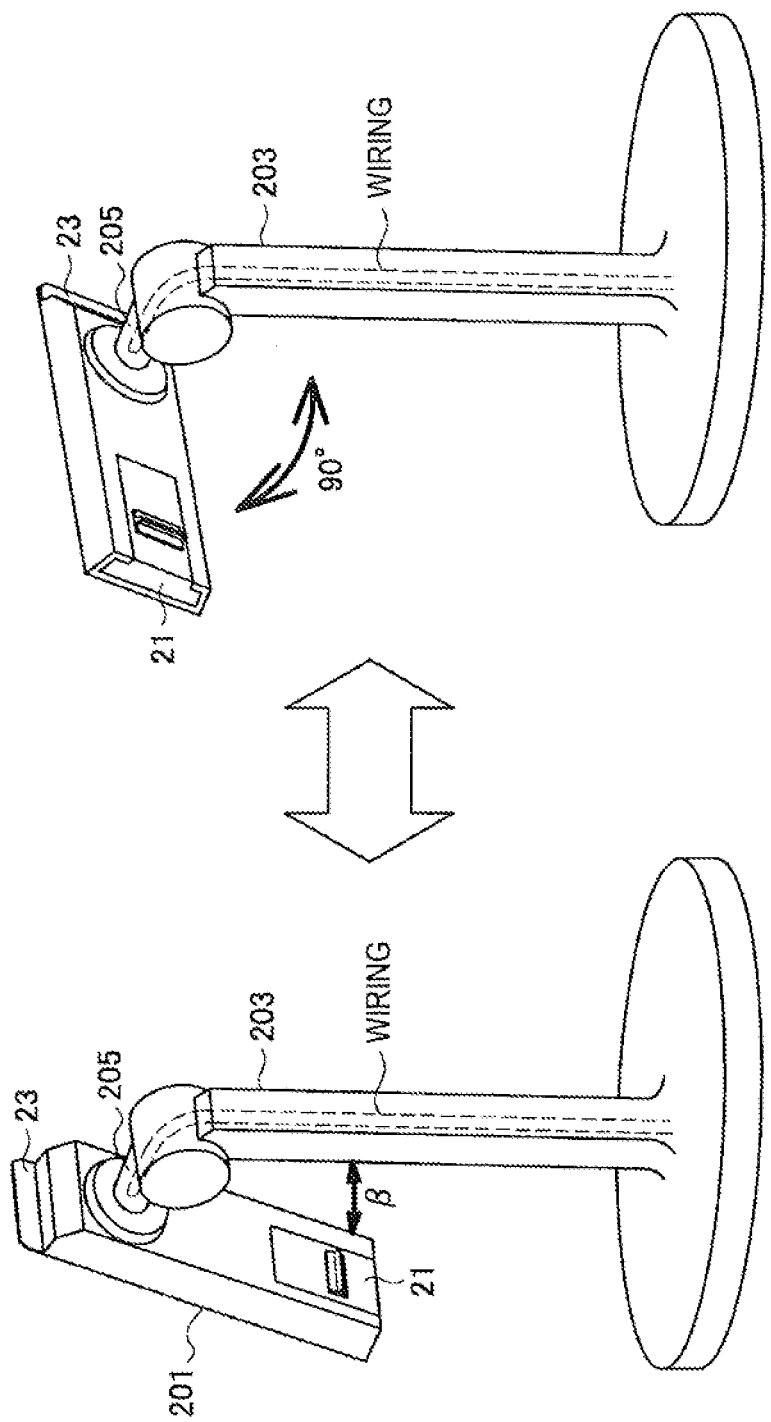

FIG. 15B
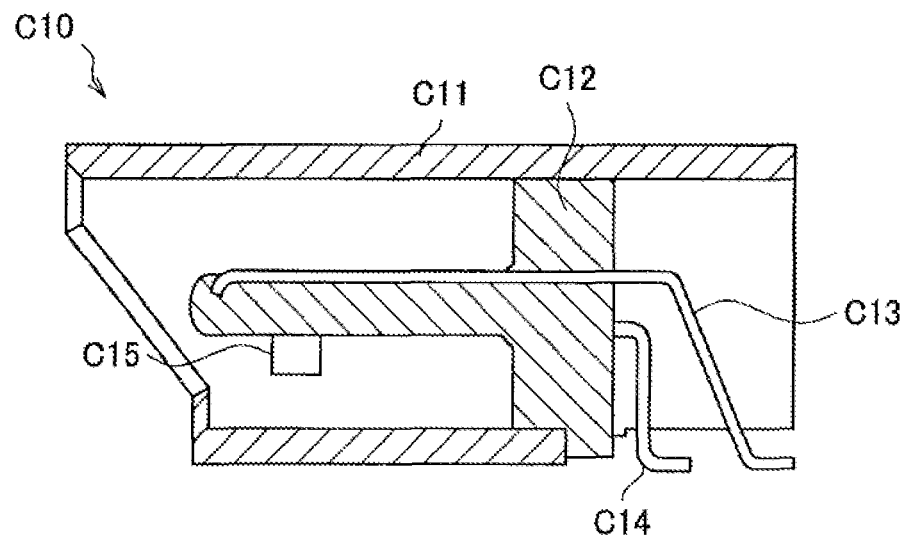
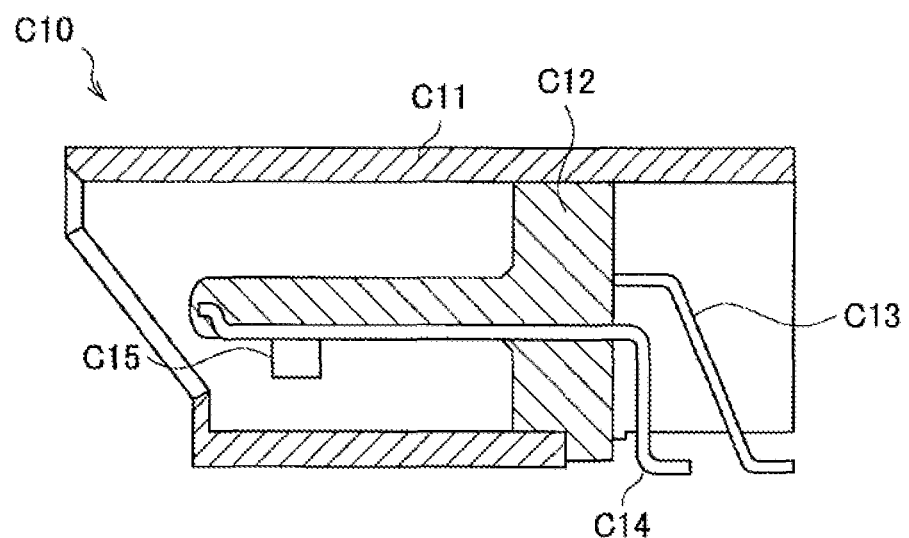

FIG. 15C
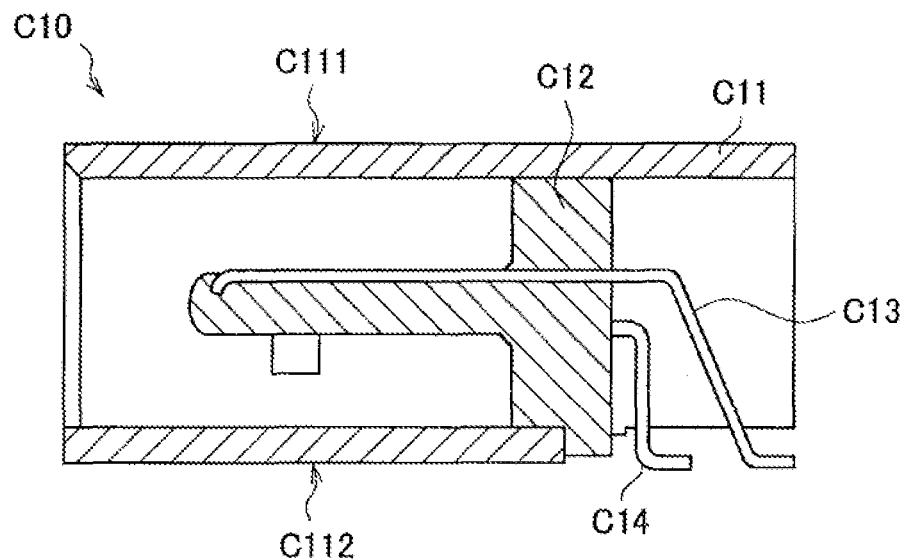
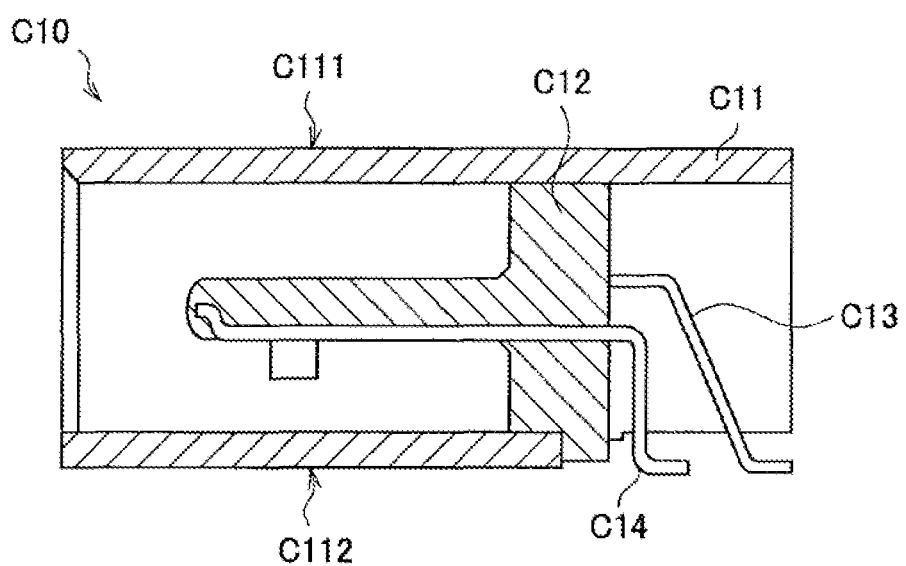

FIG. 15D
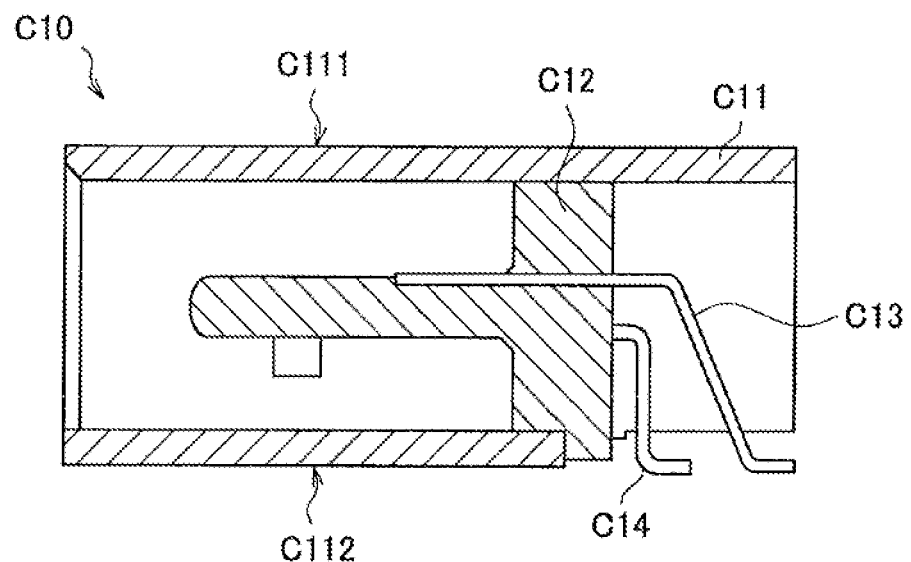
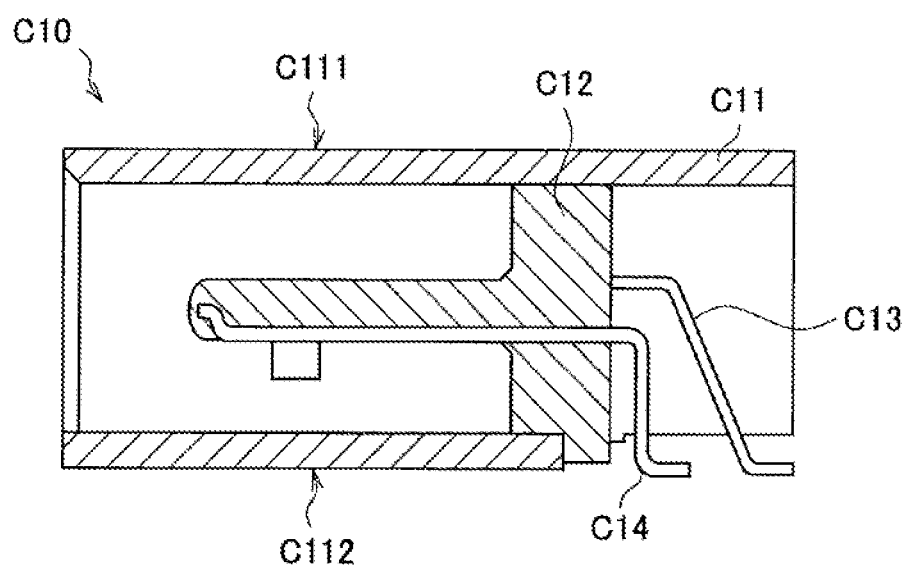

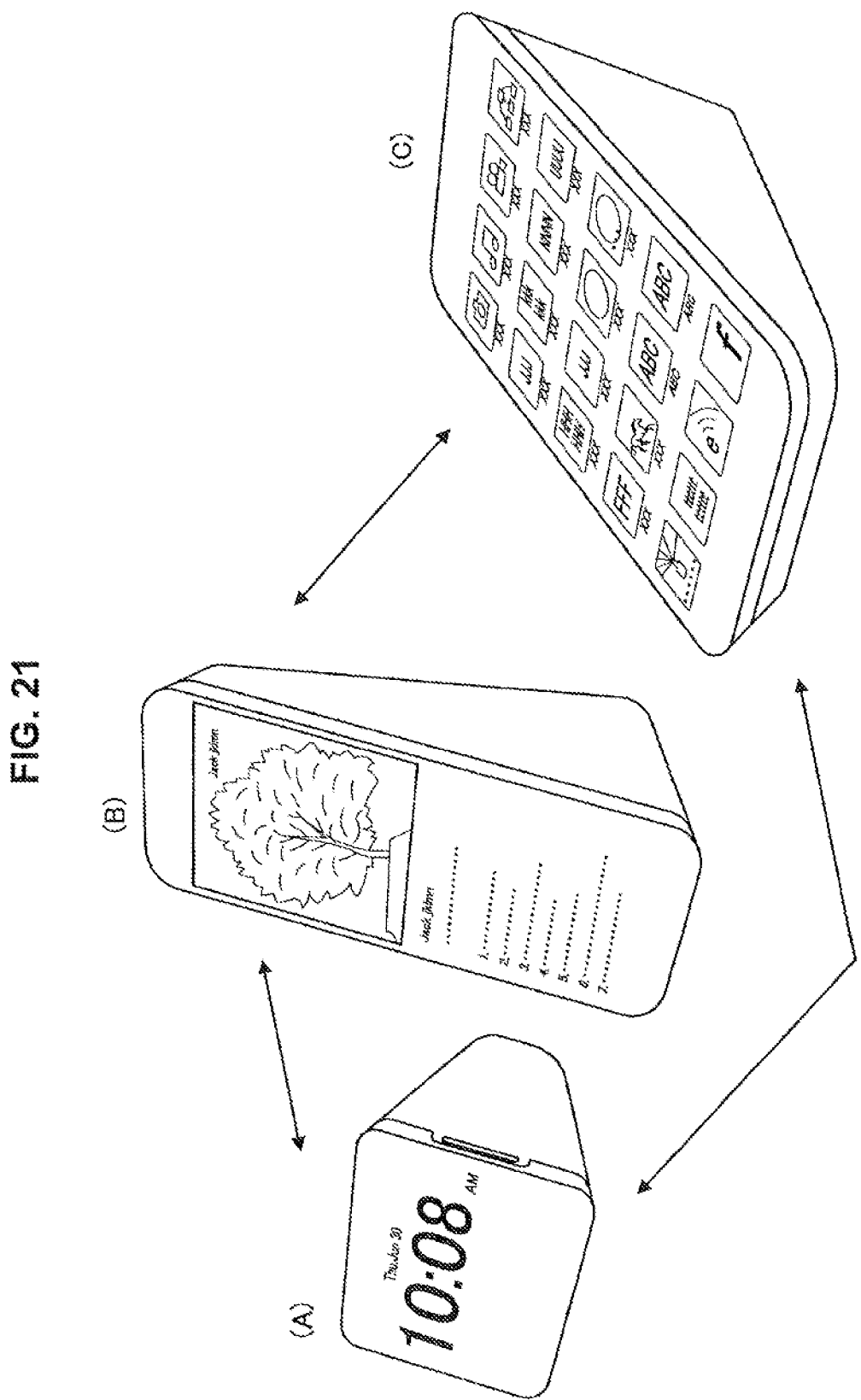

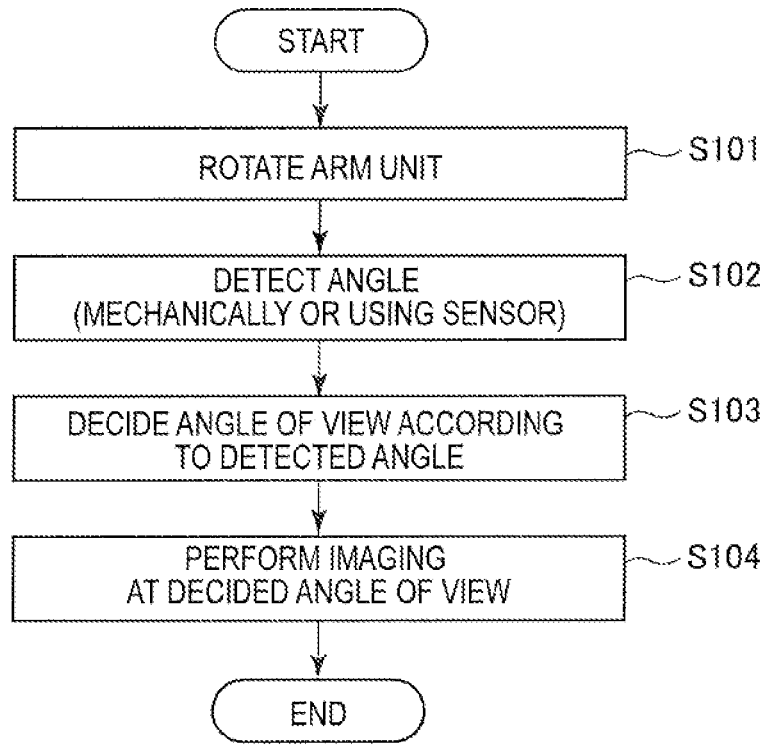
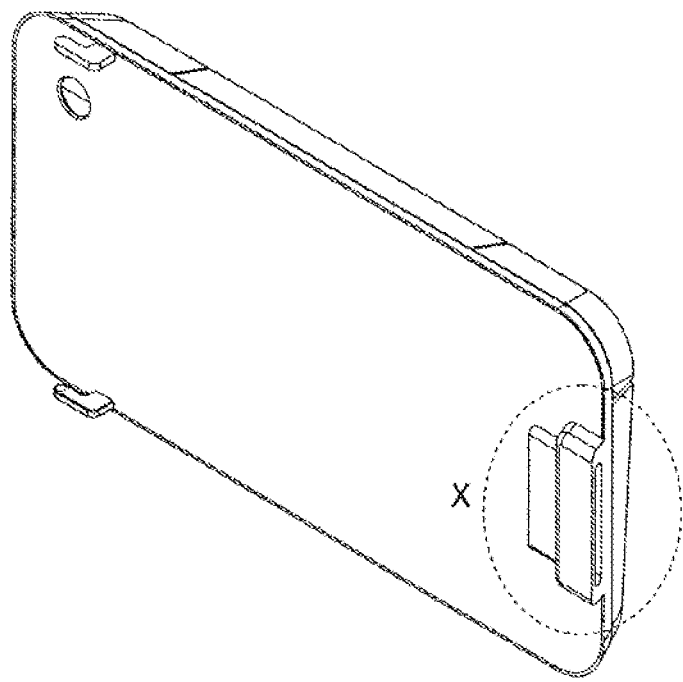

ELECTRONIC DEVICE AND EXTERNAL STRUCTURE CONFIGURED TO ATTACH TO OR DETACH FROM THE ELECTRONIC DEVICE

CROSS-REFERENCE TO RELATED APPLICATION

The present application is a national phase entry under 35 U.S.C. §371 of International Application No. PCT/JP2012/082668 filed Dec. 17, 2012, published on Jul. 11, 2013 as WO 2013/103082 A1, which claims priority from Japanese Patent Application No. JP 2012-001682, filed in the Japanese Patent Office on Jan. 6, 2012.

TECHNICAL FIELD

The present disclosure relates to an external structure and an electronic device.

BACKGROUND ART

Various connectors for connecting different kinds of externally connected devices are provided in portable electronic devices including smartphones, portable tablets, portable game devices, and portable music players, and electronic devices including notebook computers, desktop computers, and the like (for example, refer to Patent Literature 1 below). As kinds of such connectors, for example, a power source connector, a USB (Universal Serial Bus) connector, an HDMI (High-Definition Multimedia Interface) connector, an MIPI (Mobile Industry Processor Interface) connector, an S-ATA (Serial Advanced Technology Attachment) connector, and the like can be exemplified.

CITATION LIST

Patent Literature

Patent Literature 1: JP 2011-65616A

SUMMARY OF INVENTION

Technical Problem

However, in recent years, attempts to use one electronic device described above in different forms have been made, such as using such an electronic device while carrying it in some use cases, using an electronic device while having it stand on a table in other use cases, and the like.

When such various uses cases are considered, convenience of an electronic device can be even more enhanced by using an externally connected device that helps convenience of the electronic device to be enhanced or gives a new function to the electronic device. In that case, ease and functionality of connection between the electronic device and the externally connected device are considered to be important.

Thus, considering the above-described circumstances, the present disclosure proposes an external structure that enables easy installation of an electronic device and satisfactory locking of the installed electronic device, and an electronic device that can be connected to the external structure.

Solution to Problem

According to the present disclosure, there is provided an external structure configured to be attached to or detached from an electronic device configured to have a concave portion formed on a surface of a housing, and a connection connector provided in a position of the concave portion receding from the surface of the housing, the concave portion having a cross-sectional shape enabling locking of the external structure, the external structure including a first fitting unit configured to be fitted to the connection connector.

According to the present disclosure, there is provided an electronic device including a concave portion formed on a face of a housing, and a connection connector configured to be provided in a position of the concave portion receding from the surface of the housing. The concave portion has a cross-sectional shape that enables locking of an external structure connected to the connection connector.

According to the present disclosure, the external structure having a first fitting unit fitted to a connection connector provided in the electronic device is connected to the electronic device that includes a concave portion that has a specific shape, and the external structure is locked by the concave portion that has the specific shape.

Advantageous Effects of Invention

According to the present disclosure described above, an external structure that enables easy installation of an electronic device and satisfactory locking of the installed electronic device and an electronic device that can be connected to the external structure are provided.

BRIEF DESCRIPTION OF DRAWINGS

FIG. 1 is an illustrative diagram showing an electronic device according to a first embodiment of the present disclosure.

FIG. 2D is an illustrative diagram showing a connector connection portion of the electronic device according to the embodiment.

FIG. 3 is a table showing examples of pins provided in an external structure connection connector.

FIG. 4 is an illustrative diagram showing an example of a connection method of an external structure.

FIG. 6B is an illustrative diagram showing a cover with a keyboard that is an example of the external structure.

FIG. 7B is an illustrative diagram showing an electronic device holding stand that is an example of the external structure.

FIG. 7C is an illustrative diagram showing an electronic device holding stand that is an example of the external structure.

FIG. 15B is an illustrative diagram for describing pin disposition of the external structure connection connector according to the embodiment.

FIG. 15C is an illustrative diagram for describing pin disposition of the external structure connection connector according to the embodiment.

FIG. 15D is an illustrative diagram for describing pin disposition of the external structure connection connector according to the embodiment.

FIG. 21 is an illustrative diagram showing a speaker that is an example of the external structure according to the embodiment.

FIG. 33 is a flowchart showing an example of a flow of a process performed in the stand unit according to the embodiment.

FIG. 34A is an exterior diagram of a game controller that is an example of the external structure according to the embodiment.

FIG. 37B is still another exterior diagram of the game controller connected to the electronic device according to the embodiment.

FIG. 37C is still another exterior diagram of the game controller connected to the electronic device according to the embodiment.

FIG. 37D is still another exterior diagram of the game controller connected to the electronic device according to the embodiment.

FIG. 37E is still another exterior diagram of the game controller connected to the electronic device according to the embodiment.

FIG. 37F is still another exterior diagram of the game controller connected to the electronic device according to the embodiment.

FIG. 37G is still another exterior diagram of the game controller connected to the electronic device according to the embodiment.

FIG. 37H is still another exterior diagram of the game controller connected to the electronic device according to the embodiment.

FIG. 38A is still another exterior diagram of the game controller that is an example of the external structure according to the embodiment.

FIG. 38B is still another exterior diagram of the game controller that is an example of the external structure according to the embodiment.

FIG. 38C is still another exterior diagram of the game controller that is an example of the external structure according to the embodiment.

FIG. 38D is still another exterior diagram of the game controller that is an example of the external structure according to the embodiment.

FIG. 38E is still another exterior diagram of the game controller that is an example of the external structure according to the embodiment.

Figure 38A:
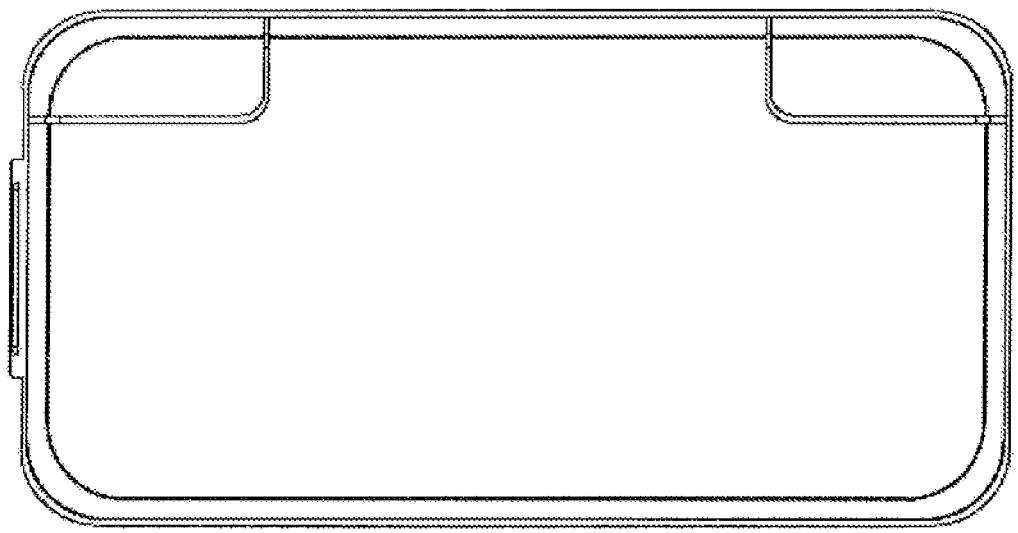
Figure 38B:
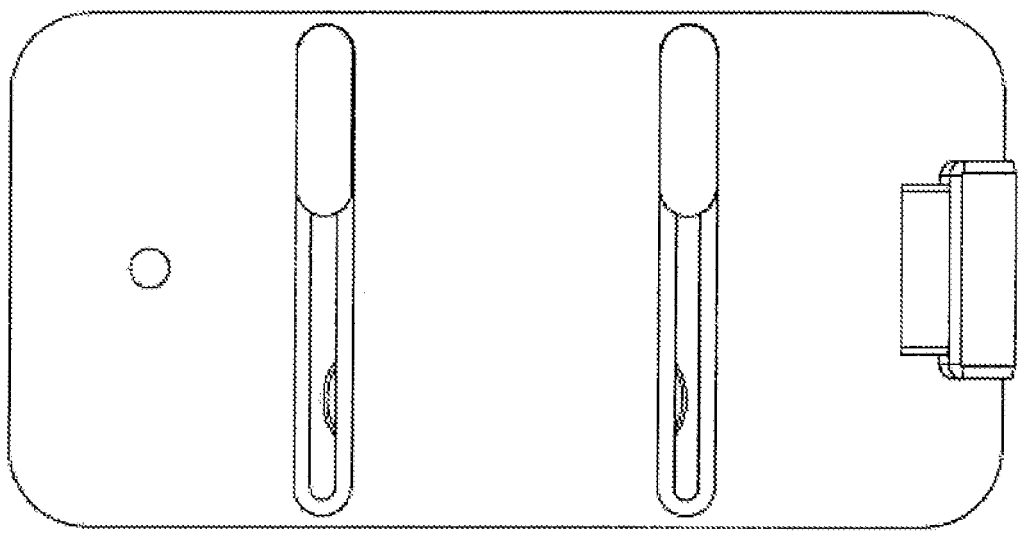
Figure 38C:
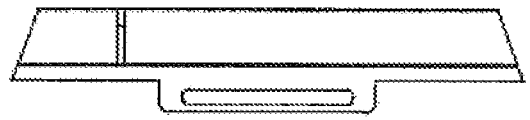
Figure 38D:
Figure 38E:
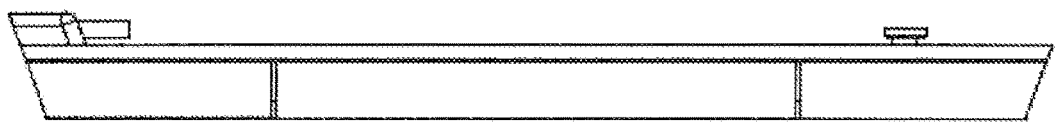
Figure 38F:
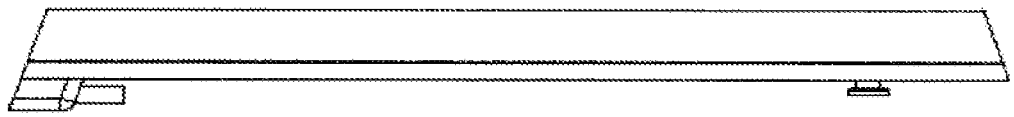

FIG. 38F is still another exterior diagram of the game controller that is an example of the external structure according to the embodiment.

Figure 38G:
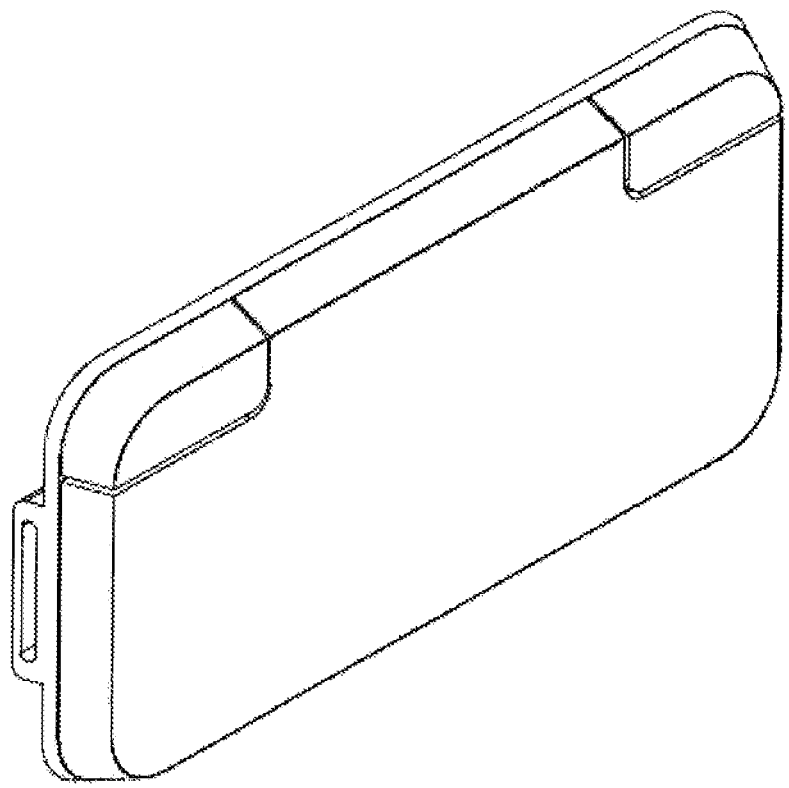

FIG. 38G is still another exterior diagram of the game controller that is an example of the external structure according to the embodiment.

Figure 38H:
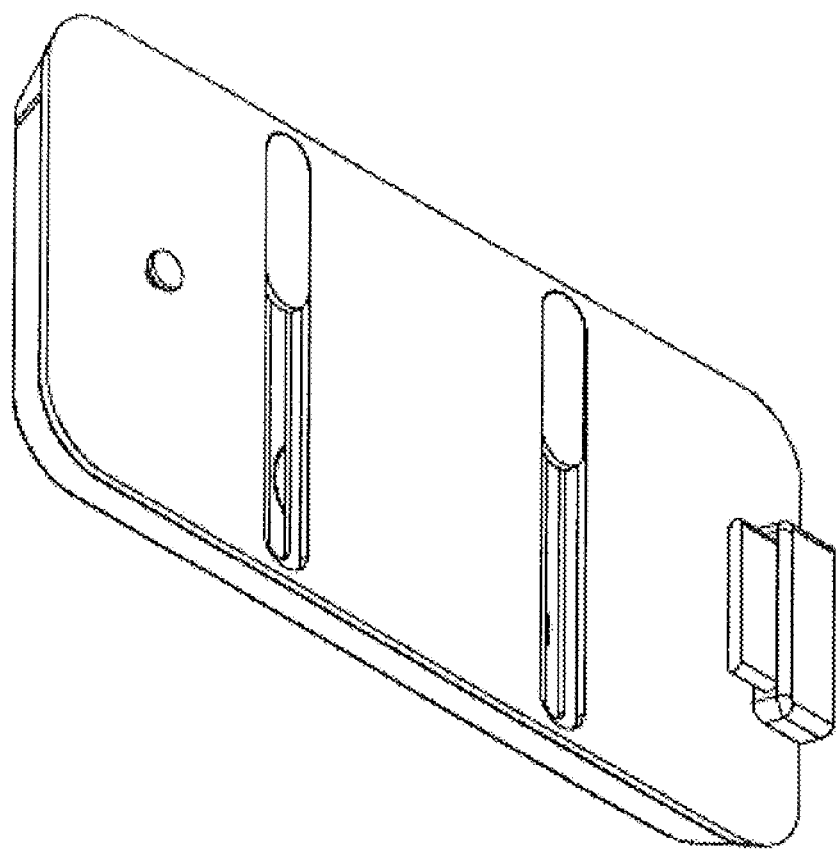

FIG. 38H is still another exterior diagram of the game controller that is an example of the external structure according to the embodiment.

Figure 38I:
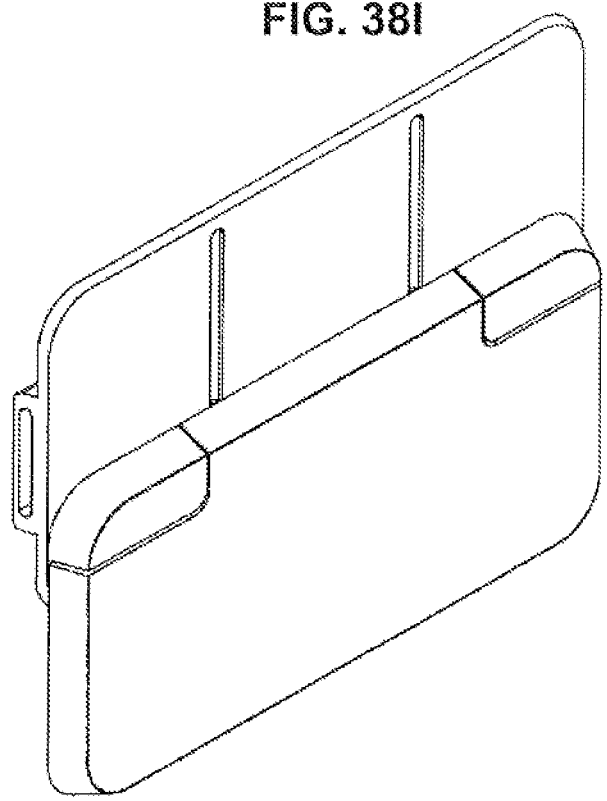

FIG. 38I is still another exterior diagram of the game controller that is an example of the external structure according to the embodiment.

Figure 38J:
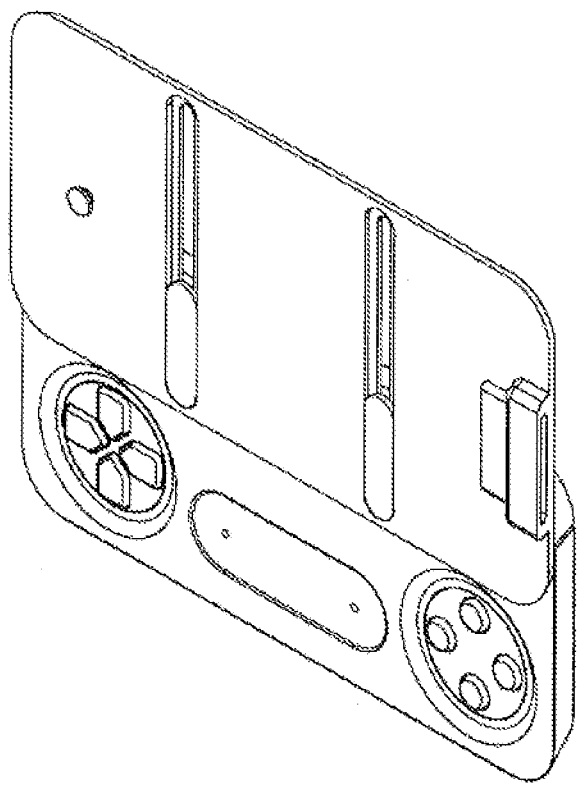

FIG. 38J is still another exterior diagram of the game controller that is an example of the external structure according to the embodiment.

Figure 39A:
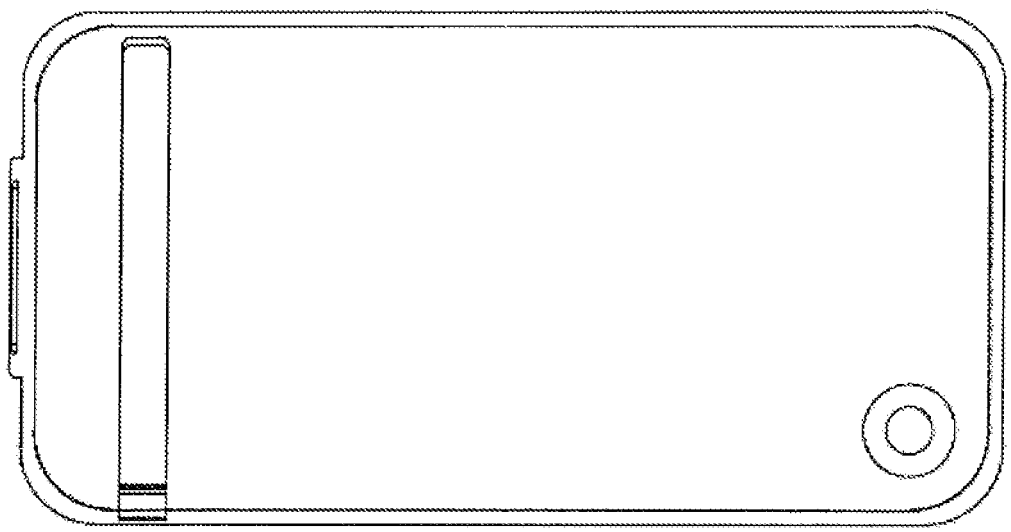

FIG. 39A is an exterior diagram of a TV tuner module that is an example of the external structure according to the embodiment.

Figure 39B:
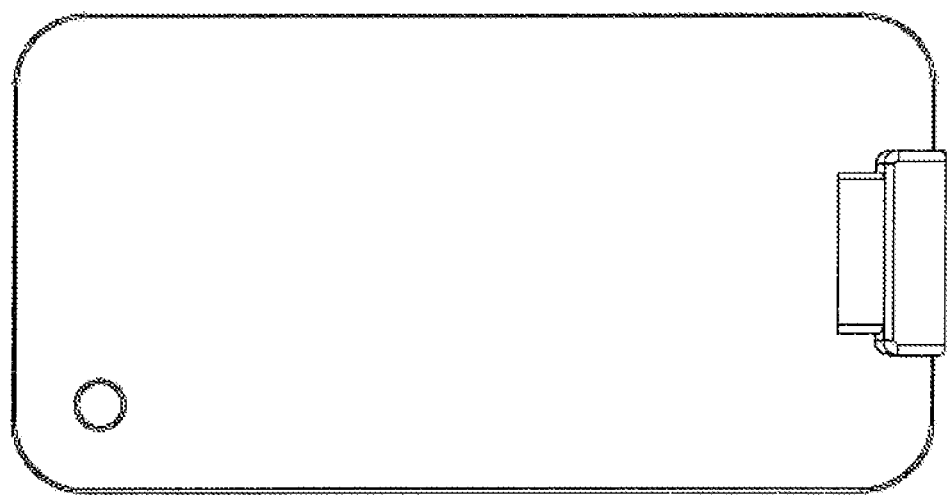

FIG. 39B is an exterior diagram of a TV tuner module that is an example of the external structure according to the embodiment.

Figure 39C:

FIG. 39C is an exterior diagram of a TV tuner module that is an example of the external structure according to the embodiment.

Figure 39D:
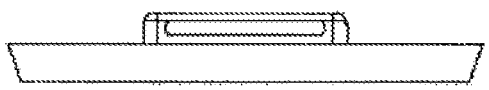

FIG. 39D is an exterior diagram of a TV tuner module that is an example of the external structure according to the embodiment.

Figure 39E:
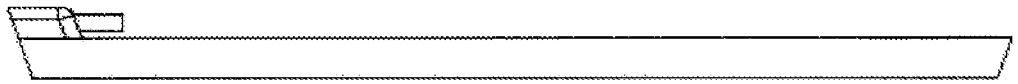

FIG. 39E is an exterior diagram of a TV tuner module that is an example of the external structure according to the embodiment.

Figure 39F:
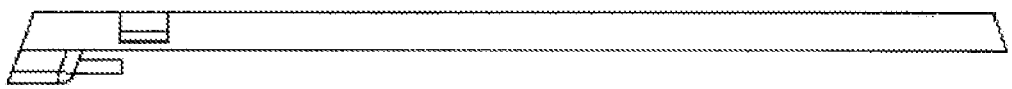

FIG. 39F is an exterior diagram of a TV tuner module that is an example of the external structure according to the embodiment.

Figure 39G:
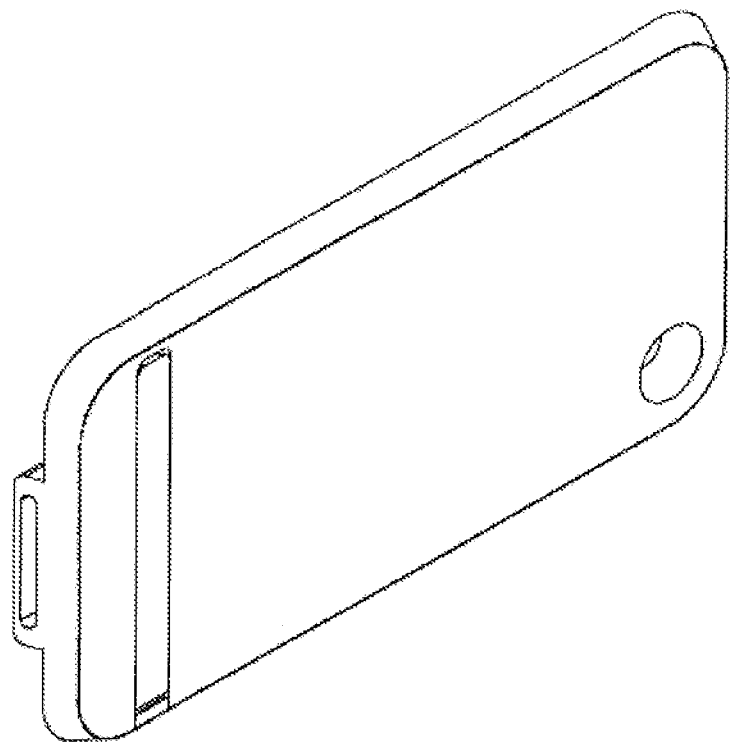

FIG. 39G is an exterior diagram of a TV tuner module that is an example of the external structure according to the embodiment.

Figure 39H:
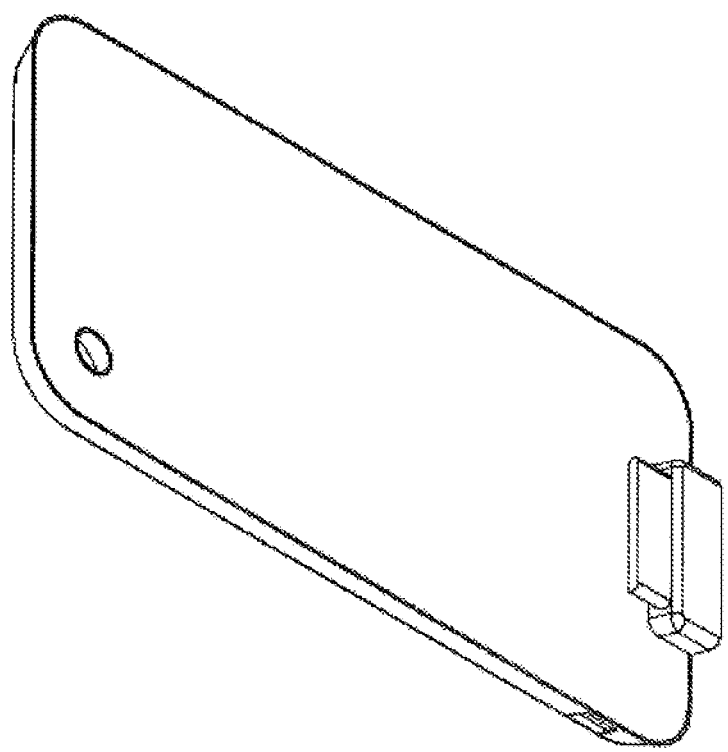

FIG. 39H is an exterior diagram of a TV tuner module that is an example of the external structure according to the embodiment.

Figure 40A:
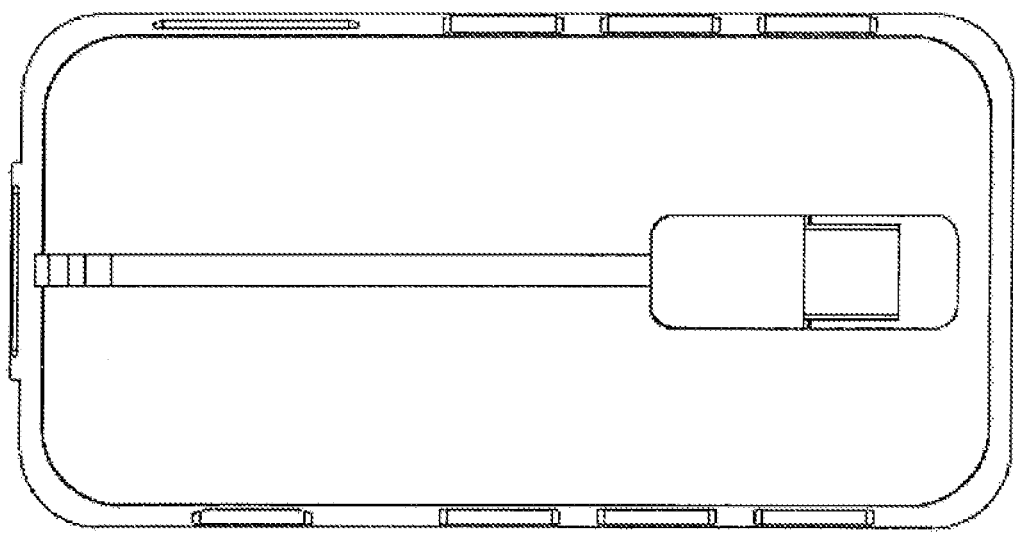

FIG. 40A is an exterior diagram of an extension port module that is an example of the external structure according to the embodiment.

Figure 40B:
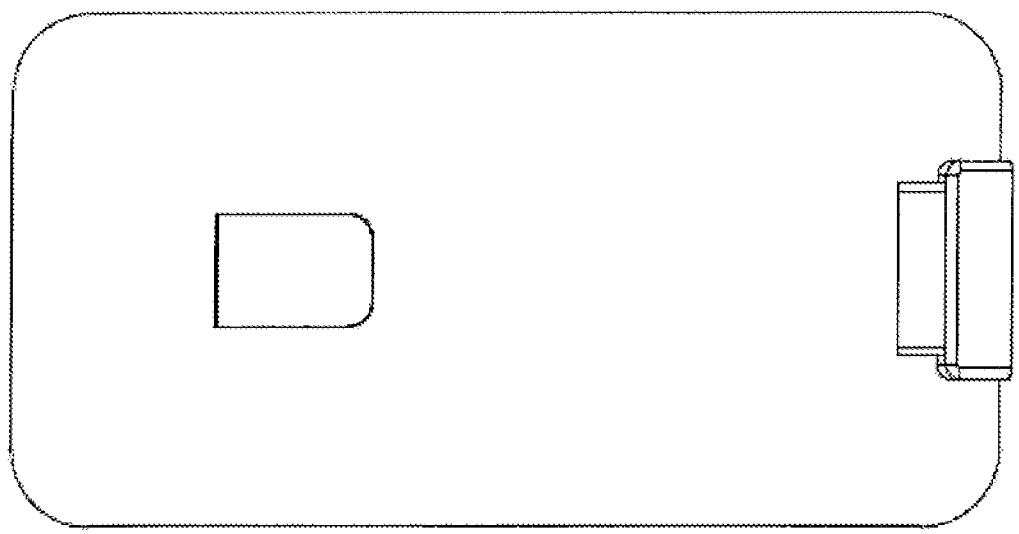

FIG. 40B is an exterior diagram of an extension port module that is an example of the external structure according to the embodiment.

Figure 40C:
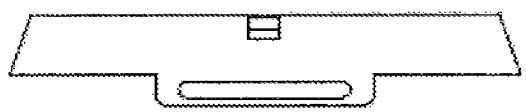

FIG. 40C is an exterior diagram of an extension port module that is an example of the external structure according to the embodiment.

Figure 40D:
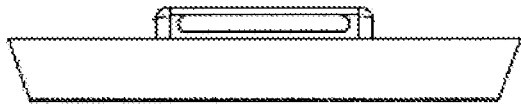

FIG. 40D is an exterior diagram of an extension port module that is an example of the external structure according to the embodiment.

Figure 40E:
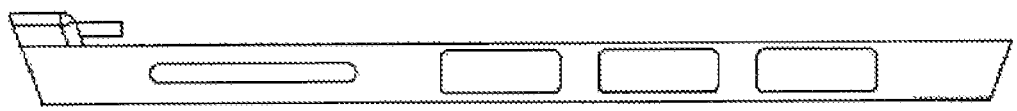

FIG. 40E is an exterior diagram of an extension port module that is an example of the external structure according to the embodiment.

Figure 40F:
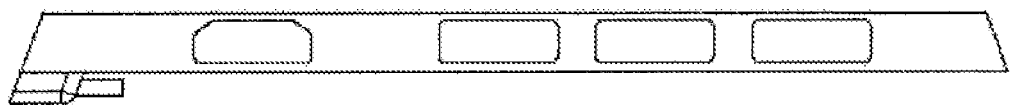

FIG. 40F is an exterior diagram of an extension port module that is an example of the external structure according to the embodiment.

Figure 40G:
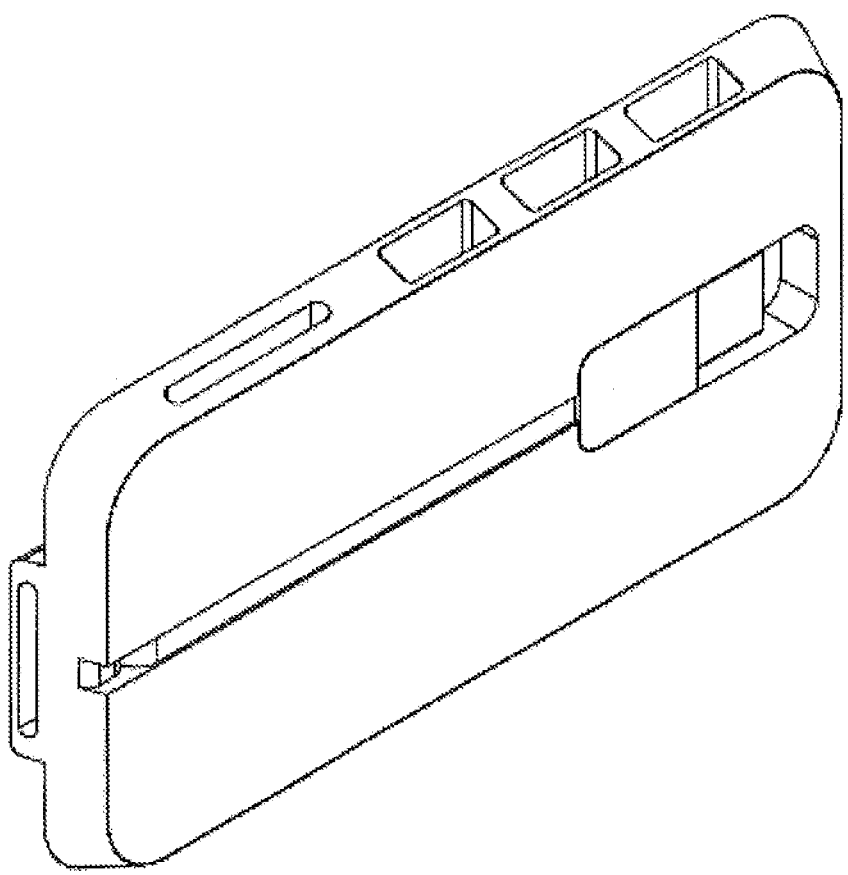

FIG. 40G is an exterior diagram of an extension port module that is an example of the external structure according to the embodiment.

Figure 40H:
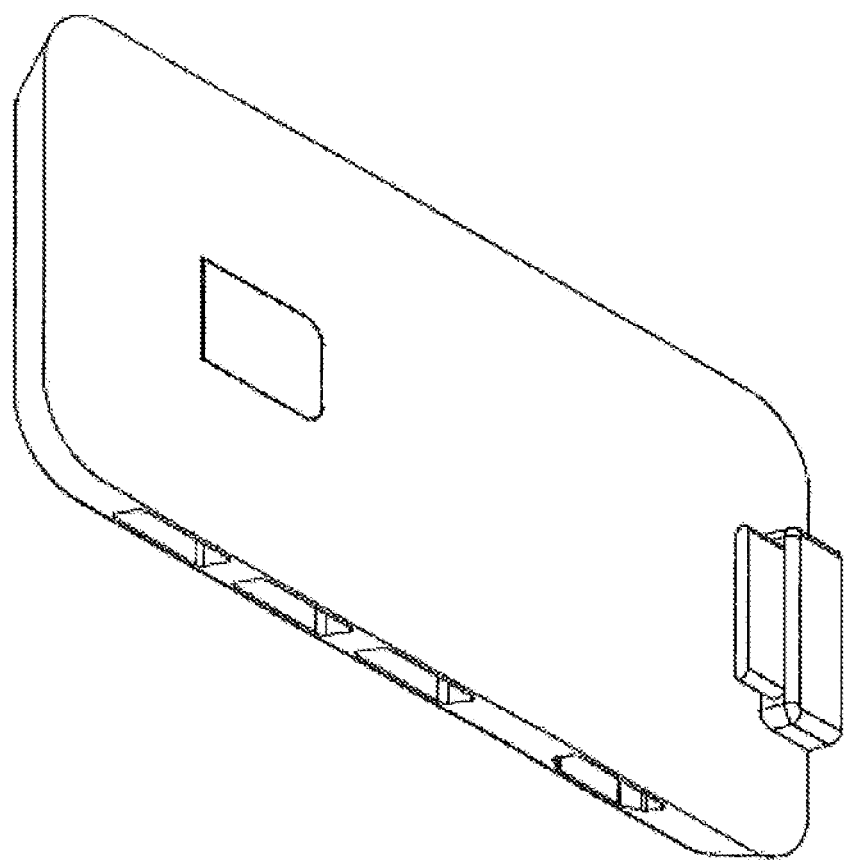

FIG. 40H is an exterior diagram of an extension port module that is an example of the external structure according to the embodiment.

Figure 40I:
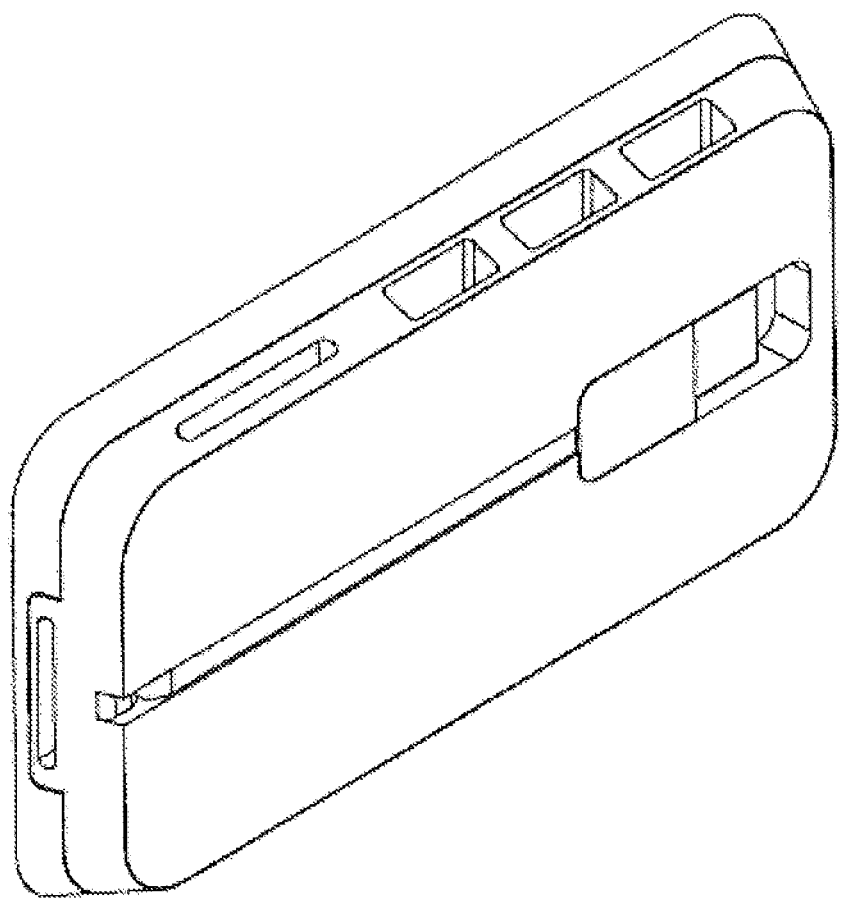

FIG. 40I is an exterior diagram of an extension port module that is an example of the external structure according to the embodiment.

Figure 41A:
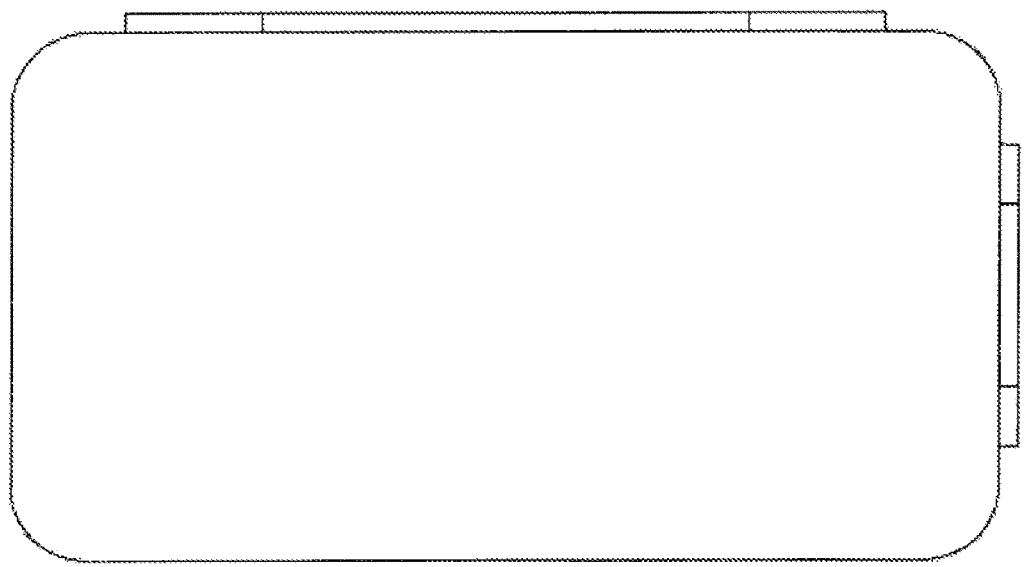

FIG. 41A is an exterior diagram of an adaptor module with hinges for linking to an electronic device which is an example of the external structure according to the embodiment.

Figure 41B:
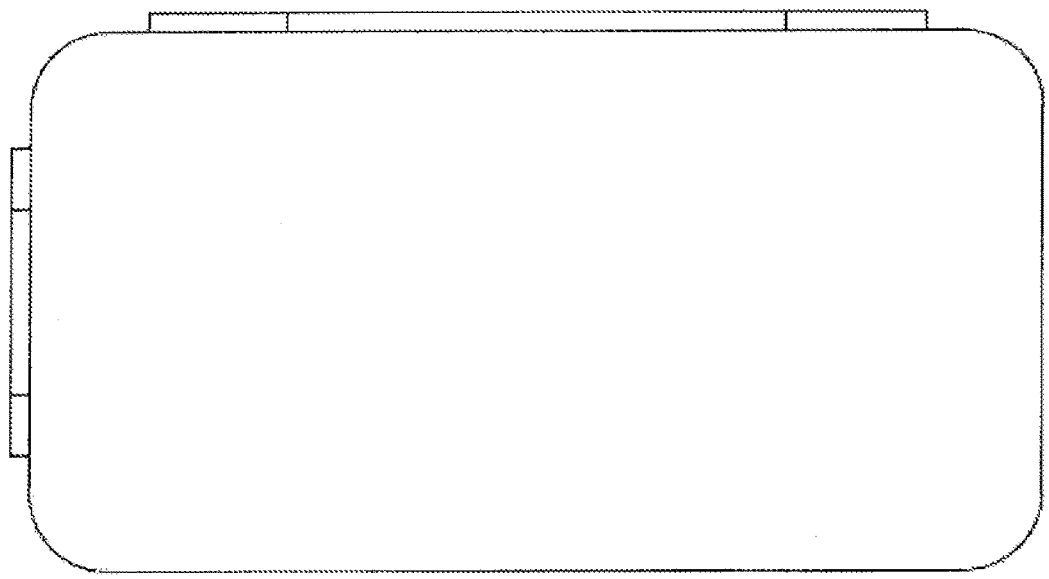

FIG. 41B is an exterior diagram of an adaptor module with hinges for linking to an electronic device which is an example of the external structure according to the embodiment.

Figure 41C:
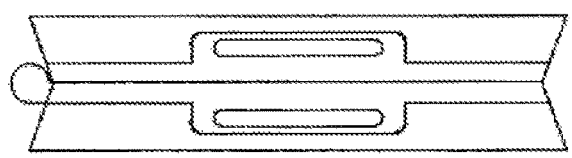

FIG. 41C is an exterior diagram of an adaptor module with hinges for linking to an electronic device which is an example of the external structure according to the embodiment.

Figure 41D:
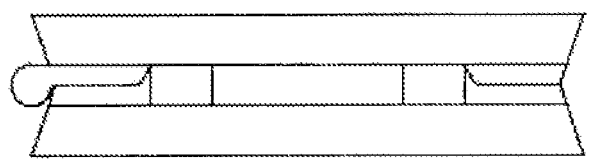

FIG. 41D is an exterior diagram of an adaptor module with hinges for linking to an electronic device which is an example of the external structure according to the embodiment.

Figure 41E:
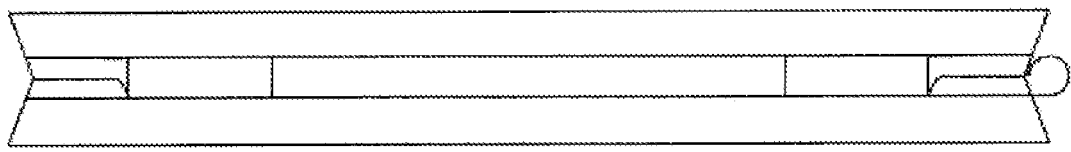

FIG. 41E is an exterior diagram of an adaptor module with hinges for linking to an electronic device which is an example of the external structure according to the embodiment.

Figure 41F:
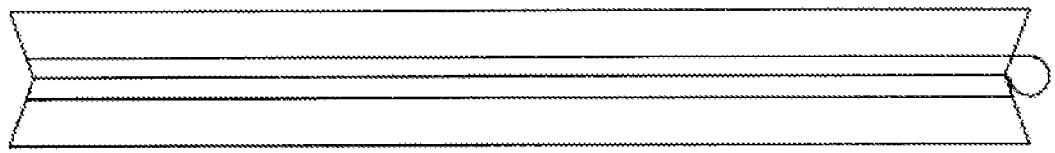

FIG. 41F is an exterior diagram of an adaptor module with hinges for linking to an electronic device which is an example of the external structure according to the embodiment.

Figure 41G:
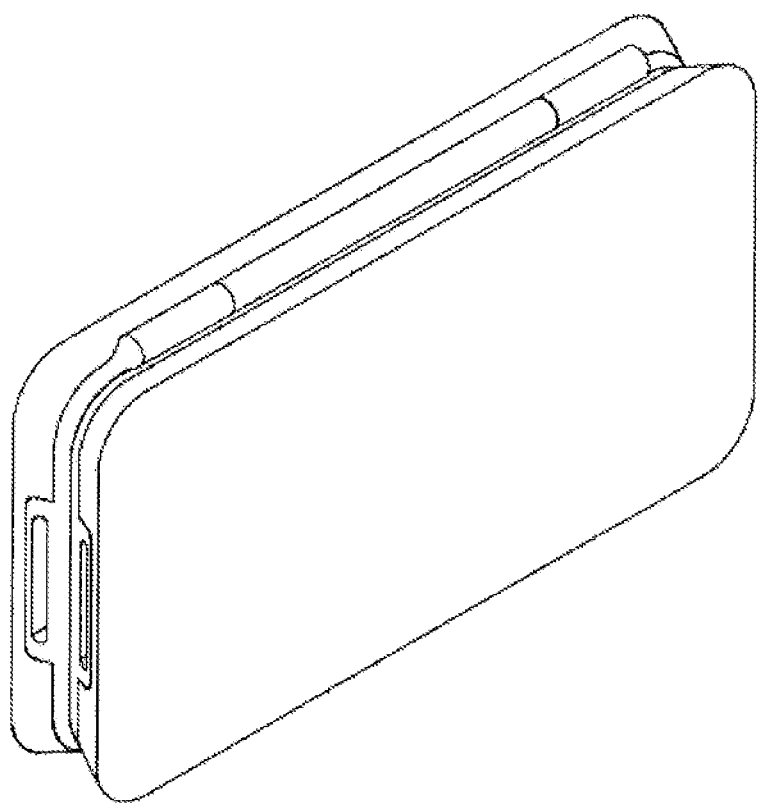

FIG. 41G is an exterior diagram of an adaptor module with hinges for linking to an electronic device which is an example of the external structure according to the embodiment.

Figure 41H:
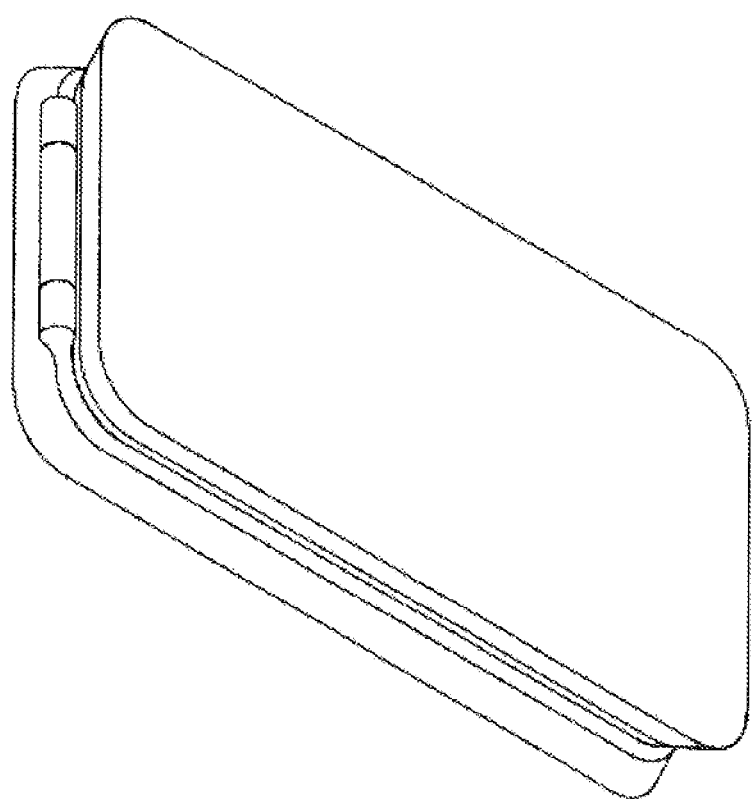

FIG. 41H is an exterior diagram of an adaptor module with hinges for linking to an electronic device which is an example of the external structure according to the embodiment.

Figure 41I:
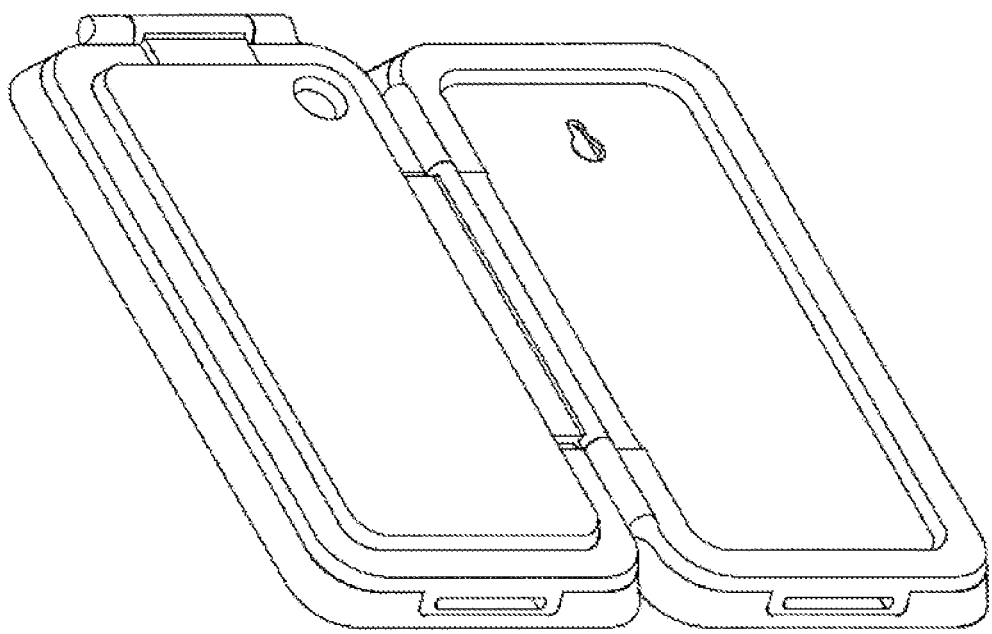

FIG. 41I is an exterior diagram of an adaptor module with hinges for linking to an electronic device which is an example of the external structure according to the embodiment.

Figure 41J:
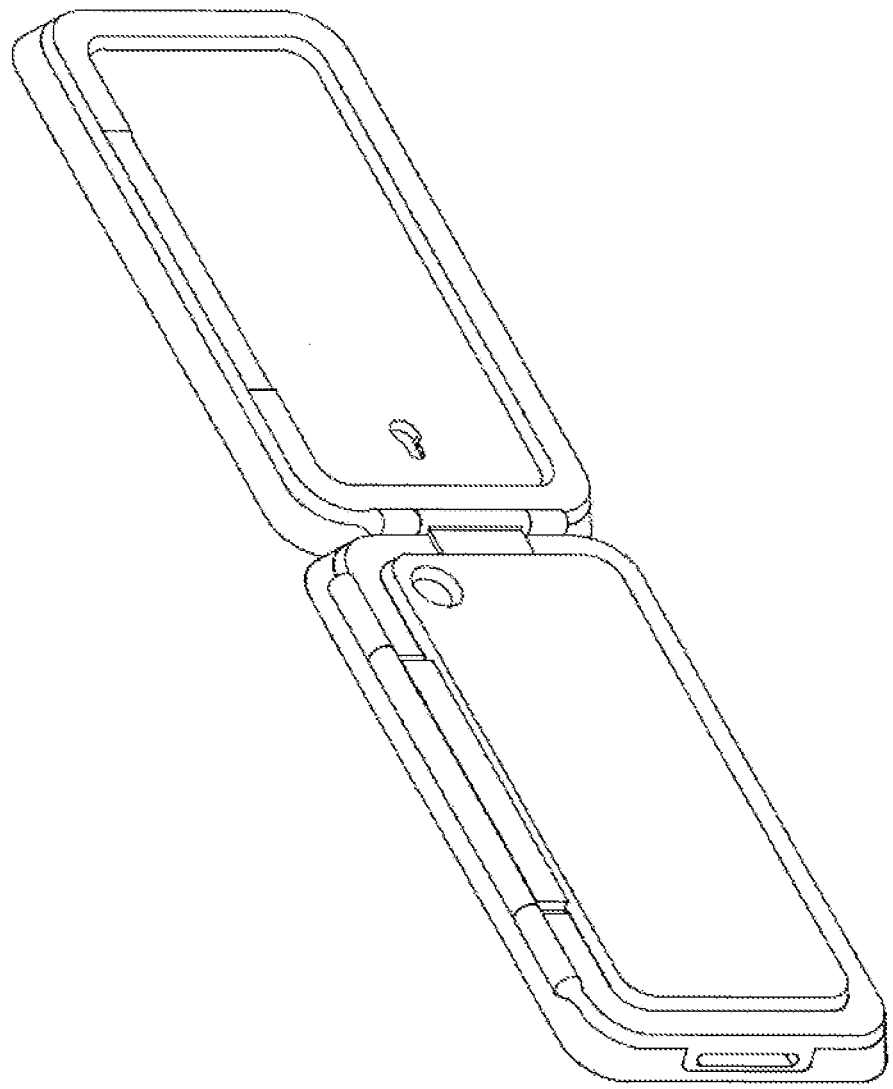

FIG. 41J is an exterior diagram of an adaptor module with hinges for linking to an electronic device which is an example of the external structure according to the embodiment.

Figure 41K:
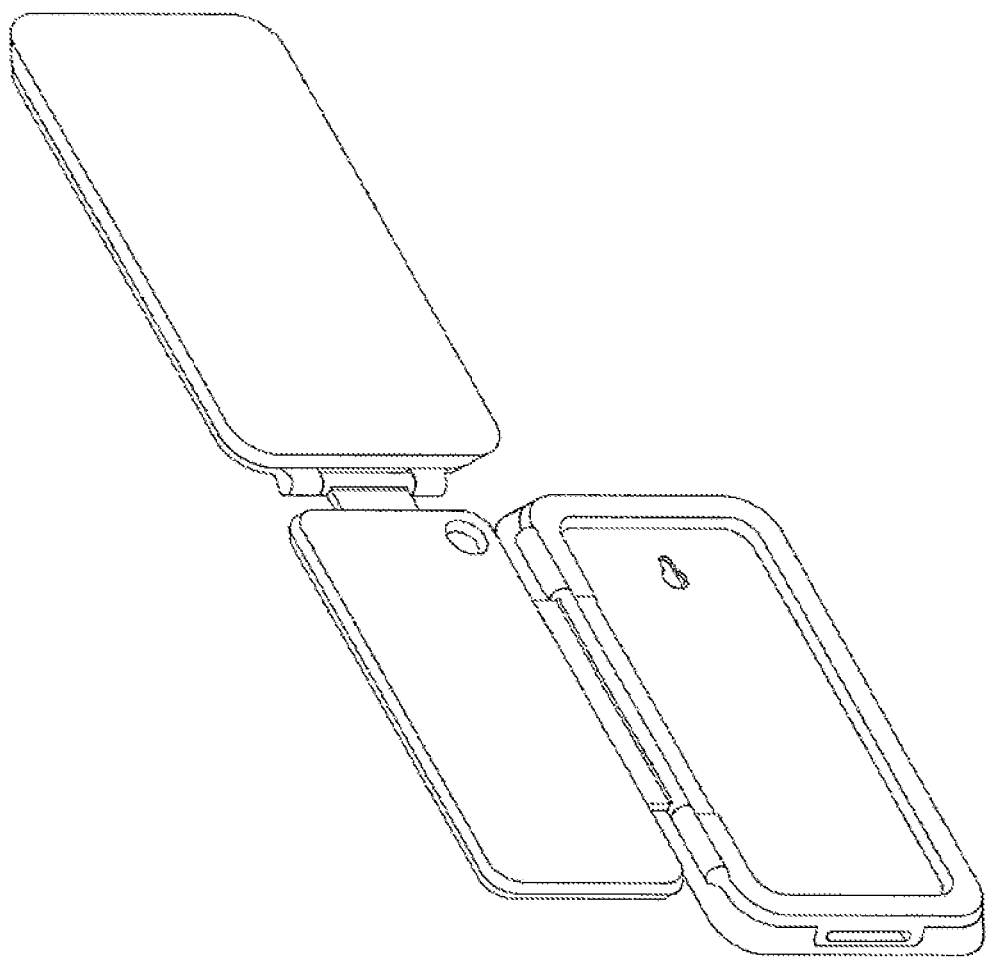

FIG. 41K is an exterior diagram of an adaptor module with hinges for linking to an electronic device which is an example of the external structure according to the embodiment.

Figure 42A:
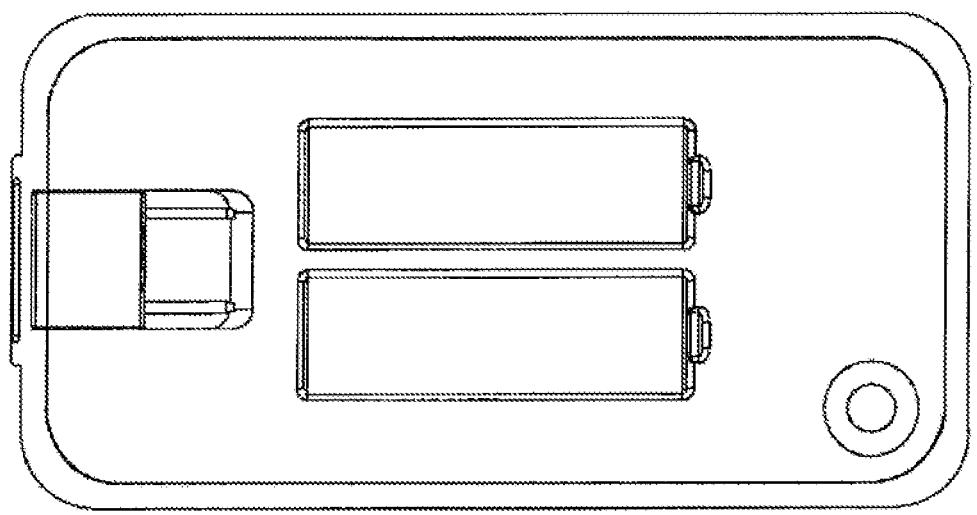

FIG. 42A is an exterior diagram of a battery module that is an example of the external structure according to the embodiment.

Figure 42B:
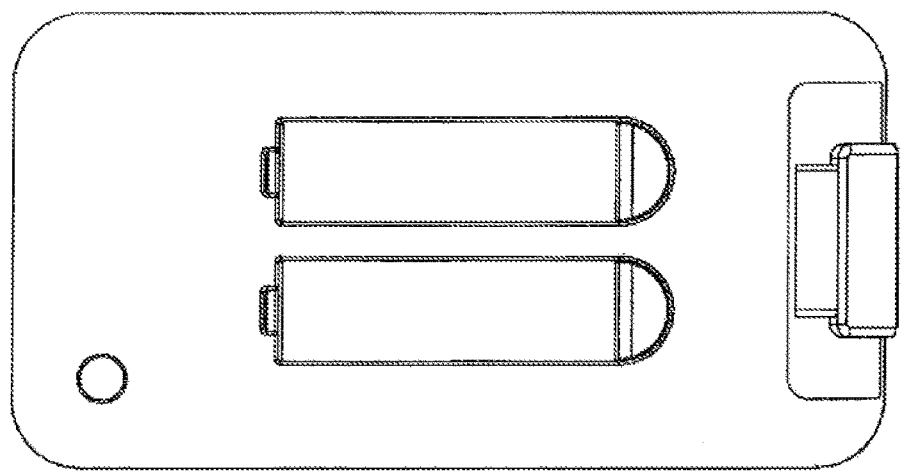

FIG. 42B is an exterior diagram of a battery module that is an example of the external structure according to the embodiment.

Figure 42C:
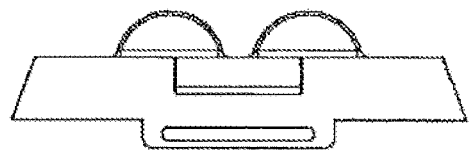

FIG. 42C is an exterior diagram of a battery module that is an example of the external structure according to the embodiment.

Figure 42D:
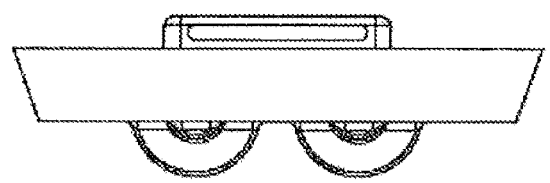

FIG. 42D is an exterior diagram of a battery module that is an example of the external structure according to the embodiment.

Figure 42E:
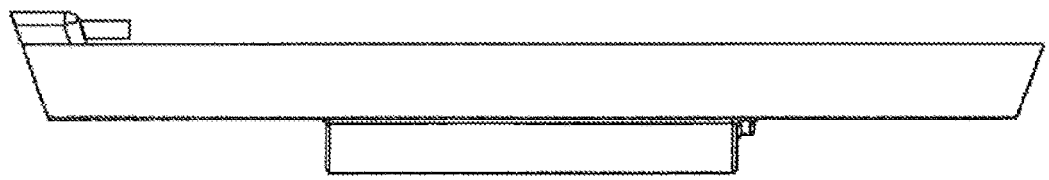

FIG. 42E is an exterior diagram of a battery module that is an example of the external structure according to the embodiment.

Figure 42F:
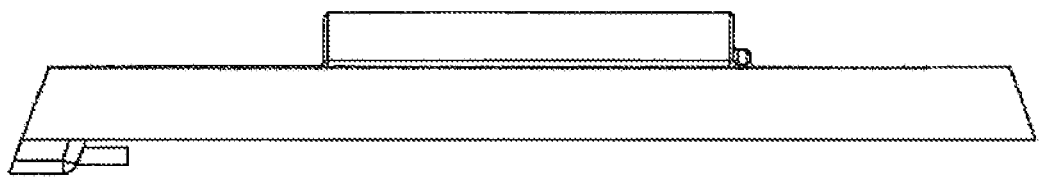

FIG. 42F is an exterior diagram of a battery module that is an example of the external structure according to the embodiment.

Figure 42G:
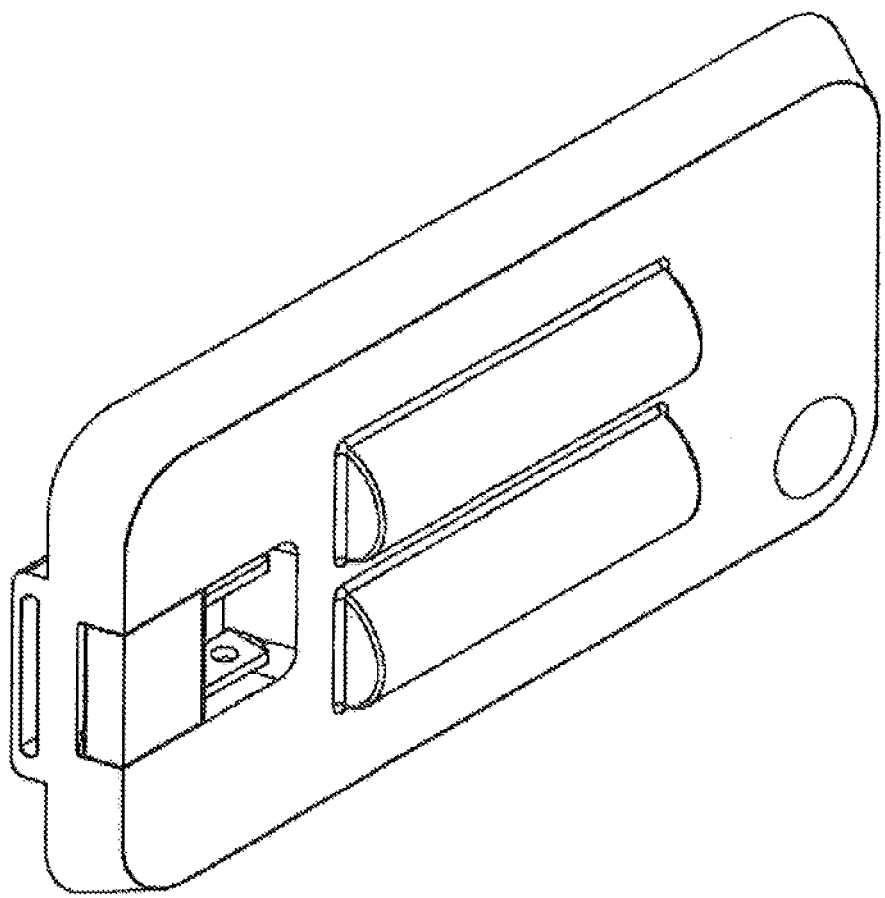

FIG. 42G is an exterior diagram of a battery module that is an example of the external structure according to the embodiment.

Figure 42H:
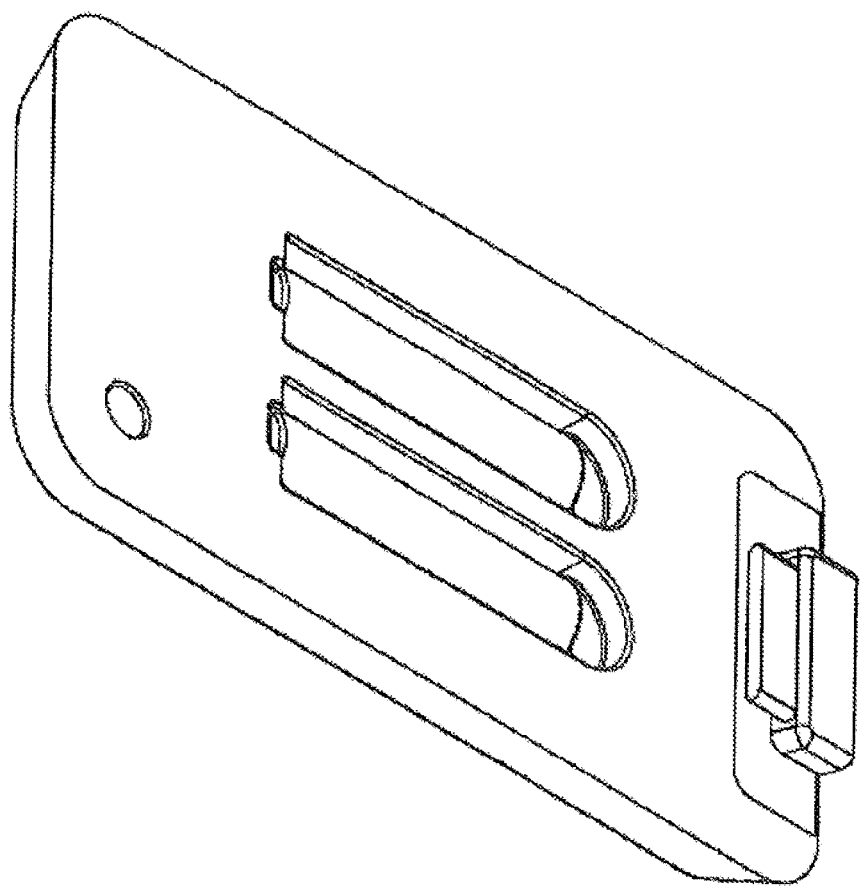

FIG. 42H is an exterior diagram of a battery module that is an example of the external structure according to the embodiment.

Figure 43A:
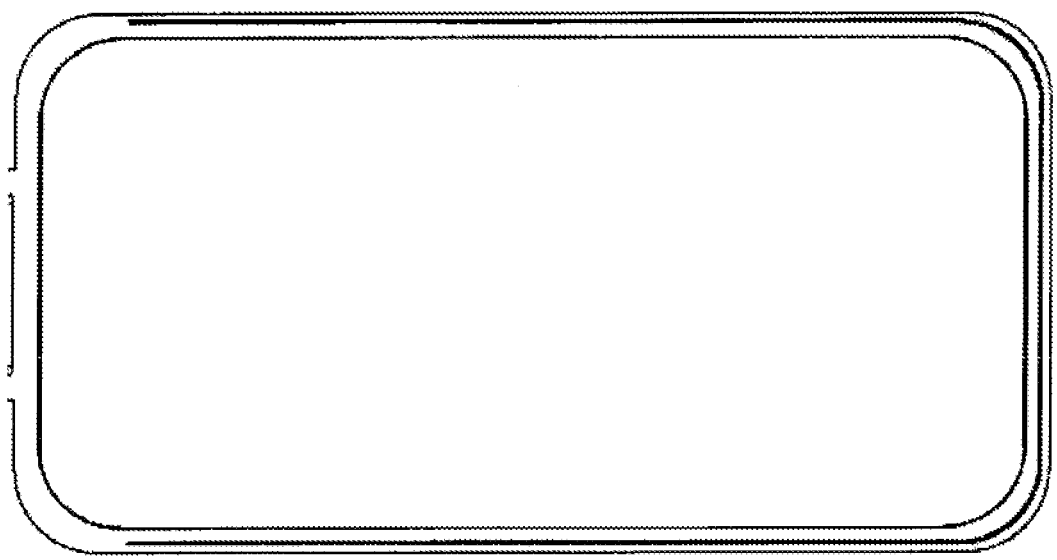

FIG. 43A is an exterior diagram of a printer module that is an example of the external structure according to the embodiment.

FIG. 43A is an exterior diagram of a printer module that is an example of the external structure according to the embodiment.

Figure 43B:
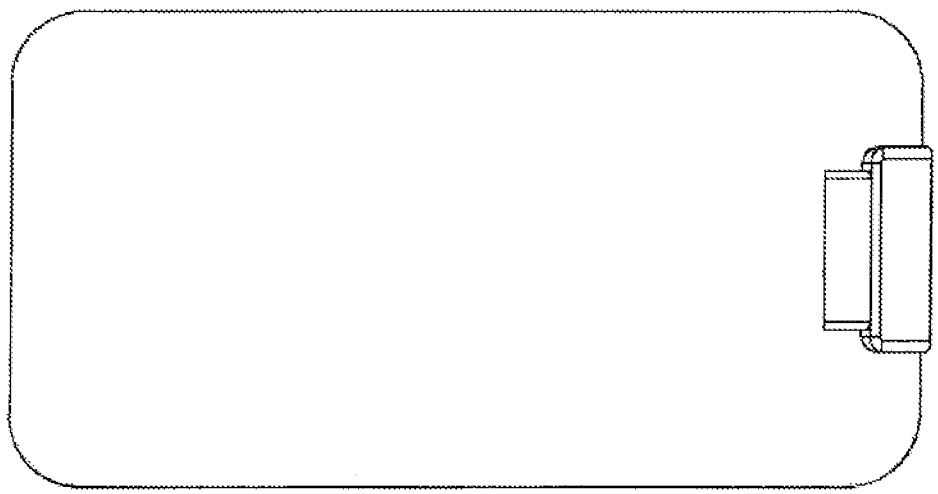

FIG. 43B is an exterior diagram of a printer module that is an example of the external structure according to the embodiment.

Figure 43C:
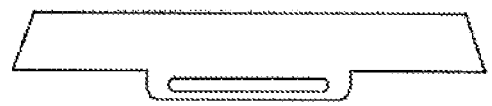

FIG. 43C is an exterior diagram of a printer module that is an example of the external structure according to the embodiment.

Figure 43D:
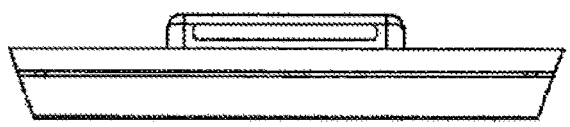

FIG. 43D is an exterior diagram of a printer module that is an example of the external structure according to the embodiment.

Figure 43E:

FIG. 43E is an exterior diagram of a printer module that is an example of the external structure according to the embodiment.

Figure 43F:
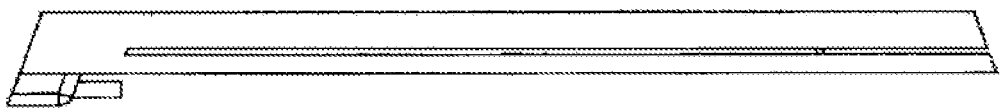

FIG. 43F is an exterior diagram of a printer module that is an example of the external structure according to the embodiment.

Figure 43G:
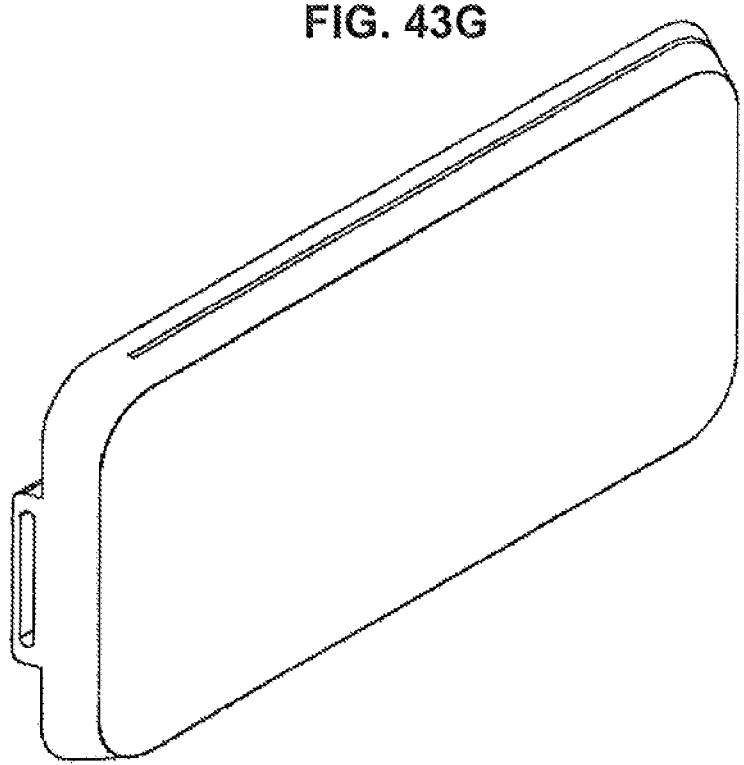

FIG. 43G is an exterior diagram of a printer module that is an example of the external structure according to the embodiment.

Figure 43H:
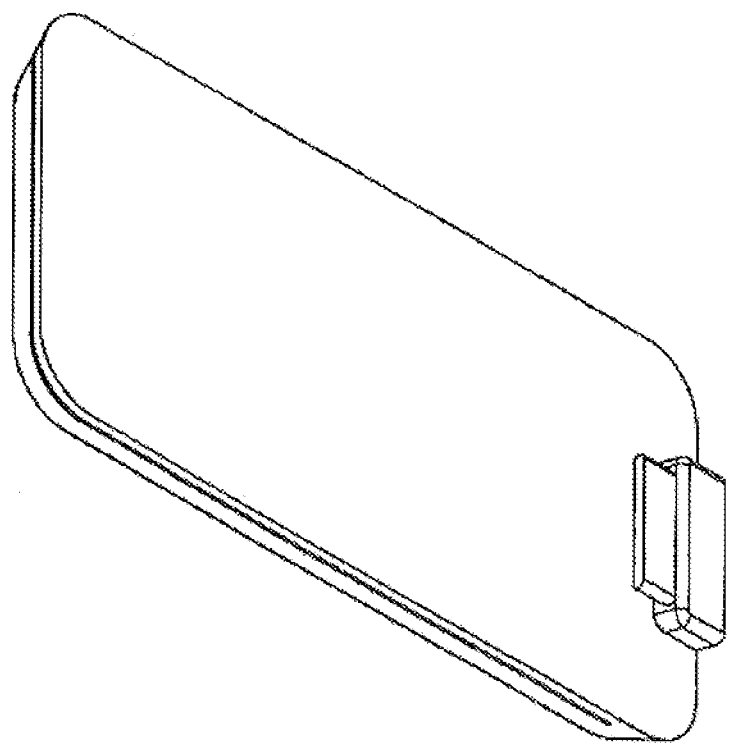

FIG. 43H is an exterior diagram of a printer module that is an example of the external structure according to the embodiment.

Figure 44A:
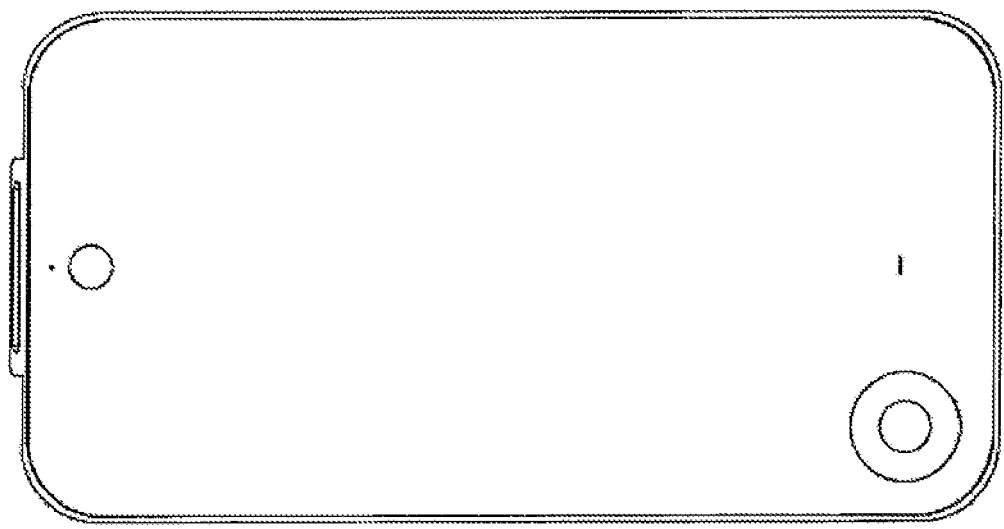

FIG. 44A is an exterior diagram of a wireless communication module that is an example of the external structure according to the embodiment.

Figure 44B:
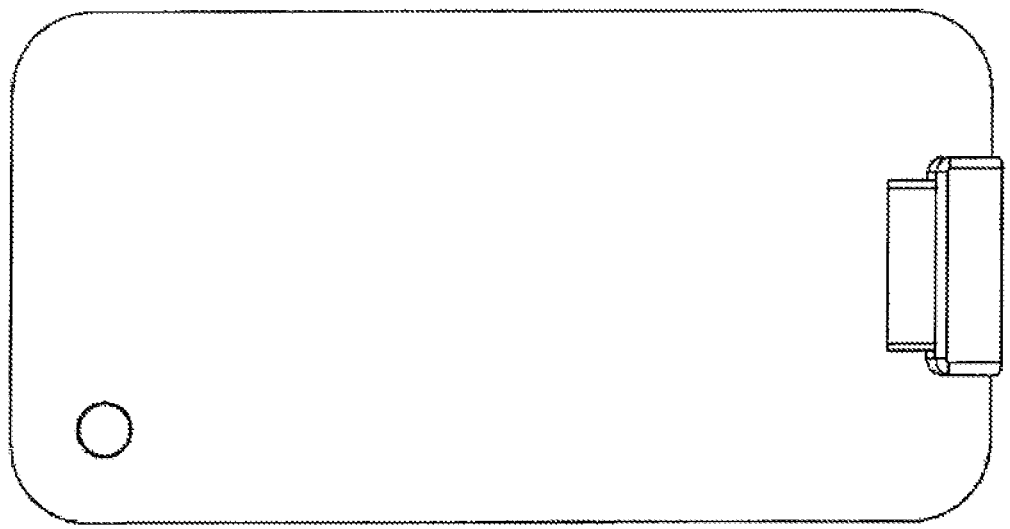

FIG. 44B is an exterior diagram of a wireless communication module that is an example of the external structure according to the embodiment.

Figure 44C:

FIG. 44C is an exterior diagram of a wireless communication module that is an example of the external structure according to the embodiment.

Figure 44D:
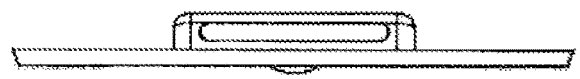

FIG. 44D is an exterior diagram of a wireless communication module that is an example of the external structure according to the embodiment.

Figure 44E:
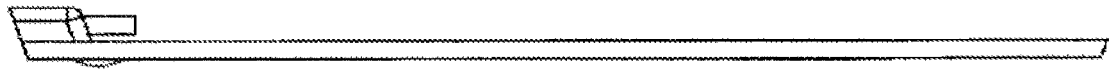

FIG. 44E is an exterior diagram of a wireless communication module that is an example of the external structure according to the embodiment.

Figure 44F:
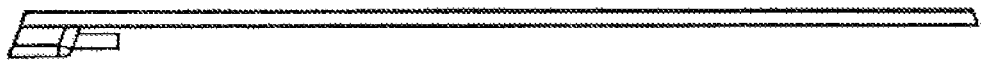

FIG. 44F is an exterior diagram of a wireless communication module that is an example of the external structure according to the embodiment.

Figure 44G:
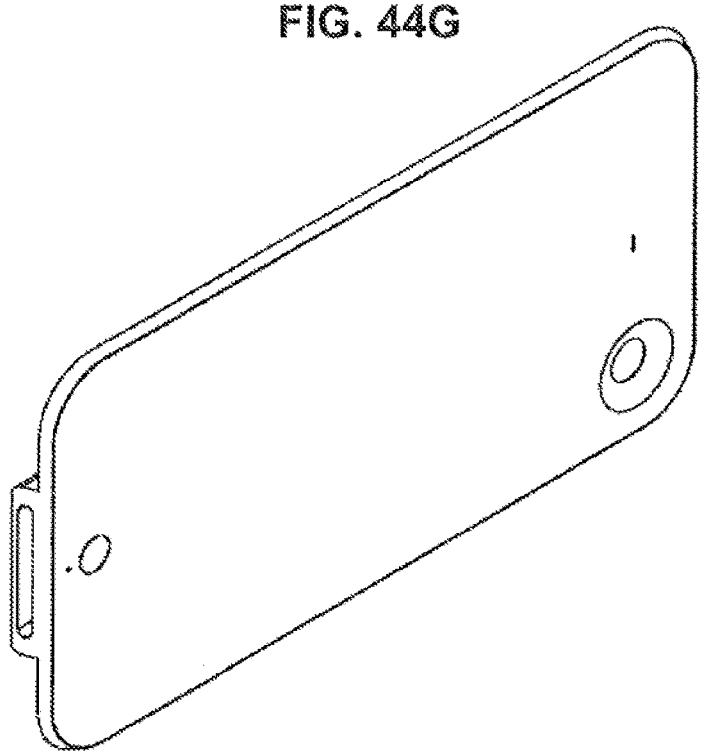

FIG. 44G is an exterior diagram of a wireless communication module that is an example of the external structure according to the embodiment.

Figure 44H:
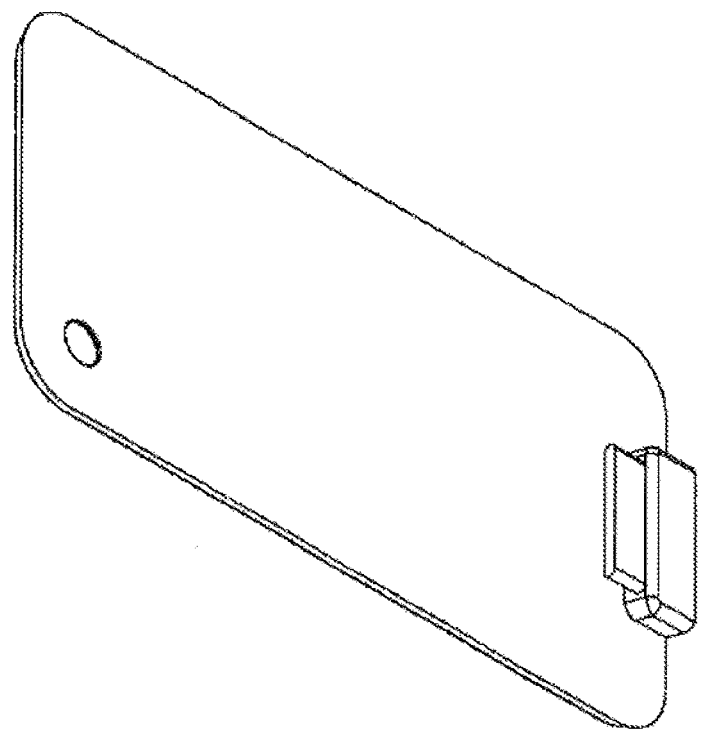

FIG. 44H is an exterior diagram of a wireless communication module that is an example of the external structure according to the embodiment.

Figure 45A:
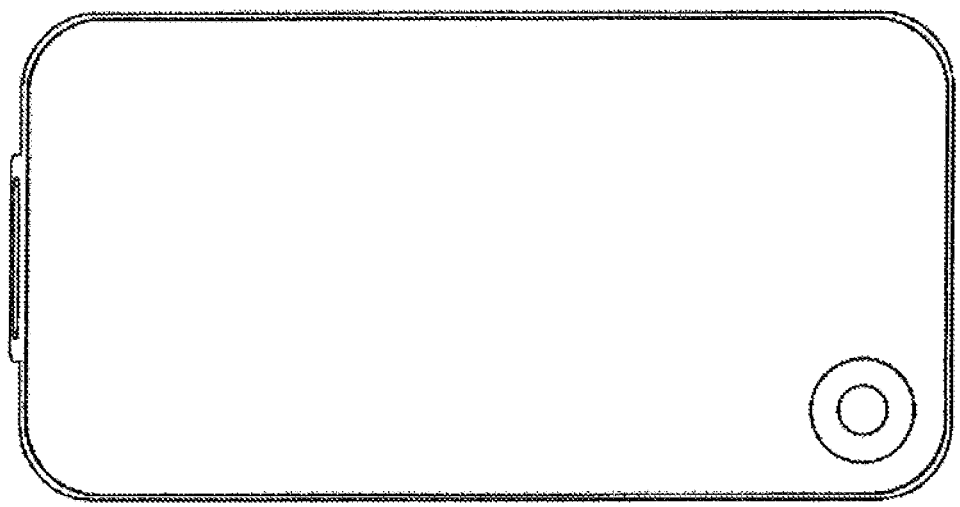

FIG. 45A is an exterior diagram of a non-contact charge and non-contact IC card communication function added module that is an example of the external structure according to the embodiment.

Figure 45B:
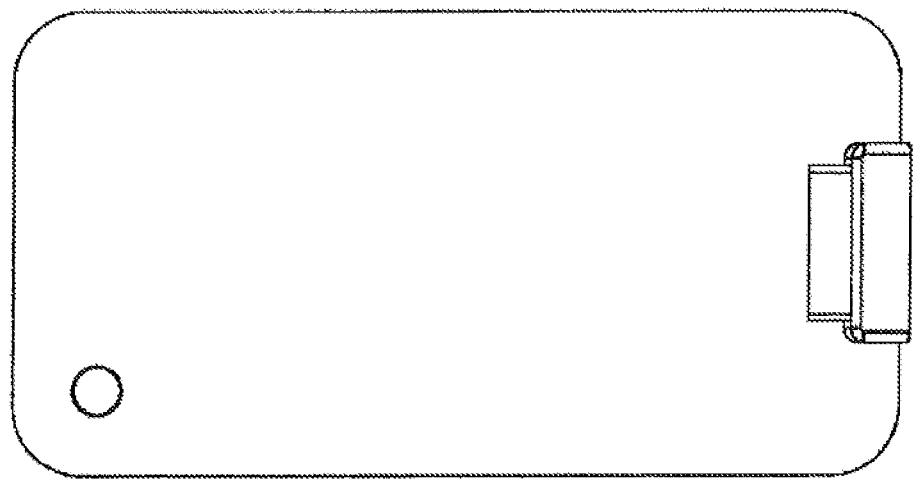

FIG. 45B is an exterior diagram of a non-contact charge and non-contact IC card communication function added module that is an example of the external structure according to the embodiment.

Figure 45C:
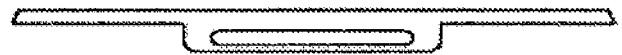

FIG. 45C is an exterior diagram of a non-contact charge and non-contact IC card communication function added module that is an example of the external structure according to the embodiment.

Figure 45D:
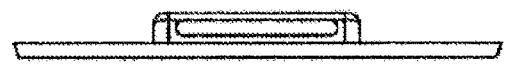

FIG. 45D is an exterior diagram of a non-contact charge and non-contact IC card communication function added module that is an example of the external structure according to the embodiment.

Figure 45E:

FIG. 45E is an exterior diagram of a non-contact charge and non-contact IC card communication function added module that is an example of the external structure according to the embodiment.

Figure 45F:
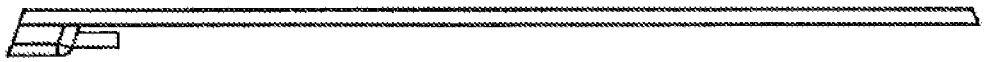

FIG. 45F is an exterior diagram of the non-contact charge module that is an example of the external structure according to the embodiment.

Figure 45G:
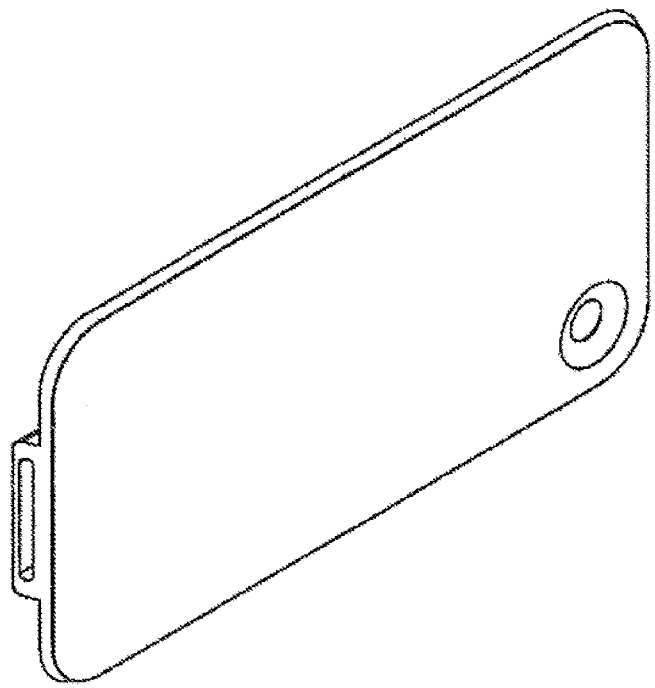

FIG. 45G is an exterior diagram of the non-contact charge and non-contact IC card communication function added module that is an example of the external structure according to the embodiment.

Figure 45H:
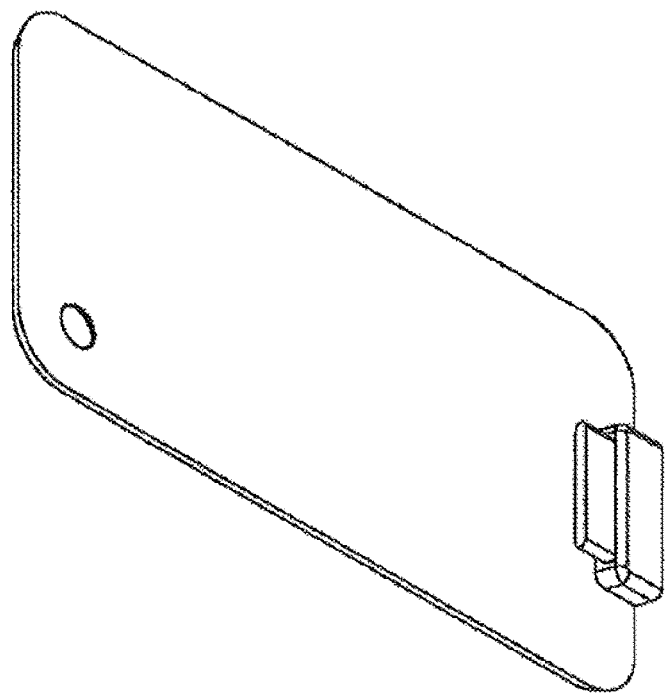

FIG. 45H is an exterior diagram of the non-contact charge and non-contact IC card communication function added module that is an example of the external structure according to the embodiment.

Figure 46A:
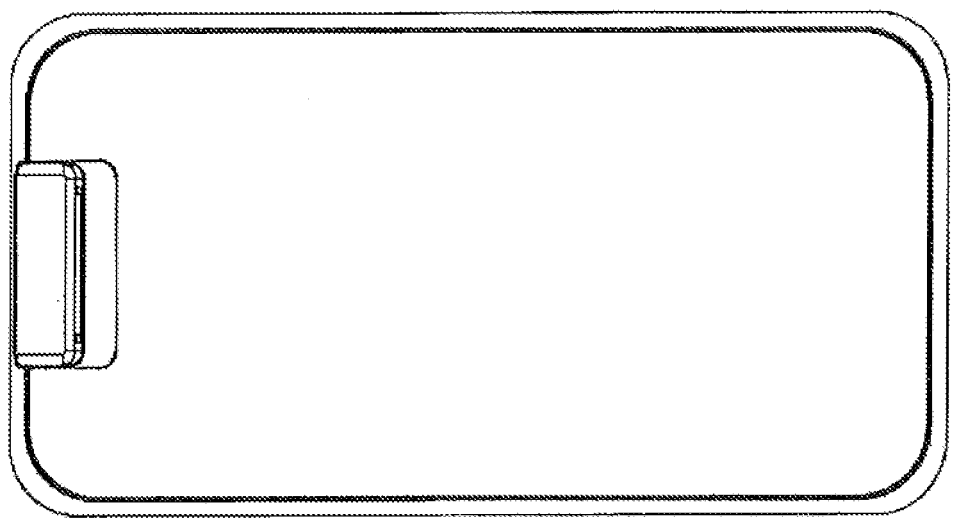

FIG. 46A is an exterior diagram of an example of the electronic device according to the embodiment.

Figure 46B:
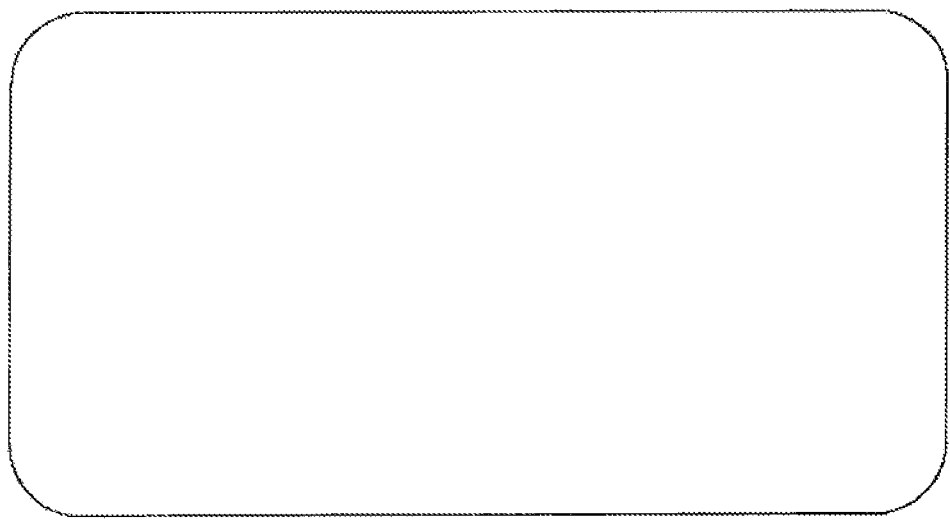

FIG. 46B is an exterior diagram of an example of the electronic device according to the embodiment.

Figure 46C:
Figure 46D:

FIG. 46C is an exterior diagram of an example of the electronic device according to the embodiment.

FIG. 46A is an exterior diagram of an example of the electronic device according to the embodiment.

Figure 46E:
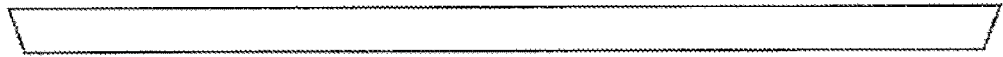

FIG. 46E is an exterior diagram of an example of the electronic device according to the embodiment.

Figure 46F:
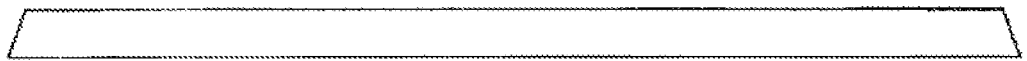

FIG. 46F is an exterior diagram of an example of the electronic device according to the embodiment.

Figure 46G:
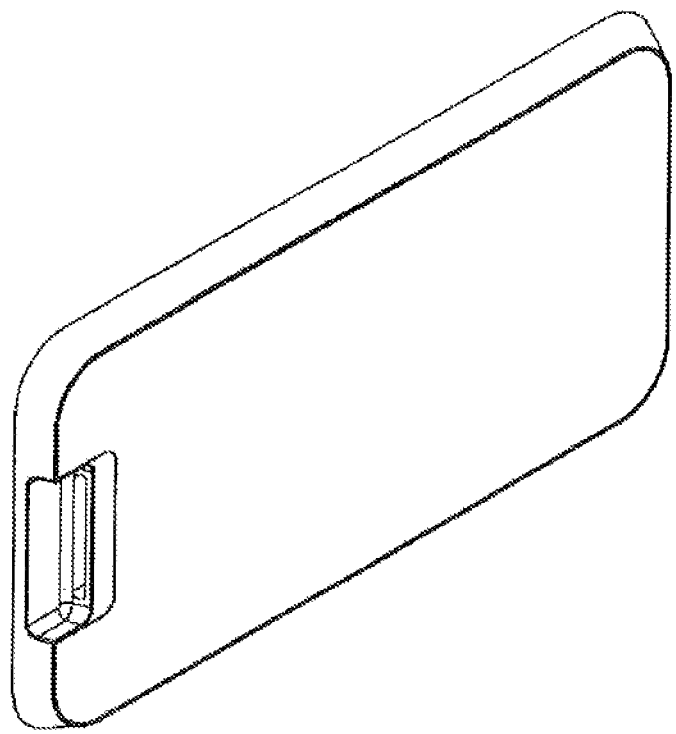

FIG. 46G is an exterior diagram of an example of the electronic device according to the embodiment.

Figure 46H:
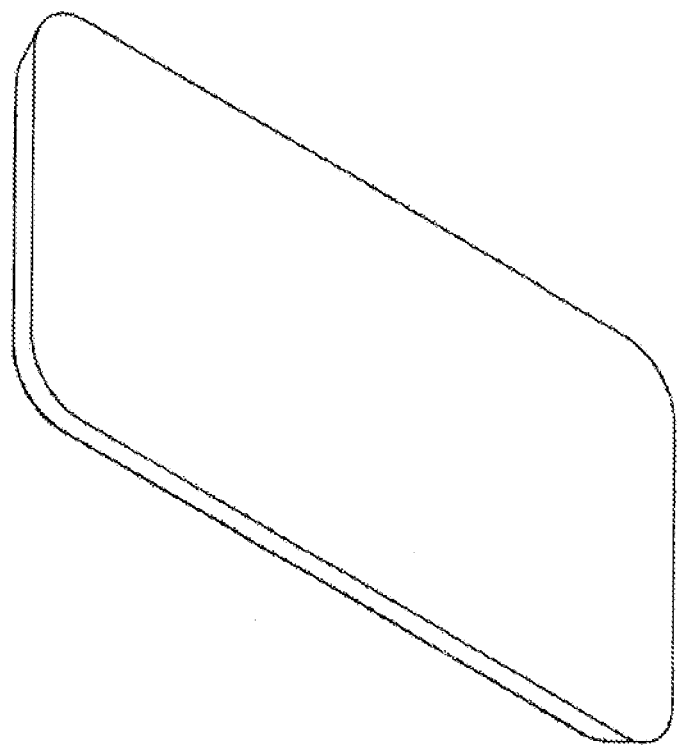

FIG. 46H is an exterior diagram of an example of the electronic device according to the embodiment.

Figure 47A:
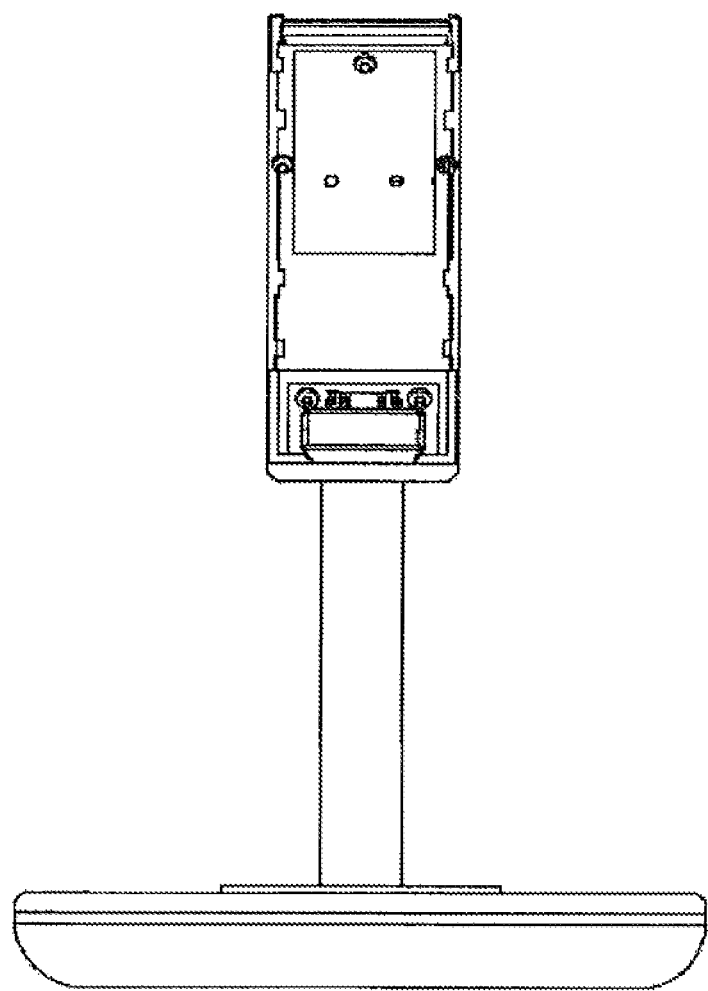

FIG. 47A is an exterior diagram of an electronic device holding stand that is an example of the external structure according to the embodiment.

Figure 47B:
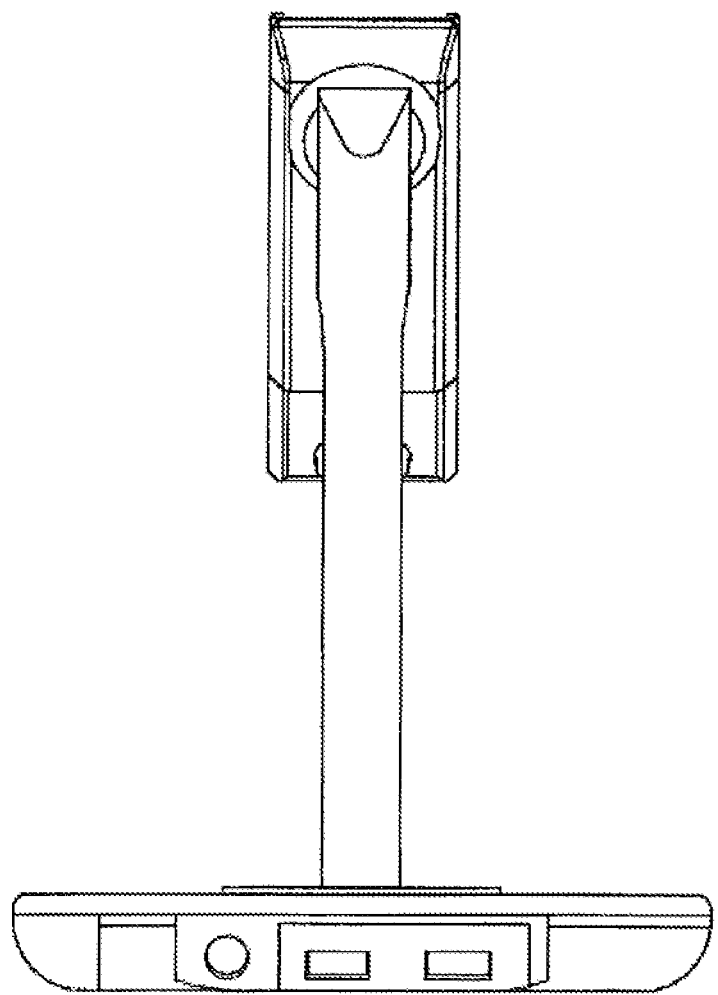

FIG. 47B is an exterior diagram of an electronic device holding stand that is an example of the external structure according to the embodiment.

Figure 47C:
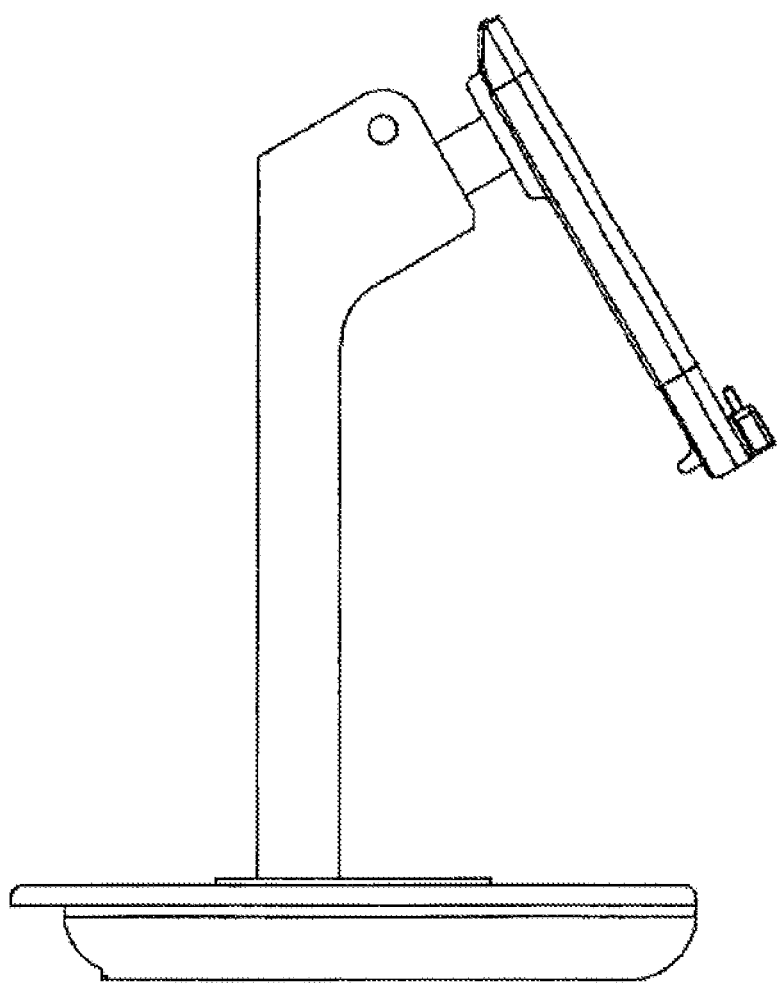

FIG. 47C is an exterior diagram of an electronic device holding stand that is an example of the external structure according to the embodiment.

Figure 47D:
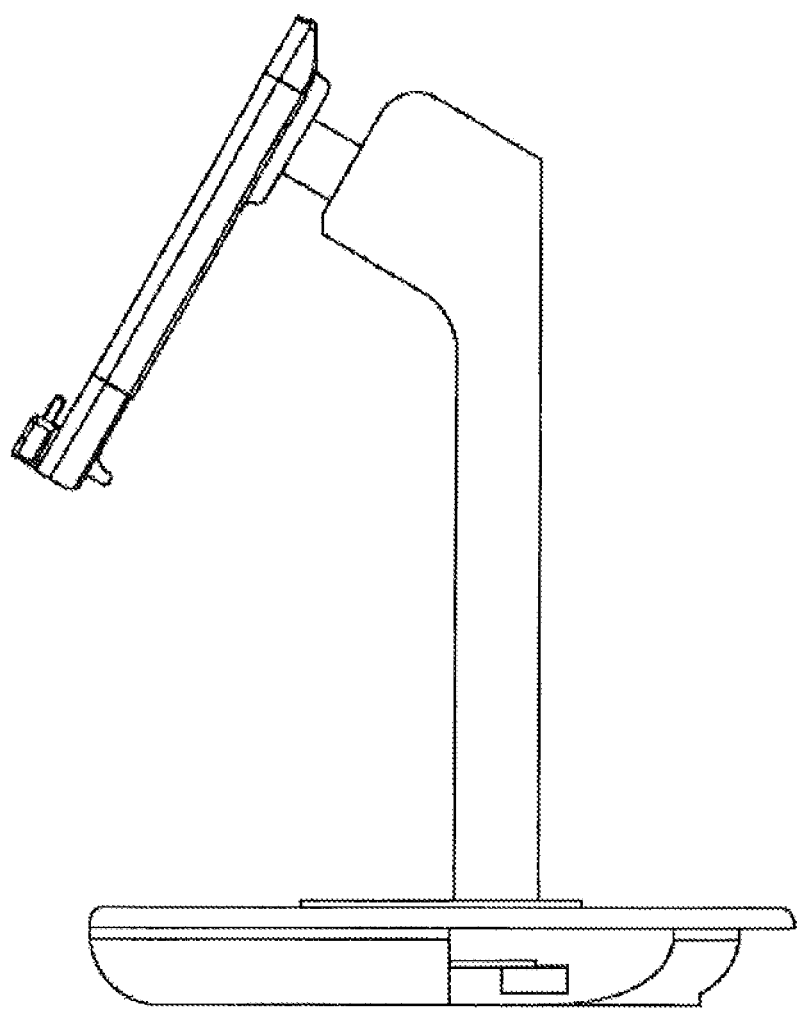

FIG. 47D is an exterior diagram of an electronic device holding stand that is an example of the external structure according to the embodiment.

Figure 47E:
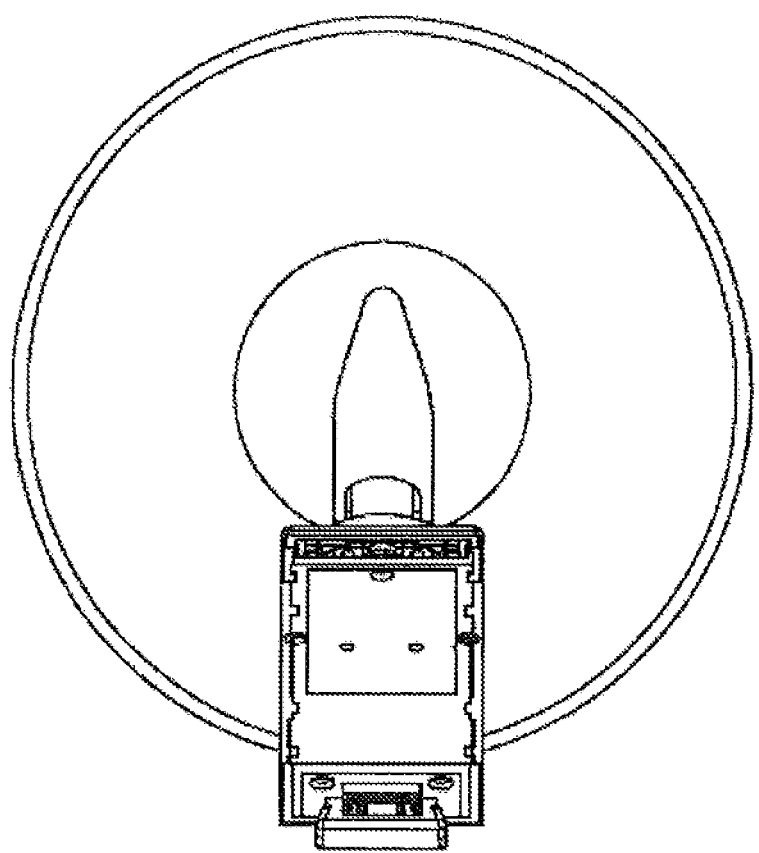

FIG. 47E is an exterior diagram of an electronic device holding stand that is an example of the external structure according to the embodiment.

Figure 47F:
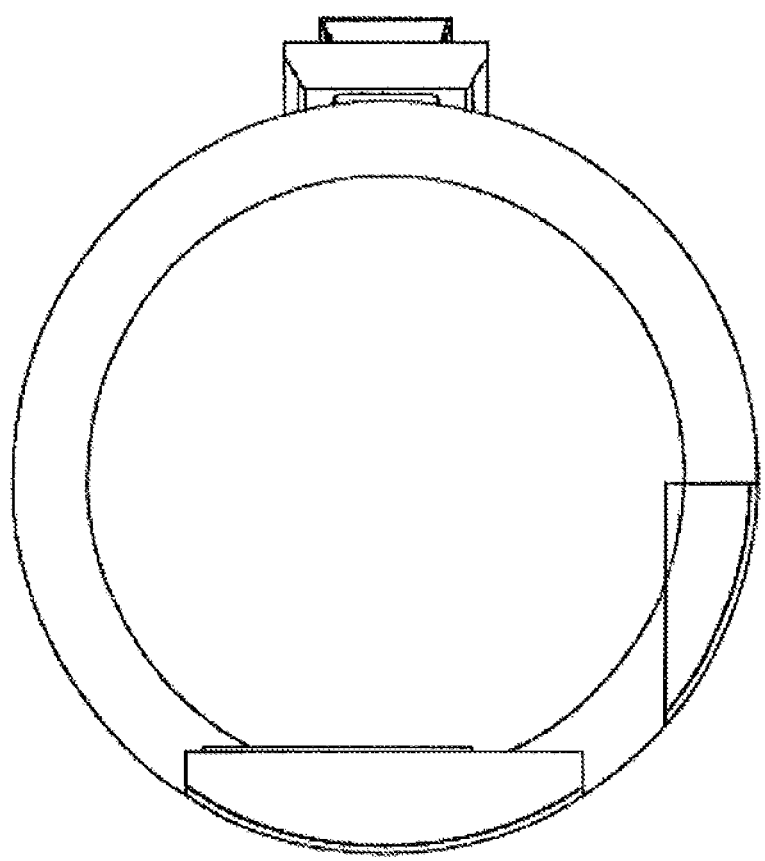

FIG. 47F is an exterior diagram of an electronic device holding stand that is an example of the external structure according to the embodiment.

Figure 47G:
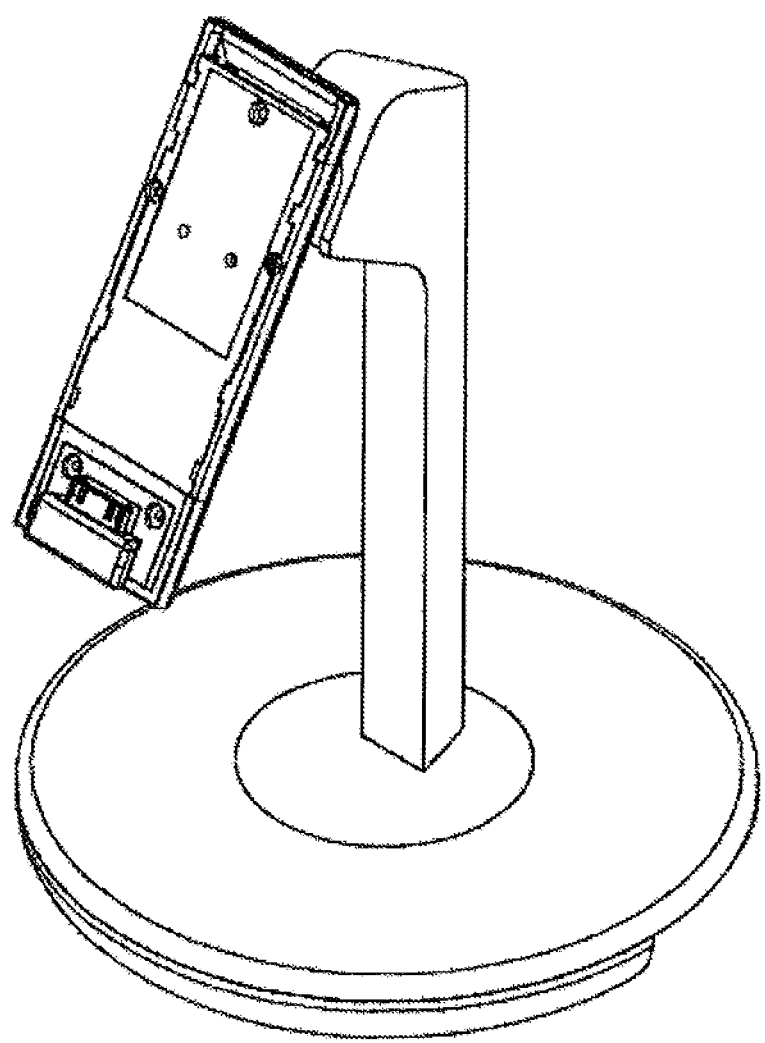

FIG. 47G is an exterior diagram of an electronic device holding stand that is an example of the external structure according to the embodiment.

Figure 47H:
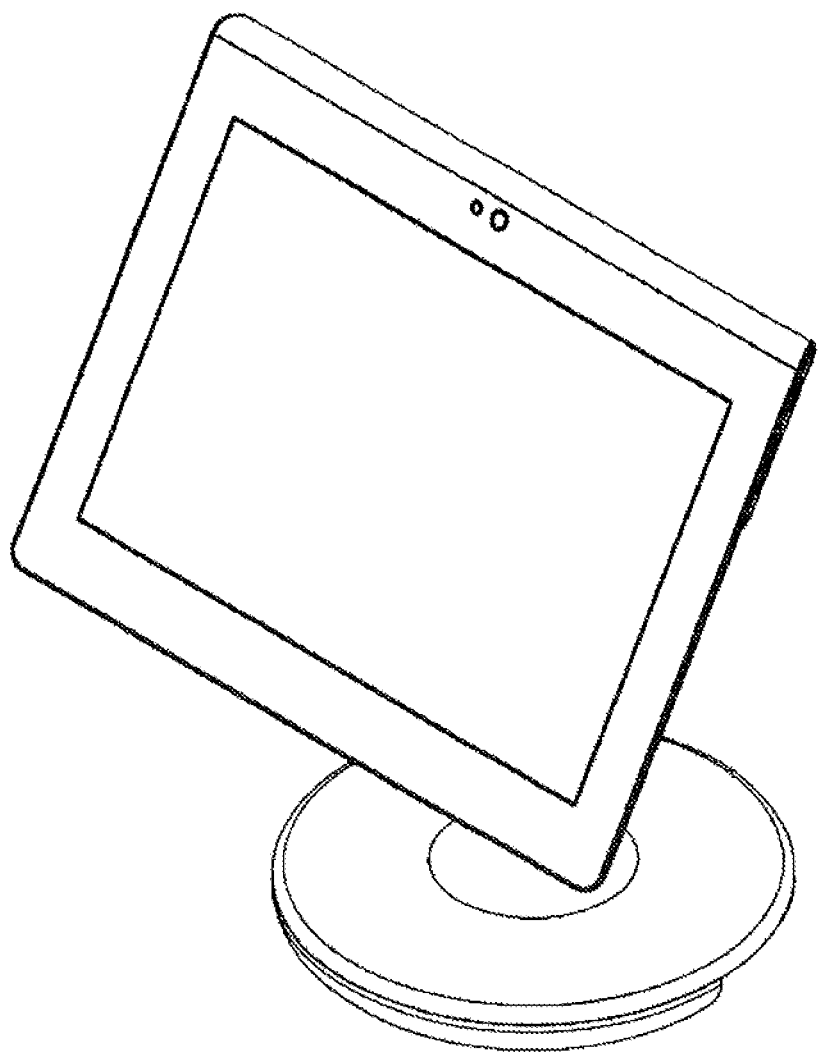

FIG. 47H is an exterior diagram of an electronic device holding stand that is an example of the external structure according to the embodiment.

Figure 47I:
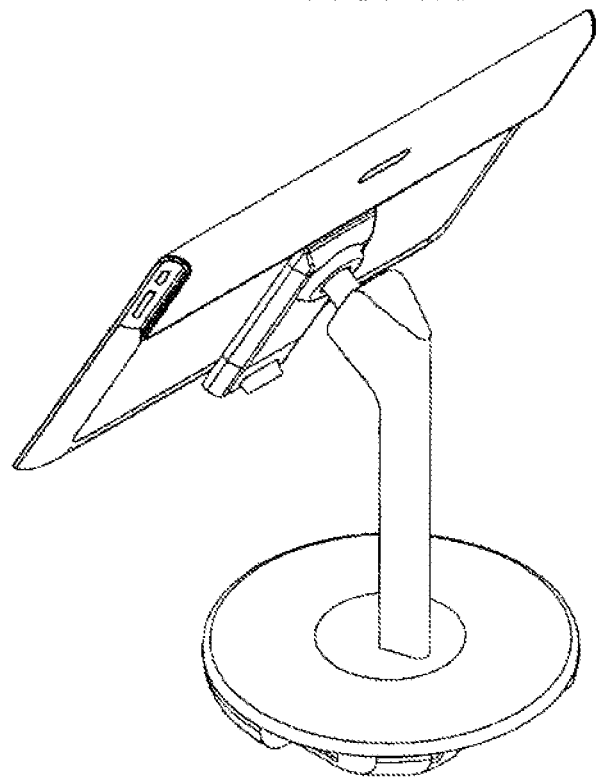

FIG. 47I is an exterior diagram of an electronic device holding stand that is an example of the external structure according to the embodiment.

Figure 47J:
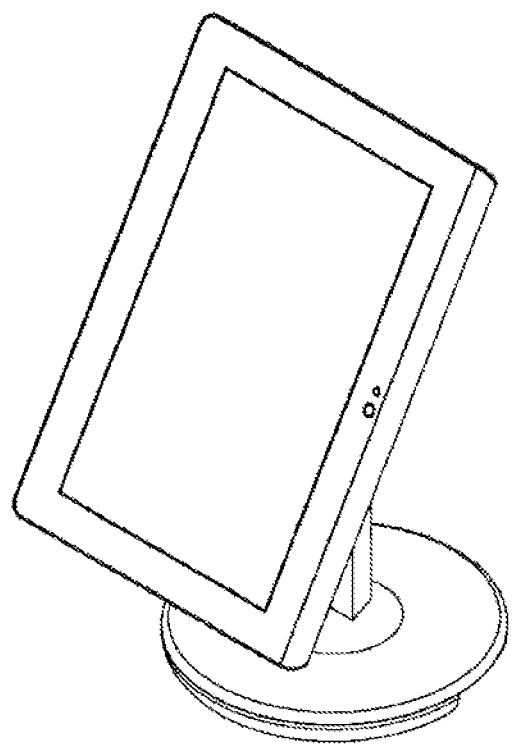

FIG. 47J is an exterior diagram of an electronic device holding stand that is an example of the external structure according to the embodiment.

Figure 47K:
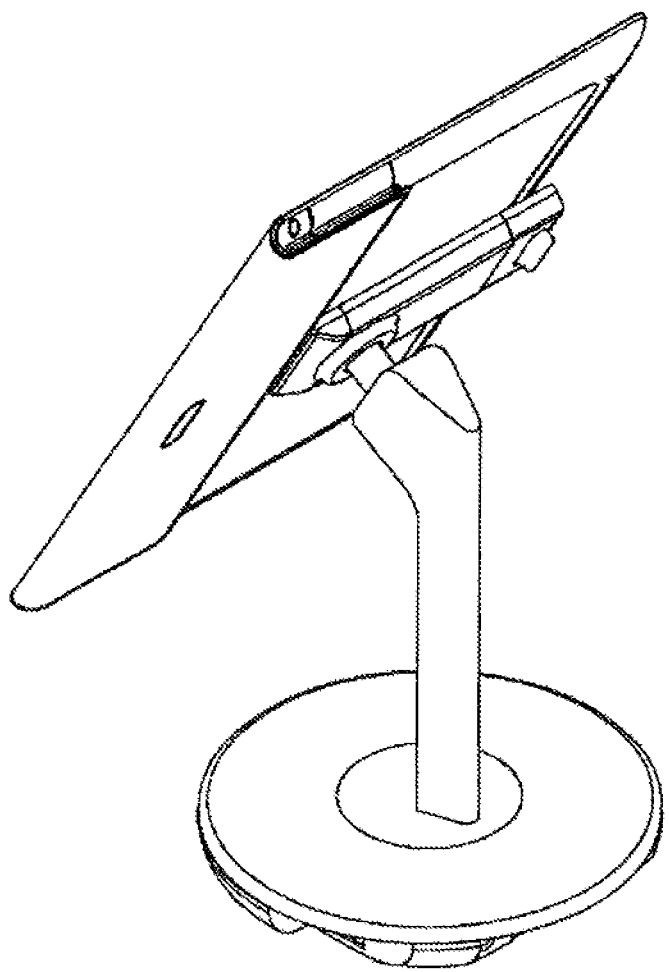

FIG. 47K is an exterior diagram of an electronic device holding stand that is an example of the external structure according to the embodiment.

Figure 48A:
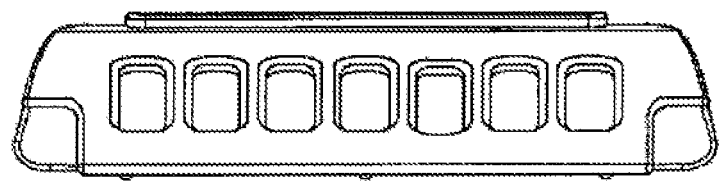

FIG. 48A is an exterior diagram of a connector cap that is an example of the external structure according to the embodiment.

Figure 48B:
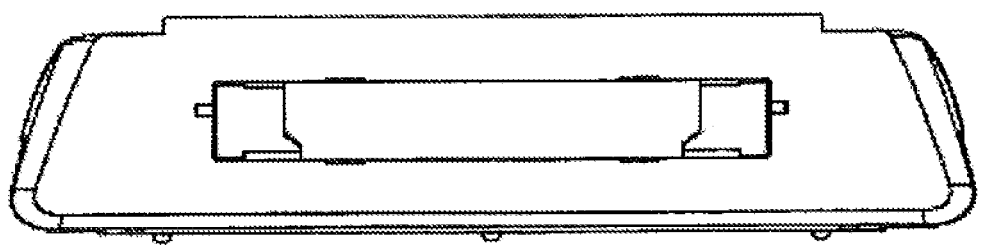

FIG. 48B is an exterior diagram of a connector cap that is an example of the external structure according to the embodiment.

Figure 48C:
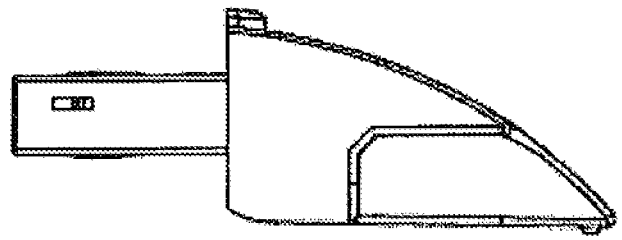

FIG. 48C is an exterior diagram of a connector cap that is an example of the external structure according to the embodiment.

Figure 48D:
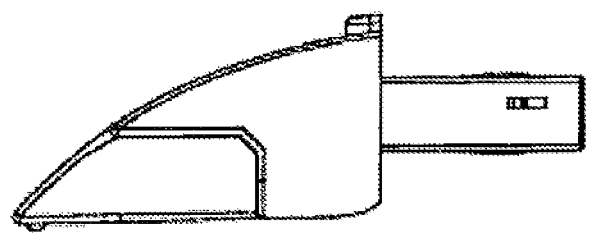

FIG. 48D is an exterior diagram of a connector cap that is an example of the external structure according to the embodiment.

Figure 48E:
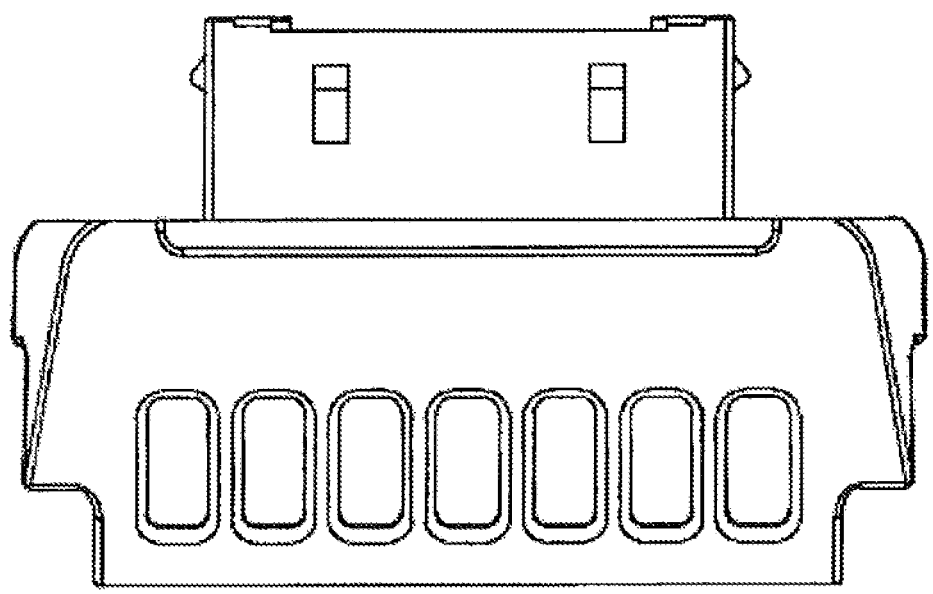

FIG. 48E is an exterior diagram of a connector cap that is an example of the external structure according to the embodiment.

Figure 48F:
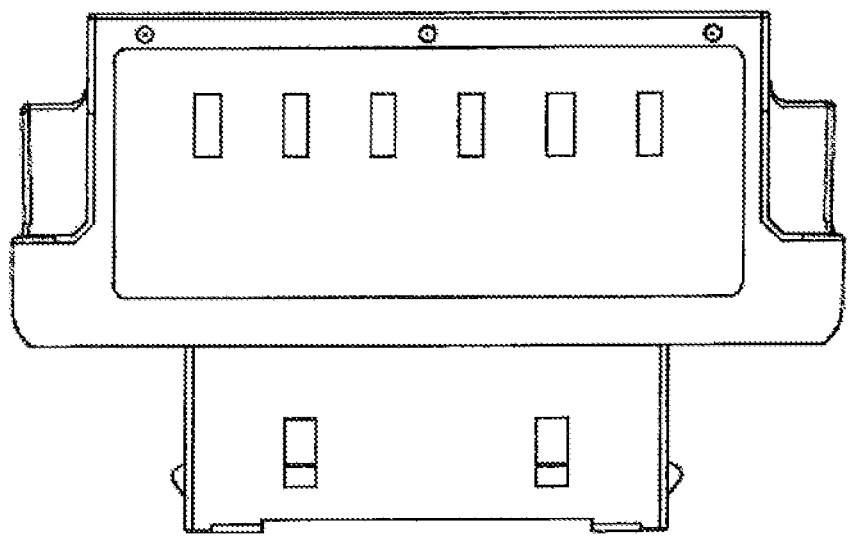

FIG. 48F is an exterior diagram of a connector cap that is an example of the external structure according to the embodiment.

Figure 48G:
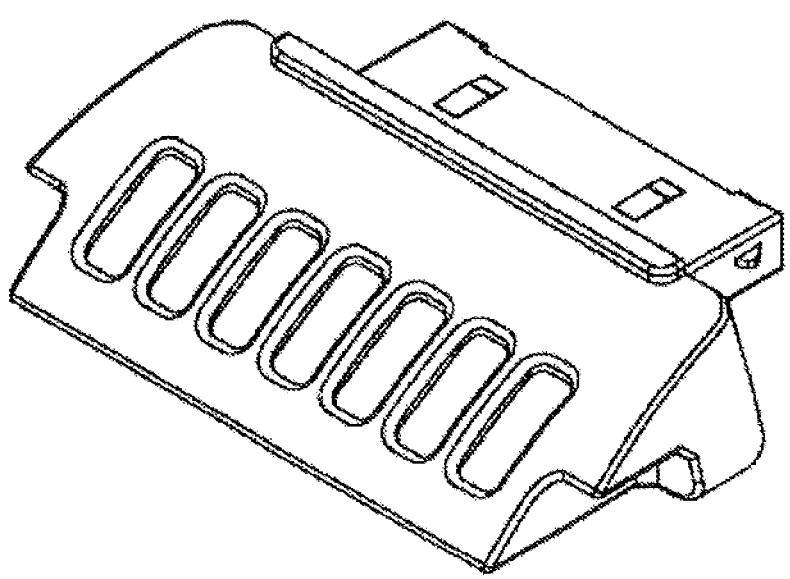

FIG. 48G is an exterior diagram of a connector cap that is an example of the external structure according to the embodiment.

Figure 48H:
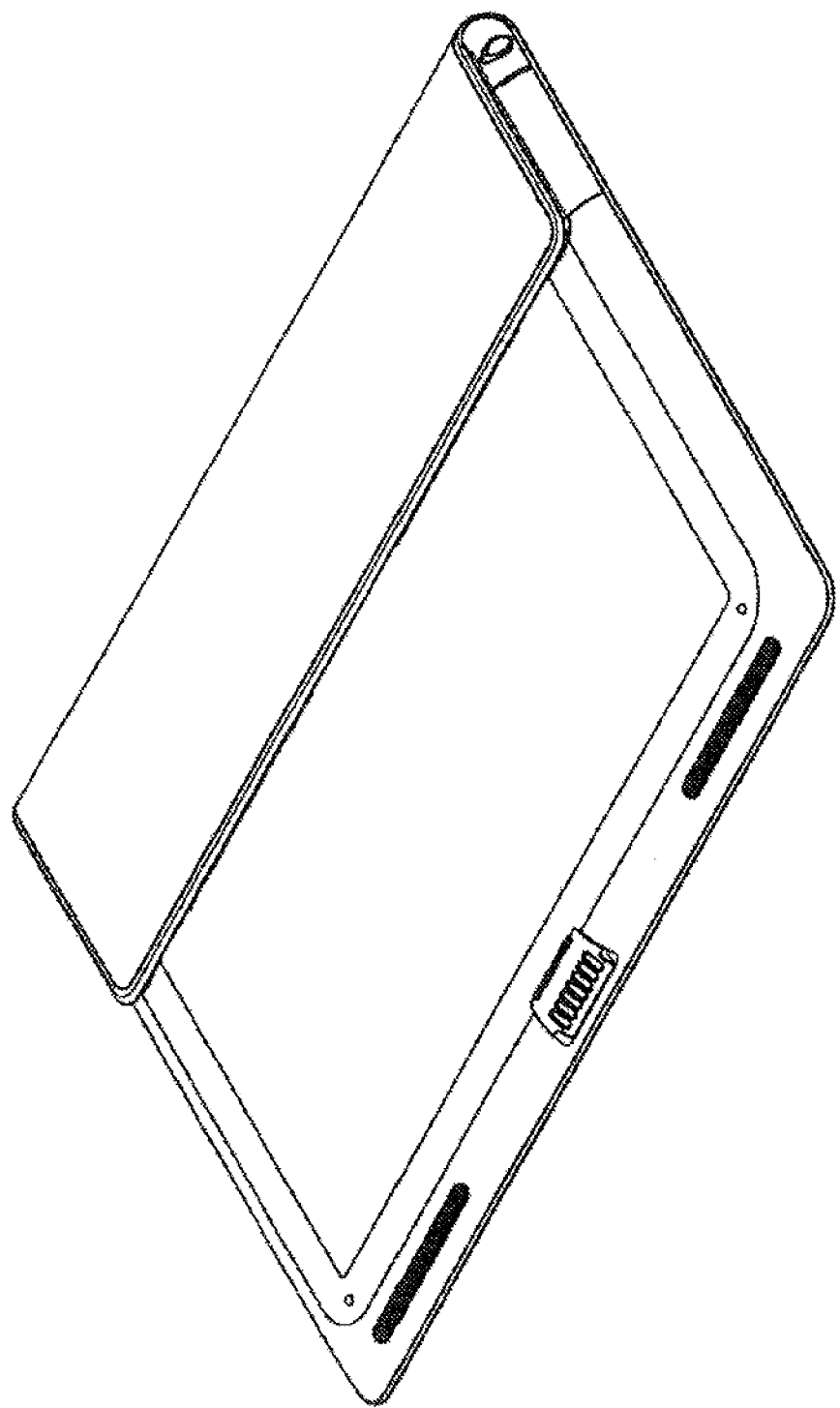

FIG. 48H is an exterior diagram of a connector cap that is an example of the external structure according to the embodiment.

Figure 49A:
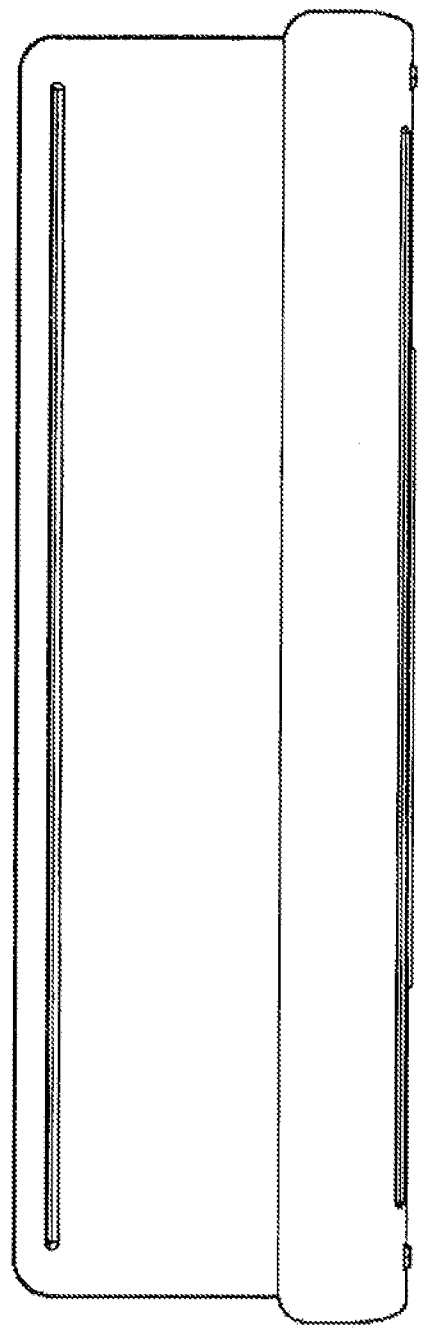

FIG. 49A is an exterior diagram of a cradle that is an example of the external structure according to the embodiment.

Figure 49B:
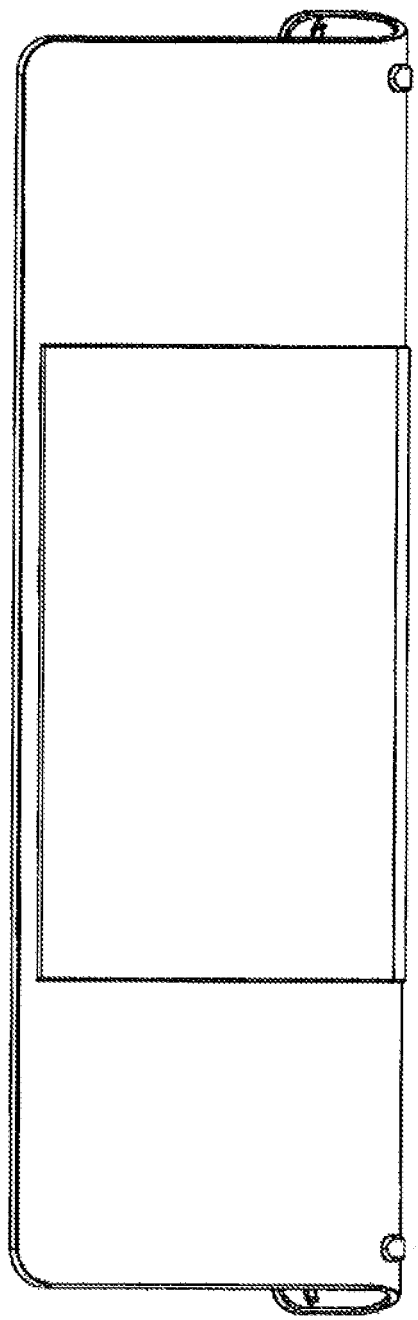

FIG. 49B is an exterior diagram of a cradle that is an example of the external structure according to the embodiment.

Figure 49C:
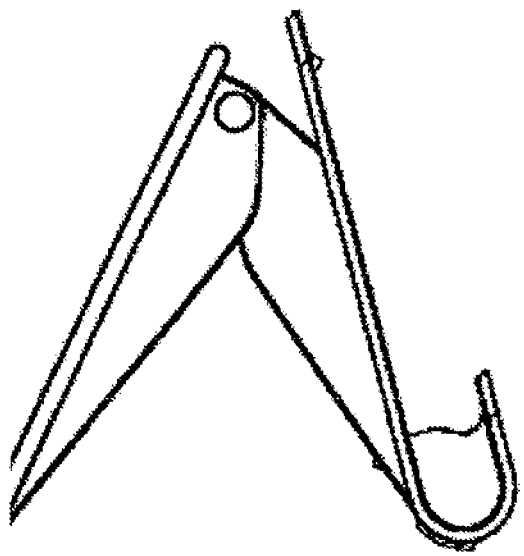

FIG. 49C is an exterior diagram of a cradle that is an example of the external structure according to the embodiment.

Figure 49D:
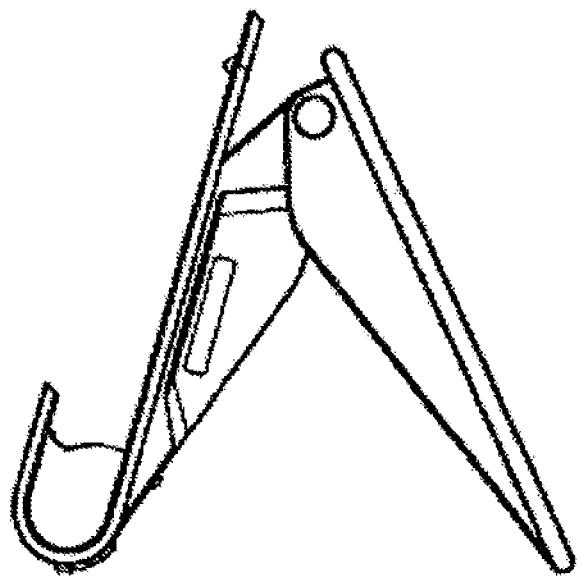

FIG. 49D is an exterior diagram of a cradle that is an example of the external structure according to the embodiment.

Figure 49E:
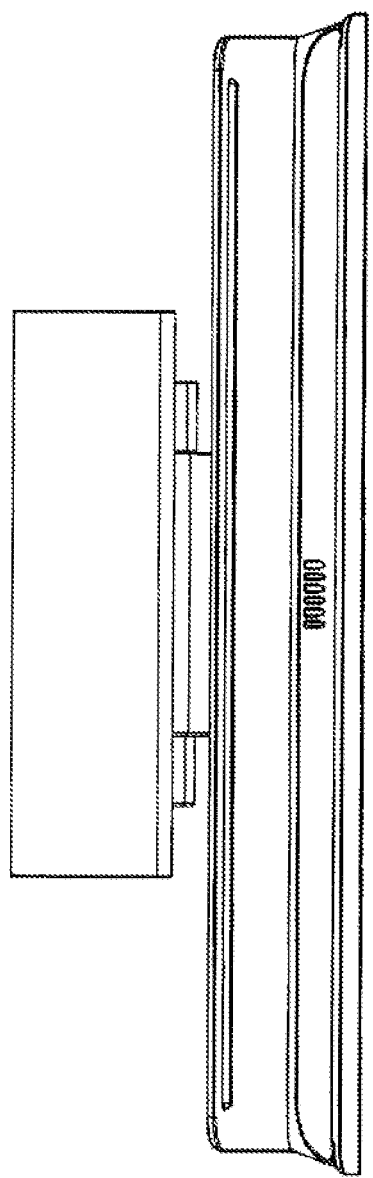

FIG. 49E is an exterior diagram of a cradle that is an example of the external structure according to the embodiment.

Figure 49F:
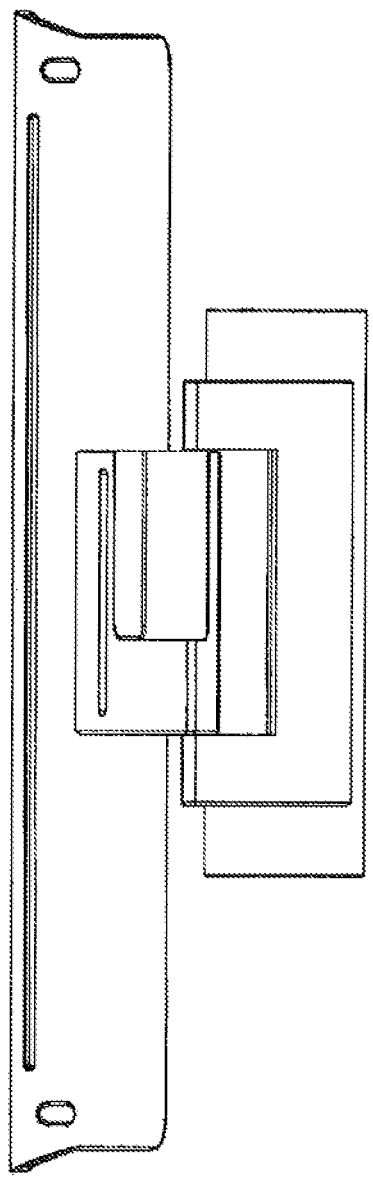

FIG. 49F is an exterior diagram of a cradle that is an example of the external structure according to the embodiment.

Figure 49G:
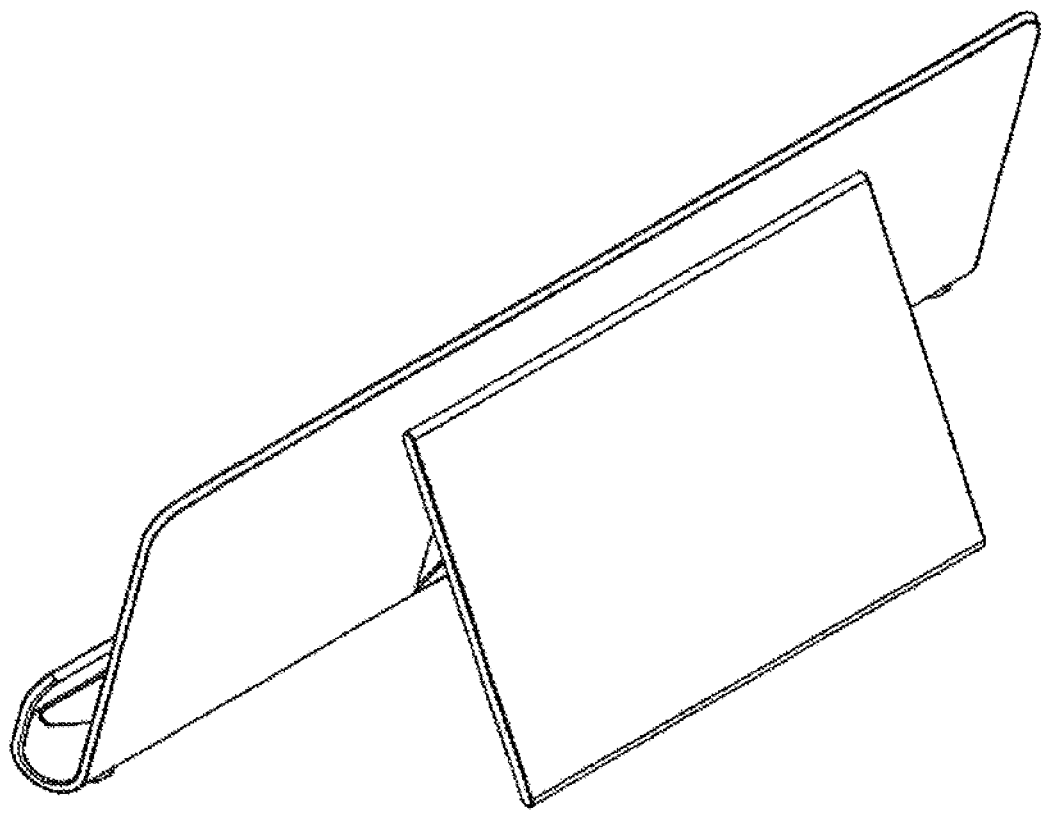

FIG. 49G is an exterior diagram of a cradle that is an example of the external structure according to the embodiment.

Figure 49H:
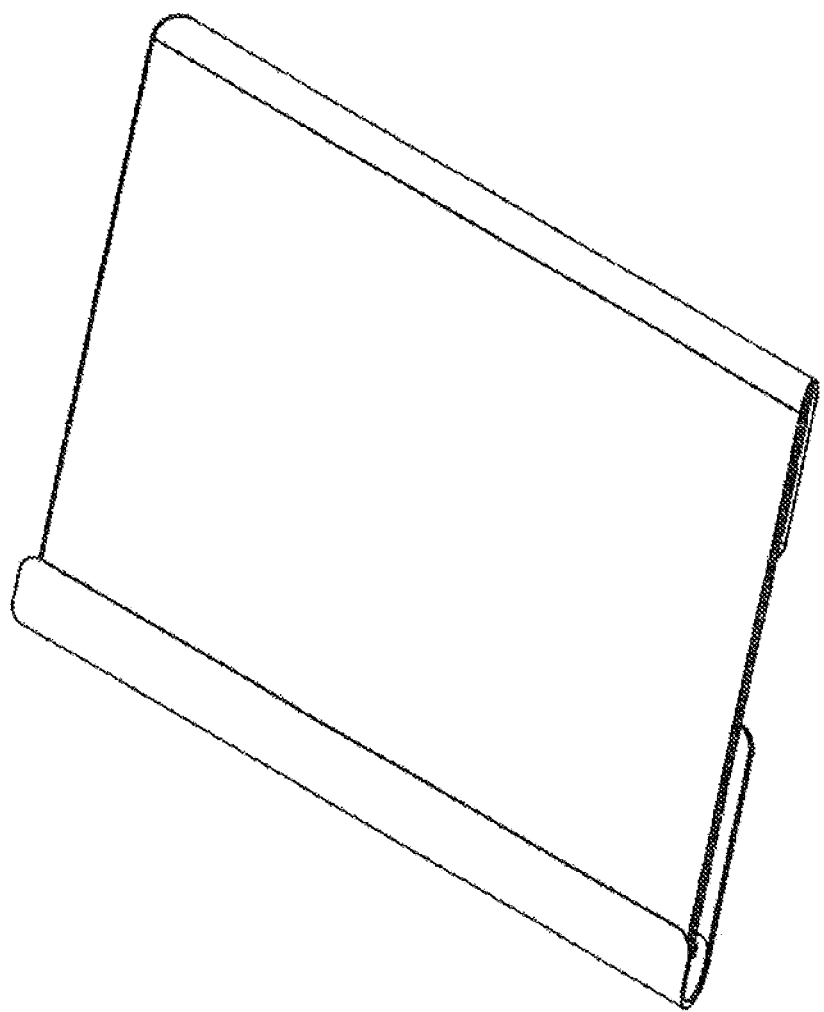

FIG. 49H is an exterior diagram of a cradle that is an example of the external structure according to the embodiment.

Figure 49I:
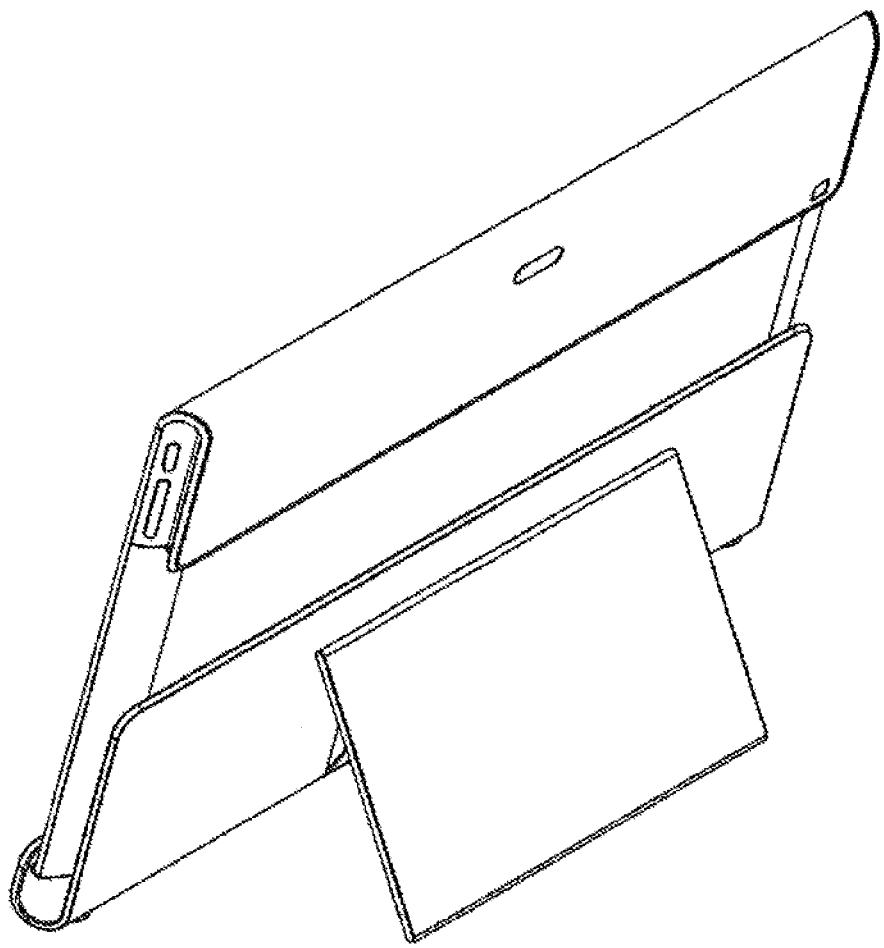

FIG. 49I is an exterior diagram of a cradle that is an example of the external structure according to the embodiment.

Figure 50A:

FIG. 50A is an exterior diagram of an electronic device cover that is an example of the external structure according to the embodiment.

Figure 50B:
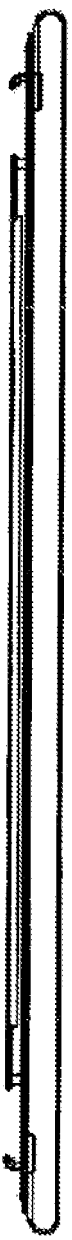

FIG. 50B is an exterior diagram of an electronic device cover that is an example of the external structure according to the embodiment.

Figure 50C:

FIG. 50C is an exterior diagram of an electronic device cover that is an example of the external structure according to the embodiment.

Figure 50D:

FIG. 50D is an exterior diagram of an electronic device cover that is an example of the external structure according to the embodiment.

Figure 50E:
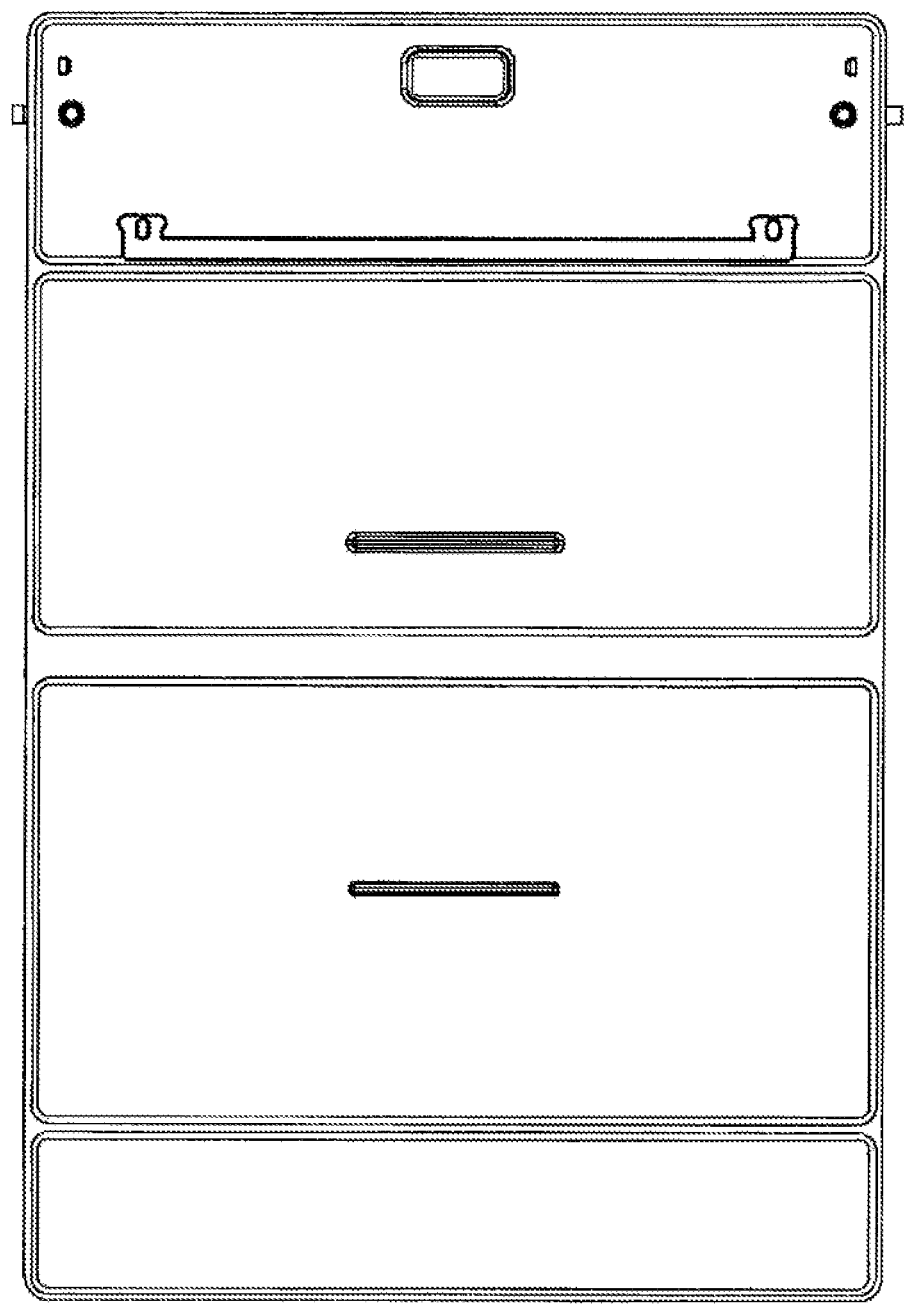

FIG. 50E is an exterior diagram of an electronic device cover that is an example of the external structure according to the embodiment.

Figure 50F:
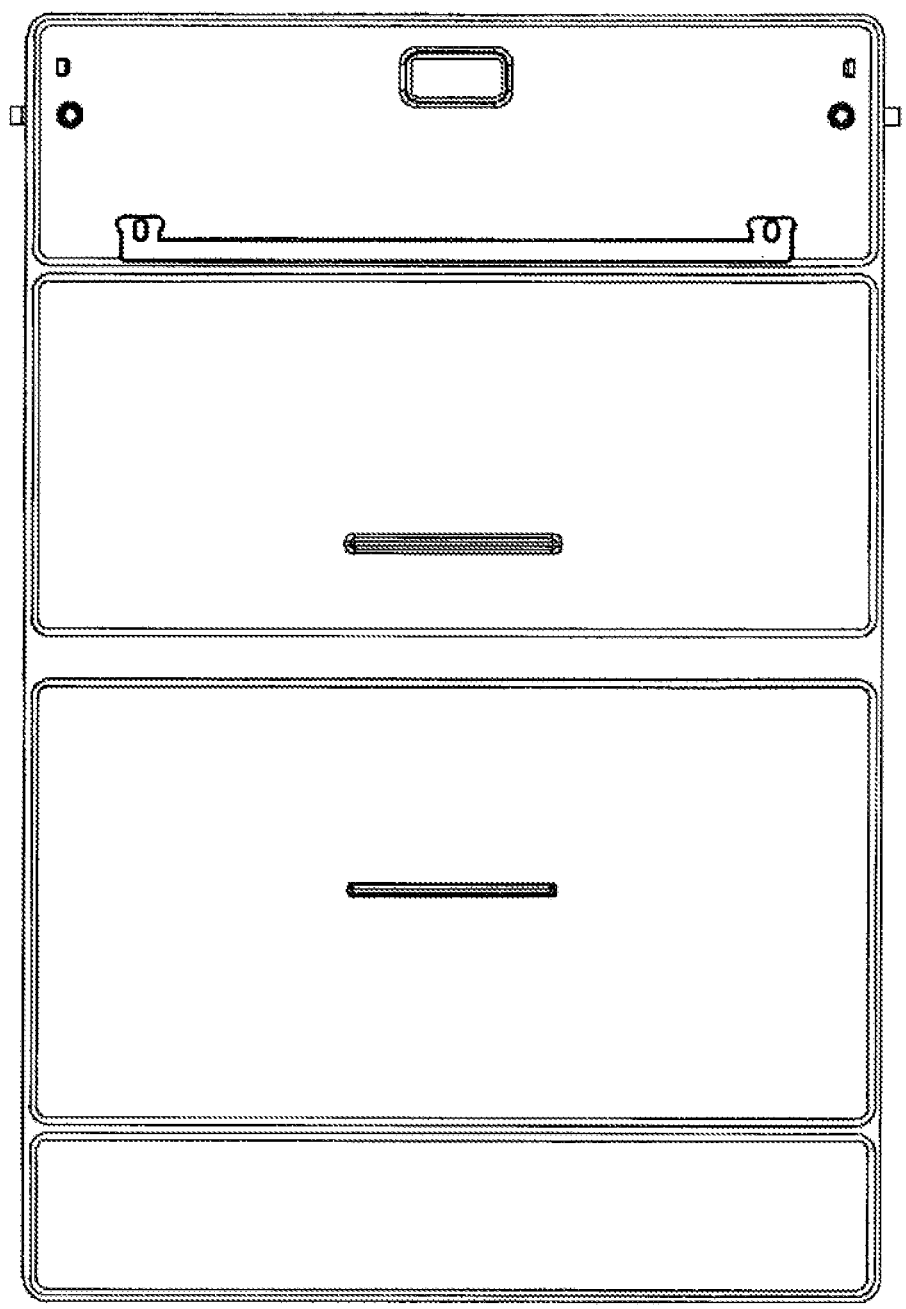

FIG. 50F is an exterior diagram of an electronic device cover that is an example of the external structure according to the embodiment.

Figure 50G:
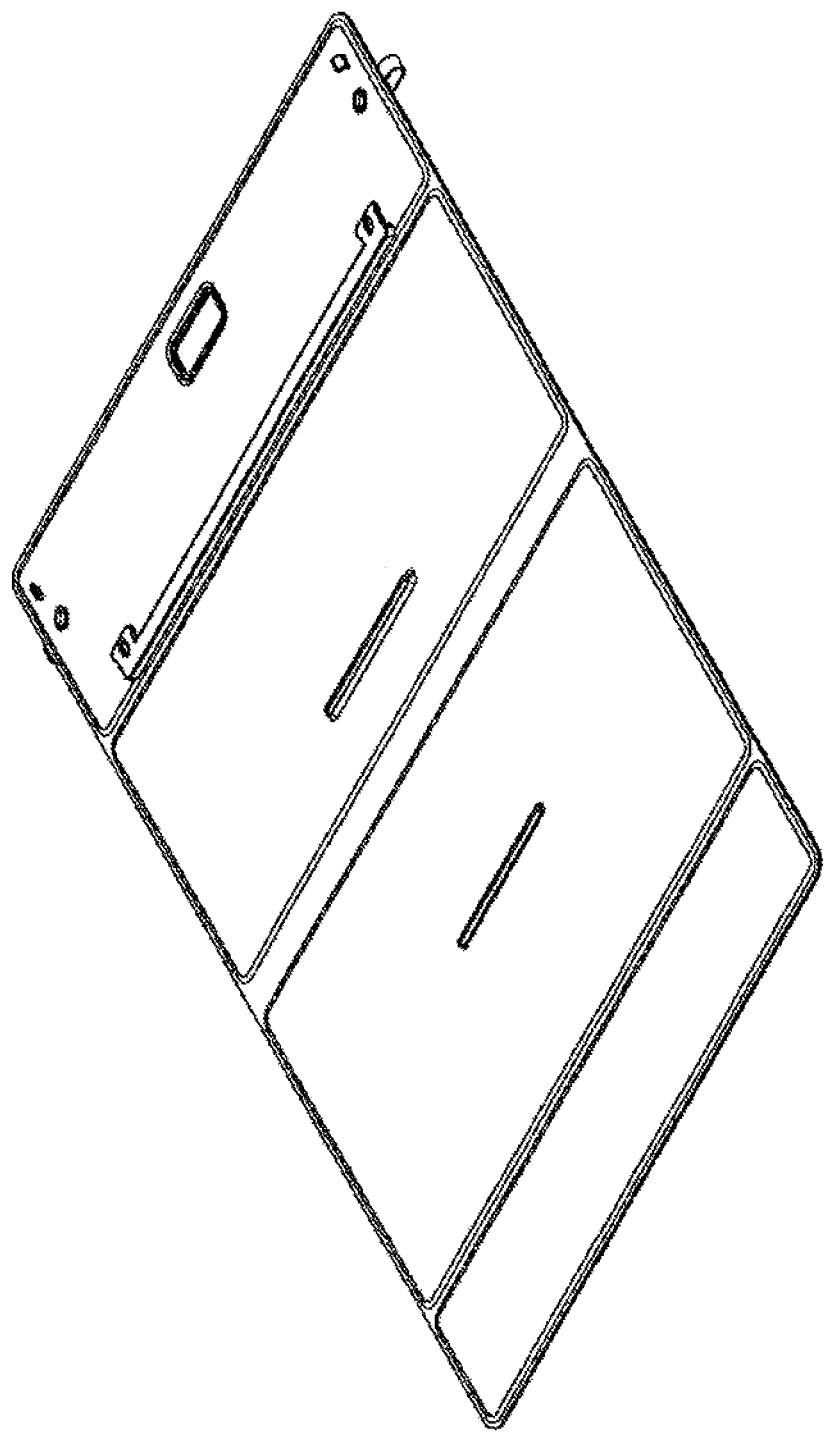

FIG. 50G is an exterior diagram of an electronic device cover that is an example of the external structure according to the embodiment.

Figure 50H:
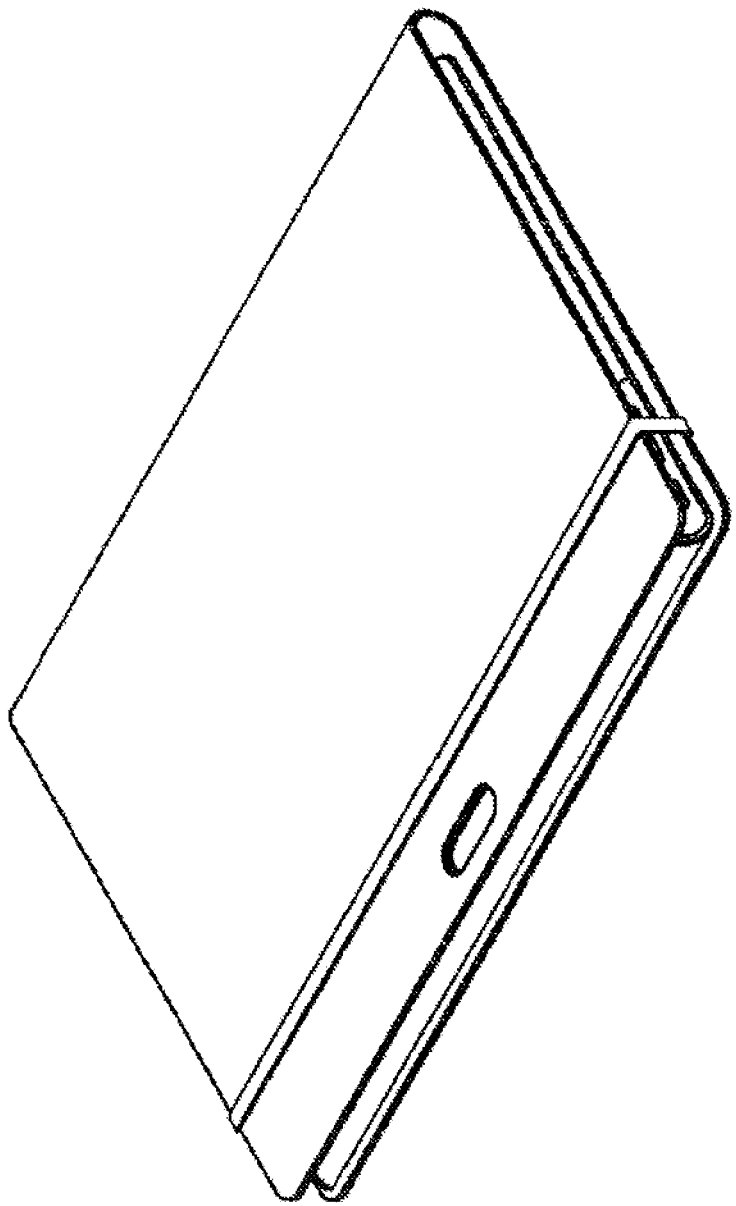

FIG. 50H is an exterior diagram of an electronic device cover that is an example of the external structure according to the embodiment.

Figure 50I:
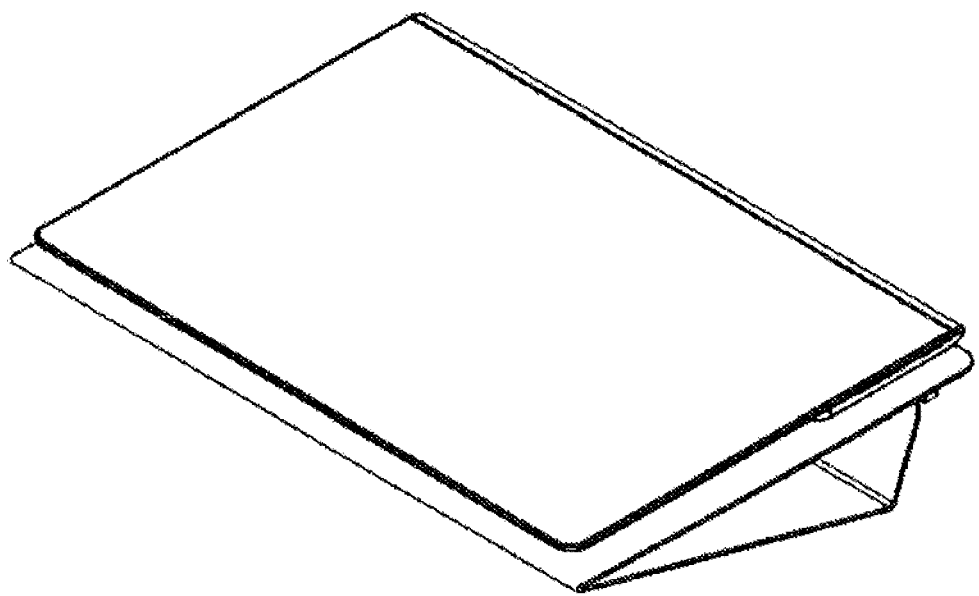

FIG. 50I is an exterior diagram of an electronic device cover that is an example of the external structure according to the embodiment.

Figure 50J:
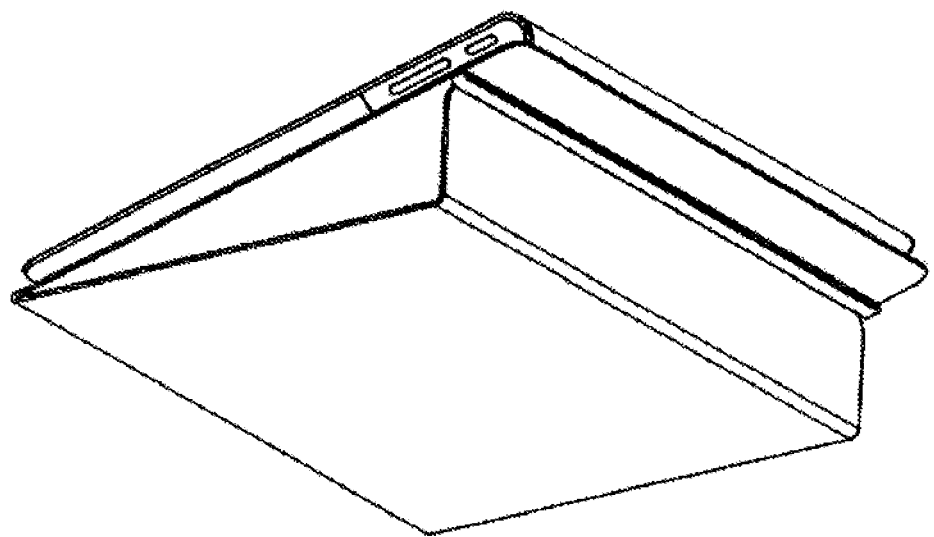

FIG. 50J is an exterior diagram of an electronic device cover that is an example of the external structure according to the embodiment.

Figure 50K:
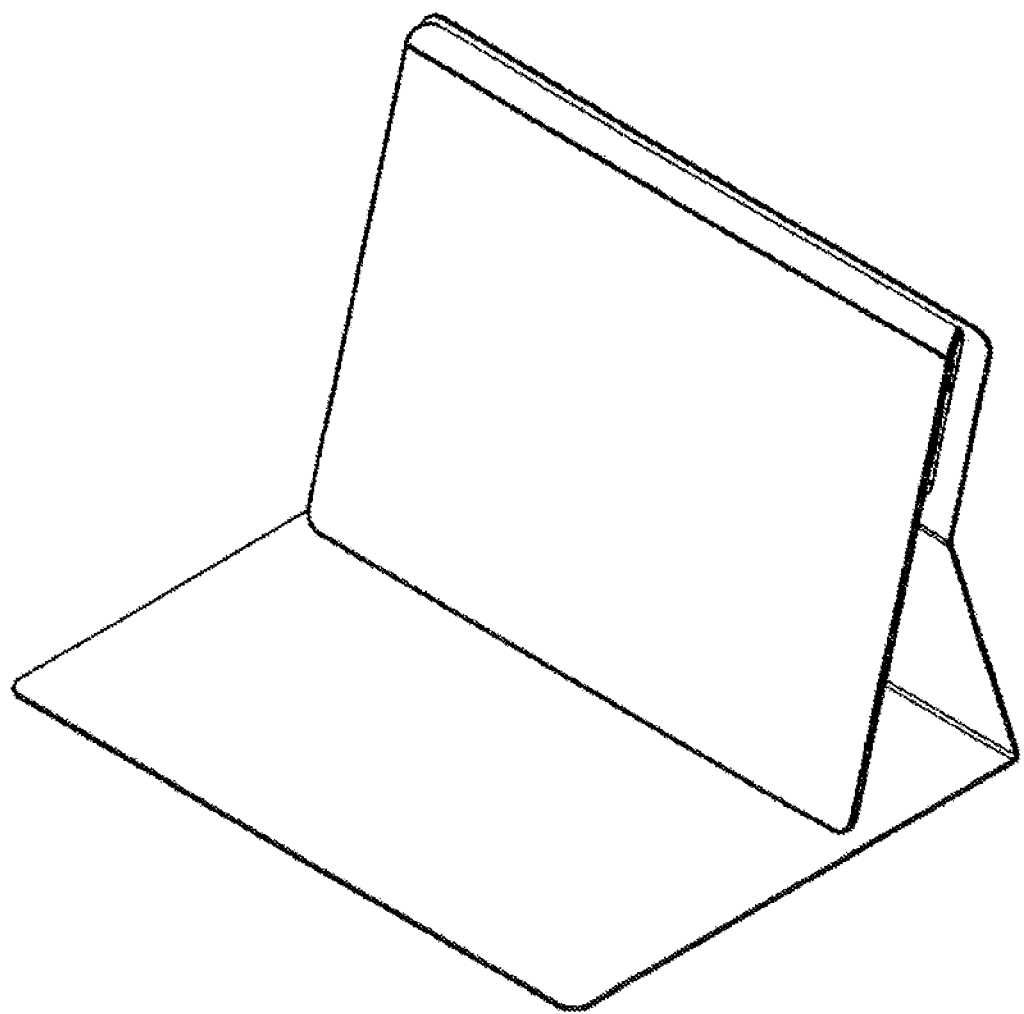

FIG. 50K is an exterior diagram of an electronic device cover that is an example of the external structure according to the embodiment.

Figure 51A:
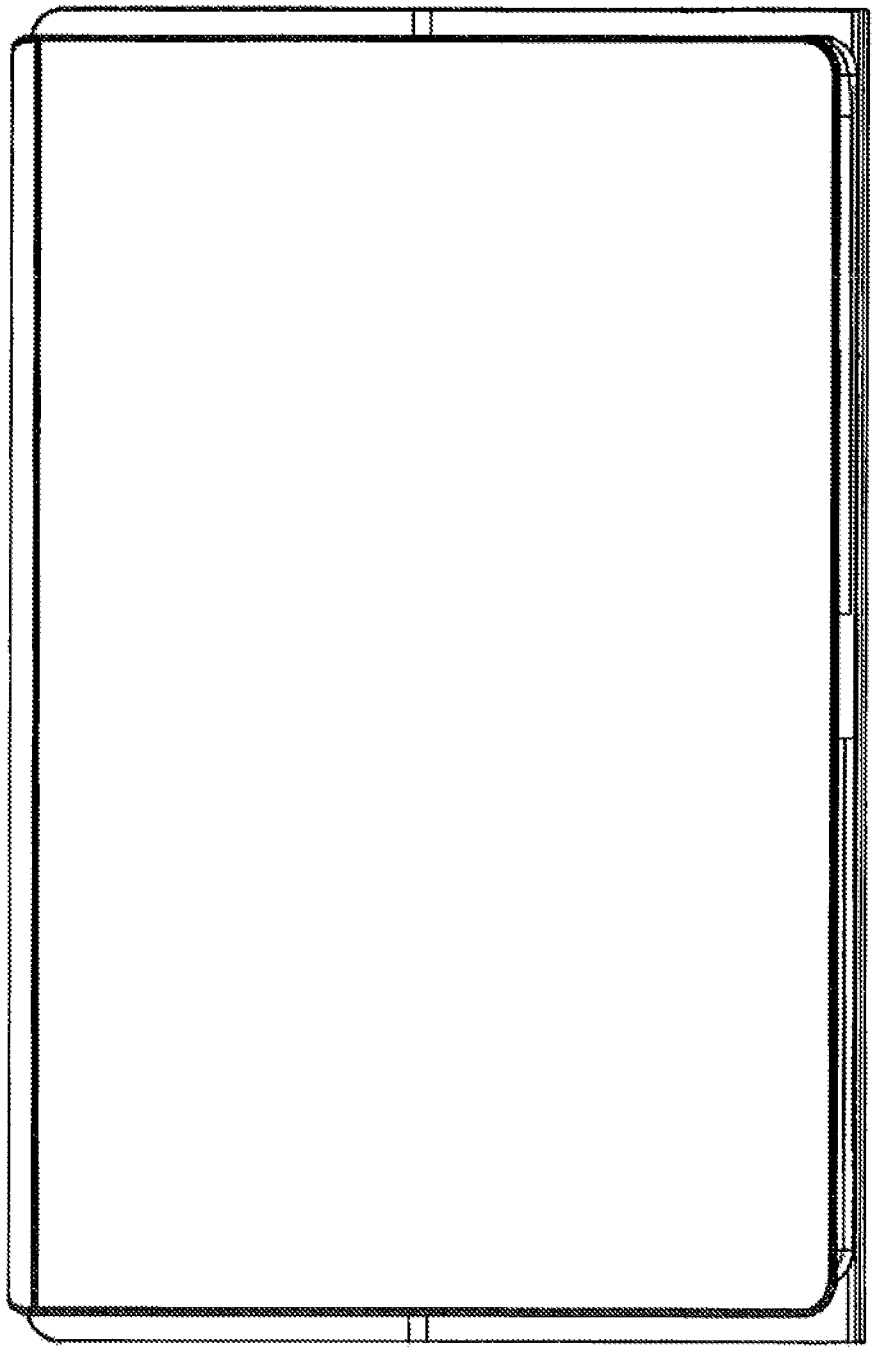

FIG. 51A is an exterior diagram of a cover with a keyboard that is an example of the external structure according to the embodiment.

Figure 51B:
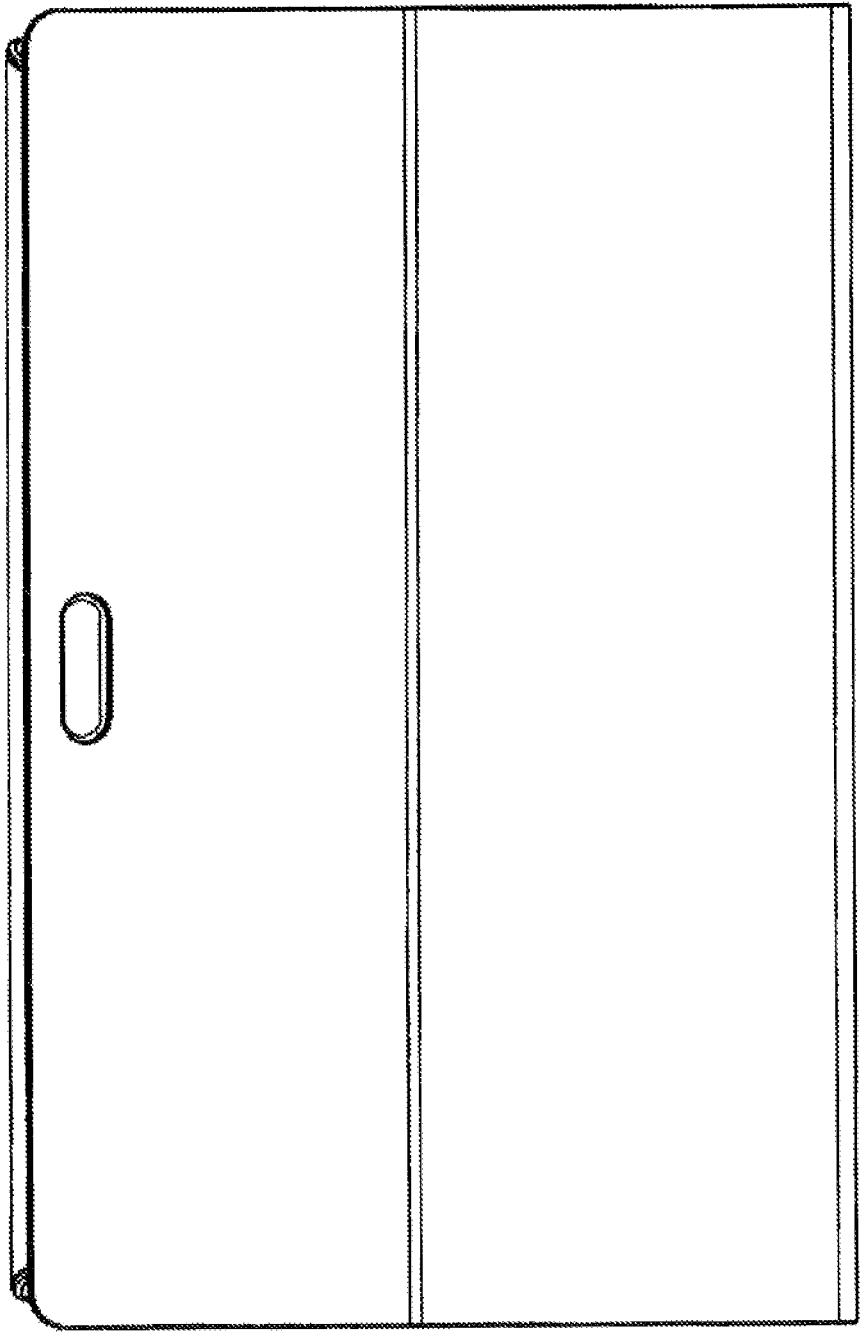

FIG. 51B is an exterior diagram of a cover with a keyboard that is an example of the external structure according to the embodiment.

Figure 51C:
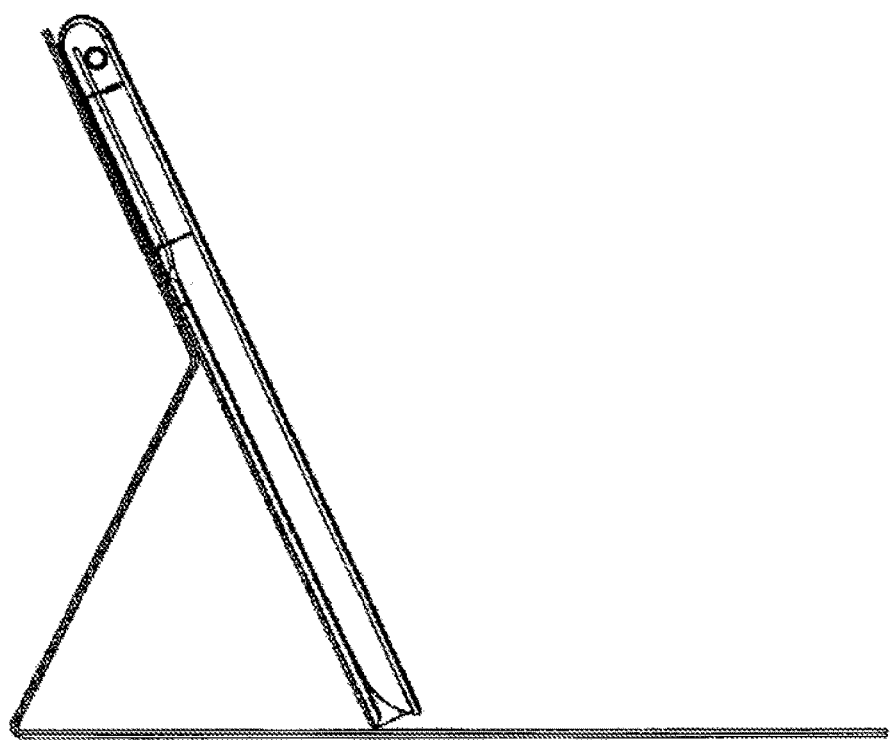

FIG. 51C is an exterior diagram of a cover with a keyboard that is an example of the external structure according to the embodiment.

Figure 51D:
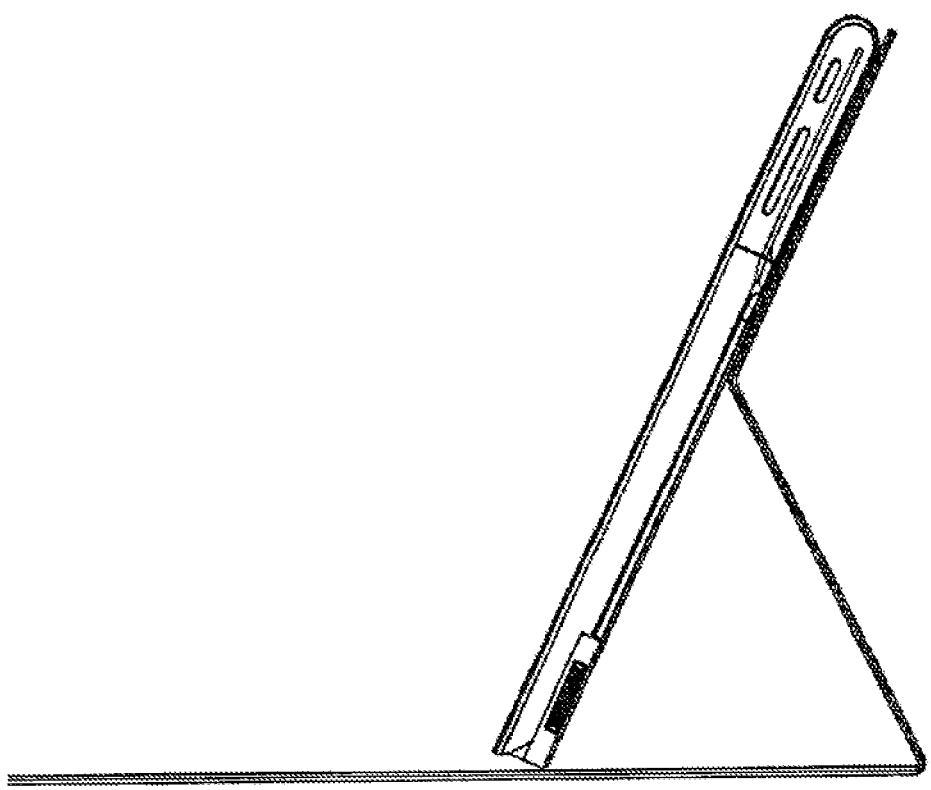

FIG. 51D is an exterior diagram of a cover with a keyboard that is an example of the external structure according to the embodiment.

Figure 51E:
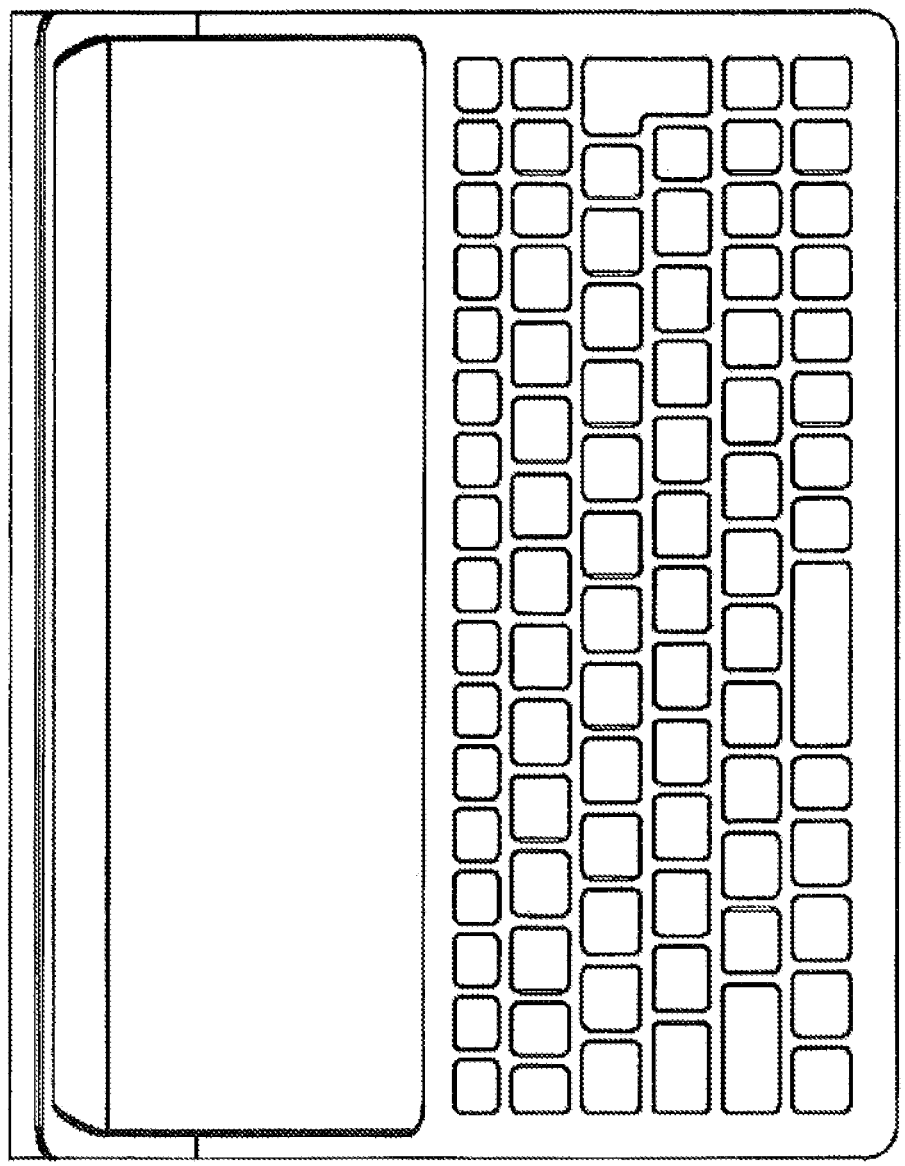

FIG. 51E is an exterior diagram of a cover with a keyboard that is an example of the external structure according to the embodiment.

Figure 51F:
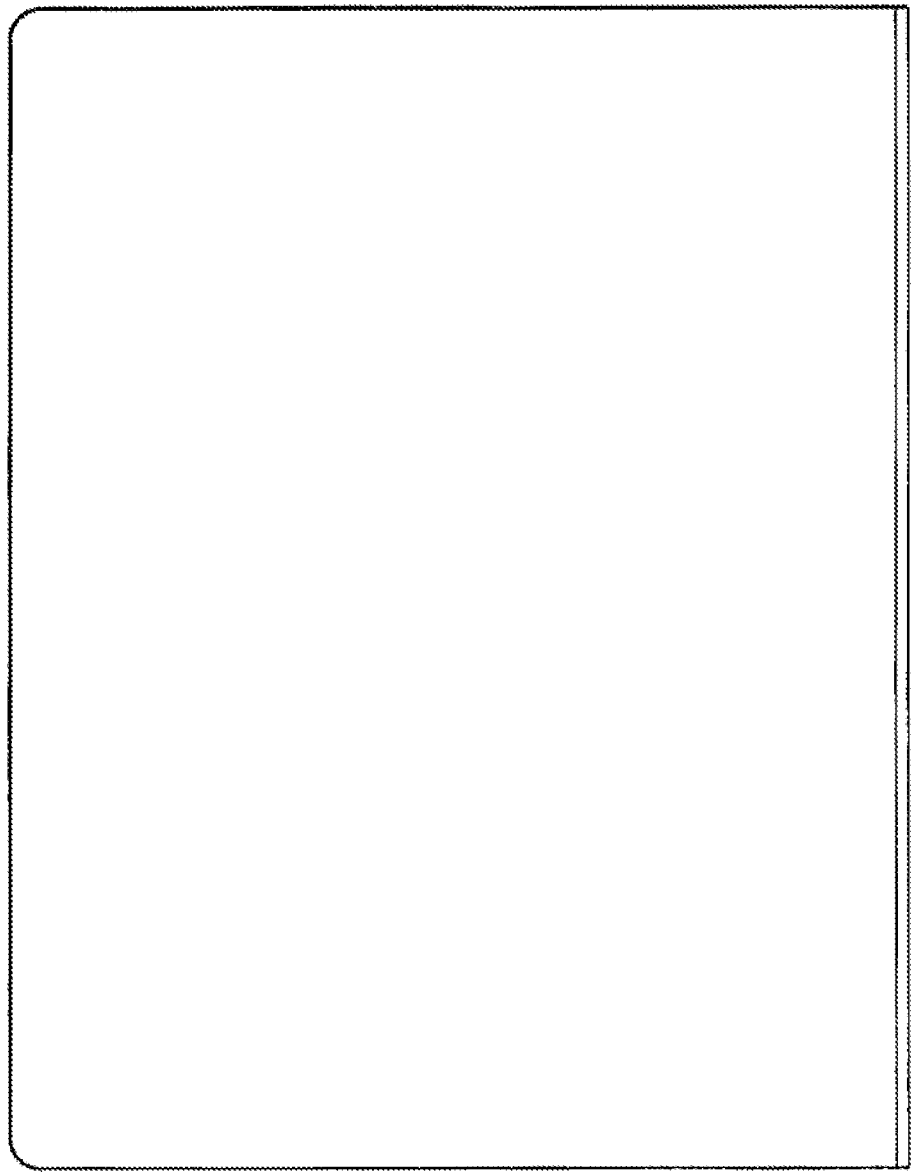

FIG. 51F is an exterior diagram of a cover with a keyboard that is an example of the external structure according to the embodiment.

Figure 51G:
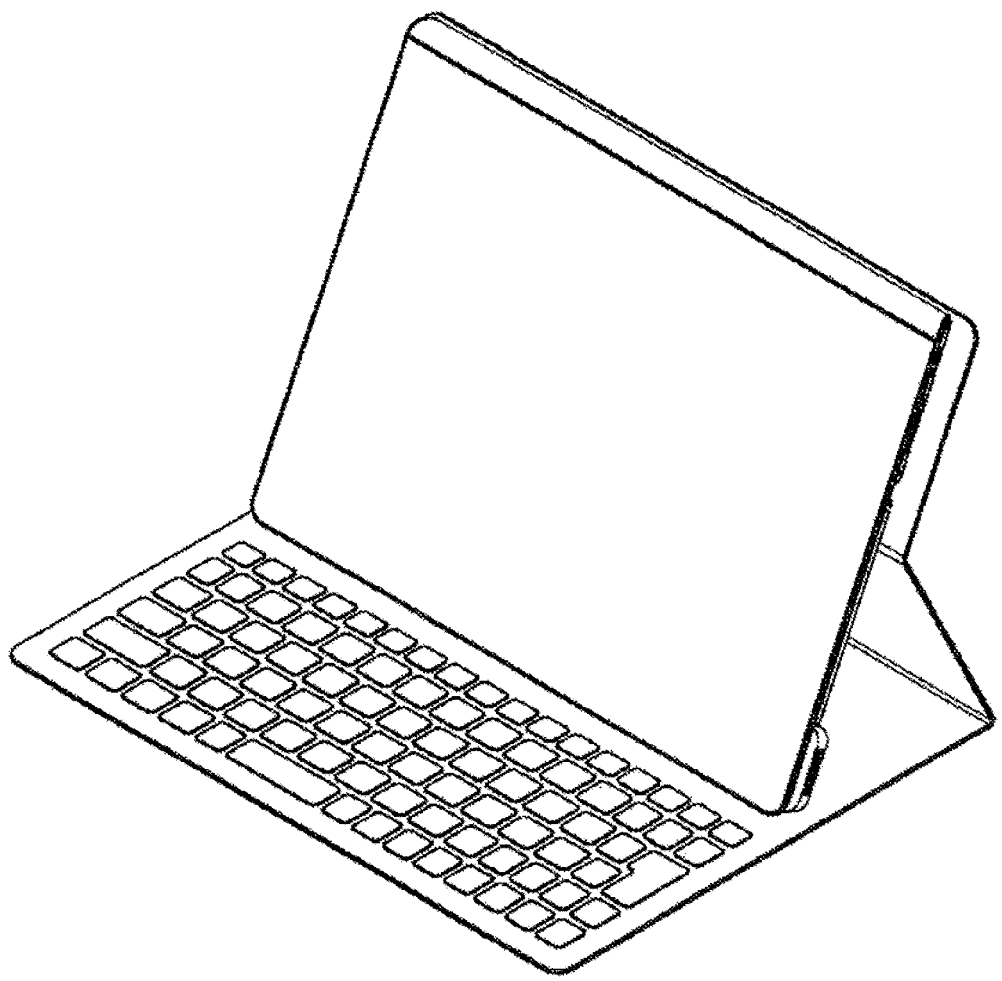

FIG. 51G is an exterior diagram of a cover with a keyboard that is an example of the external structure according to the embodiment.

Figure 52A:
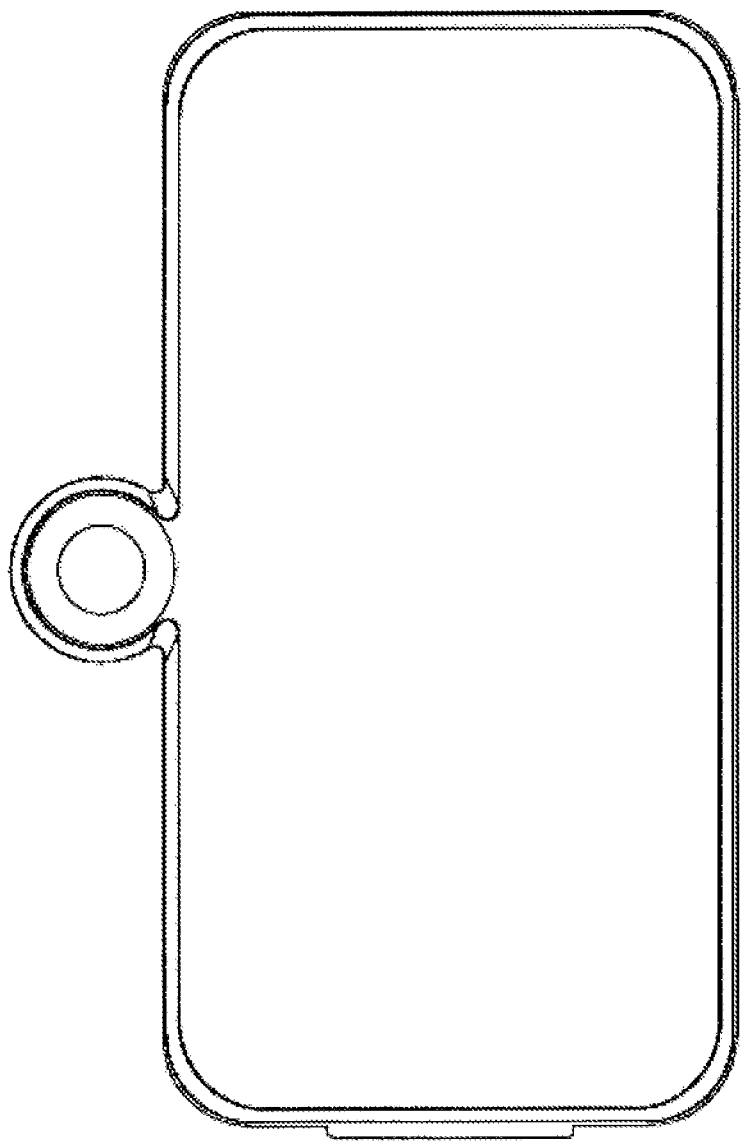

FIG. 52A is an exterior diagram of a waterproof cap module with buoyancy that is an example of the external structure according to the embodiment.

Figure 52B:
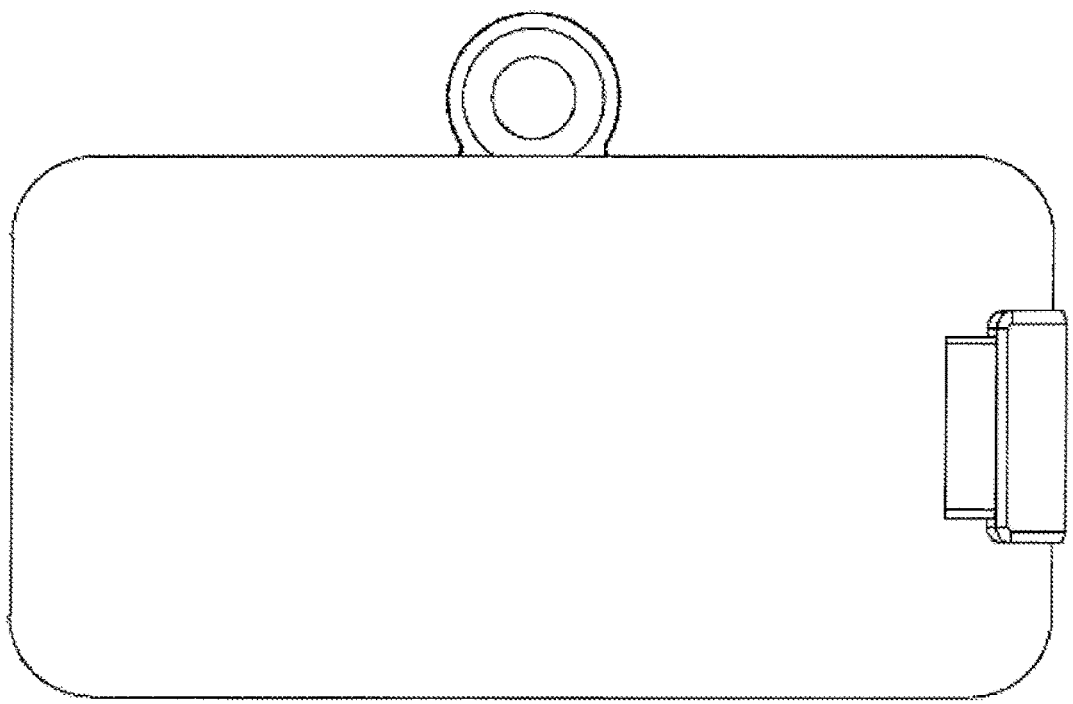

FIG. 52B is an exterior diagram of a waterproof cap module with buoyancy that is an example of the external structure according to the embodiment.

Figure 52C:

FIG. 52C is an exterior diagram of a waterproof cap module with buoyancy that is an example of the external structure according to the embodiment.

Figure 52D:
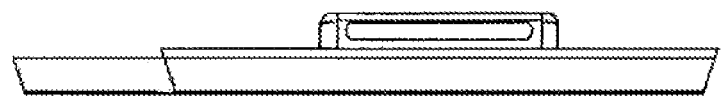

FIG. 52D is an exterior diagram of a waterproof cap module with buoyancy that is an example of the external structure according to the embodiment.

Figure 52E:
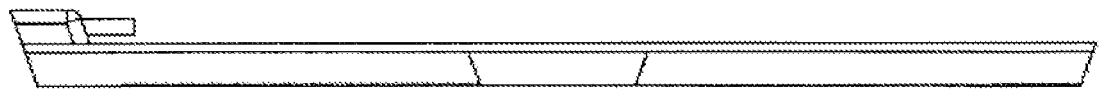

FIG. 52E is an exterior diagram of a waterproof cap module with buoyancy that is an example of the external structure according to the embodiment.

Figure 52F:
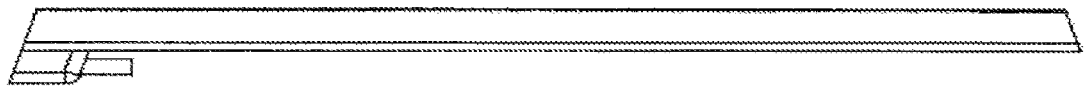

FIG. 52F is an exterior diagram of a waterproof cap module with buoyancy that is an example of the external structure according to the embodiment.

Figure 52G:
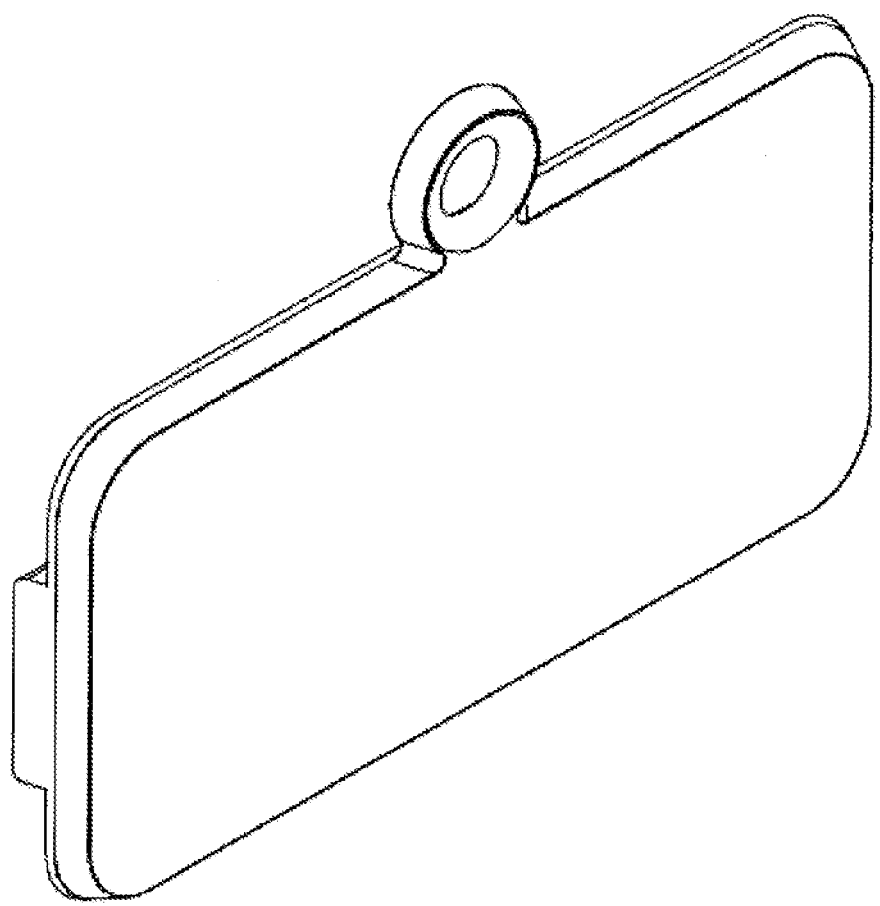

FIG. 52G is an exterior diagram of a waterproof cap module with buoyancy that is an example of the external structure according to the embodiment.

Figure 52H:
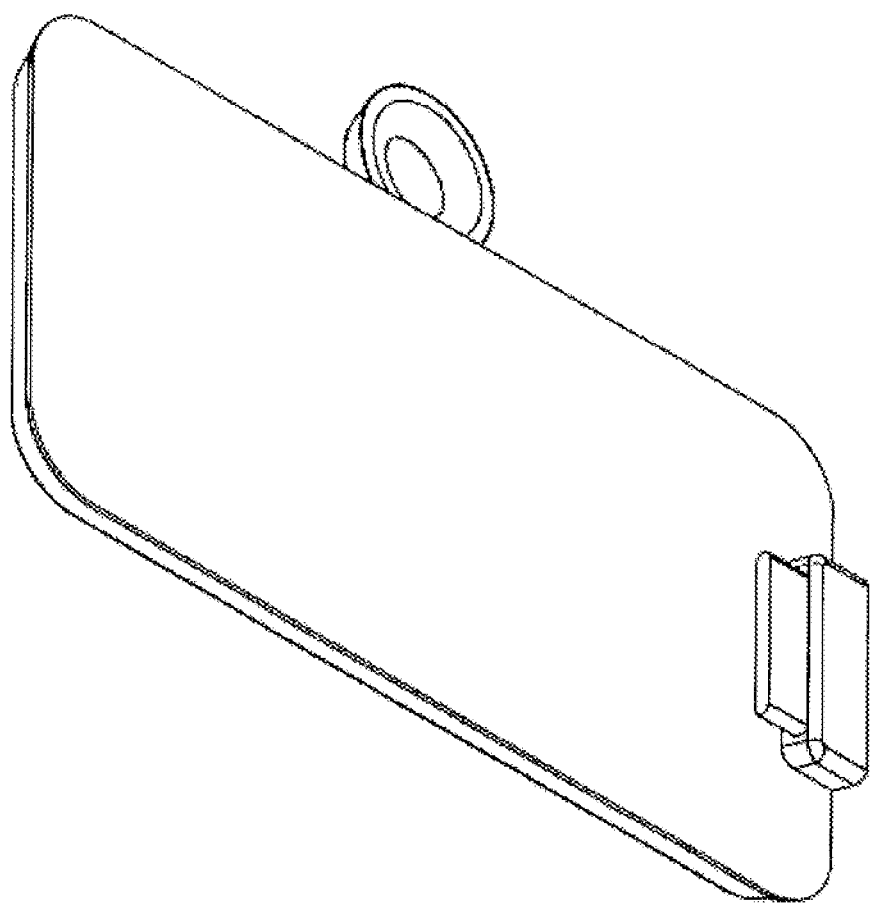

FIG. 52H is an exterior diagram of a waterproof cap module with buoyancy that is an example of the external structure according to the embodiment.

Figure 53:
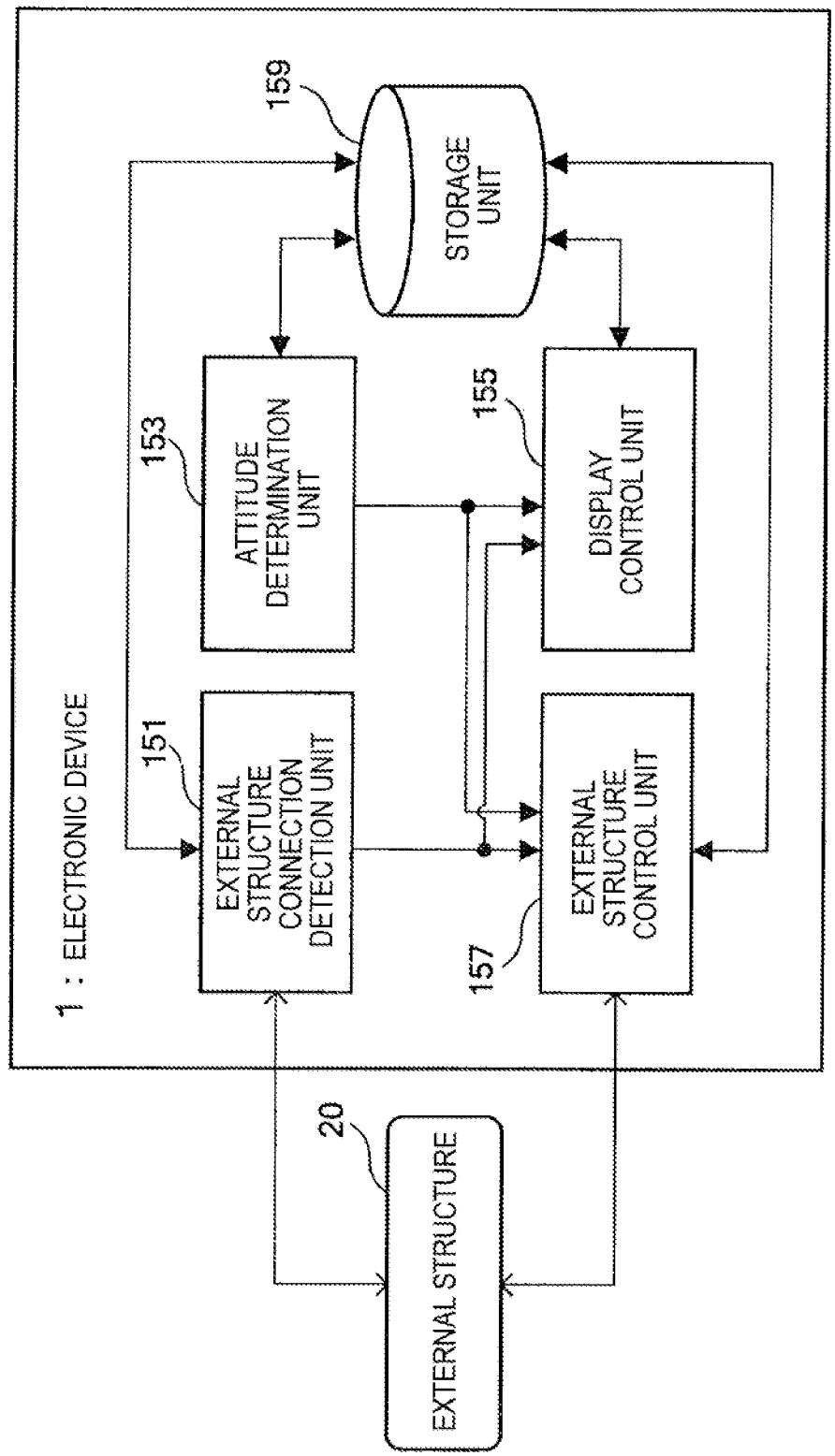

FIG. 53 is a block diagram showing an example of a configuration of the electronic device according to the embodiment.

DESCRIPTION OF EMBODIMENT

Hereinafter, a preferred embodiment of the present invention will be described in detail with reference to the appended drawings. Note that, in this specification and the drawings, elements that have substantially the same function and structure are denoted with the same reference signs, and repeated explanation is omitted.

Note that description will be provided in the following order.

(1) First Embodiment
  (1-1) Regarding an electronic device
    (1-1-1) Exterior
    (1-1-2) External structure connection connector
  (1-2) Regarding an external structure
    (1-2-1) Electronic device cover
    (1-2-2) Cover with a keyboard
    (1-2-3) Electronic device holding stand
    (1-2-4) Cable
    (1-2-5) Connector cap
  (1-3) Regarding a disposition method of pins of an external structure connection connector
  (1-4) Regarding another example of the electronic device
  (1-5) Regarding an external structure
    (1-5-1) List of connectable external structures
    (1-5-2) Speaker
    (1-5-3) Stand unit
  (1-6) Exterior diagram of an electronic device and an external structure

First Embodiment

<Regarding an Electronic Device>

First, an electronic device according to a first embodiment of the present disclosure will be described in detail with reference to FIGS. 1 to 3.

The electronic device 1 according to the present embodiment is a device represented by a portable-type electronic device such as a smartphone, a portable tablet, a portable game device or a portable music player, a portable computer such as a notebook computer, a standing-type computer such as a desktop computer, or the like. Hereinbelow, description will be provided exemplifying a portable tablet as the electronic device 1.

[Exterior]

The electronic device 1 according to the present embodiment has a housing 11 and a connector connection unit 13 formed in at least one portion of the housing 11. In the example shown in FIG. 1, the connector connection unit 13 is formed on a face (rear face) facing the face (display face) on which a display unit such as a display or the like of the housing 11 is formed.

The connector connection unit 13 is a connection site used for connecting the electronic device 1 according to the present embodiment to various external structures. The connector connection unit 13 has a concave portion 15 formed on a surface of the housing 11, and an external structure connection connector (hereinafter, also simply referred to as a connection connector or a connector) 17 provided in a position of the concave portion 15 receding from the surface of the housing.

In the housing 11 constituted by a first face (for example, the display face) and a second face (for example, the rear face) facing each other on the front and rear sides and side faces which face each other substantially orthogonally to the display face and the rear face, the concave portion 15 is positioned at at least one portion of a joint of the display face or the rear face and one side face that is substantially orthogonal to the display face or the rear face.

Figure 2A:
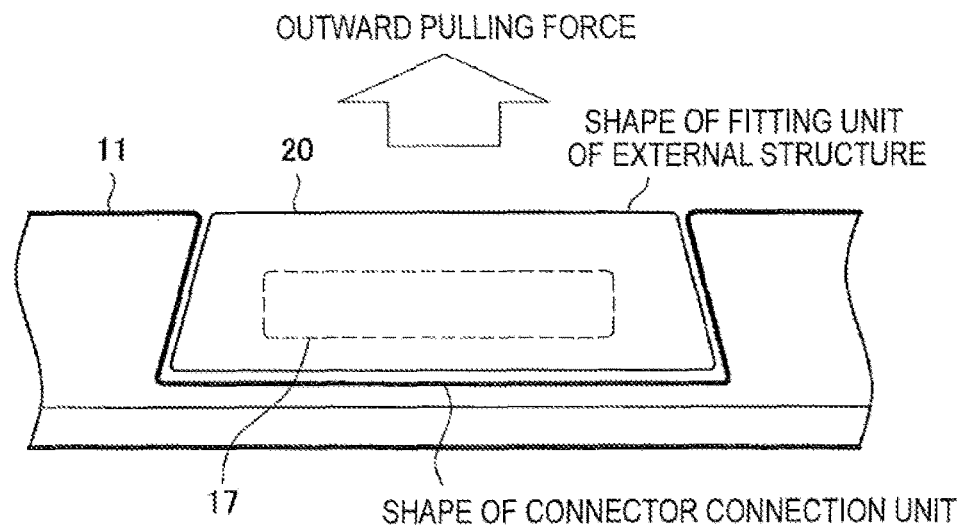
FIG. 2A is an illustrative diagram showing a connector connection portion of the electronic device according to the embodiment.

FIG. 2A shows a diagram of the concave portion 15 according to the embodiment when it is viewed from a side. The concave portion 15 according to the present embodiment has a shape that enables an external structure connected to the connection connector to be locked. The shape of the concave portion 15 when viewed from a side and the cross-sectional shape of the concave portion 15 are substantially a trapezoidal shape as shown in, for example, FIG. 2A. With regard to the concave portion 15 according to the present embodiment, there is a concave on the surface of the housing of which the width is wider than the width of the concave portion 15 as shown in FIG. 2A. For this reason, even when there is an exerted force pulling an external structure out from the concave portion 15, the external structure is locked and thus electric contact with the connection connector 17 is maintained. In addition, as the concave portion 15 has the shape as shown in FIG. 2A, the force pulling the external structure out is exerted on the outer shape of the concave portion 15 rather than on the connection connector 17. For this reason, damage to the connection connector 17 can be avoided.

Figure 2B:
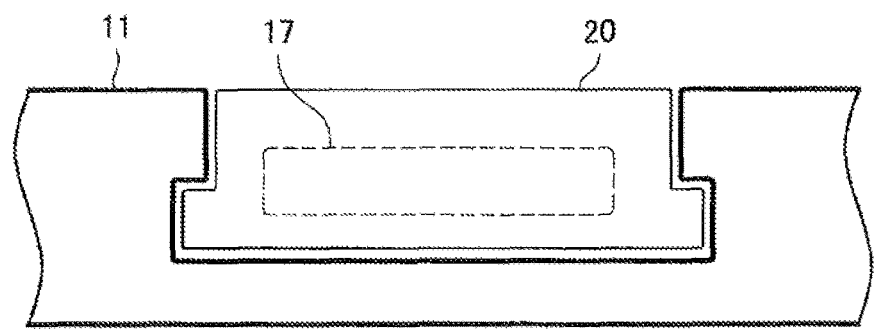
FIG. 2B is an illustrative diagram showing a connector connection portion of the electronic device according to the embodiment.
Figure 2C:
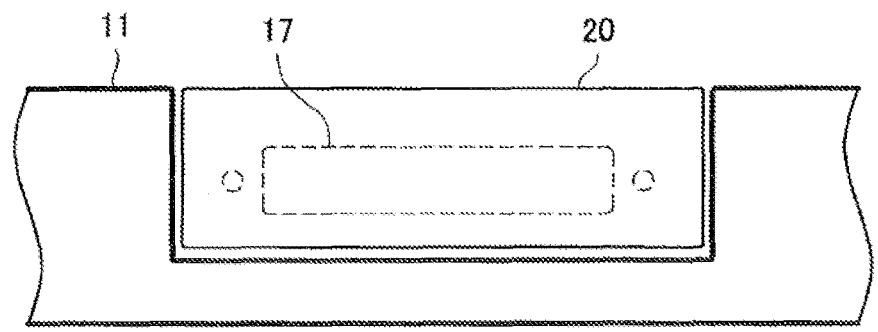
FIG. 2C is an illustrative diagram showing a connector connection portion of the electronic device according to the embodiment.

Note that the shape of the concave portion 15 according to the present embodiment is not limited to the substantial trapezoidal shape show in FIG. 2A, and may be substantially a protruding shape having a level difference as shown in, for example, FIG. 2B, or may be substantially a rectangular shape formed with holes for guide pin insertion as shown in FIG. 2C. In addition, the shape of the concave portion 15 according to the present embodiment may be a shape in which a wide-width portion is present at the substantial center portion in the depth direction of the concave portion 15 as shown in FIG. 2D.

[External Structure Connection Connector]

FIG. 3 is a table showing examples of pins provided in the connection connector 17 according to the present embodiment. As exemplified in FIG. 3, about 50 pins are provided in the connection connector 17 according to the present embodiment, and various signals are transmitted and received via the plurality of pins. As shown in FIG. 3, in the connection connector 17, pins of a signal system, pins of a power source system, pins of a control system, and other pins are each disposed in plural.

As the pins of the signal system, for example, a pin used for HDMI output, a pin used for USB 2.0/3.0, a pin used for audio output of SPDIF, and the like are provided. In addition, as the pins of the power source system, pins for DCIN and DCOUT are provided. In addition, as the pins of the control system, a DETECT pin used for detecting an external structure 20 (for example, a cradle or the like to be described below), an AD pin for identifying an external structure, a UART pin for command control, a DCOUTRQ pin for DCOUT output, and the like are provided. In addition, as other pins, a GND pin and the like are provided.

Note that the kinds of the pins shown in FIG. 3 are mere examples, and the kinds of the pins provided in the connection connector 17 according to the present embodiment are not limited to the examples shown in FIG. 3.

Hereinabove, the electronic device 1 according to the present embodiment has been described with reference to FIGS. 1 to 3.

<Regarding an External Structure>

In the connector connection unit 13 having the shape, an external structure 20 including not only accessories that give functions to an electronic device such as an extension module, a battery module, and an external keyboard having various functions but also equipment such as a stand or a cradle holding the electronic device can be mounted.

In such an external structure 20, a first fitting unit 21 that fits to the connection connector 17 and a second fitting unit 23 that is connected to a different portion (fixing portion 19) from the connection connector 17 of the electronic device 1 are formed as shown in, for example, FIG. 4. After the second fitting unit 23 is fitted to the fixing unit 19 of the electronic device 1, the first fitting unit 21 is fitted to the connection connector 17, and thereby the electronic device 1 and the external structure 20 are integrated without protrusion of the portion of the external structure coming into contact with the electronic device 1 from the outer shape of the housing of the electronic device 1 as shown in the lower part of FIG. 4.

In addition, there is a case in which the electronic device 1 and the external structure 20 perform transmission and reception of various signals via the first fitting unit 21 being fitted to the connection connector 17. In such a case, a wiring of a flexible substrate FB or the like extends from various kinds of a substrate B provided in the inside of the external structure 20, and a connection connector provided in the first fitting unit 21 is electrically connected to the wiring. Accordingly, the substrate B that controls the external structure 20 can perform transmission and reception of various signals with the electronic device 1.

[Electronic Device Cover]

Figure 5A:
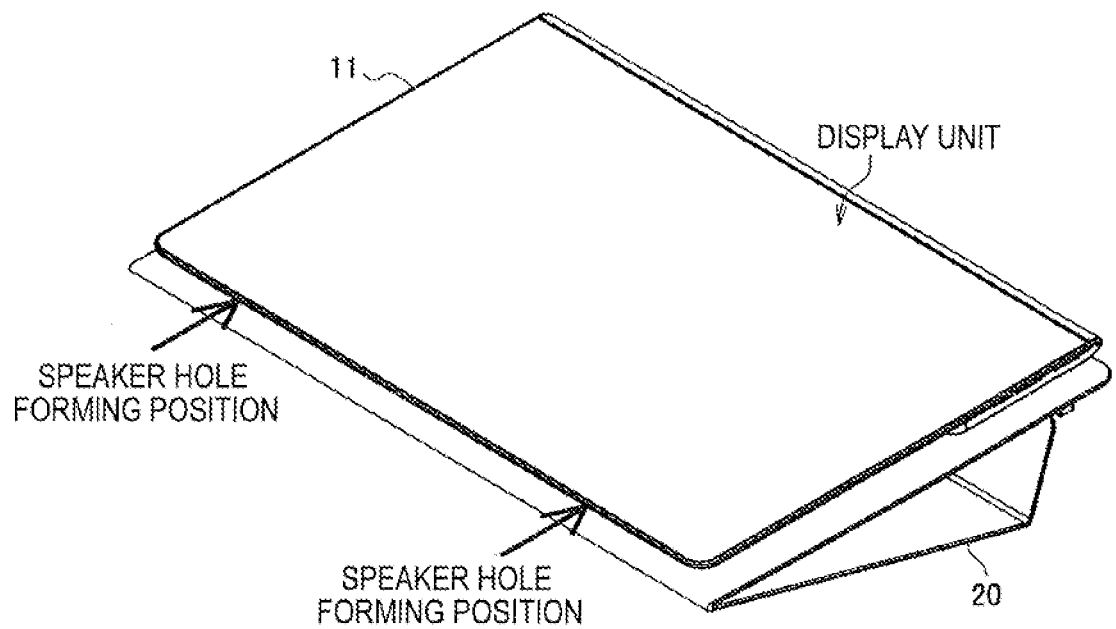
FIG. 5A is an illustrative diagram showing an electronic device cover that is an example of the external structure.
Figure 5B:
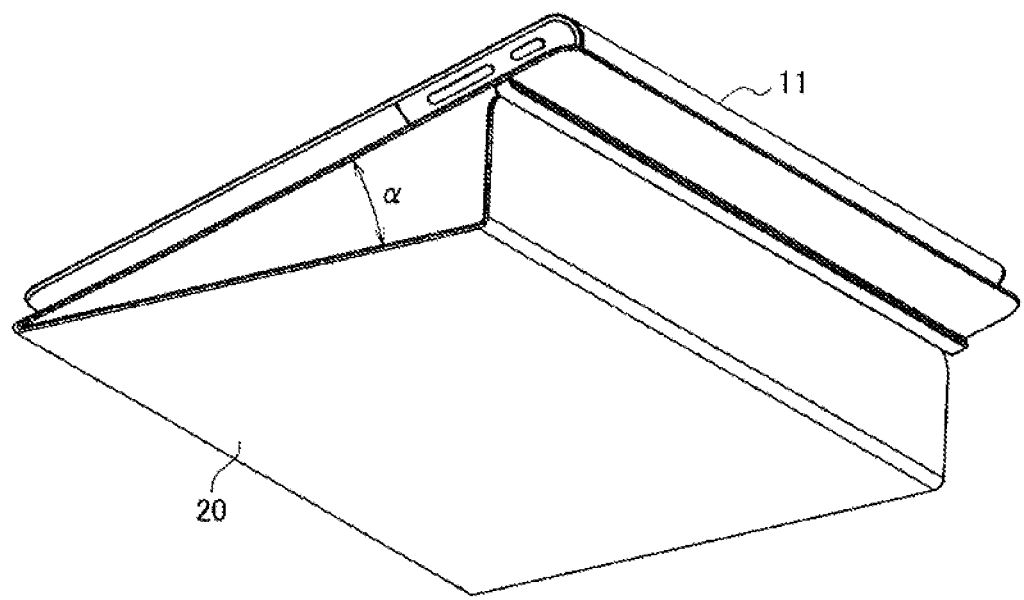
FIG. 5B is an illustrative diagram showing an electronic device cover that is an example of the external structure.

As an example of the external structure 20, a folding type electronic device cover can be exemplified as shown in, for example, FIGS. 5A and 5B. A first fitting unit 21 to be fitted to the connection connector 17 is also formed in the electronic device cover, the electronic device cover protects the display unit of the electronic device 1 when the electronic device cover is folded, and the electronic device cover functions as a stand of the electronic device 1 when the electronic device cover is opened.

The electronic device cover in the stand state is shaped so as not to occlude the portion in which speaker holes of the electronic device 1 are formed (the portion indicated by the arrows in FIG. 5A), and the size of an angle formed by the electronic device cover in the folded state (the angle α in FIG. 5B) is an angle appropriate for a user to operate the electronic device 1 (for example, about 20°).

Note that the electronic device cover described above has the exterior as shown in FIGS. 50G to 50K and its shape is defined according to the 6-face diagrams shown in FIGS. 50A to 50F.

[Cover with a Keyboard]

Figure 6A:
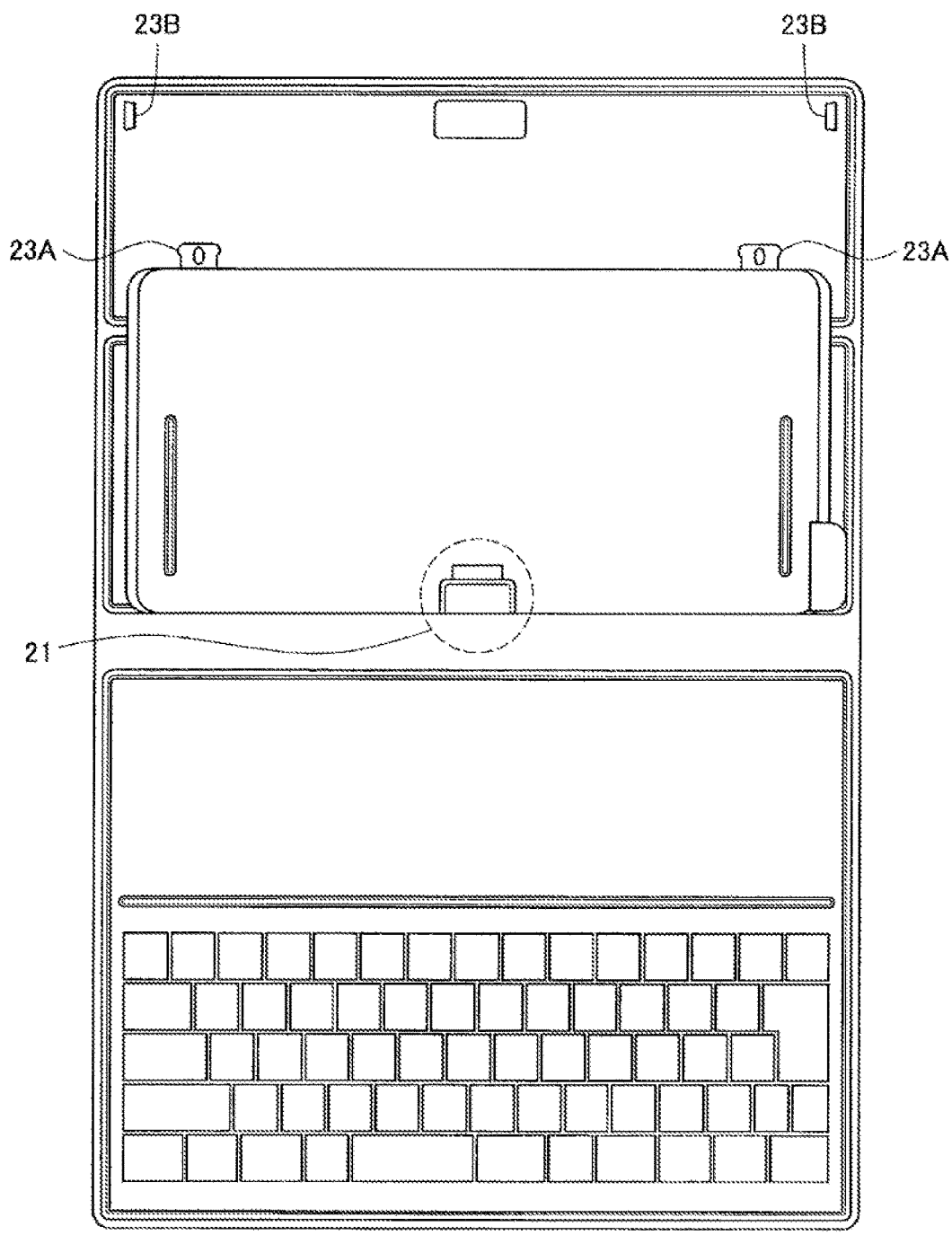
FIG. 6A is an illustrative diagram showing a cover with a keyboard that is an example of the external structure.

In addition, as another example of the external structure 20, for example, a cover with a keyboard can be exemplified as shown in FIGS. 6A to 6D. As shown in FIG. 6A, a first fitting unit 21 connected to the connection connector 17, and a plurality of second fitting units 23 fitted to the fixing portion 19 of the electronic device 1 are also formed in the cover with a keyboard. In the cover with a keyboard shown in FIG. 6A, as the second fitting units 23, two kinds of latching members including claws 23A formed to protrude in the same direction as the connection connector provided in the first fitting unit 21 as shown in FIG. 6B and claws 23B formed to protrude in the thickness direction of the electronic device 23 are formed.

FIG. 6B is a diagram showing the state in which the two kinds of latching members 23A and 23B provided in the cover with a keyboard are engaged with the electronic device 1. First, after the latching members 23B of the cover with a keyboard are engaged with the fixing portion 19 of the electronic device 1 as shown in FIG. 6B, the latching members 23B slide along a guide groove or the like provided in the electronic device 1, and then a relative position of the first fitting unit 21 relative to the electronic device 1 is changed. Then, the first fitting unit 21 is fitted to the connection connector 17, and thereby the electronic device 1 and the cover with a keyboard are integrated.

Figure 6C:
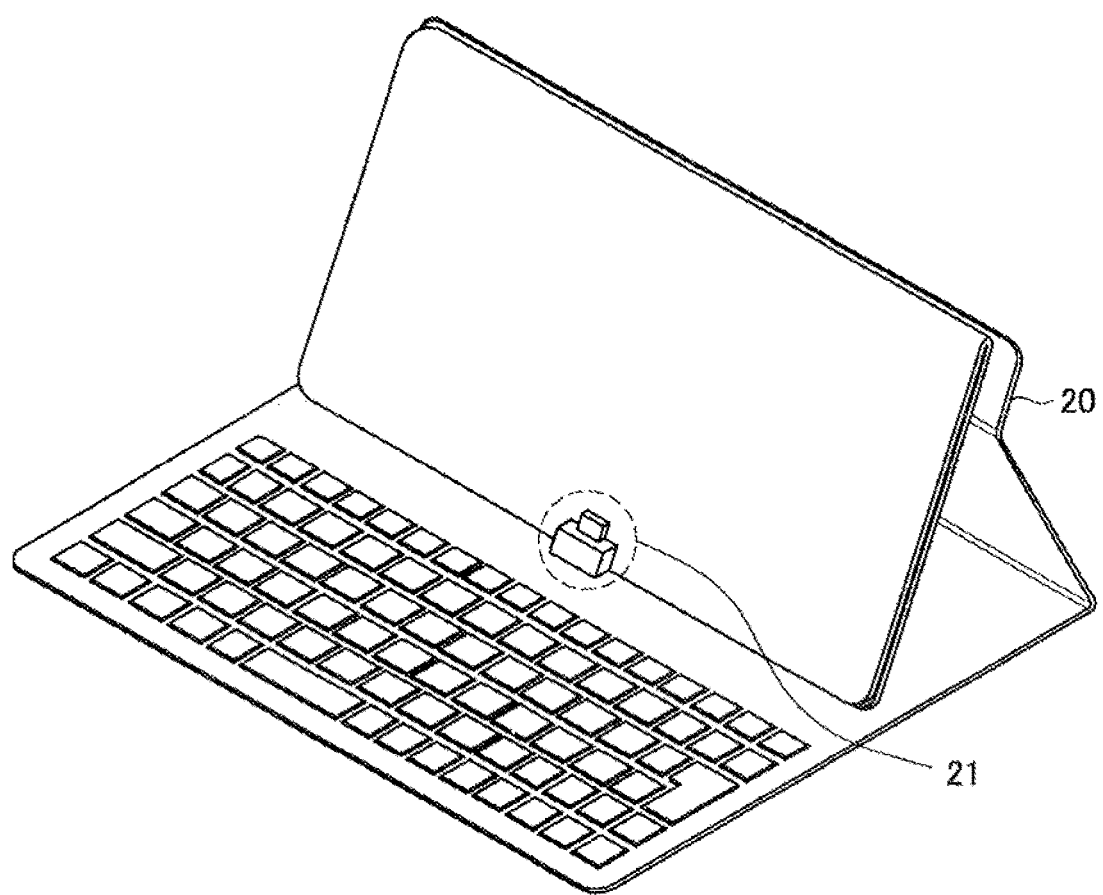
FIG. 6C is an illustrative diagram showing a cover with a keyboard that is an example of the external structure.
Figure 6D:
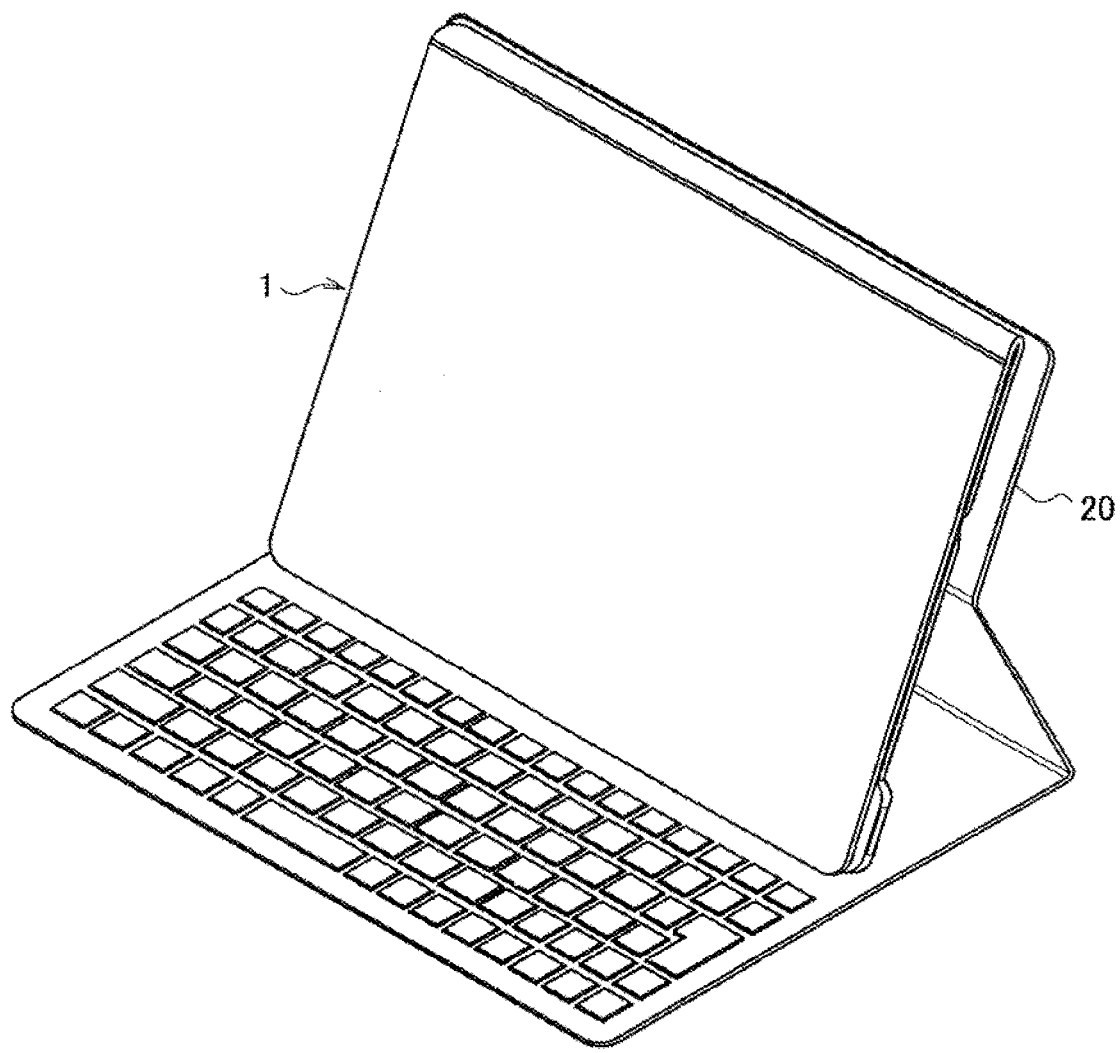
FIG. 6D is an illustrative diagram showing a cover with a keyboard that is an example of the external structure.

The portion of the cover with a keyboard in which the keyboard is formed and the portion thereof to which the electronic device 1 is fitted are set so that an angle appropriate for keyboard input is formed as shown in, for example, FIG. 6C. As a result, the cover with a keyboard in which the electronic device 1 is mounted can enhance convenience of a user in keyboard input as shown in, for example, FIG. 6D.

Note that the cover with a keyboard described above has an exterior shown in FIG. 51G and its shape is defined according to the 6-face diagrams shown in FIGS. 51A to 51F.

[Electronic Device Holding Stand]

Figure 7A:
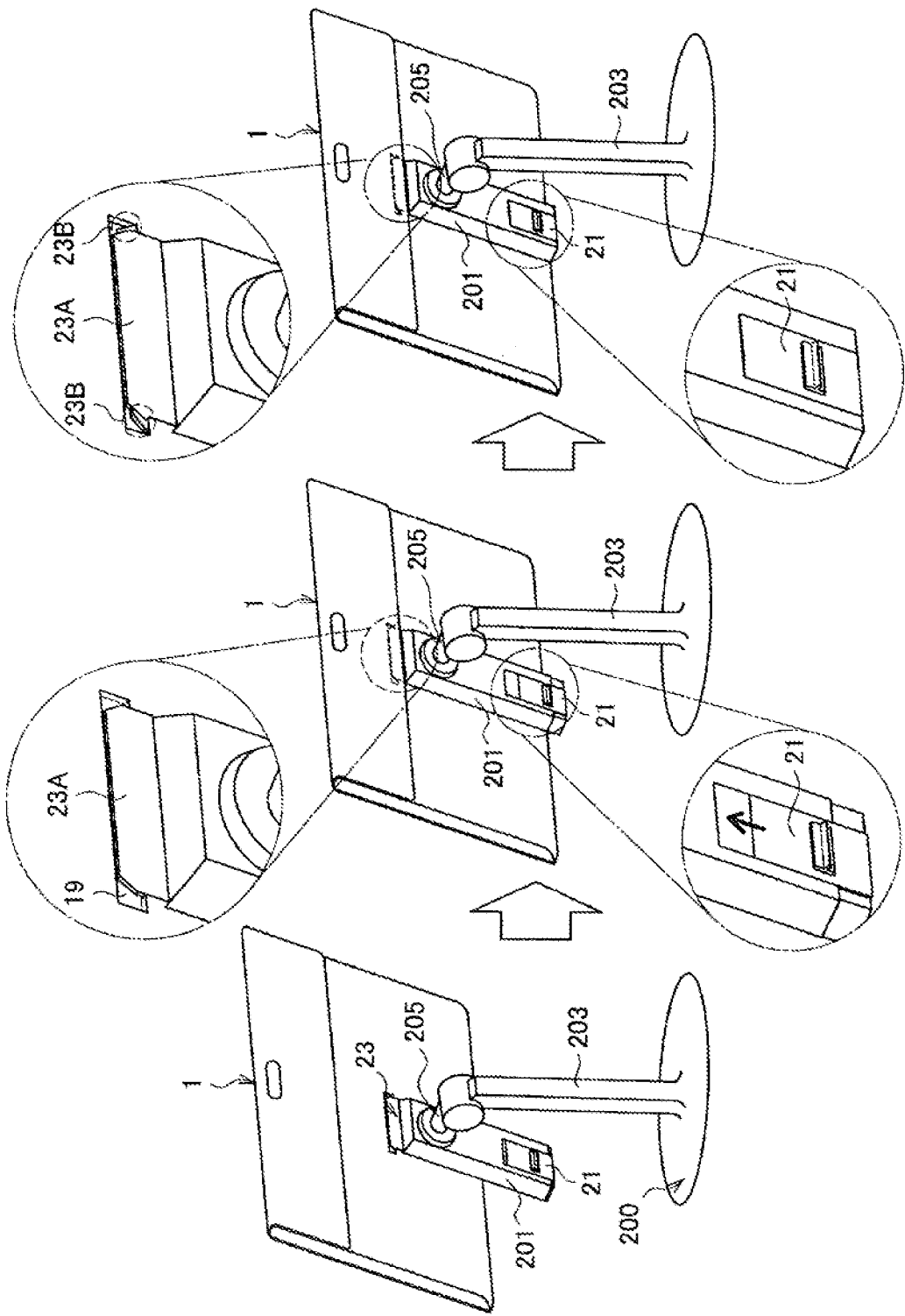
FIG. 7A is an illustrative diagram showing an electronic device holding stand that is an example of the external structure.

Next, an electronic device holding stand 200 that is an example of the external structure 20 will be described with reference to FIGS. 7A to 7C. The electronic device holding stand (hereinafter, also referred to simply as a holding stand) 200 has a linking unit 201 that links a first fitting unit 21 to a second fitting unit 23 and a support unit 203 that supports the linking unit 201, and the linking unit 201 is linked to the support unit 203 via a shaft unit 205 as shown in FIG. 7A.

In addition, the first fitting unit 21 is of a movable type, the first fitting unit 21 is not fitted to the connection connector 17 in a state in which the first fitting unit 21 is not fixed to the linking unit 201, and the first fitting unit 21 is fitted to the connection connector 17 in a state in which the first fitting unit 21 is fixed to the linking unit 201.

Hereinbelow, a flow of connecting the holding stand 200 to the electronic device 1 will be briefly described with reference to FIG. 7A.

First, the second fitting unit 23 is fitted to the fixing portion 19 of the electronic device 1, and then the holding stand 200 is guided to the electronic device 1 using the second fitting unit 23 as a supporting point. In more detail, a latching member 23A provided in the second fitting unit 23 is inserted into the fixing portion 19 of the electronic device 1 to be latched on the fixing portion 19 of the electronic device. Then, the first fitting unit 21 that has not been fixed to the linking unit 201 is operated on the side of the connection connector 17 of the electronic device 1. When the first fitting unit 21 is operated on the side of the connection connector 17, latching members 23B come to protrude from both ends of the latching member 23A in the width direction of the electronic device 1 in association with the operation with respect to the first fitting unit 21. Through the fixation of the first fitting unit 21 to the linking unit 201, the latching members 23B are also fixed to the electronic device 1, and thereby the electronic device 1 is integrated with the holding stand 200. As a result, in the state in which the first fitting unit 21 is fixed to the linking unit 201, the electronic device 1 is not separated from the holding stand 200.

Note that a mechanism of causing the latching members 23B to protrude in association with the operation with respect to the first fitting unit 21 is not particularly limited, and the first fitting unit 21 and the latching members 23B may be linked to each other using one or more of mechanical members (for example, toothed wheels or the like), or the first fitting unit 21 and the latching members 23B may be linked to each other using an elastic object such as a spring.

Here, as shown in FIG. 7B, in the state in which the first fitting unit 21 is not fixed to the linking unit 201, the lower end of the first fitting unit 21 protrudes from the lower end of the electronic device 1. However, when the first fitting unit 21 is fixed to the linking unit 201, the lower end of the first fitting unit 21 does not protrude from the lower end of the electronic device 1. As a result, when the electronic device 1 is viewed from the front side on which the display unit is provided, the first fitting unit 21 is not seen as shown in the drawing on the right side of FIG. 7B, and accordingly, design of the holding stand 200 can improve.

Here, a tilt angle β formed by the linking unit 201 and the support unit 203 shown in the drawing on the left side of FIG. 7C can be appropriately changed according to a user operation, and can be set so that the electronic device 1 is easily viewed by a user.

In addition, as shown in FIG. 7C, the linking unit 201 is formed to be rotated with respect to the shaft unit 205, and in a state in which the electronic device 1 is mounted, a direction of the display screen of the electronic device 1 can be freely changed to a vertically long state or a horizontally long state. By allowing a screen direction of the electronic device 1 to be changeable with the electronic device 1 mounted in the holding stand 200, together with the changing of the tilt angle described before, user convenience can improve.

In addition, the linking unit 201, the support unit 203, and the shaft unit 205 may be formed of hollow members, and a wiring that enables electrical connection to the connection connector 17 may be placed in the hollow portions of the linking unit 201, the support unit 203, and the shaft unit 205. Accordingly, the wiring is not visible from the exterior of the holding stand 200, and thereby design of the holding stand 200 improves.

Note that a member used to form the linking unit 201, the support unit 203, and the shaft unit 205 can be selected from known members such as various resins, metals, wood, and the like, but the portion of the linking unit 201 that comes into contact with the electronic device 1 may be formed using a member that can lock the electronic device 1. Here, as a member that can lock the electronic device 1, for example, a member of a magnet or the like that can magnetically lock the electronic device 1, a member having a high friction coefficient or a member having high tackiness that can physically lock the electronic device 1, or the like can be exemplified. In addition, the electronic device 1 may be mechanically latched by providing a latching member such as a claw or the like in the portion of the linking unit 201 that comes into contact with the electronic device 1.

Hereinabove, the electronic device holding stand 200 that is an example of the external structure 20 has been described in detail with reference to FIGS. 7A to 7C.

Note that the electronic device holding stand described above has the exterior shown in FIGS. 47G to 47K and its shape is defined according to 6-face diagrams shown in FIGS. 47A to 47F.

[Connection Cable]

Figure 8:
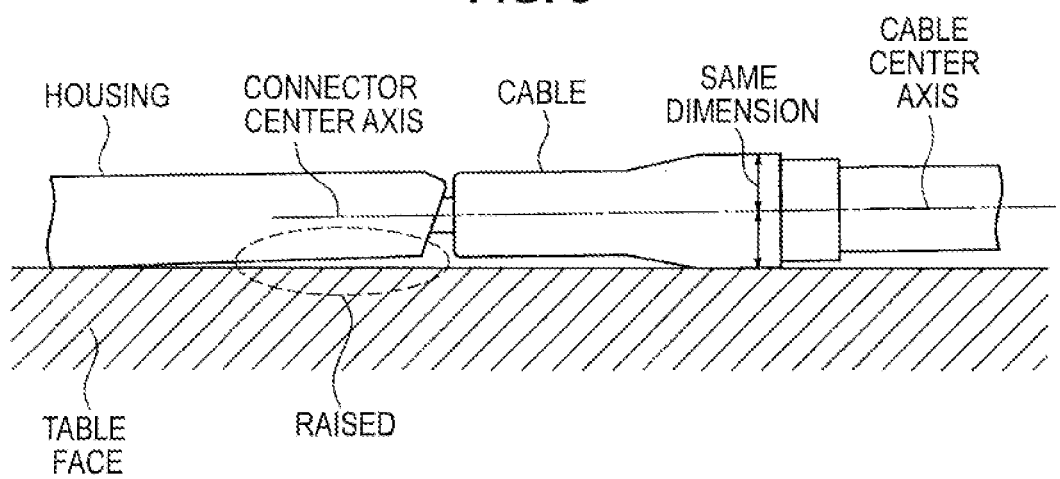
FIG. 8 is an illustrative diagram showing a connection method of a general cable.

A cable can also be connected to the connection connector 17 included in the electronic device 1 according to the present embodiment. Here, in the case of a general cable, the upper and lower parts of the cable are designed to be symmetric as shown in, for example, FIG. 8. For this reason, when a general cable is connected to a connection connector provided in an electronic device, there are cases in which the housing of the electronic device is raised from a table surface depending on the axial diameter of the cable. Under such a circumstance, when a user performs any operation with respect to the electronic device, there are cases in which the electronic device is not stably placed on the table surface and accordingly the operability of the user deteriorates.

Figure 9:
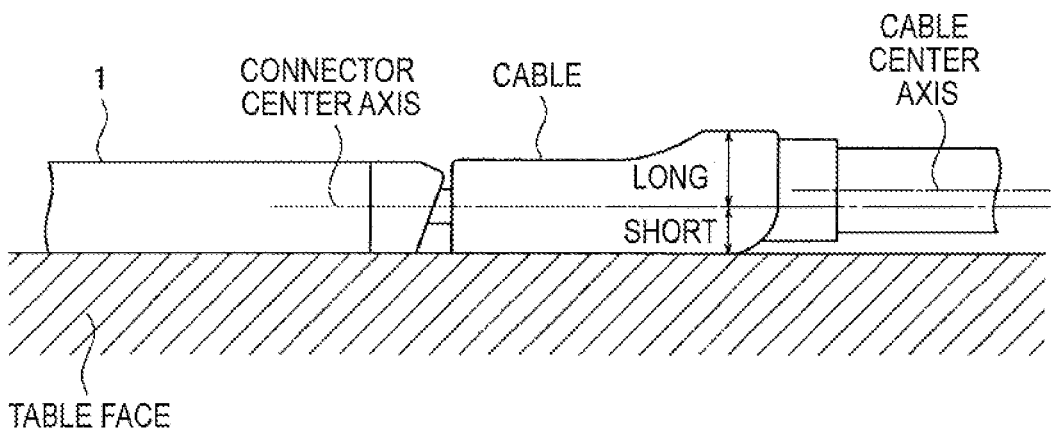
FIG. 9 is an illustrative diagram showing a method of connecting a cable to the electronic device according to the embodiment.

Thus, in a cable used in the electronic device 1 according to the present embodiment, the center axis of the connection connector does not coincide with the center axis of the cable, and the center axis of the cable is adjusted to be higher than the center axis of the connection connector as shown in, for example, FIG. 9. Accordingly, the bottom face of the housing 11 of the electronic device 1 and the bottom face of the cable can be prevented from being raised from the table surface, and thus operability of the user can improve. In addition, as shown in FIG. 9, by causing the height of an upper end of the cable to substantially coincide with the height of an upper end of the housing 11 around the connection portion of the cable, the operability of the user can further improve. In addition, as shown in FIG. 9, by increasing the axial diameter of the cable in a position a little away from the connection portion of the cable, a level difference between the connection portion of the cable can be formed. Since such a level difference can be used as a position of the cable caught by a hand of the user, convenience of the user can improve.

[Connector Cap]

As previously described, an electronic device such as a personal cable, or a portable electronic device can fulfill functions that are not realized only by the main body of the electronic device, by being connected to a device outside the electronic device. As connectors for realizing such functions, for example, there are various connectors including a power source connector, a USB connector, an HDMI connector, an MIPI connector, an S-ATA connector, and the like. For each of the connectors, a unified standard is defined, and various external devices, accessories, and the like can be connected to the electronic device by lining up a number of connectors.

However, when a plurality of connectors are installed with respect to the electronic device, as the number of connectors increases, many matters to be considered such as an attachment space, attachment positions, and disposition relationships with counterpart devices emerge. For this reason, by newly standardizing a connector with many pins, high density, and high performance, functions that were originally realized by a plurality of connectors can be realized by one connector. In addition, when a number of connectors are used, it is difficult to give a waterproof function to the electronic device, but when a single connector is used, the waterproof function can be easily given to the electronic device by putting a waterproof cap on the connector.

However, when an external device is connected to a connector on which such a waterproof cap is put, a user can connect an external device such as a cable or a cradle to the connector after removing the waterproof cap put thereon, which is not preferable because there is a possibility not only of deterioration of the operability but also of loss of the removed waterproof cap.

In addition, with respect to the connector on the counterpart side to which the electronic device is connected, various problems occur in that matters with regard to its design including having the same degree of many pins and high density as the connector provided in the electronic device, measurement of accuracy for fitting, providing a guide part, and the like, are required to be considered, a user is compelled to stably insert the connector, and there is concern of damage. In addition, even when an external device of a single function is connected to the electronic device, using a connector having all kinds of pins deteriorates efficiency.

When the electronic device is connected to an external structure that is likely to use all its functions associated with connectors, such problems as described above are unavoidable. However, when the electronic device is connected to an external structure in which using only a few of its plurality pins for a power source, a USB, or the like is sufficient, only signals to be used among signals assigned to the plurality of pins of many functions may be used. Thus, in the present embodiment to be described below, a connector cap that enables only signals to be used in a certain external structure to be taken from the connection connector of the electronic device and gives functionality, simplicity, stability, and further a waterproof property to the electronic device is proposed. Such a connector cap can realize functionality, simplicity, stability, and a waterproof property by being set to be a metal terminal (contact point terminal) of a so-called gold-tooth type, rather than being fitted to corresponding pins of a connector.

For example, a case of creating a waterproof cap with a metal terminal which selects only necessary pins from a multi-pin connector and uses a terminal of a metal plate for a contact side with an external structure (for example, a cradle) as a connector cap for a cradle specialized in power supply or charge to a portable electronic device such as a PC or a mobile phone, communication with a personal computer, or the like is considered.

A connector cap according to the present embodiment is inserted onto the connection connector, instead of a waterproof cap that is put on the side of the electronic device as a standard without electric connection. A user generally uses only the main body of the electronic device when he or she goes out or attends a meeting in the state in which the connector cap according to the present embodiment is inserted. In addition, when power is to be supplied to the electronic device, or when the electronic device is to be charged or to communicate with a personal computer, a user can perform an intended operation only by placing the electronic device, on which the connector cap is put, on an external structure such as a cradle.

By forming an external structure on which a connector cap is put using a spring connector, an attachment mechanism of the connector cap according to the present embodiment can be simplified, and a user can easily mount the electronic device with the connector cap in the external structure. Furthermore, concern over the connection connector being damaged can be reduced. In addition, since the connector cap according to the present embodiment is of a mono-cap form, it is easy to add a waterproof mechanism, and usability when a user uses the electronic device in an outdoor place, a kitchen, or the like can improve.

Based on the content described above, the connector cap according to the present embodiment to be described below can be attached to or detached from an electronic device having an external structure connection connector that is exposed to the outside and includes a plurality of pins, and has a housing unit that can cover the external structure connection connector and plate-shaped contact point terminals that are provided on a surface of the housing unit in plural and that are formed of a conductive material electrically connected to some of the plurality of pins. Hereinafter, the connector cap according to the present embodiment will be described in detail.

Figure 10:
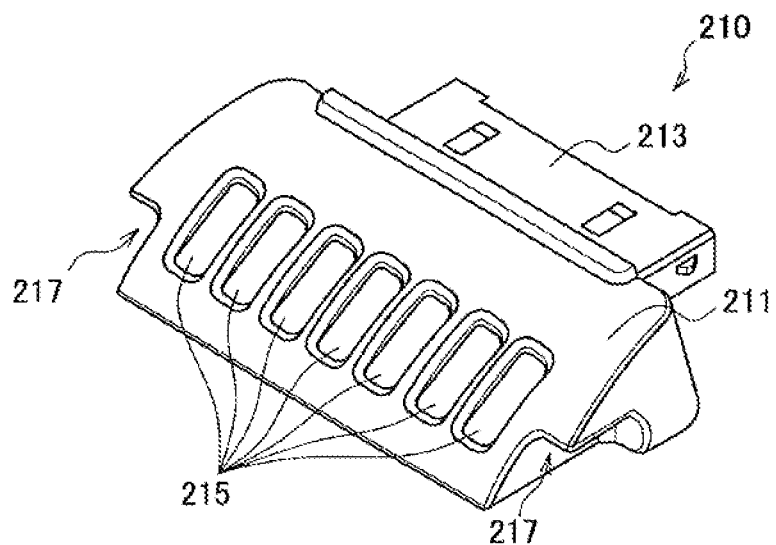
FIG. 10 is an illustrative diagram showing a connector cap according to the embodiment.

FIG. 10 is an illustrative diagram showing an example of the connector cap 210 that is an example of the external structure 20. The connector cap 210 according to the present embodiment has an external housing 211, a connector fitting unit 213 that is fitted to the connection connector 17, and contact point terminals 215 as shown in FIG. 10. In addition, in parts of the external housing 211 (at both ends of the external housing 211 in the width direction of the connector fitting unit 213), notches 217 are formed as shown in FIG. 10.

Figure 11:
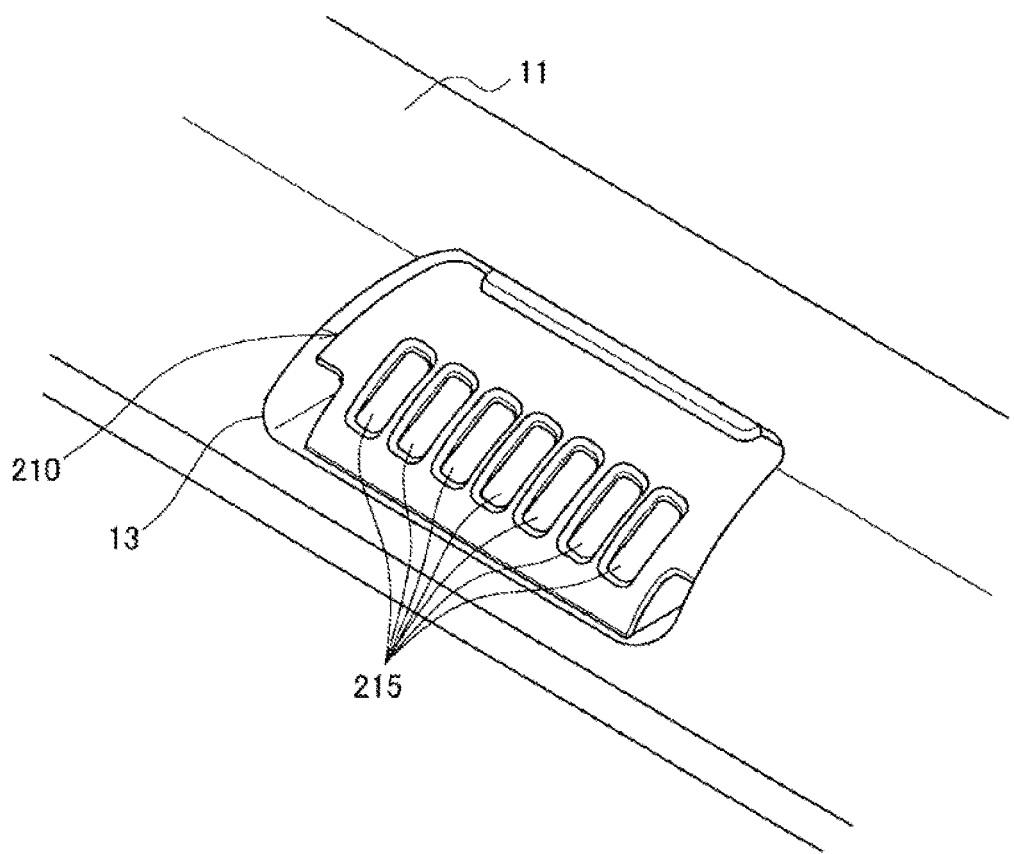
FIG. 11 is an illustrative diagram showing a connector cap according to the embodiment.

The external housing 211 can be formed of a known resin, metal, or the like, and as shown in FIG. 11, for example, has an outer shape integrated with the electronic device 1 when it is laid in the connector connection unit 13 of the electronic device 1, with substantially no level difference with the housing 11 of the electronic device 1.

The connector fitting unit 213 is a portion fitted to the connection connector 17 having about 50 pins as shown in, for example, FIG. 3, and electrically connected to the plurality of contact point terminals 215 using a predetermined metal wiring or the like inside the connector cap 210.

The plurality of contact point terminals 215 are plate-shaped terminals formed of a conductive material such as a metal, and are portions electrically connected to the connection connector provided in the external structure 20. In the example shown in FIG. 10, seven contact point terminals 215 are formed on an outer face of the external housing 211.

In the connector cap 210 according to the present embodiment, the kinds of the pins of the connection connector 17 connected to the seven contact point terminals are, for example, as follows.

GND
USB_VBUS: USB power source line
USB_D+: USB communication data signal line
USB_D−: USB communication data signal line
ACC_DET#: Signal line for detecting connection of an external structure
ACC_AD: Signal line for identifying a type of an external structure
SW: Signal line indicating whether an electronic device is connected to an external structure (cradle or the like)

In addition, on the side of the external structure such as a cradle, a connector that corresponds to the contact point terminals shown in FIG. 10 is mounted on a substrate of the external structure, and connected to a USB AC charger or a computer via a USB host cable.

Note that, the terminal (ACC_DET#) is connected to GND on the external structure side, and pulled up on the electronic device side. When a signal value indicates GND, the external structure is determined to be connected, and when the signal value is high, the external structure is determined not to be connected.

In addition, the terminal (ACC_AD) is connected to GND via a resistor having a predetermined resistance value on the external structure side, and pulled up on the electronic device side. When the signal value is a predetermined AD value, a cradle can be determined to be connected.

In addition, for the sake of safety, the terminal (USB_VBUS) on the external structure side can also be configured to be blocked by a predetermined IC or the like when the electronic device is not connected.

The SW signal terminal among the seven contact point terminals can also be configured to be short-circuited to GND inside the connector cap 210. In addition, it can be configured such that the terminal is pulled up by USB_VBUS inside the cradle, the signal value becomes low and then conduction starts when the electronic device is placed on the cradle, and the signal value becomes high and then conduction is blocked when the electronic device is not placed on the cradle.

As described above, the number of the contact point terminals 215 provided in the connector cap 210 according to the present embodiment is set to be smaller than the number of pins formed in the connection connector 17 to which the connector cap 210 is connected. In addition, the examples of the signal lines described above are example of signal lines when they specialize in the functions of power supply, charge, communication with an information processing device and the like, and the number of contact point terminals 215 and the type of signal lines to be connected can be appropriately changed according to the type of an external structure with which connection is intended.

Figure 12:
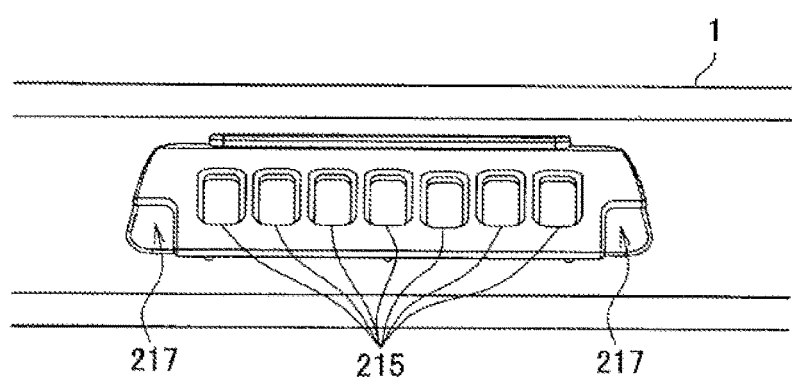
FIG. 12 is an illustrative diagram showing a connector cap according to the embodiment.

In addition, in the connector cap 210 according to the present embodiment, the notches 217 are formed as shown in FIG. 10. When the connector cap 210 having the notches 217 is put on the connector connection unit 213 of the electronic device 1, apertures are generated in the positions corresponding to the notches 217 as shown in, for example, FIG. 12. Here, by forming protruding portions (for example, pins or the like) in an external structure to be connected to the connector cap 210 and inserting the protruding portions into the apertures corresponding to the notches 217, the apertures can be used as guiding members that guide connection of the external structure to the connector cap 210. Accordingly, accuracy of positioning when the external structure such as a cradle is connected to the connector cap 210 can be further enhanced.

Figure 13:
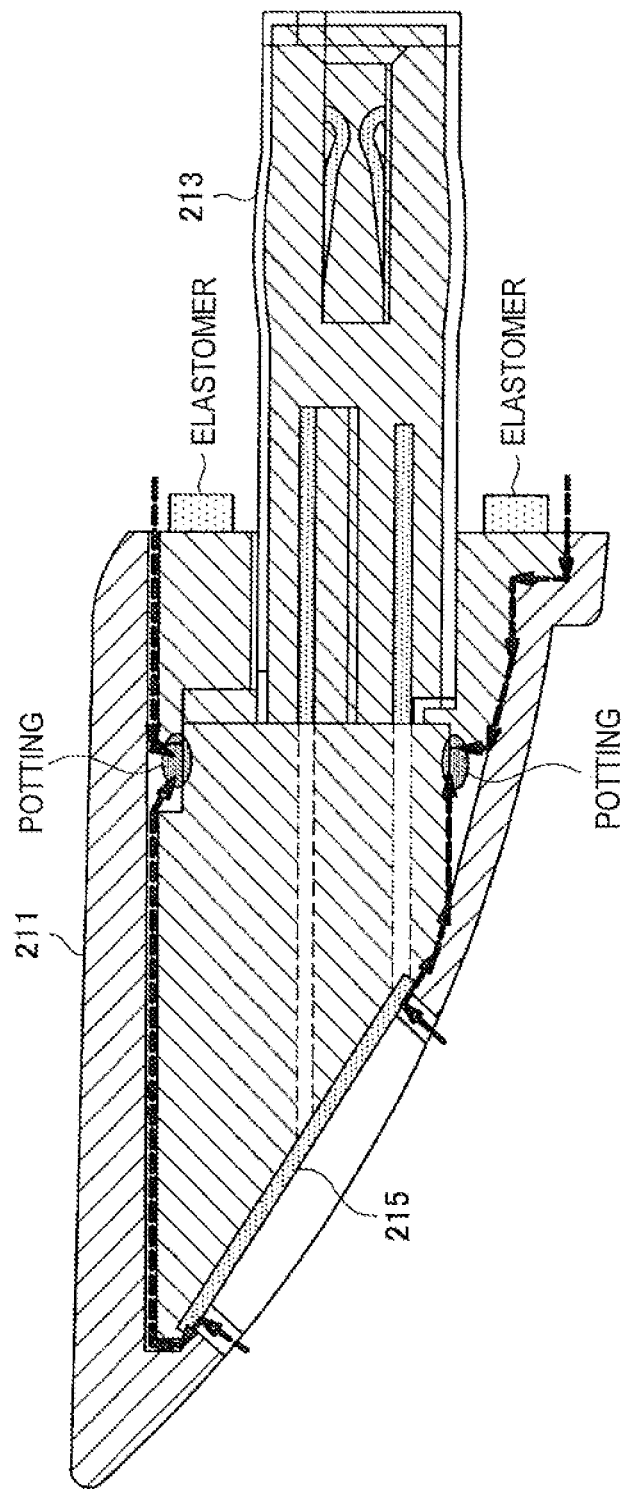
FIG. 13 is an illustrative diagram showing a connector cap according to the embodiment.

FIG. 13 is an example of a side cross-sectional diagram when the connector cap 210 according to the present embodiment is cut. As shown in FIG. 13, a terminal unit (the portion corresponding to the external housing 211) of the connector cap 210 according to the present embodiment is, for example, cast and the plate-shaped contact point terminals 215 and a wiring of metal or the like of the connector fitting unit 213 are appropriately electrically connected. In addition, the elements inside the connector cap 210 are bonded to each other using glue or the like, and a member formed of an elastomer or the like is provided in the portion that comes into contact with the electronic device 1. Accordingly, the waterproof mechanism of the connector cap 210 can be realized using a relatively easy method.

Figure 14:
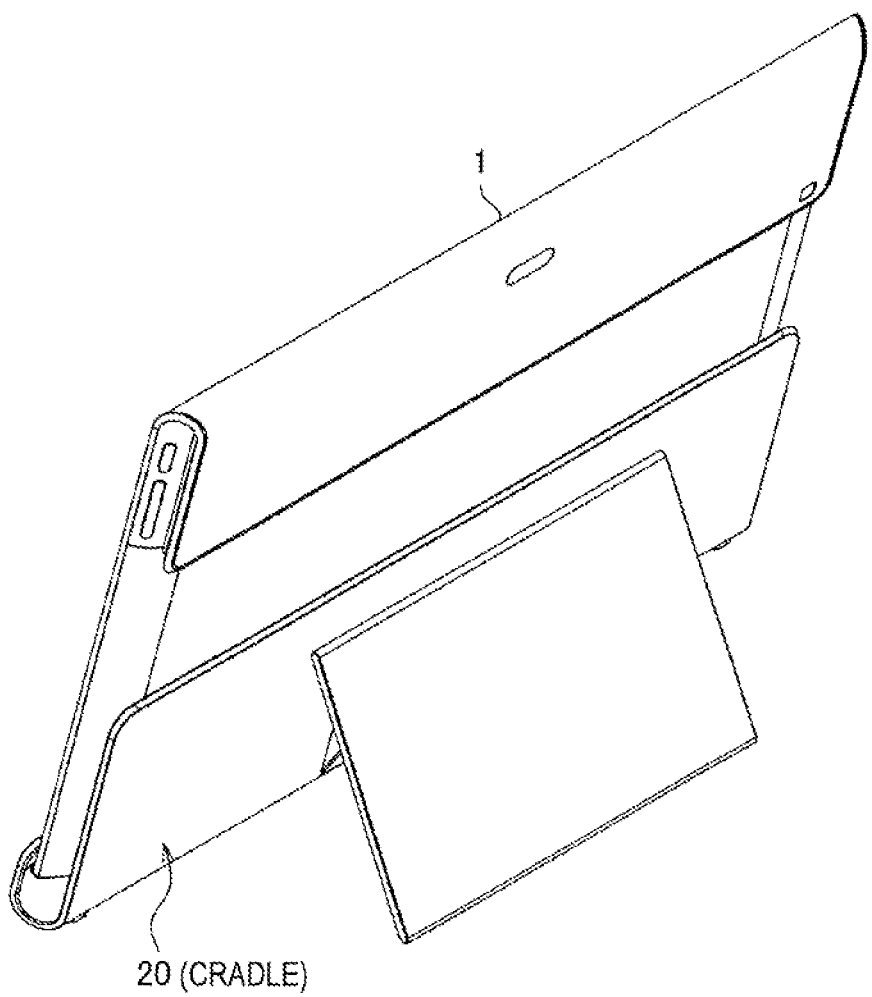
FIG. 14 is an illustrative diagram showing a connector cap according to the embodiment.

By realizing the connector cap 210 as described above, even when the connector cap 210 is put on the connector connection unit 13 of the electronic device 1, the electronic device 1 on which the connector cap 210 is put can be easily installed in an external structure such as a cradle as shown in, for example, FIG. 14. As a result, functionality, simplicity, stability, and the waterproof property of the electronic device 1 can be realized.

Hereinabove, the connector cap 210 that is an example of the external structure 20 has been described in detail with reference to FIGS. 10 to 14.

Note that the connector cap described above has an exterior shown in FIGS. 48G and 48H, and a shape thereof is defined according to the 6-face diagrams shown in FIGS. 48A to 48F. In addition, the cradle has an exterior shown in FIGS. 49G to 49I, and a shape thereof is defined according to the 6-face diagrams shown in FIGS. 49A to 49F.

<Regarding an Arrangement Method of Pins of an External Structure Connection Connector>

Figure 15A:
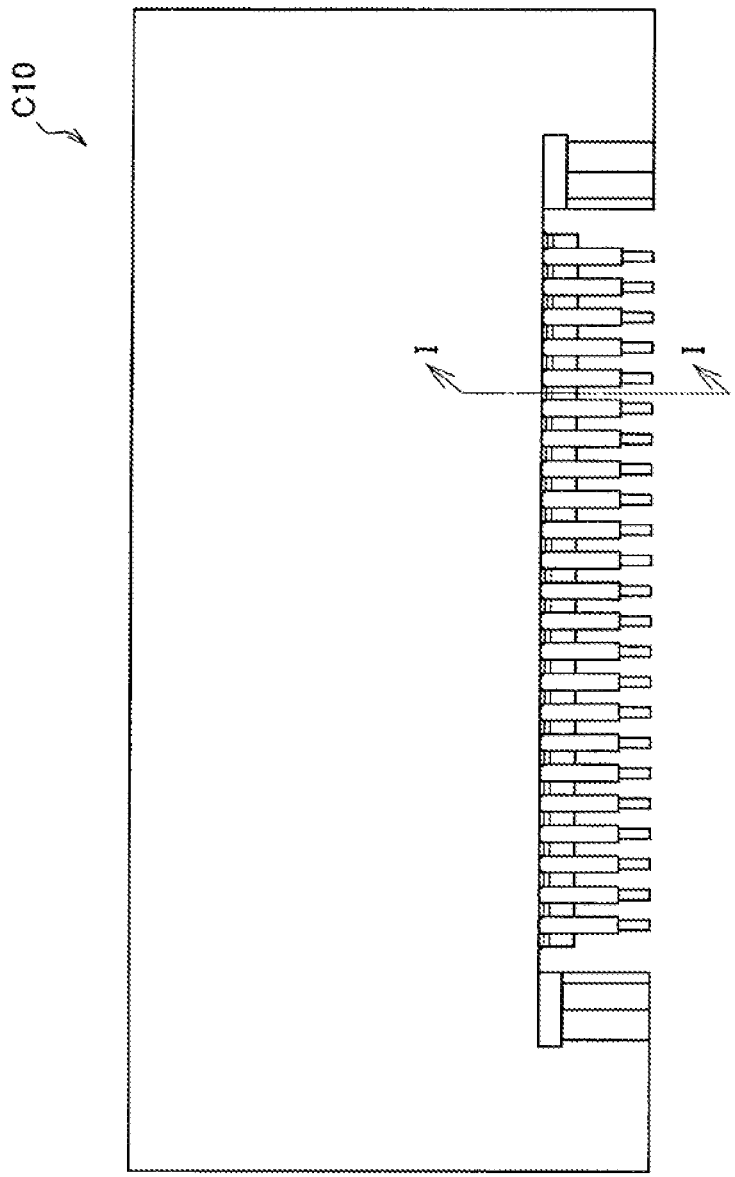
FIG. 15A is an illustrative diagram showing an example of an external structure connection connector according to the embodiment.

A connector for electrically connecting to an external structure is provided in the first fitting unit. The connector (connector C10) is provided with a number of pins as shown in, for example, FIG. 15A. Each pin functions as a signal line. The function of each signal line can be freely set; however, signal lines for example, a USB, an HDMI, power supply, ground connection, a control signal, module detection (connection detection and various detections) and the like are arranged. Note that, in the example shown in FIG. 15A, the signal lines are described as having an exposed form for the convenience of description, but the signal lines are surrounded by an outer frame member C11 as shown in FIG. 15B (I-I line cross-sectional diagram). In addition, the connector C10 according to the present embodiment is wired with signal line groups in two stages (signal line groups C13 and C14). The stage in which the signal line group C13 is arranged is called an upper stage, and the stage in which the signal line group C14 is arranged is called a lower stage.

The upper diagram of FIG. 15B shows a cut face of one signal line of the signal line group C13 of the upper stage after being cut so as to be exposed. On the other hand, the lower diagram of FIG. 15B shows a cut face of one signal line of the signal line group C14 of the lower stage after being cut so as to be exposed. In other words, when the signal line groups C13 and C14 are viewed from above, they are arranged differently from each other. In addition, an electrostatic discharge countering member C15 is provided close to the signal line group C14 of the lower stage. In general, a connector is provided with an electrostatic discharge (ESD) countering member if necessary in order to test influence on a signal line caused by electrostatic discharge derived from outside and thereby to clear a reference of tolerance. However, when such an electrostatic discharge countering member is provided, an effect occurs on a signal flowing on a signal line, and accordingly, there is a possibility of the signal weakening.

Thus, the connector C10 according to the present embodiment uses the signal line group C13 of the upper stage for transmission of a high-speed signal and the signal line group C14 of the lower stage for transmission of a low-speed signal. Furthermore, the connector C10 is formed such that a part of the outer frame member C11 positioned on the upper stage side stretches to be long on the outer side, and on the other hand, another part of the outer frame member C11 stretches to be long to the periphery of the tip end portions of the signal lines as shown in FIG. 15B. With such a configuration, the influence of electrostatic discharge derived from outside on the signal line group C13 is suppressed by the long stretched portion of the outer frame member C11, and then the electrostatic discharge countering member C15 may not be provided near the signal line group C13. As a result of the provision of the electrostatic discharge countering member C15, weakening of the signal of the signal line group C13 does not occur.

Note that, as the high-speed signal, for example, a signal that requires a high transmission speed including an image signal for display on a display, a transmission signal for wireless communication, or the like is exemplified. On the other hand, as a low-speed signal, for example, a connection detection signal of a connection connector, an identification signal for determining the type of a module, or the like is exemplified. As is known, a transmission speed of a signal is not measured only based on a transmission clock being high or low. For example, even when a signal is transmitted on a transmission path with much noise at a high clock, processes including re-transmission control, error detection, error correction, and the like should be repeatedly executed, and there are cases in which a transmission speed actually drops. For these reasons, the connector C10 is configured such that the signal line group C13 is arranged in a position that is affected relatively little by electrostatic discharge, and the signal line group C14 and the electrostatic discharge countering member C15 are arranged in positions that are relatively easily affected by electrostatic discharged. With such a configuration, weakening of a high-speed signal can be effectively suppressed.

Note that, in the example of FIG. 15B, the influence of electrostatic discharge is suppressed using the structure in which the part of the outer frame member C11 close to the signal line group C13 of the upper stage stretches much on the outer side, but the same effect can also be obtained when the lengths of stretching in the upper and lower stages are set to be the same as shown in FIG. 15C. As one method thereof, for example, a method of forming a part C111 of the outer frame member C11 close to the signal line group C13 of the upper stage of a member having a high electric conductivity (for example, a metal or the like) is considered. Note that other portions such as a part C112 of the outer frame member C11 close to the signal line group C14 of the lower stage may be formed of a material having a low electric conductivity (for example, a resin or the like). Since a member having a high electric conductivity brings an effect of suppressing influence of electrostatic discharge received from outside, such a configuration achieves protection of the signal line group C13, and as a result, the same effect as the configuration of FIG. 15B is obtained. In addition, the same effect is obtained when the length of the signal line group C14 of the lower stage is maintained and the signal line group C13 of the upper stage is shortened as shown in FIG. 15D.

Hereinabove, arrangement of pins of the connector has been described.

<Regarding Another Example of the Electronic Device>

Figure 16:
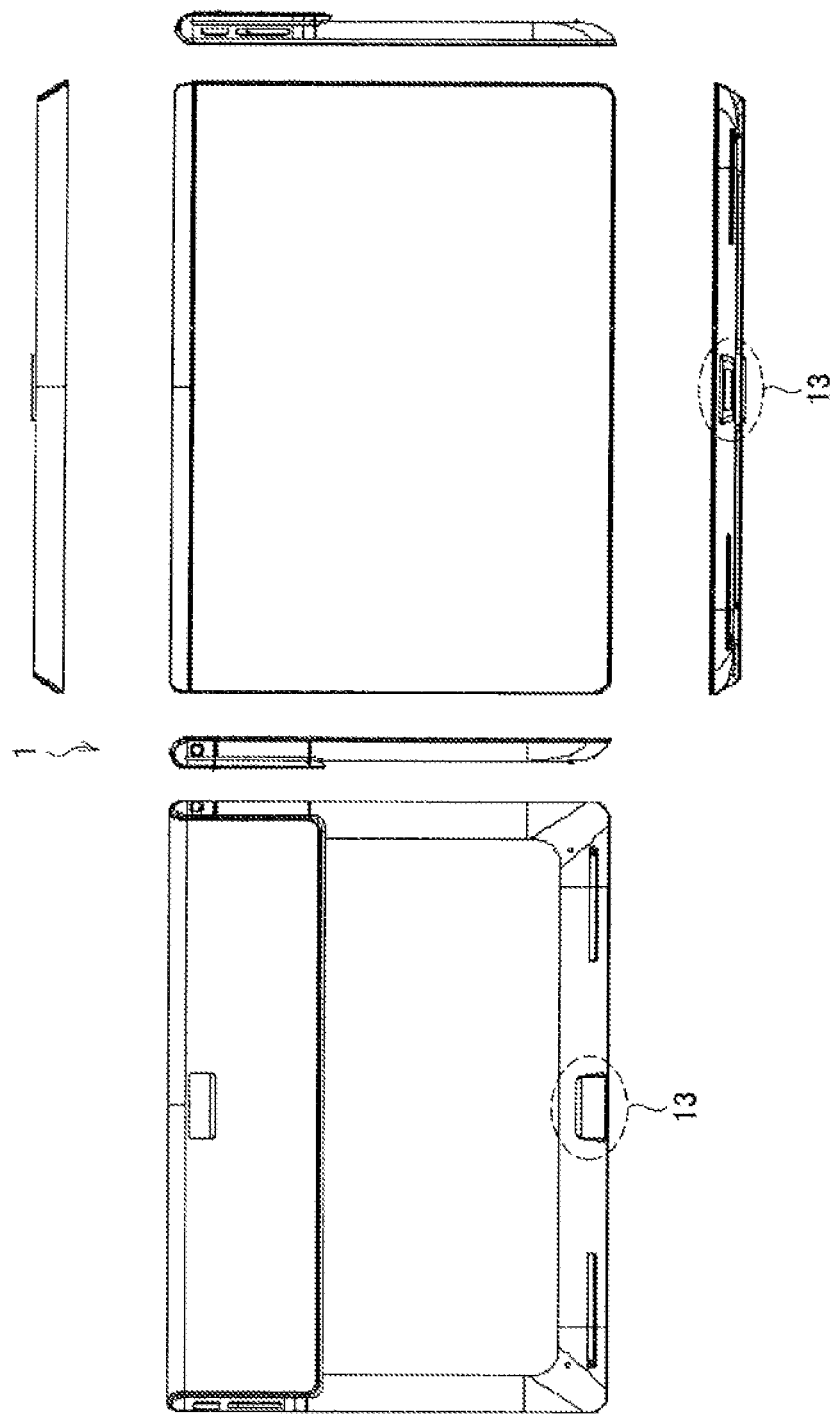
FIG. 16 is an exterior diagram of an example of the electronic device according to the embodiment.
Figure 17A:
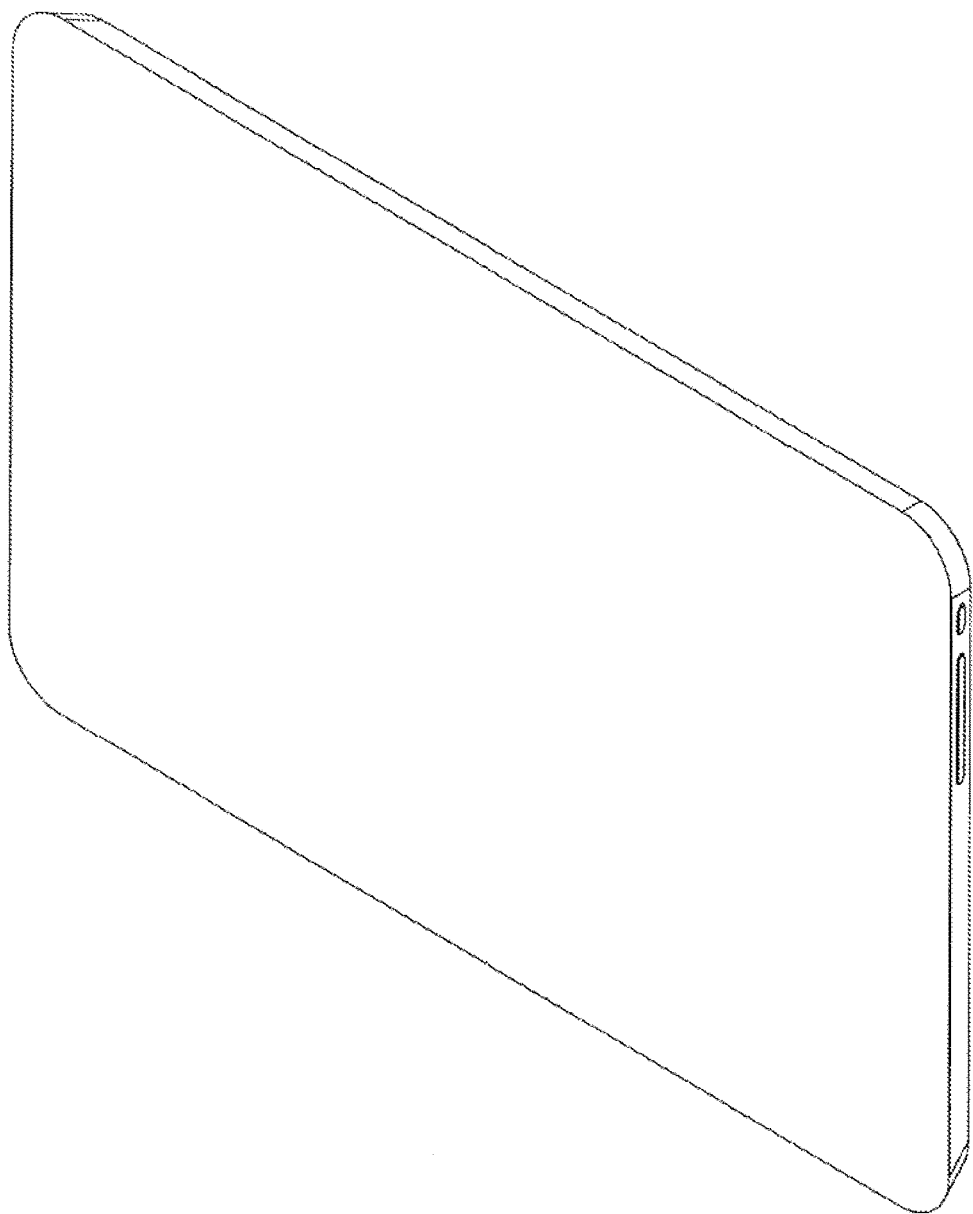
FIG. 17A is an exterior diagram of an example of the electronic device according to the embodiment.
Figure 17B:
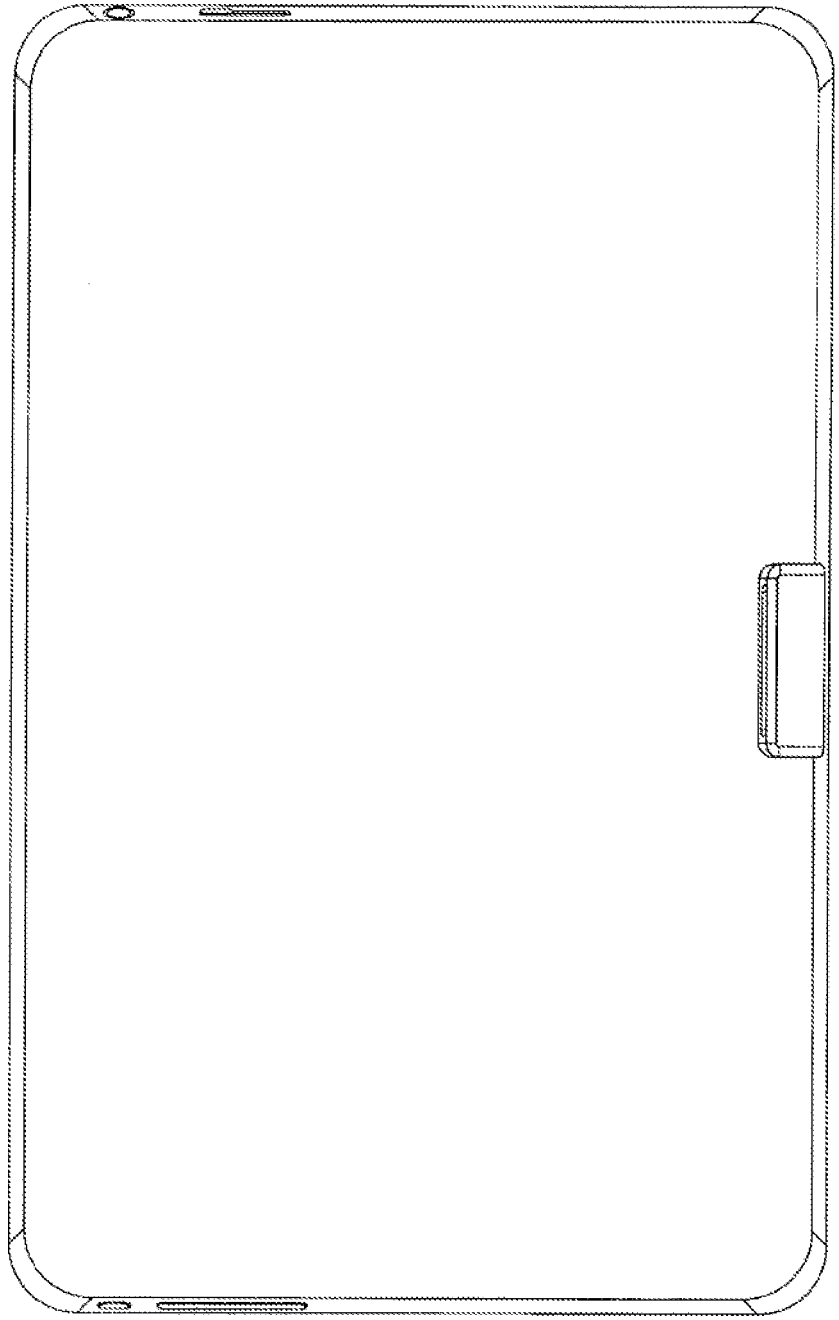
FIG. 17B is an exterior diagram of an example of the electronic device according to the embodiment.
Figure 17C:
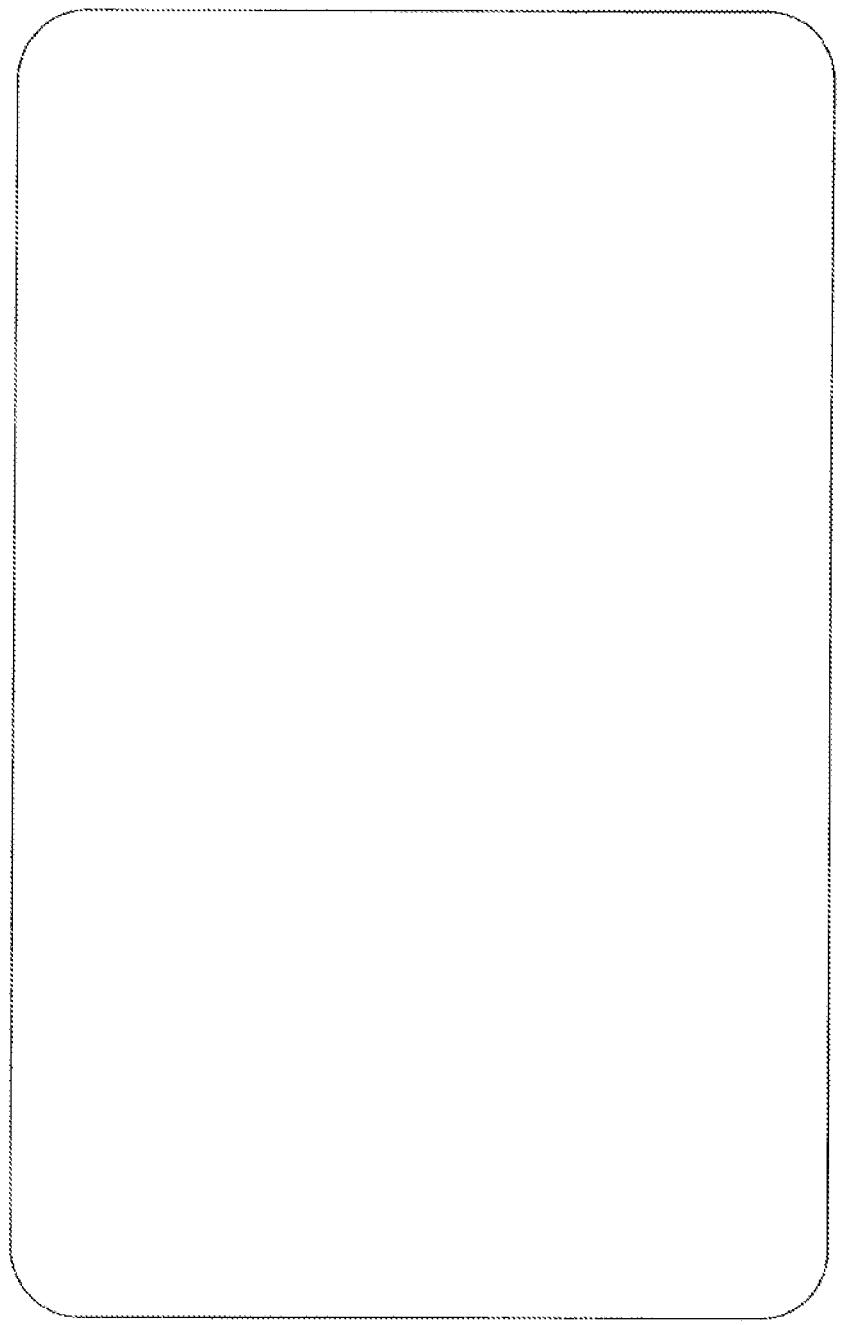
FIG. 17C is an exterior diagram of an example of the electronic device according to the embodiment.
Figure 17D:
FIG. 17D is an exterior diagram of an example of the electronic device according to the embodiment.
Figure 17E:
FIG. 17E is an exterior diagram of an example of the electronic device according to the embodiment.
Figure 17F:
FIG. 17F is an exterior diagram of an example of the electronic device according to the embodiment.
Figure 17G:
FIG. 17G is an exterior diagram of an example of the electronic device according to the embodiment.
Figure 18A:
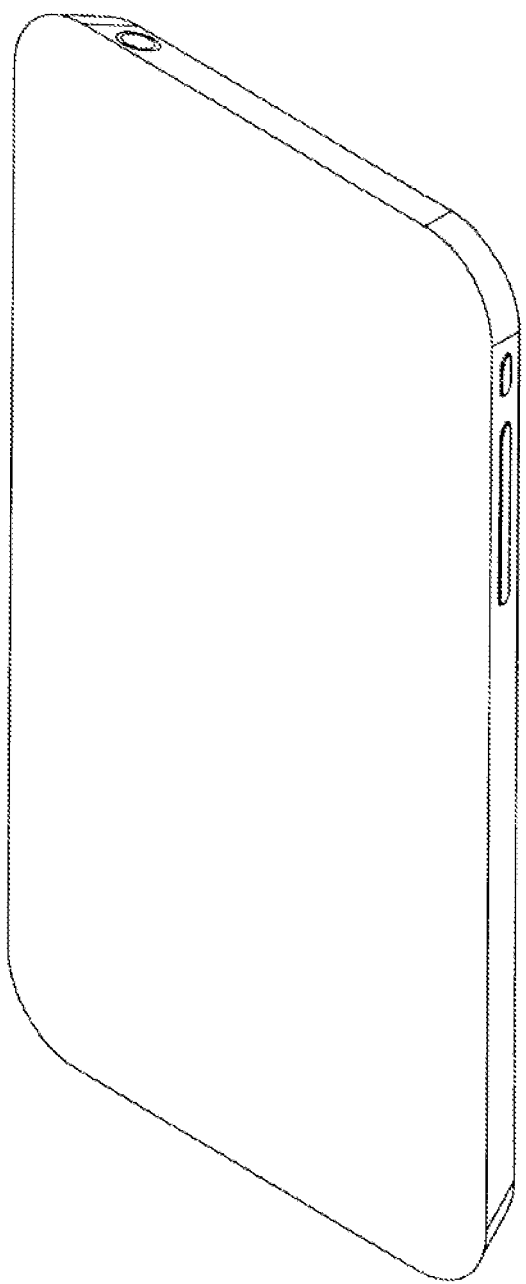
FIG. 18A is an exterior diagram of an example of the electronic device according to the embodiment.
Figure 18B:
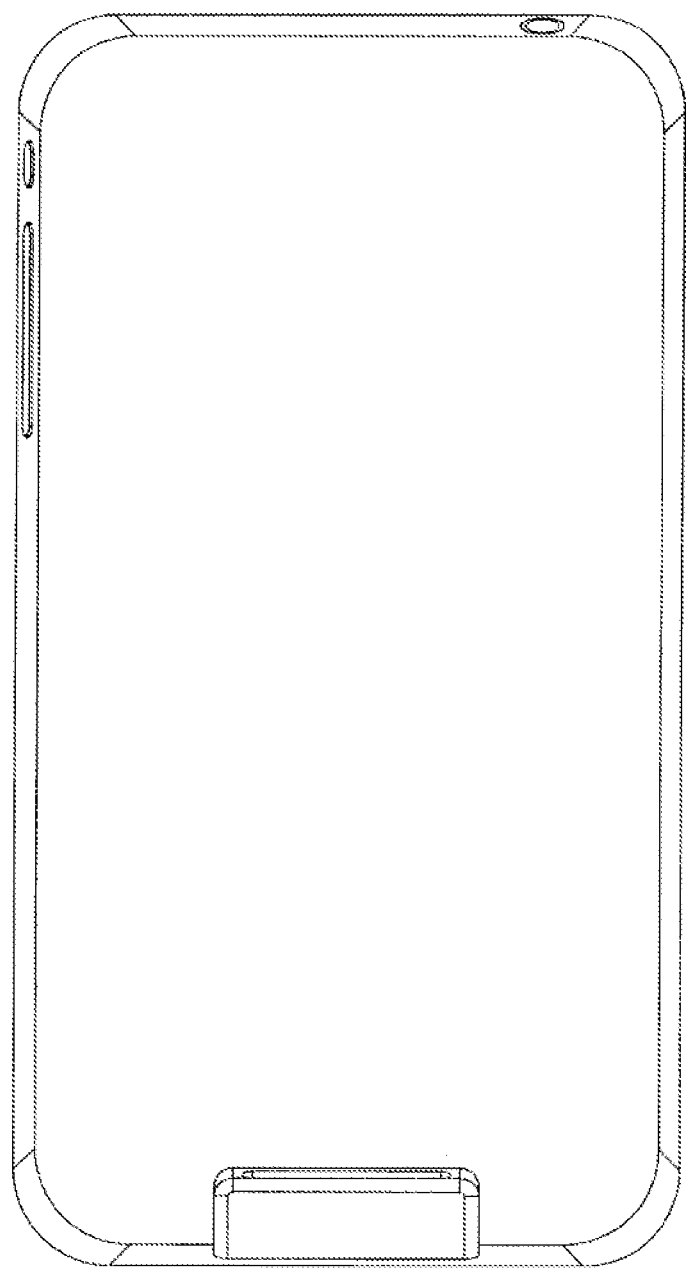
FIG. 18B is an exterior diagram of an example of the electronic device according to the embodiment.
Figure 18C:
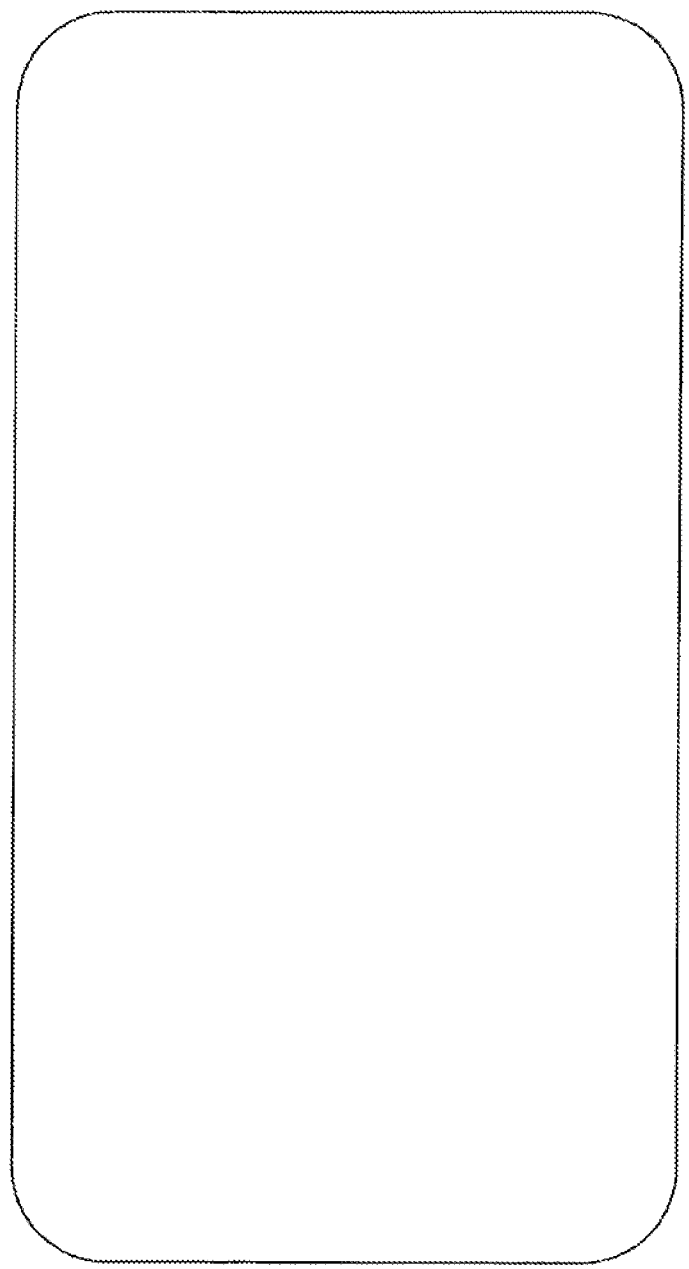
FIG. 18C is an exterior diagram of an example of the electronic device according to the embodiment.
Figure 18D:
FIG. 18D is an exterior diagram of an example of the electronic device according to the embodiment.
Figure 18E:
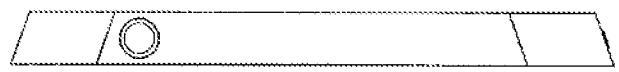
FIG. 18E is an exterior diagram of an example of the electronic device according to the embodiment.
Figure 18F:
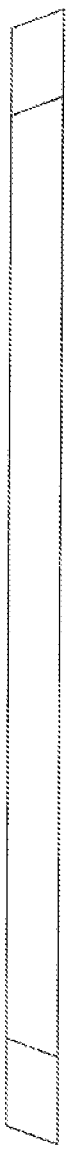
FIG. 18F is an exterior diagram of an example of the electronic device according to the embodiment.
Figure 18G:
FIG. 18G is an exterior diagram of an example of the electronic device according to the embodiment.

The face of the electronic device 1 as described above on which the connector connection unit 13 of the electronic device 1 is provided originally has a level difference as shown in, for example, FIG. 16. However, as shown in FIGS. 17A to 17G and 18A to 18G, for example, the electronic device 1 having a flattened face on which the connector connection unit 13 of the electronic device 1 is provided can also be realized. Here, since the electronic device 1 shown in FIGS. 17A to 17G has a relatively large display screen, the connector connection unit 13 is provided on an edge of the electronic device 1 in a short axis direction as shown in FIG. 17B. In addition, since the electronic device 1 shown in FIGS. 18A to 18G has a relatively small display screen, the connector connection unit 13 is provided on an edge of the electronic device 1 in a long axis direction as shown in FIG. 18B.

Figure 19A:
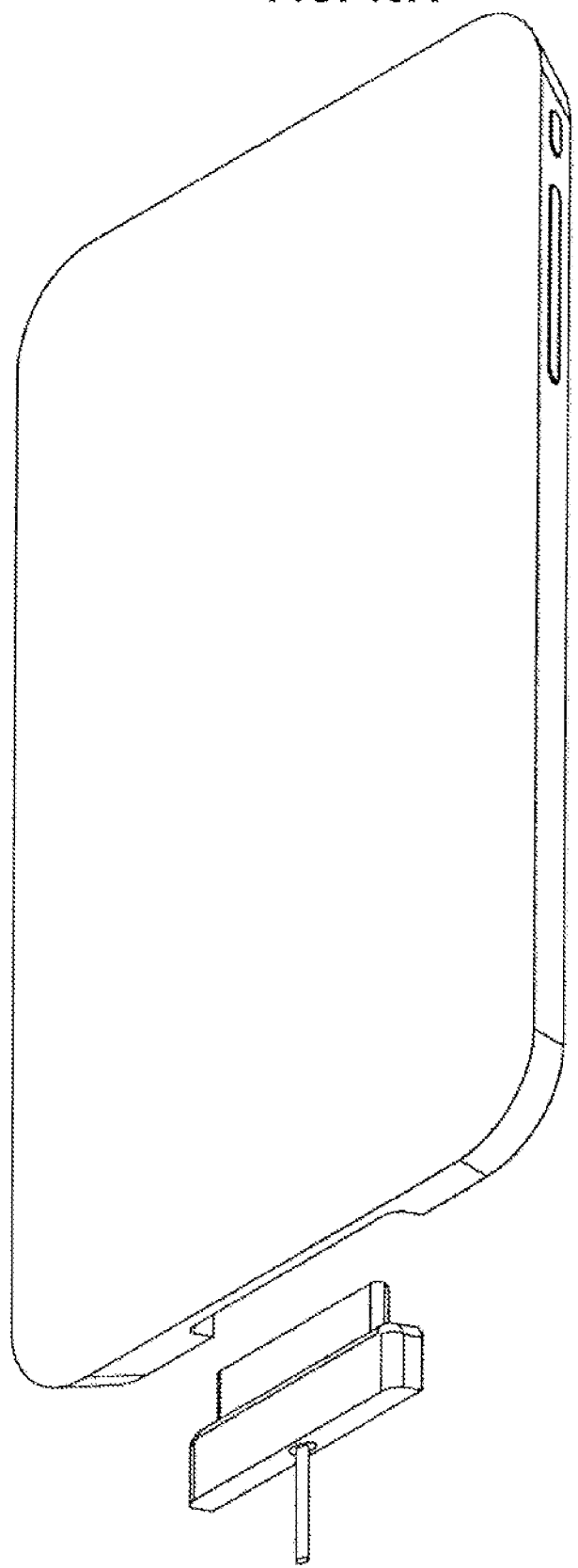
FIG. 19A is an illustrative diagram showing an example of connection of a connector to the electronic device according to the embodiment.
Figure 19B:
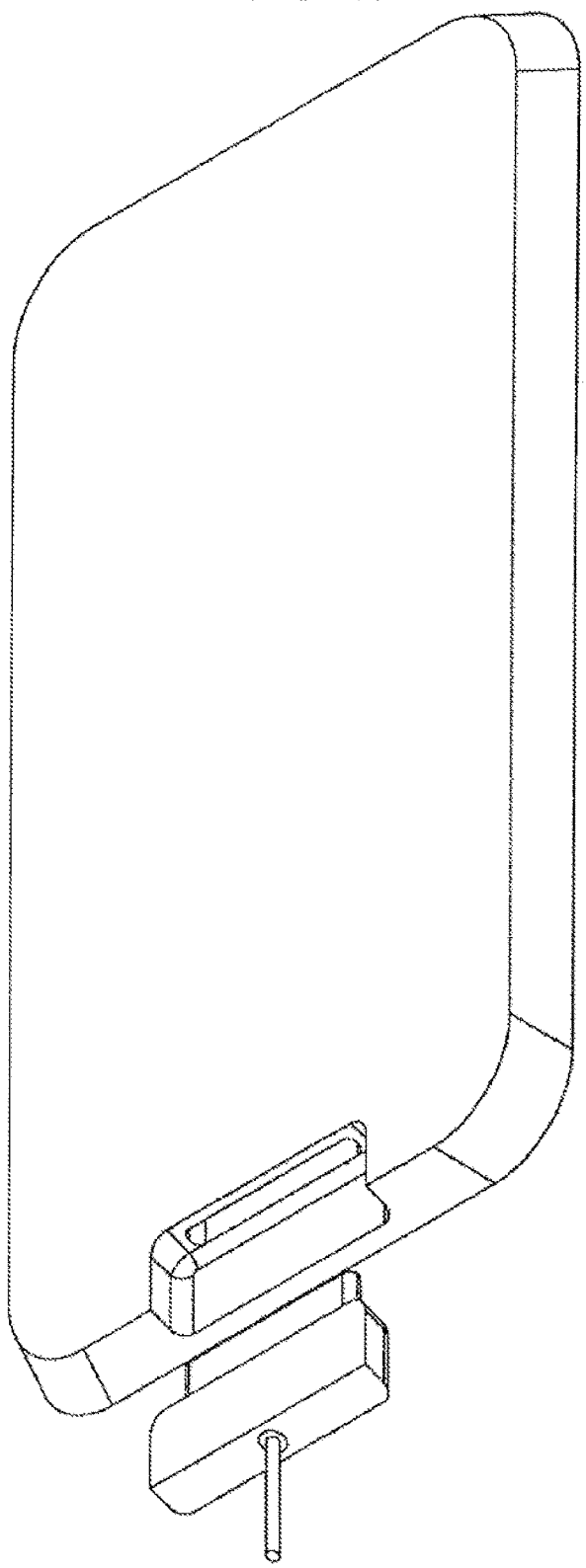
FIG. 19B is an illustrative diagram showing an example of connection of a connector to the electronic device according to the embodiment.

With regard to the electronic device 1 on which the connector connection unit 13 is formed on a flattened face thereof as shown in FIGS. 17A to 18G, various cables can be connected to the connector connection unit 13 as shown in, for example, FIGS. 19A and 19B. In addition, it is preferable that, after a cable is connected thereto, the face of the electronic device 1 on which the connector connection unit 13 is formed be integrated with the outer shape of the cable thereby forming one flattened face, and only the wiring portion of the cable appear to protrude from the electronic device 1 when viewed from the side of the display screen. By setting such a shape, design of the electronic device 1 can further improve.

Note that the electronic device described above has an exterior shown in FIGS. 47G and 46H, and a shape thereof is defined according to the 6-face diagrams shown in FIGS. 46A to 46F.

<Regarding an External Structure>

[List of Connectable External Structures]

Various external structures can be connected to an electronic device of which a face on which the connector connection unit 13 is formed does not have a level difference as shown in FIGS. 17A to 18G.

Figure 20:
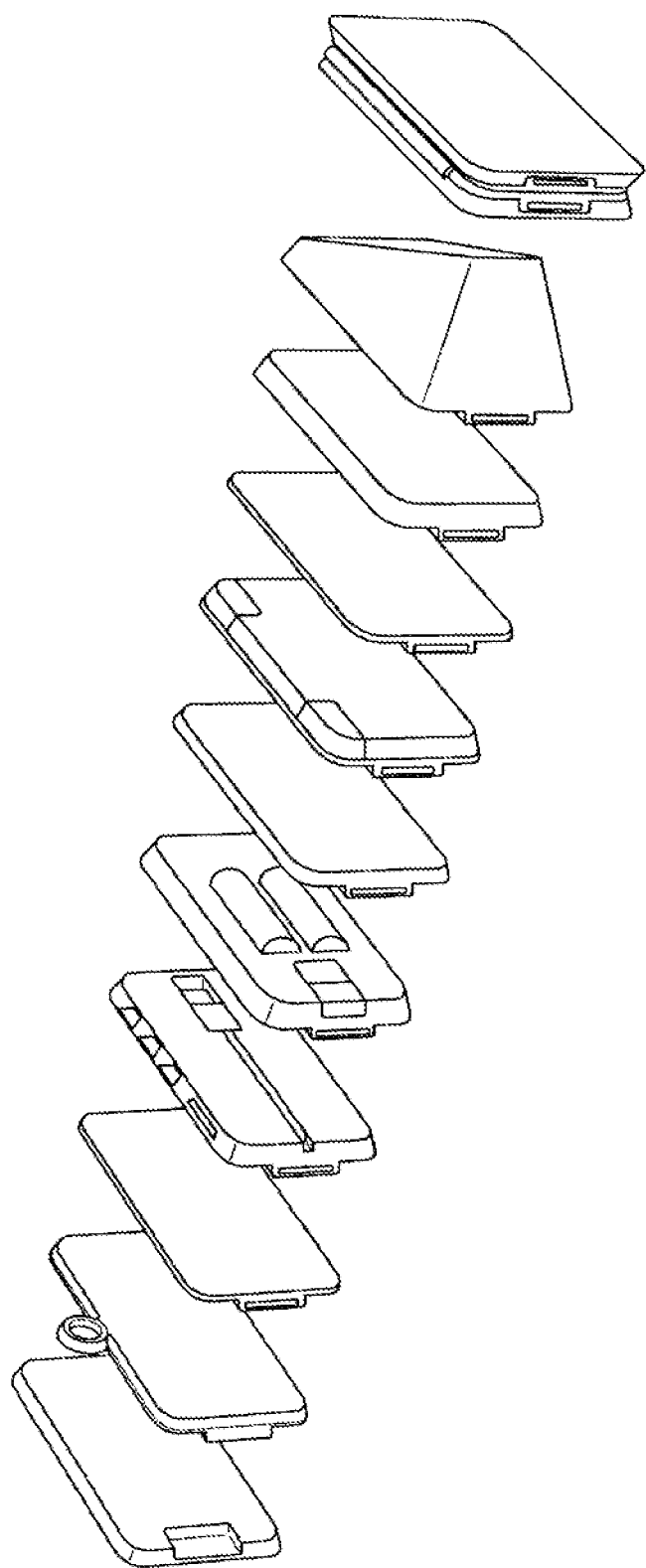
FIG. 20 is an illustrative diagram showing an example of an external structure that can be connected to the electronic device according to the embodiment.

FIG. 20 is an illustrative diagram showing an example of an external structure that can be connected to the electronic device 1 shown in FIGS. 17A to 18G Modules that can give the following functions to the electronic device can be connected to the electronic device 1 as shown in the leftmost end of FIG. 20.

Waterproof cap module with buoyancy
    Non-contact charge and non-contact IC card communication function added module
    Extension port module
    Battery module
    TV tuner module
    Game controller module
    Wireless communication module
    Printer module
    Speaker module
    Adaptor module with hinges for linking to an electronic device The waterproof cap module with buoyancy among the modules described above is integrated with the electronic device as a first fitting unit of the module is fitted to the connector connection unit 13 of the main body of the electronic device, and thereby a waterproof property is given to the main body of the electronic device and buoyancy is given so that the module floats on water. Accordingly, the electronic device can be used around water like using the electronic device 1 during a bath.

The waterproof cap module with buoyancy among the modules described above has an exterior shown in FIGS. 52G and 52H, and a shape thereof is defined according to the 6-face diagrams shown in FIGS. 52A to 52F.

The non-contact charge and non-contact IC card communication function added module among the modules described above is integrated as a first fitting unit of the module and fitted to the connector connection unit 13 of the main body of the electronic device, and thereby the module enables non-contact charge of the electronic device or provides a communication function via a non-contact IC card such as Felica (a registered trademark) or the like. In addition, in terms of another point of view, by setting the module providing such a function as an external structure of the main body of the electronic device, effort of assigning the function to the electronic device 1 can be saved and accordingly further miniaturization, low cost, and the like of the electronic device can be realized.

The non-contact charge and non-contact IC card communication function added module among the modules described above has an exterior shown in FIGS. 45G and 45H, and a shape thereof is defined according to the 6-face diagrams shown in FIGS. 45A to 45F.

The extension port module among the modules described above is integrated with the electronic device as a first fitting unit of the module is fitted to the connector connection unit 13 of the main body of the electronic device, and thereby various kinds of extension ports such as a USB port, an Ethernet port, a recording medium slot of an SD card, and the like can be added to the electronic device, and more externally connected devices can be connected to the electronic device.

The extension port module among the modules described above has an exterior shown in FIGS. 40G to 41I, and a shape thereof is defined according to the 6-face diagrams shown in FIGS. 40A to 40F.

The battery module among the modules described above is integrated with the electronic device as a first fitting unit of the module is fitted to the connector connection unit 13 of the main body of the electronic device, and accordingly, the module can function as an external power source of the electronic device. In addition, by providing a plug to be inserted into a power plug (a socket or an outlet) in the battery module, the electronic device 1 can be easily connected to a power source for household use and then the electronic device can be charged. Furthermore, by providing an insertion portion of various batteries in the battery module, power can be provided to the electronic device 1 from the batteries.

The battery module among the modules described above has an exterior shown in FIGS. 42G and 42H, and a shape thereof is defined according to the 6-face diagrams shown in FIGS. 42A to 42F.

The TV tuner module among the modules described above is integrated with the electronic device as a first fitting unit of the module is fitted to the connector connection unit 13 of the main body of the electronic device, and thereby TV broadcasting such as One Seg or the like is received from an antenna provided in the TV tuner module and then displayed on the display screen of the electronic device 1.

The TV tuner module among the modules described above has an exterior shown in FIGS. 39G and 39H, and a shape thereof is defined according to the 6-face diagrams shown in FIGS. 39A to 39F.

The game controller module among the modules described above is integrated with the electronic device as a first fitting unit of the module is fitted to the connector connection unit 13 of the main body of the electronic device, and thereby a game controller that can operate a game executed in the electronic device 1 is provided.

Figure 34B:
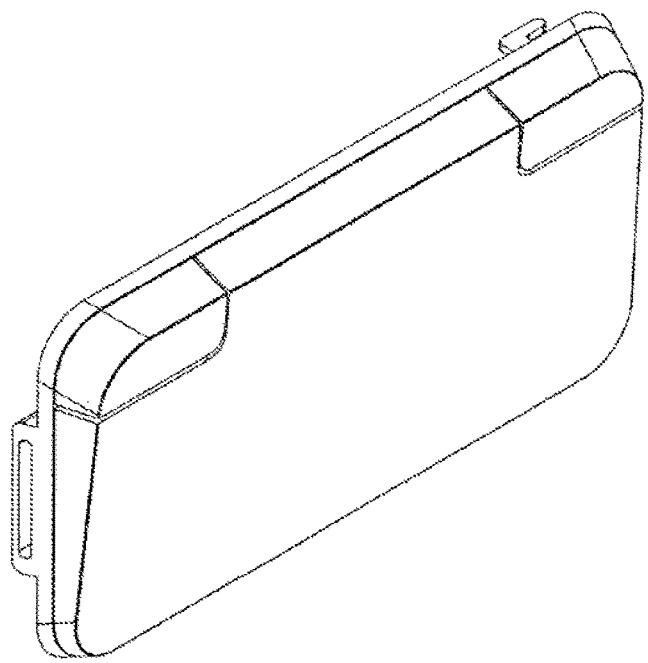
FIG. 34B is an exterior diagram of a game controller that is an example of the external structure according to the embodiment.
Figure 34C:
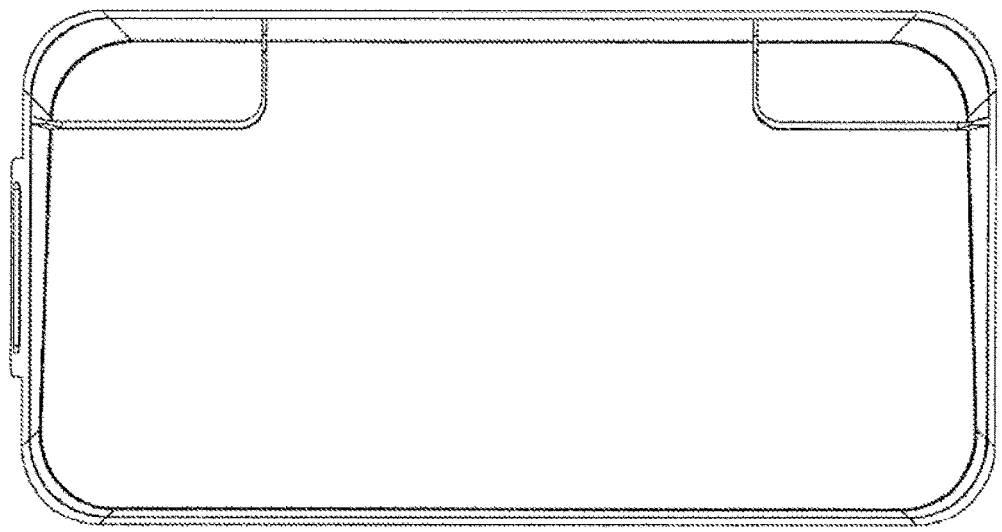
FIG. 34C is an exterior diagram of a game controller that is an example of the external structure according to the embodiment.
Figure 34D:
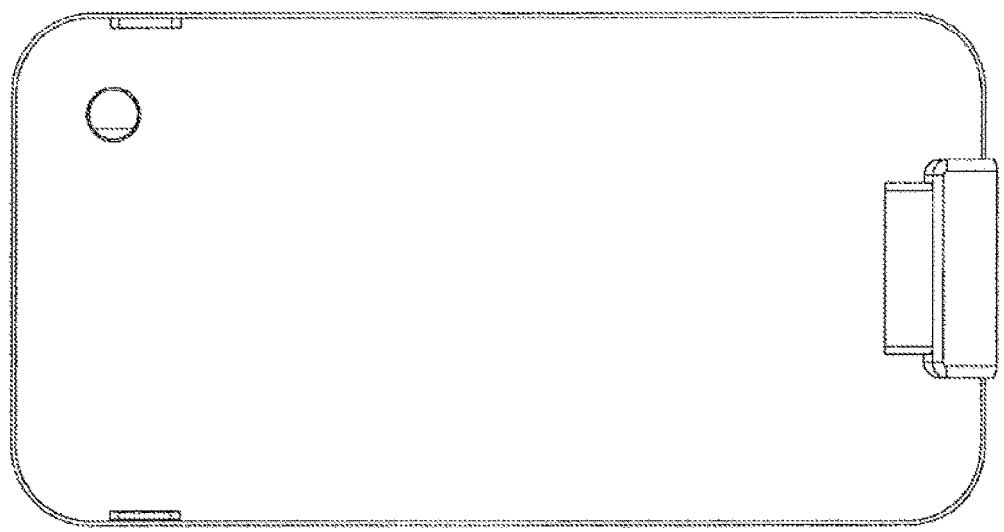
FIG. 34D is an exterior diagram of a game controller that is an example of the external structure according to the embodiment.
Figure 34E:
FIG. 34E is an exterior diagram of a game controller that is an example of the external structure according to the embodiment.
Figure 34F:
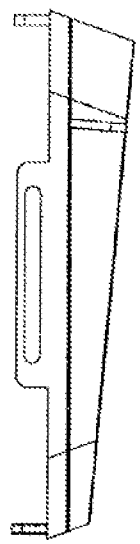
FIG. 34F is an exterior diagram of a game controller that is an example of the external structure according to the embodiment.
Figure 34G:
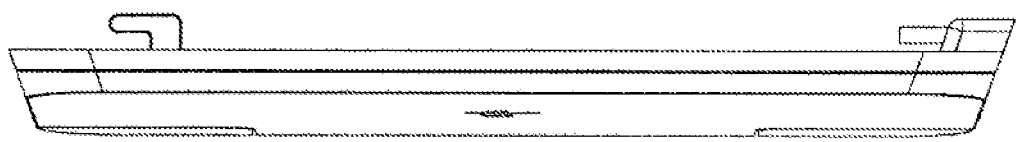
FIG. 34G is an exterior diagram of a game controller that is an example of the external structure according to the embodiment.
Figure 34H:
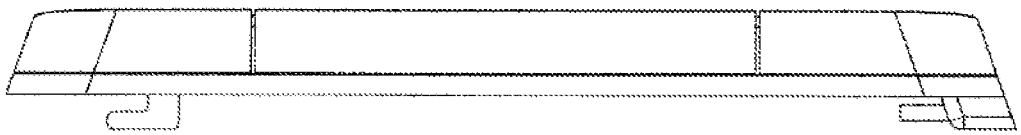
FIG. 34H is an exterior diagram of a game controller that is an example of the external structure according to the embodiment.
Figure 35A:
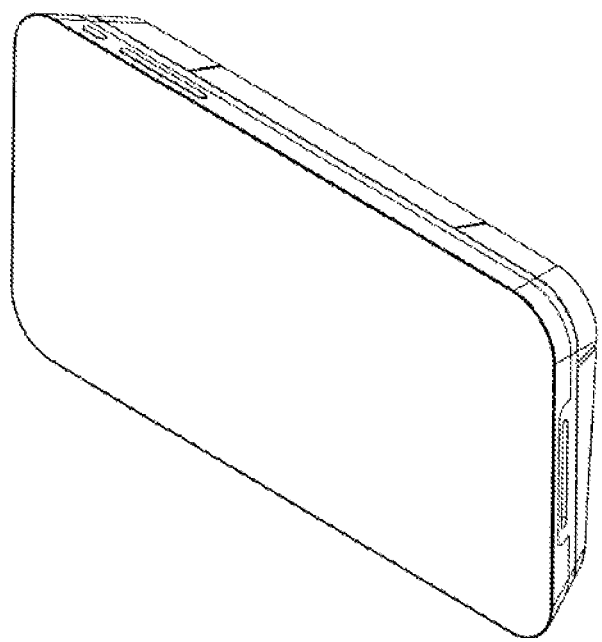
FIG. 35A is another exterior diagram of the game controller connected to the electronic device according to the embodiment.
Figure 35B:
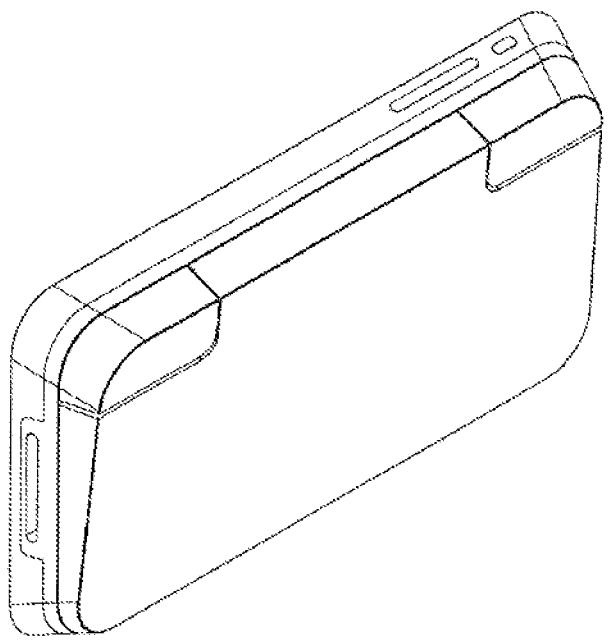
FIG. 35B is another exterior diagram of the game controller connected to the electronic device according to the embodiment.
Figure 35C:
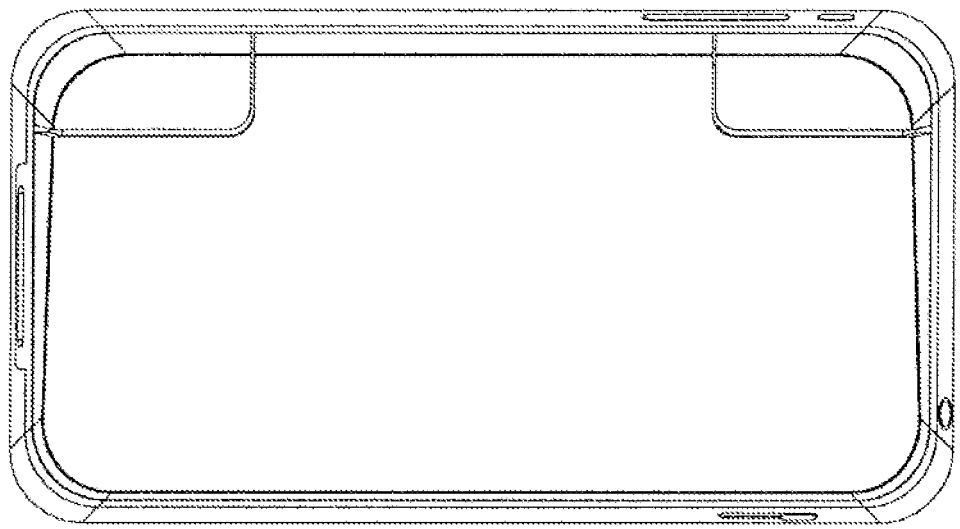
FIG. 35C is another exterior diagram of the game controller connected to the electronic device according to the embodiment.
Figure 35D:
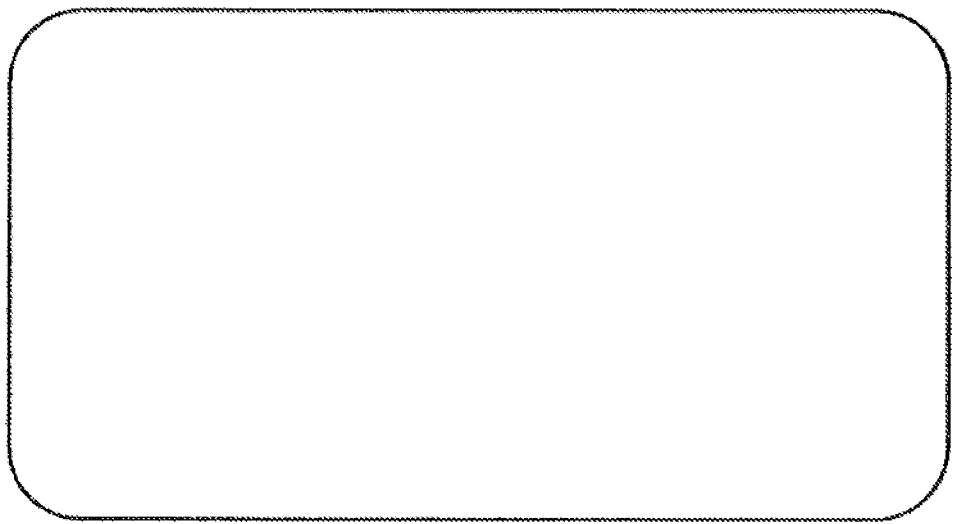
FIG. 35D is another exterior diagram of the game controller connected to the electronic device according to the embodiment.
Figure 35E:
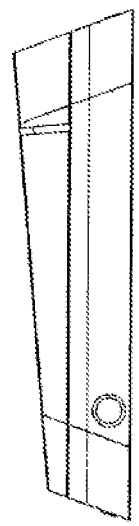
FIG. 35E is another exterior diagram of the game controller connected to the electronic device according to the embodiment.
Figure 35F:
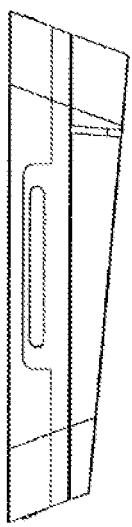
FIG. 35F is another exterior diagram of the game controller connected to the electronic device according to the embodiment.
Figure 35G:
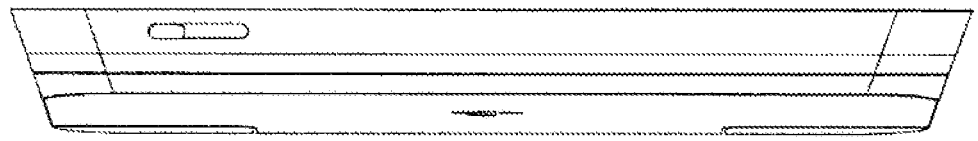
FIG. 35G is another exterior diagram of the game controller connected to the electronic device according to the embodiment.
Figure 35H:
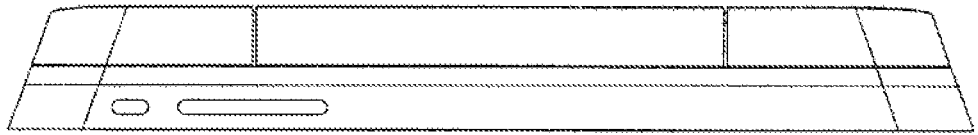
FIG. 35H is another exterior diagram of the game controller connected to the electronic device according to the embodiment.
Figure 36A:
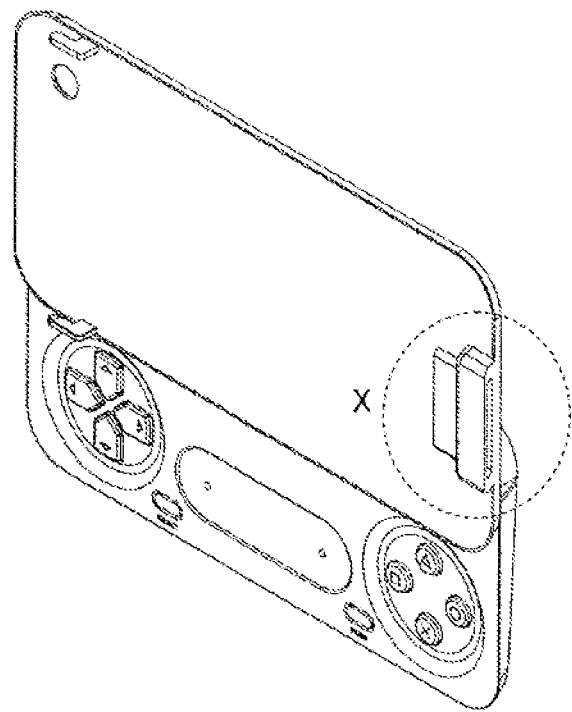
FIG. 36A is still another exterior diagram of the game controller that is an example of the external structure according to the embodiment.
Figure 36B:
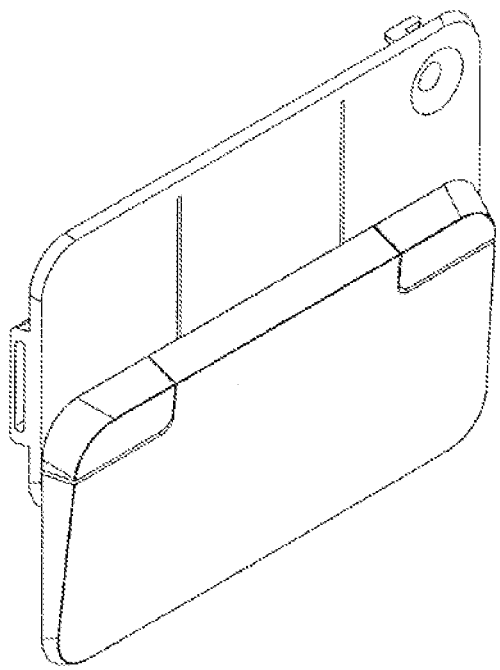
FIG. 36B is still another exterior diagram of the game controller that is an example of the external structure according to the embodiment.
Figure 36C:
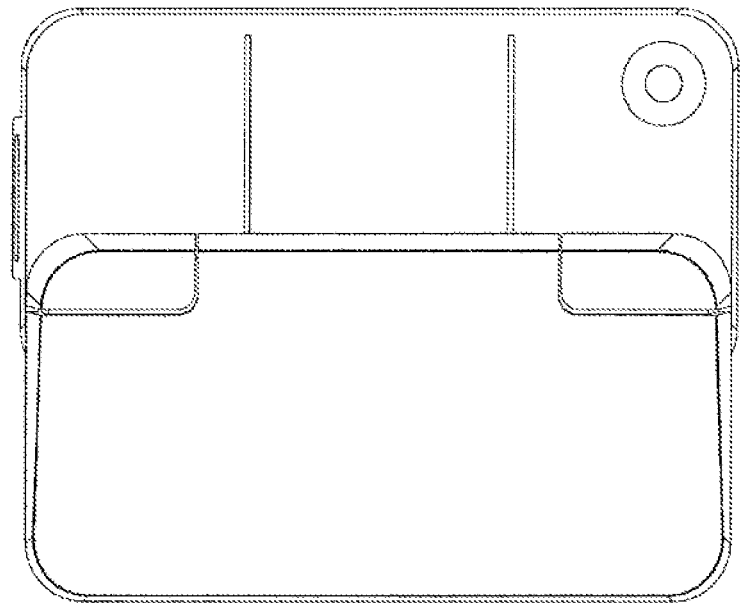
FIG. 36C is still another exterior diagram of the game controller that is an example of the external structure according to the embodiment.
Figure 36D:
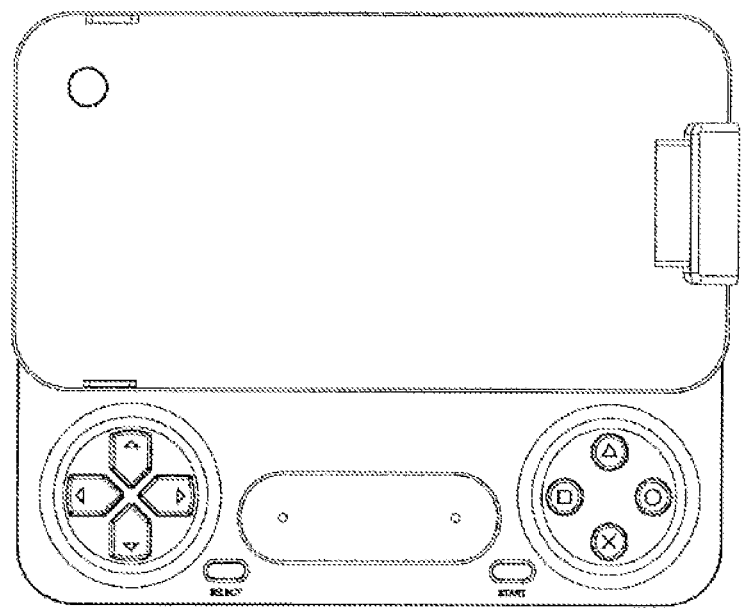
FIG. 36D is still another exterior diagram of the game controller that is an example of the external structure according to the embodiment.
Figure 36E:
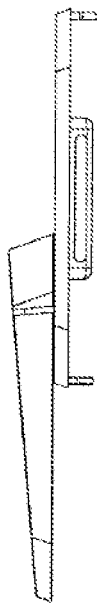
FIG. 36E is still another exterior diagram of the game controller that is an example of the external structure according to the embodiment.
Figure 36F:
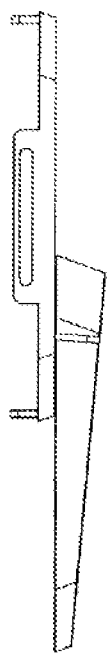
FIG. 36F is still another exterior diagram of the game controller that is an example of the external structure according to the embodiment.
Figure 36G:
FIG. 36G is still another exterior diagram of the game controller that is an example of the external structure according to the embodiment.
Figure 36H:
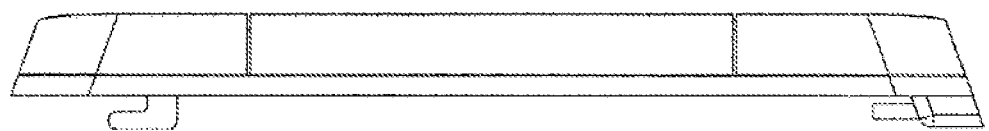
FIG. 36H is still another exterior diagram of the game controller that is an example of the external structure according to the embodiment.
Figure 37A:
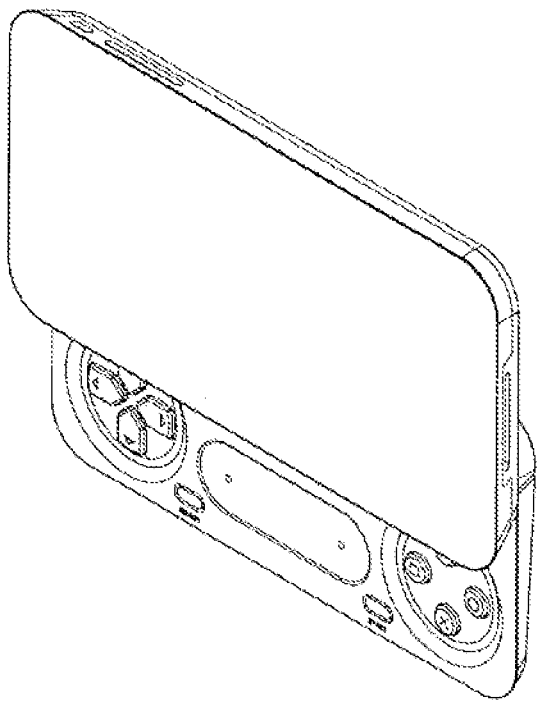
FIG. 37A is still another exterior diagram of the game controller connected to the electronic device according to the embodiment.
Figure 37B:
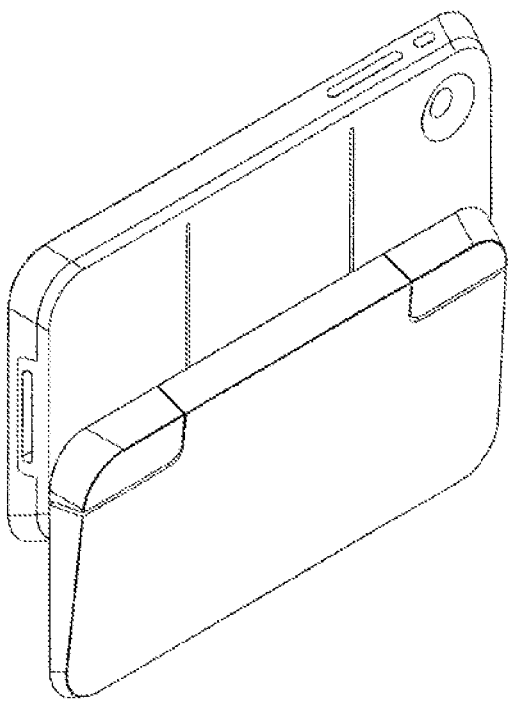
Figure 37C:
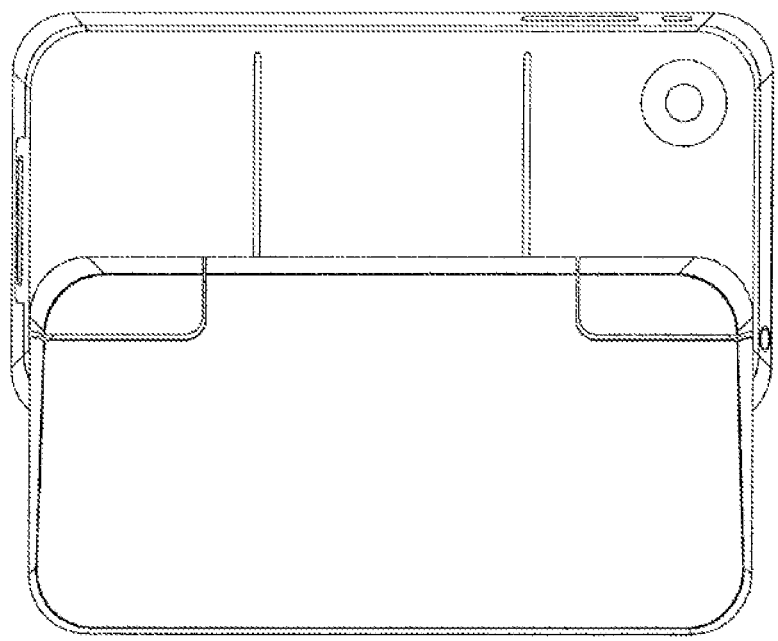
Figure 37D:
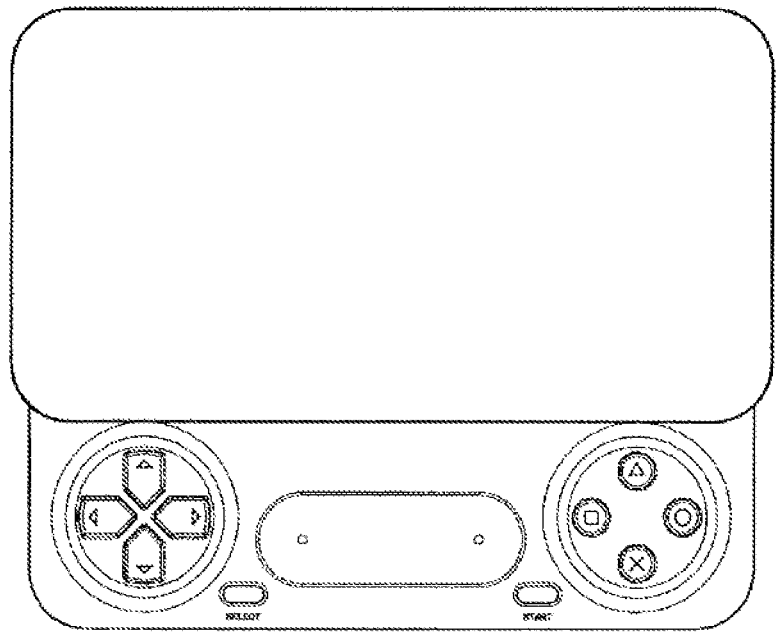
Figure 37E:
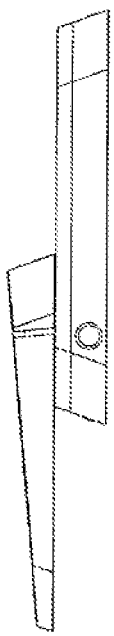
Figure 37F:
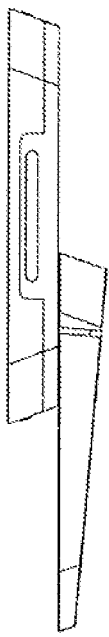
Figure 37G:
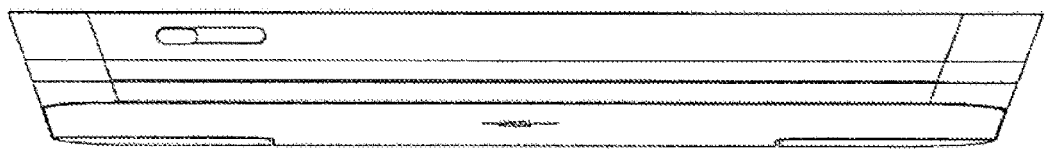
Figure 37H:
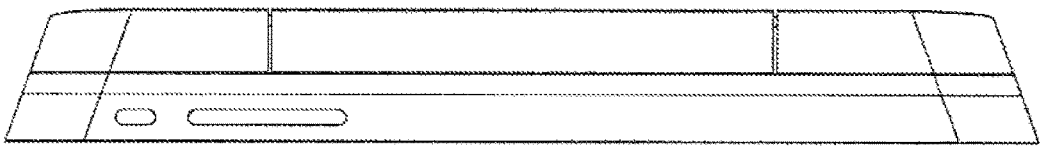

The game controller module among the modules described above has exteriors shown in FIGS. 34G, 34H, 36G, 36H, and 38G to 38J, and shapes thereof are defined according to the 6-face diagrams shown in FIGS. 34A to 34F, 36A to 36F, and 38A to 38F. In addition, the reference symbol X shown in FIG. 34A corresponds to the first fitting unit. In addition, FIGS. 35A to 35H and 37A to 37H show exteriors of the game controller module when connected to the main body of the electronic device. The game controller module is mounted with a slide mechanism that enables the operation unit to be drawn out as shown in, for example, FIG. 36A.

The wireless communication module among the modules described above is integrated with the electronic device as a first fitting unit of the module is fitted to the connector connection unit 13 of the main body of the electronic device, and thereby a communication function using a wireless LAN or known wireless communication such as Wi-Fi can be added to the electronic device 1.

The wireless communication module among the modules described above has an exterior shown in FIGS. 44G and 44H, and a shape thereof is defined according to the 6-face diagrams shown in FIGS. 44A to 44F.

The printer module among the modules described above is integrated with the electronic device as a first fitting unit of the module is fitted to the connector connection unit 13 of the main body of the electronic device, and thereby a function of printing out content displayed on the display screen of the electronic device 1 and content stored in the electronic device 1 is added to the electronic device 1.

The printer module among the modules described above has an exterior shown in FIGS. 43G and 43H, and a shape thereof is defined according to the 6-face diagrams shown in FIGS. 43A to 43F.

The speaker module among the modules described above is integrated with the electronic device as a first fitting unit of the module is fitted to the connector connection unit 13 of the main body of the electronic device, thereby functioning as an external speaker that outputs audio signals from the electronic device 1.

Figure 22A:
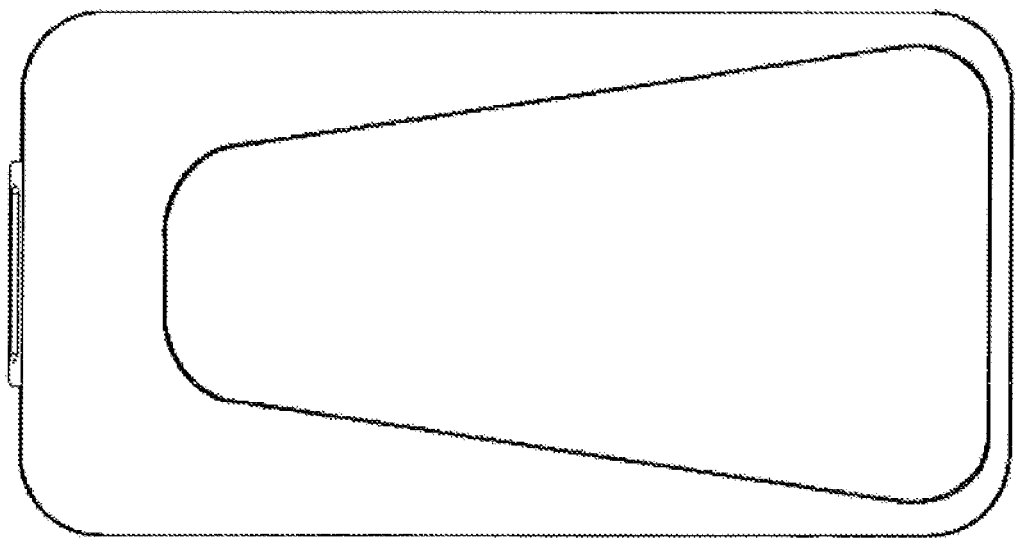
FIG. 22A is an exterior diagram of the speaker according to the embodiment.
Figure 22B:
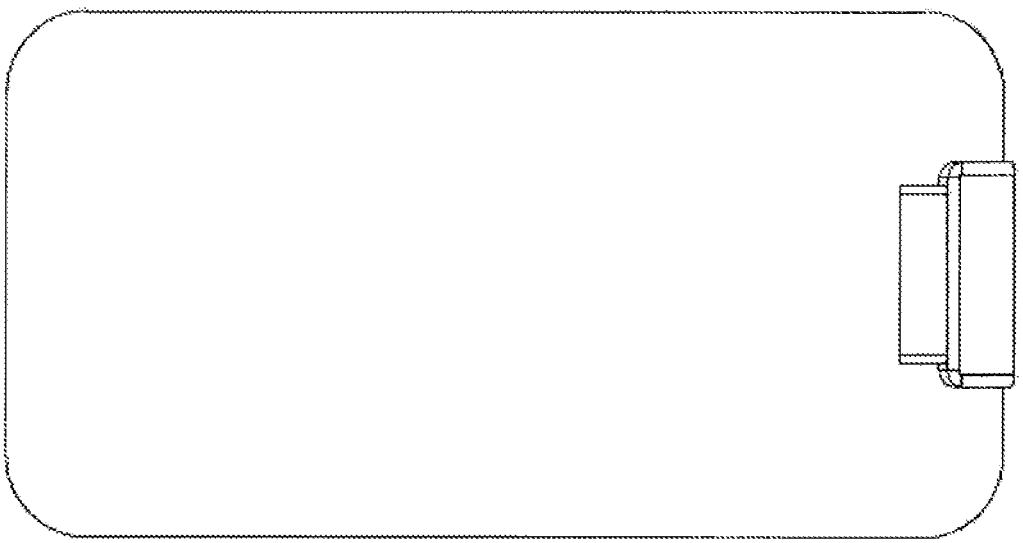
FIG. 22B is an exterior diagram of the speaker according to the embodiment.
Figure 22C:
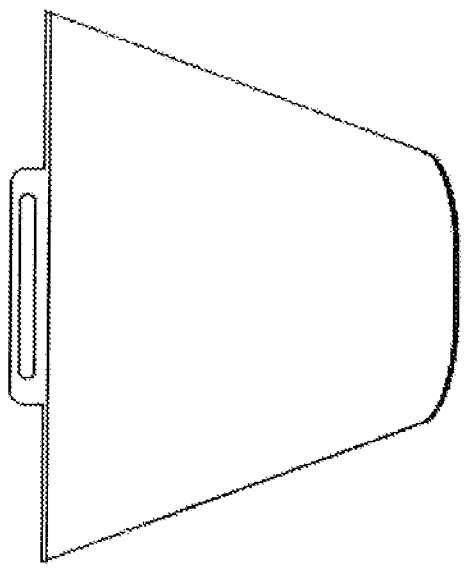
FIG. 22C is an exterior diagram of the speaker according to the embodiment.
Figure 22D:
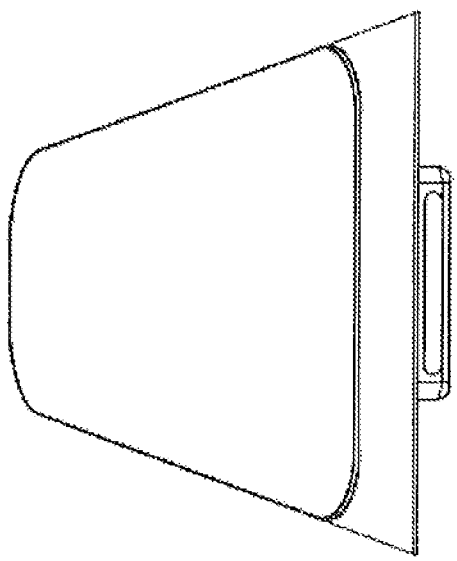
FIG. 22D is an exterior diagram of the speaker according to the embodiment.
Figure 22E:
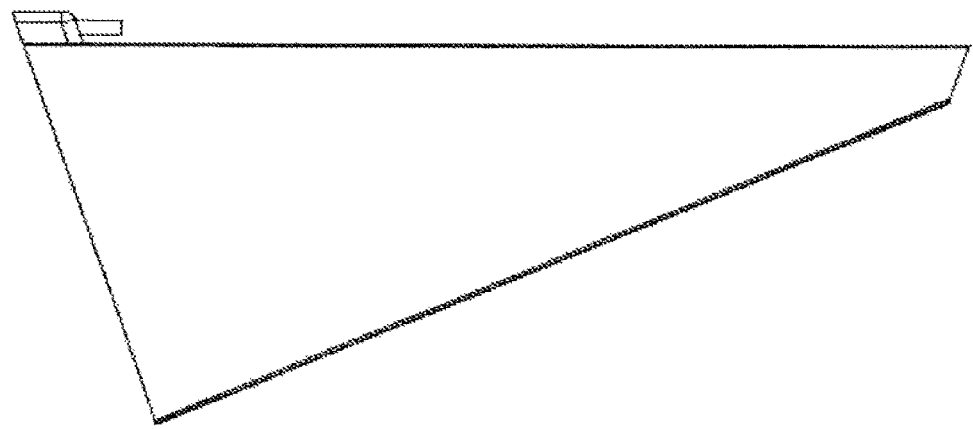
FIG. 22E is an exterior diagram of the speaker according to the embodiment.
Figure 22F:
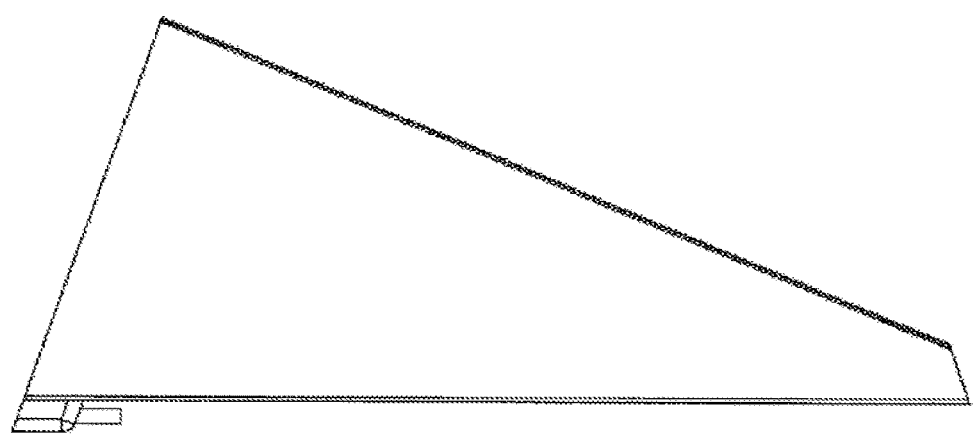
FIG. 22F is an exterior diagram of the speaker according to the embodiment.
Figure 22G:
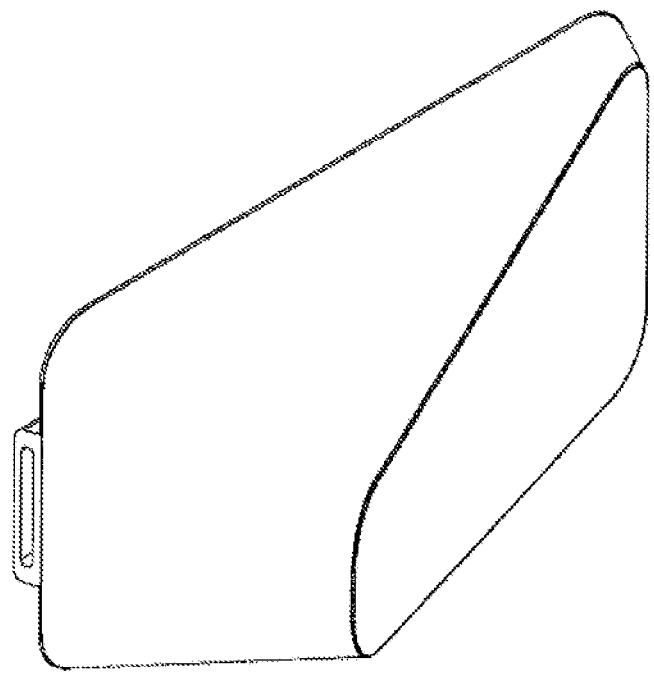
FIG. 22G is an exterior diagram of the speaker according to the embodiment.
Figure 22H:
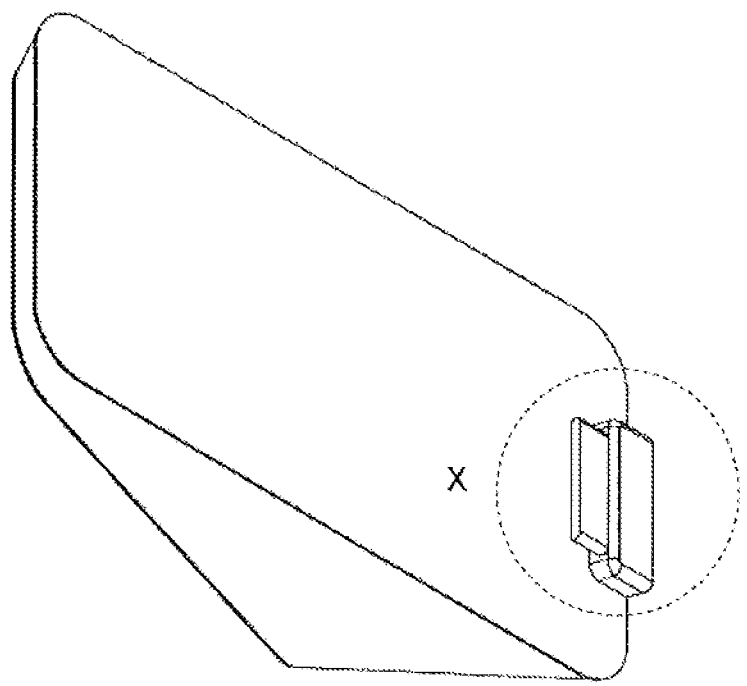
FIG. 22H is an exterior diagram of the speaker according to the embodiment.

The speaker module among the modules described above has an exterior shown in FIGS. 22G and 22H, a shape thereof is defined according to the 6-face diagrams shown in FIGS. 22A to 22F, and the reference symbol X shown in FIG. 22H corresponds to the first fitting unit. In addition, FIGS. 23A to 23H show an exterior of the speaker module when connected to the main body of the electronic device. Note that the speaker module will be described in detail later.

The adaptor module with hinges for linking to an electronic device among the modules described above is a module that links two electronic devices 1 to each other and enables them to be operated as if they were one electronic device having two screens.

The adaptor module with hinges for linking to an electronic device among the modules described above has an exterior shown in FIGS. 41G to 41K, and a shape thereof is defined according to the 6-face diagrams shown in FIGS. 41A to 41F.

In addition, a stand unit module that, for example, rotates the connected electronic device 1 and causes the electronic device 1 to automatically acquire an image can also be used in addition to the external structure shown in FIG. 20.

The stand unit module will be described in detail later.

[Speaker]

Figure 23A:
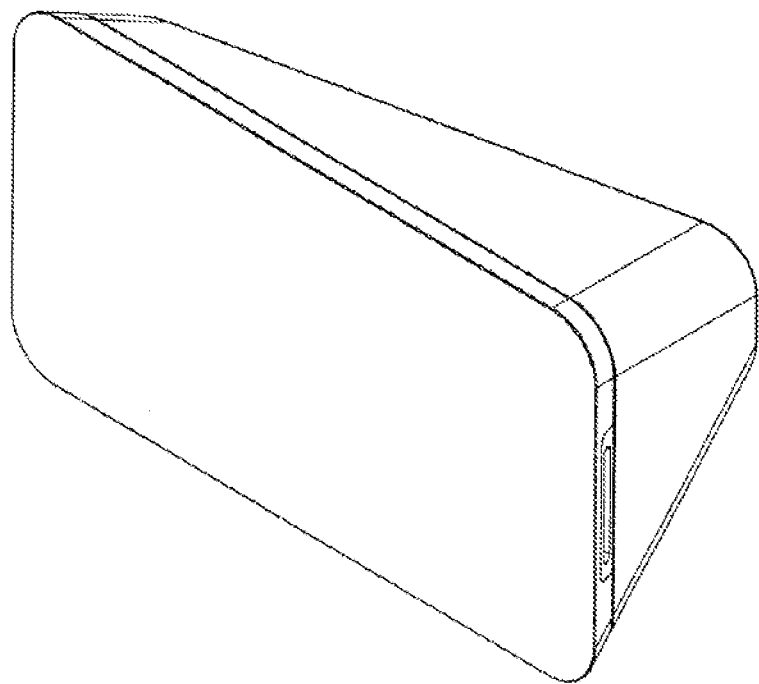
FIG. 23A is an exterior diagram of a speaker connected to the electronic device according to the embodiment.
Figure 23B:
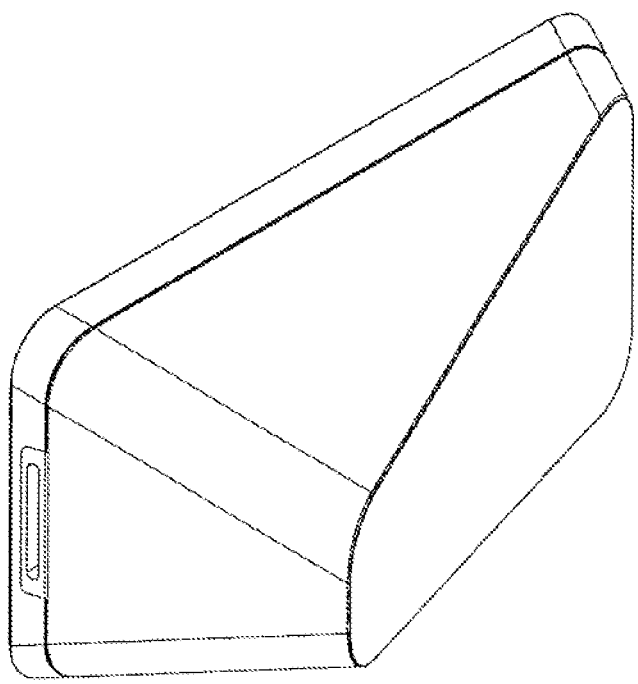
FIG. 23B is an exterior diagram of a speaker connected to the electronic device according to the embodiment.
Figure 23C:
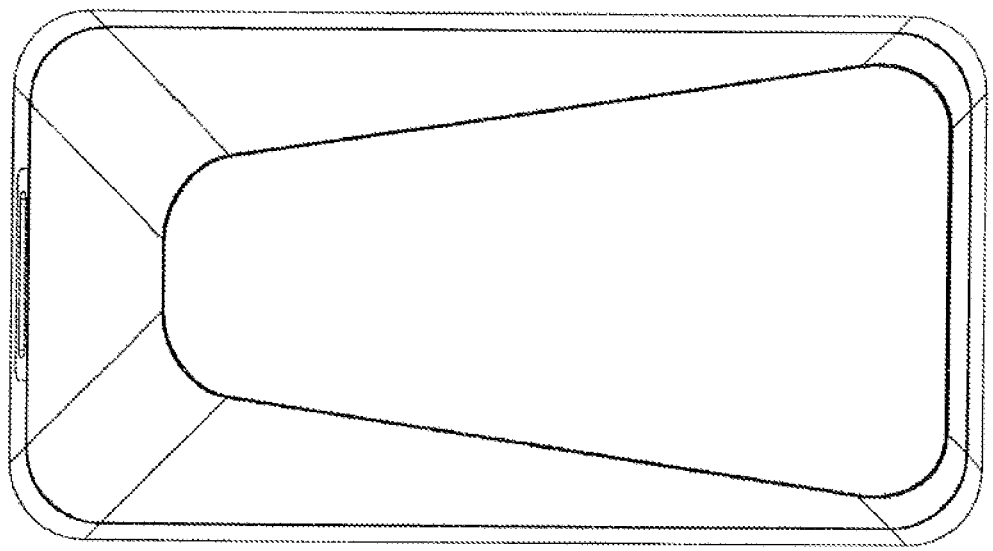
FIG. 23C is an exterior diagram of a speaker connected to the electronic device according to the embodiment.
Figure 23D:
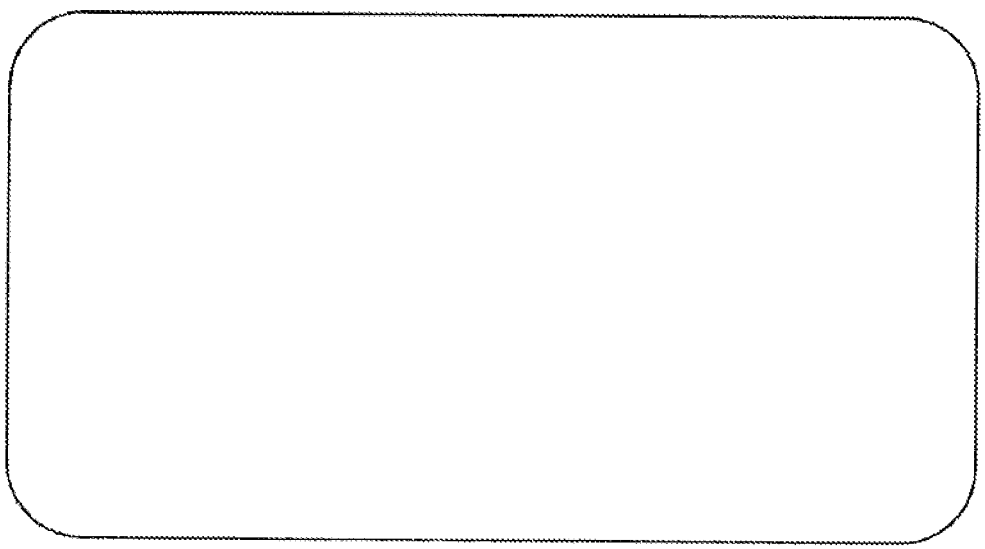
FIG. 23D is an exterior diagram of a speaker connected to the electronic device according to the embodiment.
Figure 23E:
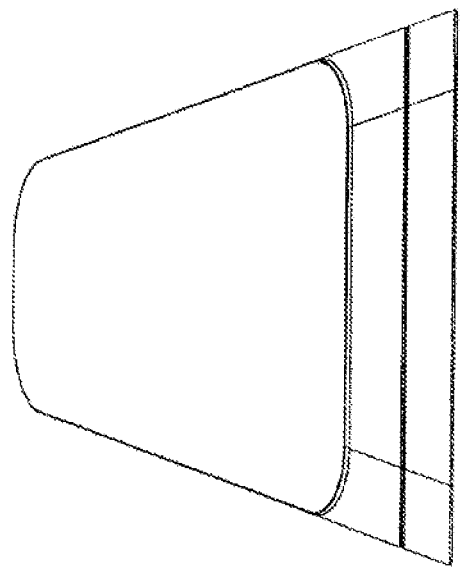
FIG. 23E is an exterior diagram of a speaker connected to the electronic device according to the embodiment.
Figure 23F:
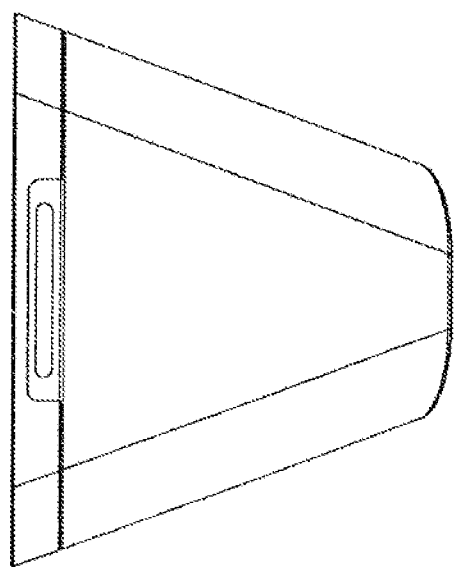
FIG. 23F is an exterior diagram of a speaker connected to the electronic device according to the embodiment.
Figure 23G:
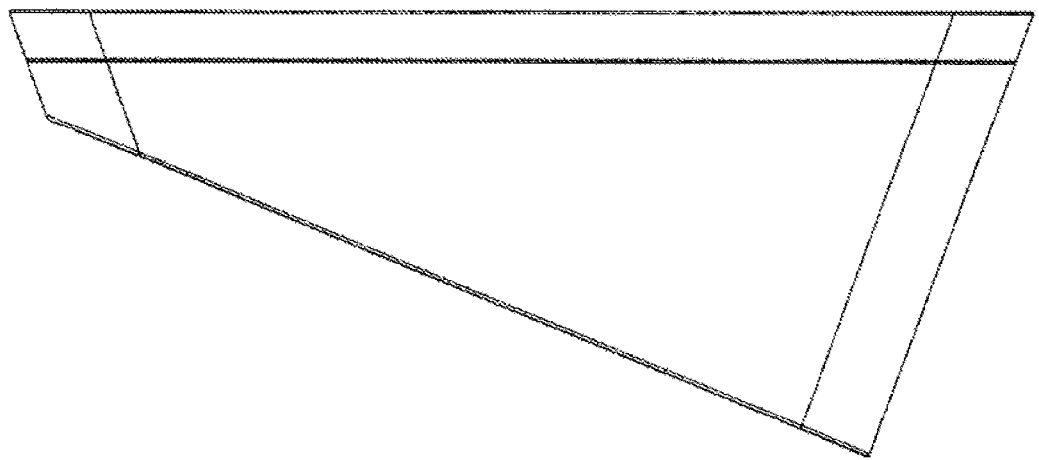
FIG. 23G is an exterior diagram of a speaker connected to the electronic device according to the embodiment.
Figure 23H:
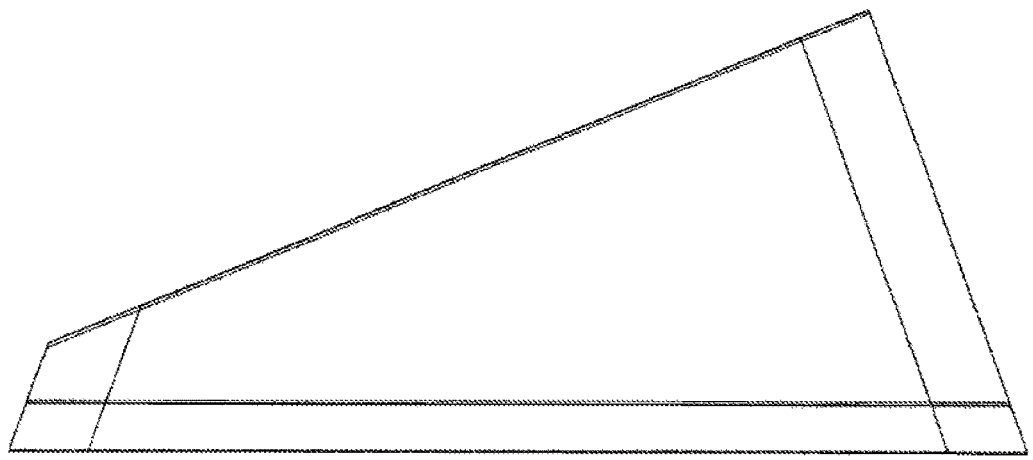
FIG. 23H is an exterior diagram of a speaker connected to the electronic device according to the embodiment.

The speaker module among the modules described above has an exterior shown in FIGS. 22G and 22H, and a shape thereof is defined according to the 6-face diagrams shown in FIGS. 22A to 22F. In addition, the portion indicated by the reference symbol X in the exterior diagram shown in FIG. 22H forms the first fitting unit for being electrically and physically connected to the electronic device 1. The exterior when the electronic device 1 is connected to the speaker module through the first fitting unit is as shown in FIGS. 23A and 23B. In addition, a shape of the device corresponding to the connection state as shown in FIGS. 23A and 23B is defined according to the 6-face diagrams shown in FIGS. 23C to 23H. The device is designed to be stable even when a ground contact face thereof is changed. For this reason, by having a configuration in which information displayed in the electronic device 1 is changed or the kind of an application is changed as shown in FIG. 21, the device can be utilized for various purposes.

Figure 24:
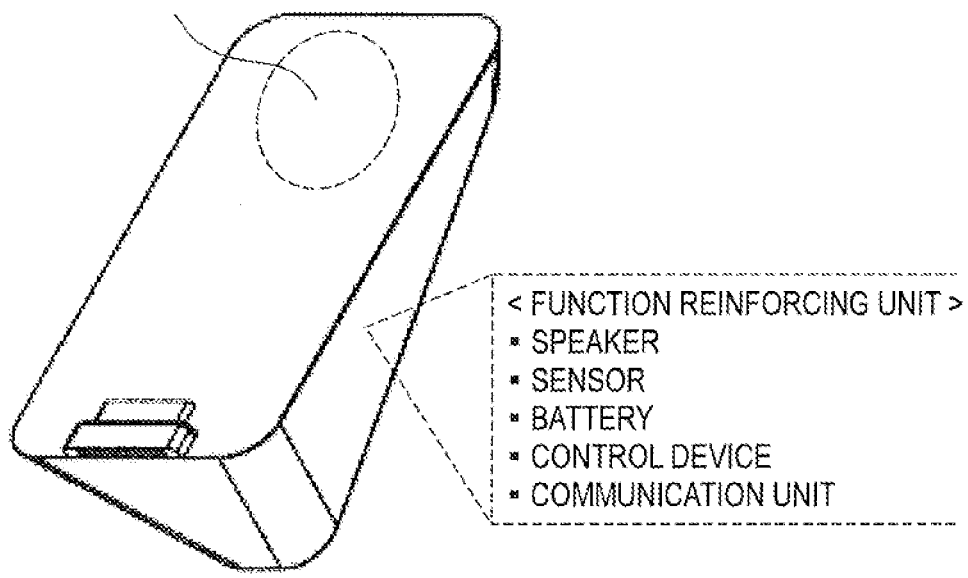
FIG. 24 is a block diagram showing functions of the speaker according to the embodiment.

Note that, in order to change the ground contact face, it is desirable to provide a mechanism that more rigidly solidifies connection between the electronic device 1 and the speaker module. Thus, a configuration of providing a fixing member separate from the first fitting unit as shown in FIG. 24 is proposed. As the fixing member, for example, a magnetic member that fixes the electronic device 1 using magnetic force, a mechanical member that mechanically fixes the electronic device 1 using a fitting member such as a claw, or the like is applicable. However, in order to maintain beauty of the exterior, it is preferable to apply a magnetic member. In addition, it is desirable to set an installation position of the fixing member near an end on the side opposite to the first fitting unit in the longitudinal direction of the speaker module as shown in FIG. 24.

In the configuration, the electronic device 1 is gripped by the speaker module at two points, and even when the electronic device 1 is rotated to the extent that the ground contact face is changed, neither of the electronic device nor the speaker module is separated or damaged due to extra force exerted on the first fitting unit. In addition, the speaker module is provided with speakers for outputting sounds on all or some of faces other than the face that comes into contact with the electronic device 1. In addition, the speakers of the faces may be configured to be capable of outputting sounds independently of each other. In addition, a speaker provided on the ground contact face may be configured not to output sounds. This configuration can be realized by providing, for example, an acceleration sensor, a gyro sensor, or the like in the electronic device 1 or the speaker module and then determining an attitude thereof based on output of the sensor.

Herein, description of functions of the speaker module will be supplemented. The speaker module is characterized by a shape that enables the use forms exemplified in FIG. 21. For this reason, various functions can be provided instead of or in addition to the speaker function. For example, as a configuration that reinforces the function of the electronic device 1, various sensors, a battery, a control device, a communication unit, and the like can be provided individually or through a combination thereof in addition to the speakers. In addition, sounds output from the speakers may be controlled by the electronic device 1, or controlled by the speaker module.

Figure 25:
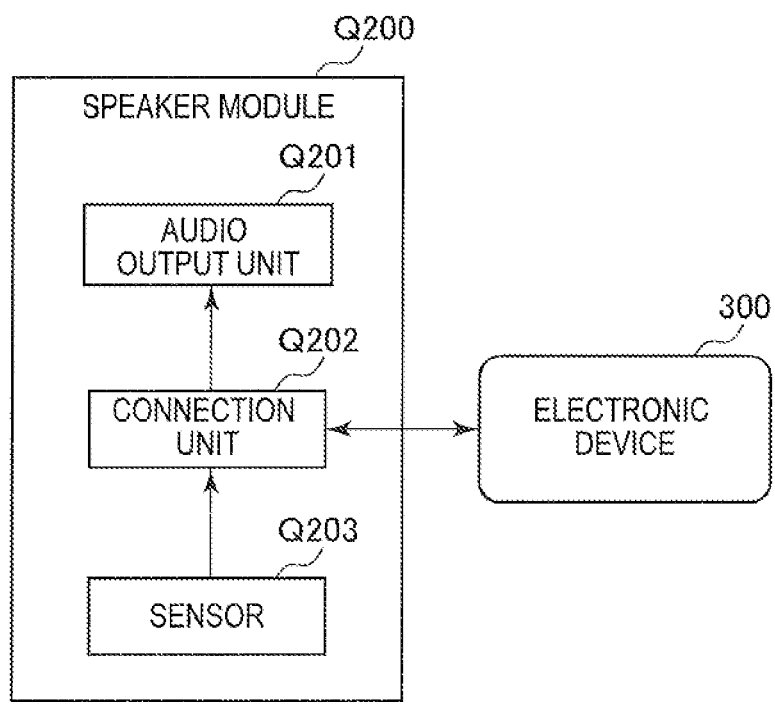
FIG. 25 is a block diagram showing functions of the speaker according to the embodiment.

Herein, the description will be further supplemented by exemplifying a functional configuration of a speaker module (speaker module Q200) when a speaker and a sensor are provided as a configuration that reinforces the function of the electronic device 1. A functional configuration of the speaker module Q200 is as shown in, for example, FIG. 25. The speaker module Q200 is mainly constituted by an audio output unit Q201, a connection unit Q202, and a sensor Q203 as shown in FIG. 25. When an attitude (i.e., a ground contact face) of the speaker module Q200 is detected by the sensor Q203, a detection result is input to the connection unit Q202. The connection unit Q202 transmits a control signal according to the input detection result to an electronic device 300 (which corresponds to the electronic device 1 described above) that has been electrically connected via a first fitting unit.

As control signals transmitted to the electronic device 300, for example, one indicating information of an attitude, one for designating a predetermined application according to the attitude, one for designating predetermined content according to the attitude, one for designating predetermined operation information according to the attitude, and the like are considered. When, for example, information on an attitude is transmitted to the electronic device 300 as a control signal, the electronic device 300 activates a music player or reproduces audio data selected from a predetermined play list according to the received control signal. At this time, an audio signal output through reproduction of audio data is input to the audio output unit Q201 via the connection unit Q202. Then, the audio output unit Q201 outputs sounds according to the input audio signal.

As described above, by mounting a sensor and a speaker in the speaker module described above, operations and control of the electronic device 1 can be performed according to attitudes. Of course, if another function as a communication unit or the like is added, various application examples in which e-mail can be transmitted through an operation of turning the speaker module or a video acquired from a local area network according to a ground contact face can be reproduced in the electronic device 1 are realized.

Modified Example

Note that the electronic device 1 according to the present embodiment may have the configuration as shown in FIG. 53. In other words, the electronic device 1 according to the present embodiment may mainly include an external structure connection detection unit 151, an attitude determination unit 153, a display control unit 155, an external structure control unit 157, and a storage unit 159.

The external structure connection detection unit 151 is realized by, for example, a CPU, a ROM, a RAM, a communication device, and the like. The external structure connection detection unit 151 detects whether or not each type of the external structure 20 as described above has been connected to the electronic device 1 using, for example, the connector connection unit 13 provided in the electronic device 1. In addition, when the external structure 20 is connected to the electronic device 1, the external structure connection detection unit 151 specifies the connected external structure 20 based on, for example, a signal acquired via the connection connector 17 or the like. Accordingly, the external structure connection detection unit 151 can specify what type of the external structure 20 (for example, the external structure as described above such as the speaker module or the game controller module) has been connected to the electronic device 1.

The attitude determination unit 153 is realized by, for example, a CPU, a ROM, a RAM, a sensor, and the like. The attitude determination unit 153 determines in what attitude the electronic device 1 has been disposed on a horizontal face of a table or the like using a known sensor (for example, a gyro sensor, an acceleration sensor, or the like) provided in the electronic device 1. Thereby, with regard to the electronic device 1 in the shape as shown in, for example, FIG. 19A, the attitude determination unit 153 can determine whether the long axis direction of the electronic device is perpendicular to, parallel to, or inclined at an arbitrary angle with respect to the horizontal face. As a result, the attitude determination unit 153 can further determine whether the electronic device 1 as shown in, for example, FIG. 19A has been installed in a horizontally long state or installed in a vertically long state, can determine a measure of an angle formed by the display screen of the electronic device 1 and the horizontal face, and the like.

The display control unit 155 is realized by, for example, a CPU, a ROM, a RAM, a communication device, an output device, and the like. The display control unit 155 controls display content of the display screen provided in the electronic device 1 or of a display screen provided outside of the electronic device 1 based on a detection result with regard to an external structure by the external structure connection detection unit 151, an attitude determination result of the device itself by the attitude determination unit 153, and the like. Accordingly, the electronic device 1 can control the content displayed on the display screen based on a combination of the type of a connected external structure, an attitude of the device itself, and the like.

The external structure control unit 157 is realized by, for example, a CPU, a ROM, a RAM, a communication unit, and the like. The external structure control unit 157 controls operations of the function realized by the external structure 20 connected to the electronic device 1 based on a detection result with regard to the external structure by the external structure connection detection unit 151, an attitude determination result of the device itself by the attitude determination unit 153, and the like. Various kinds of control signals for controlling the external structure 20 are output to the external structure 20 via the connection connector 17. In addition, in association of the display control unit 155 with the external structure control unit 157, control over the external structure 20 by the external structure control unit 157 may be executed in association with control over the display screen by the display control unit 155.

The storage unit 159 is realized by, for example, a RAM, a storage device, and the like. The storage unit 159 stores object data displayed on the display screen. The object data mentioned here includes arbitrary parts constituting a graphical user interface (GUI), for example, icons, buttons, thumbnails, and the like. In addition, in the storage unit 159, various programs executed by the electronic device 1 according to the present embodiment, various parameters and progress of a process which should be saved when a process is performed, or various databases may be appropriately recorded. Furthermore, the storage unit 159 may store various kinds of entity data used by the electronic device 1.

Each processing units of the external structure connection detection unit 151, the attitude determination unit 153, the display control unit 155, the external structure control unit 157, and the like can freely access the storage unit 159 to write or read data thereon or therefrom.

Hereinabove, an example of the configuration of the electronic device 1 according to the present embodiment has been briefly described with reference to FIG. 53.

By using the electronic device 1 with the configuration as described above, the control previously described with reference to FIGS. 20 and 21 can be achieved with the electronic device 1.

In addition, the electronic device 1 with the configuration shown in FIG. 53 can perform operation control over various kinds of the external structure 20 connected to the electronic device 1 based on an attitude of the electronic device 1 (in other words, an electronic device system including the external structure 20 integrated with the electronic device 1), in addition to the speaker module described above.

For example, a case in which a projector module that can project content display on the display screen of the electronic device 1 or content stored in the electronic device 1 is connected as the external structure 20 is considered. In addition, an outer shape of the projector module is assumed to be the same as that of the speaker module shown in, for example, FIG. 21. In this case, the electronic device 1 can control operations of the electronic device 1 and the projector module according to an attitude of the device itself. For example, an application (for example, a clock application) can be displayed on the display screen of the electronic device 1 when the electronic device 1 to which the projector module is connected has the attitude shown in FIG. 21(a), various objects such as icons are displayed on the display screen of the electronic device 1 when the electronic device has the attitude shown in FIG. 21(b), and content displayed on the display screen of the electronic device 1 or content stored in the electronic device 1 can be projected on an external screen when the electronic device 1 has the attitude shown in FIG. 21(c).

Hereinabove, the speaker module has been described.

[Stand Unit (Attitude Control Module)]

Figure 26:
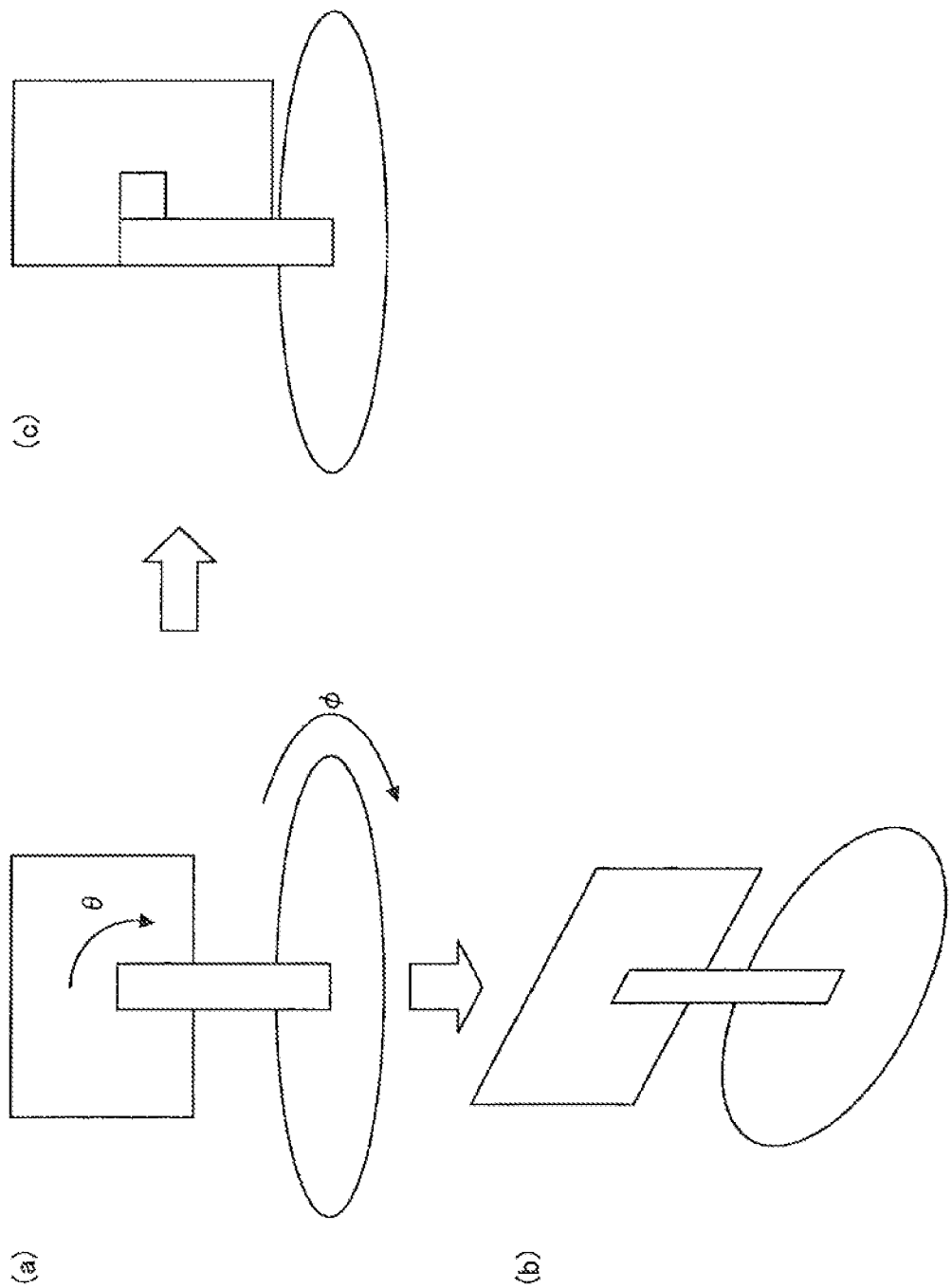
FIG. 26 is an illustrative diagram showing a state of rotation of a stand unit that is an example of the external structure according to the embodiment.
Figure 27A:
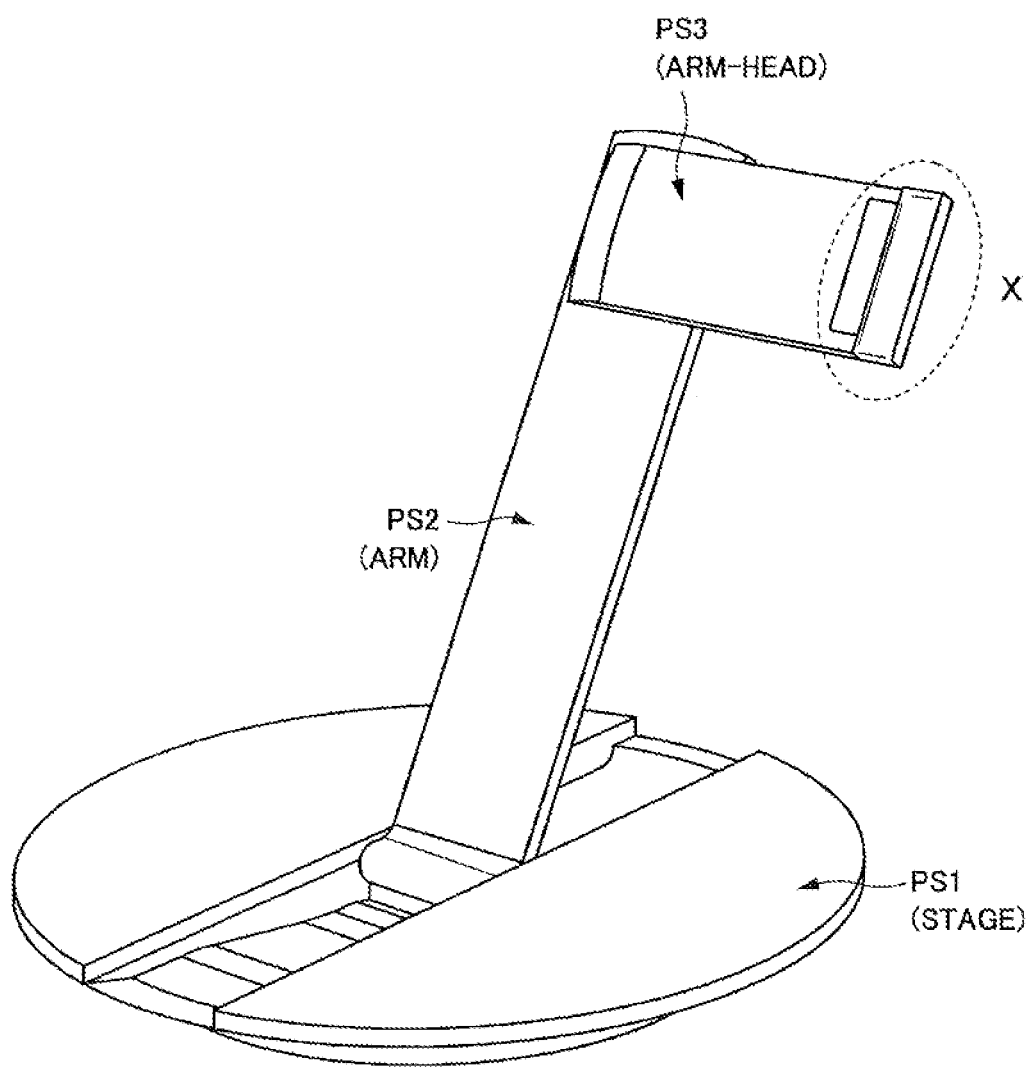
FIG. 27A is an illustrative diagram showing the stand unit according to the embodiment.
Figure 27B:
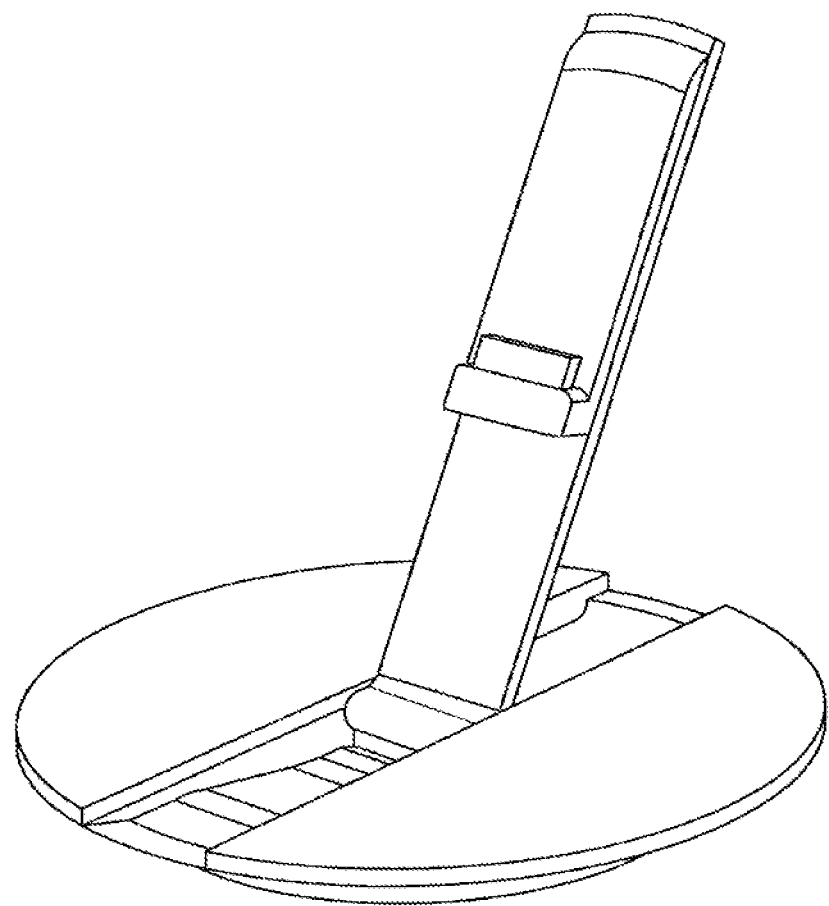
FIG. 27B is an illustrative diagram showing the stand unit according to the embodiment.
Figure 27C:
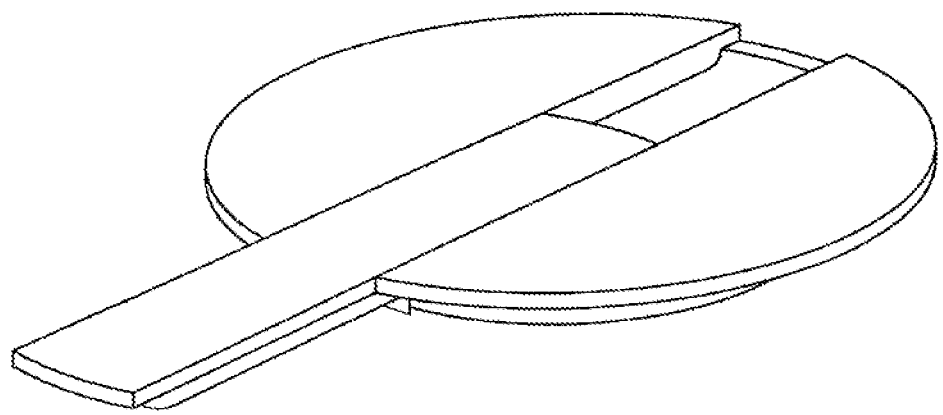
FIG. 27C is an illustrative diagram showing the stand unit according to the embodiment.
Figure 27D:
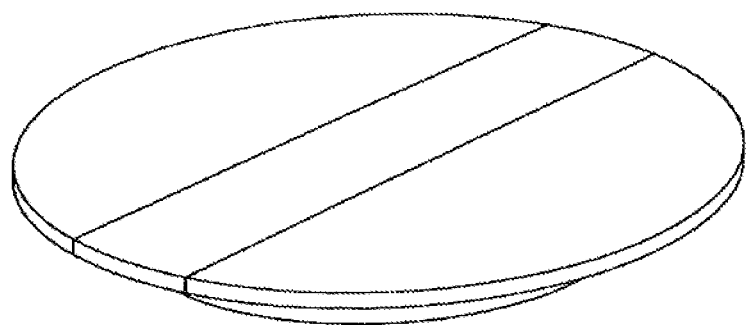
FIG. 27D is an illustrative diagram showing the stand unit according to the embodiment.
Figure 28A:
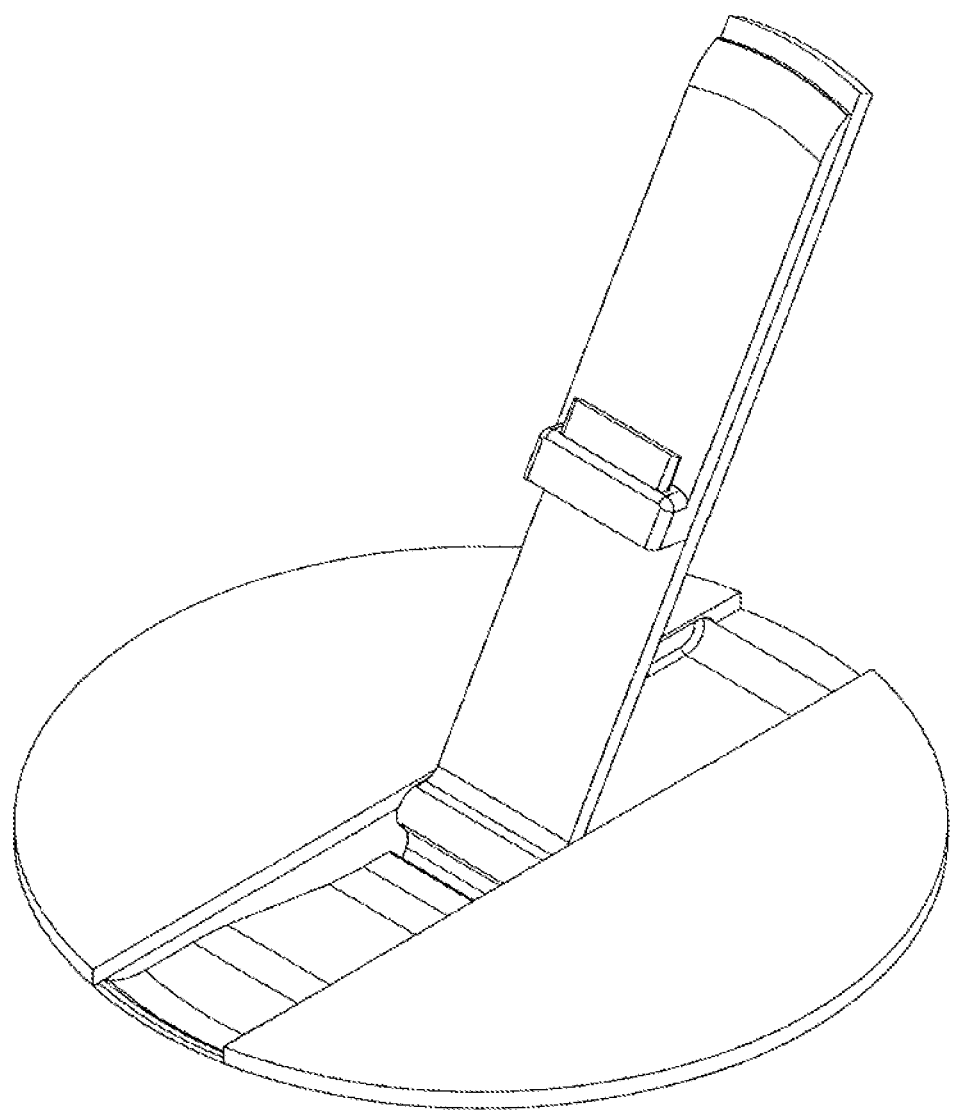
FIG. 28A is an exterior diagram of an example of the stand unit according to the embodiment.
Figure 28B:
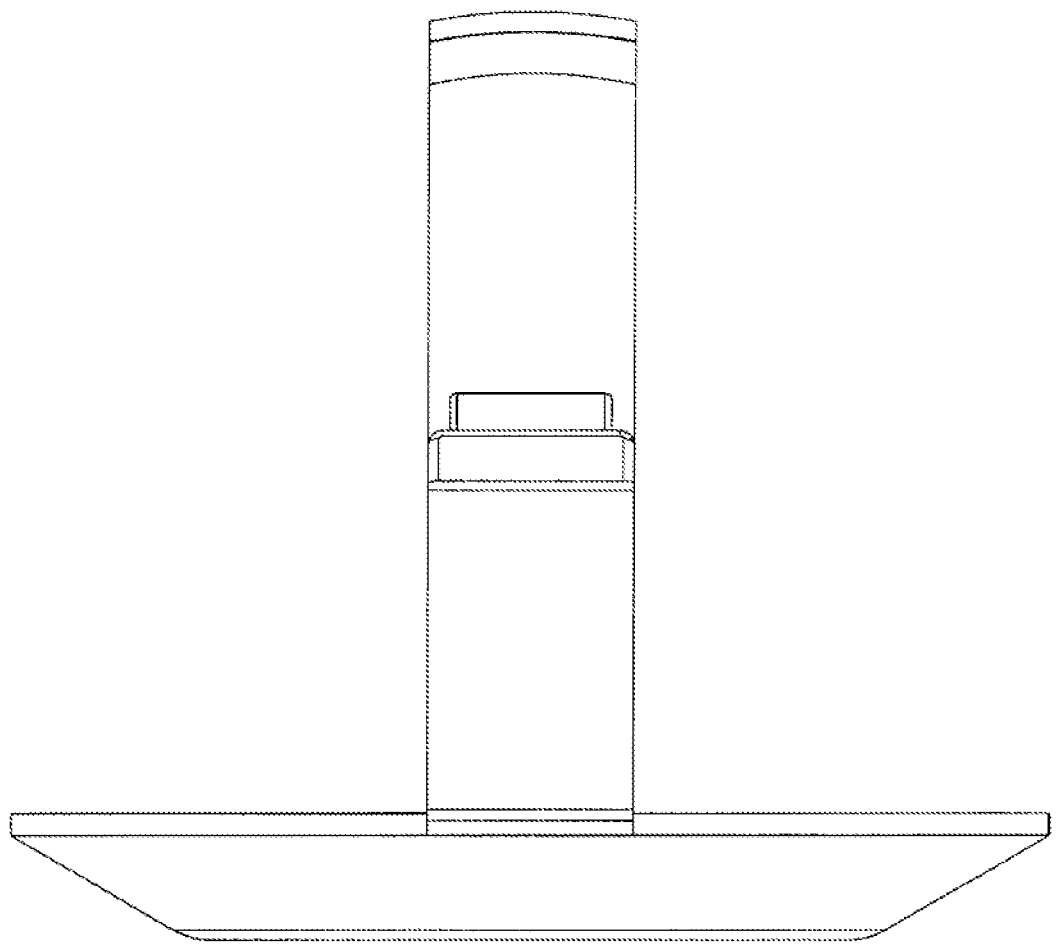
FIG. 28B is an exterior diagram of an example of the stand unit according to the embodiment.
Figure 28C:
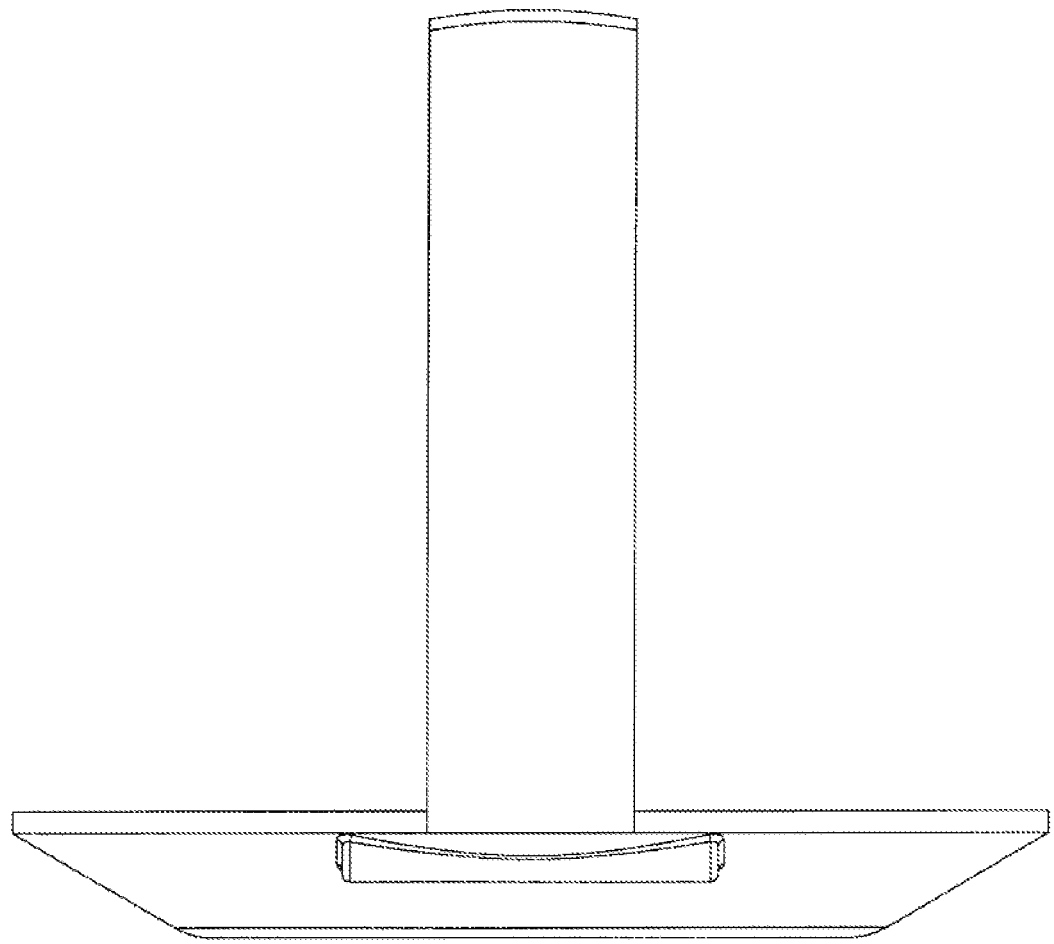
FIG. 28C is an exterior diagram of an example of the stand unit according to the embodiment.
Figure 28D:
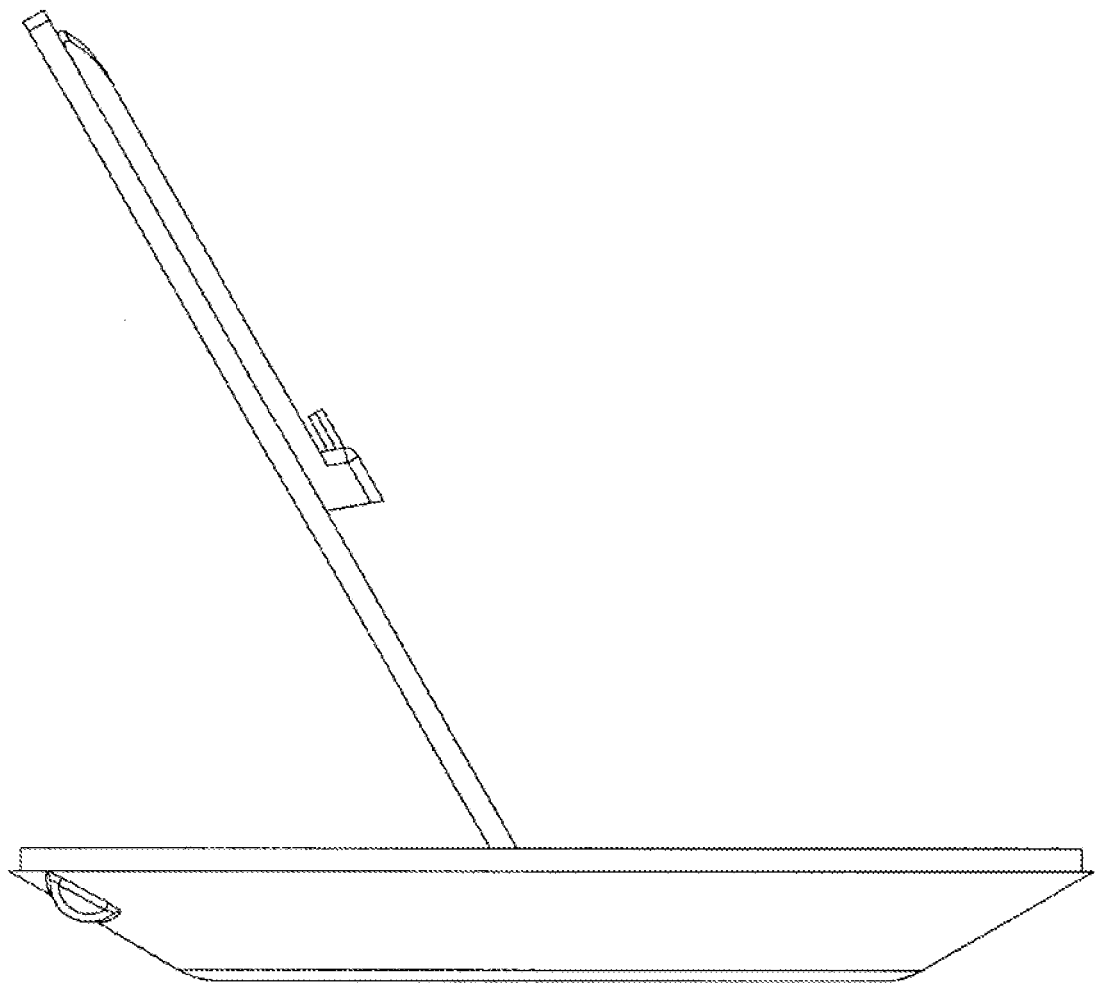
FIG. 28D is an exterior diagram of an example of the stand unit according to the embodiment.
Figure 28E:
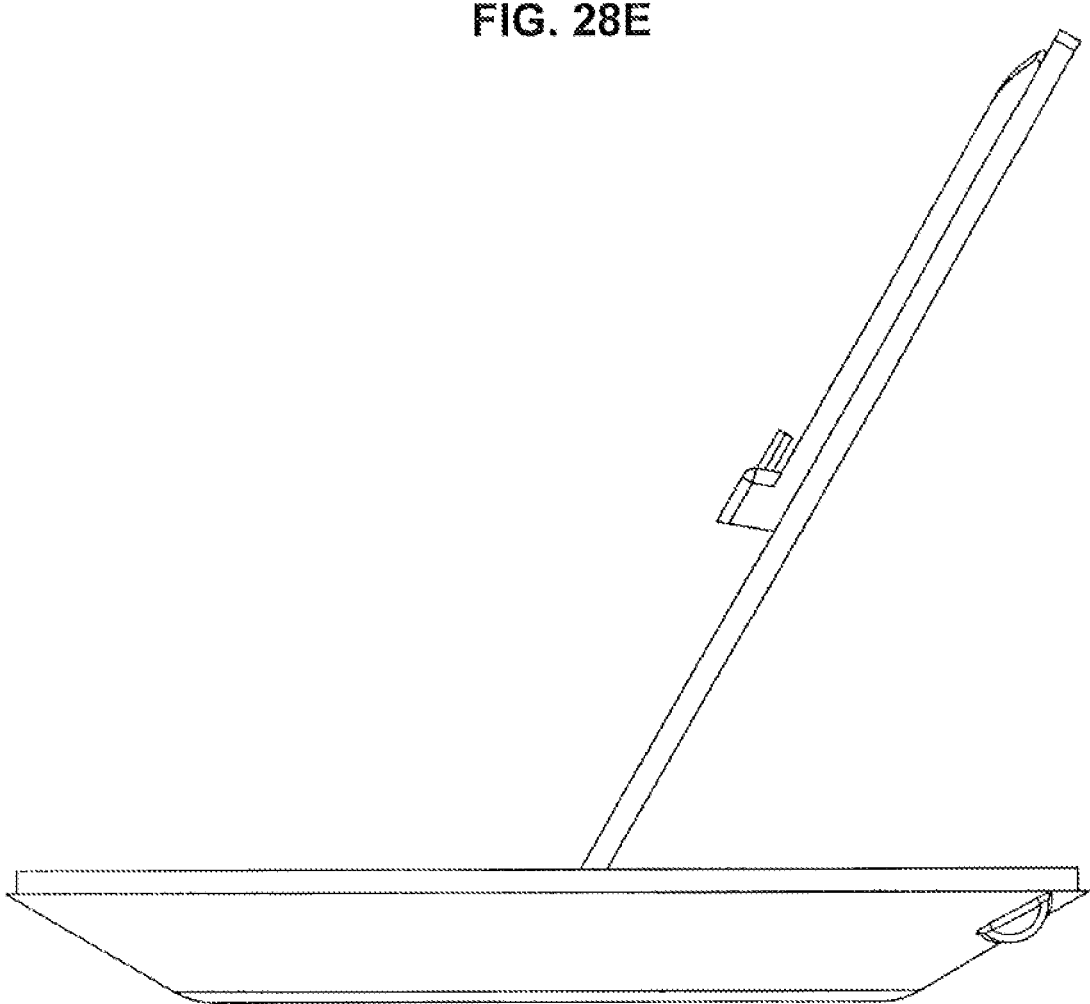
FIG. 28E is an exterior diagram of an example of the stand unit according to the embodiment.
Figure 28F:
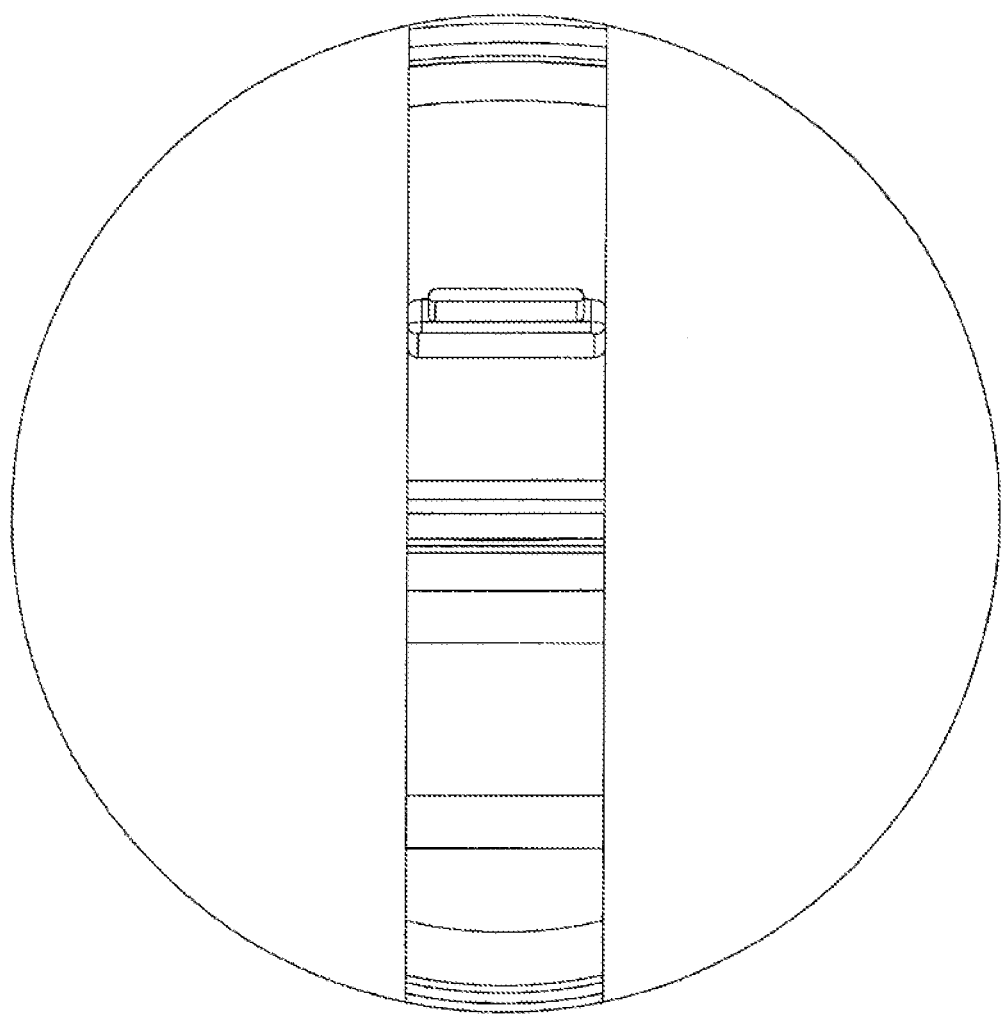
FIG. 28F is an exterior diagram of an example of the stand unit according to the embodiment.
Figure 28G:
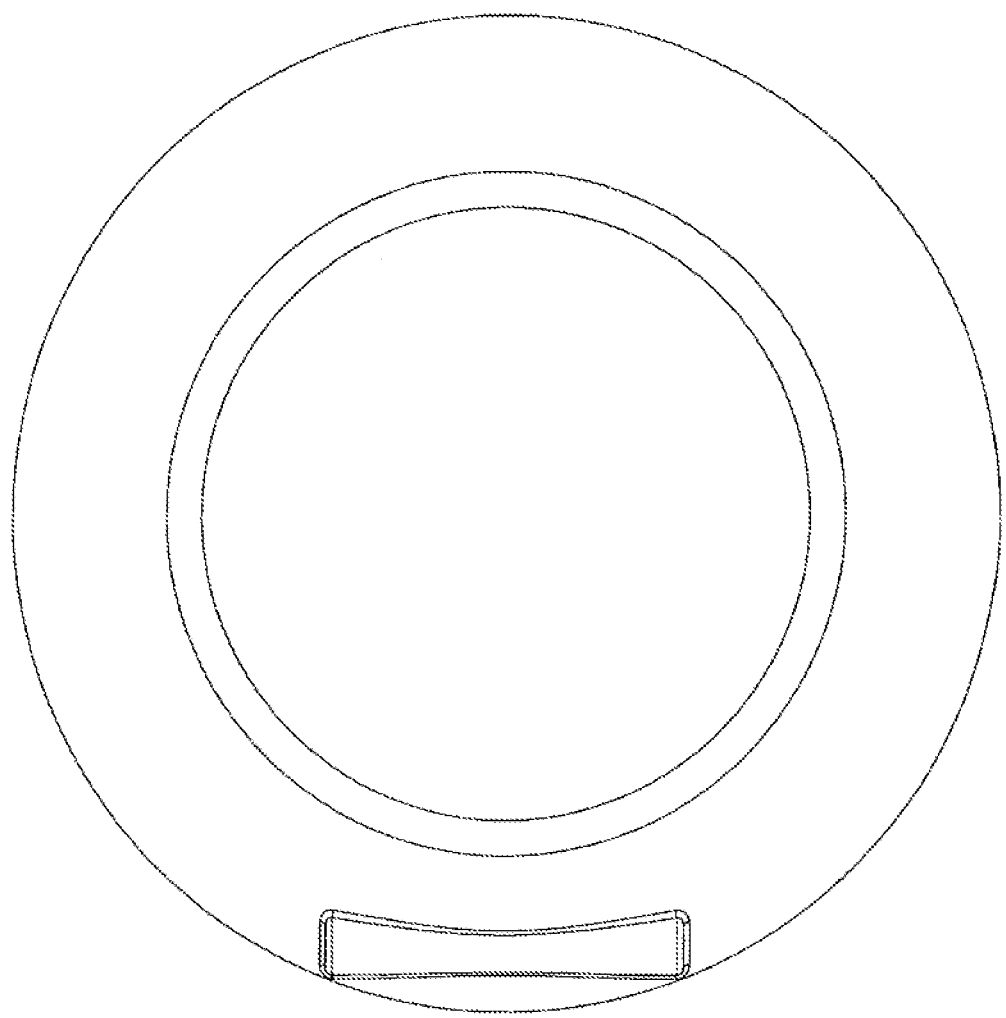
FIG. 28G is an exterior diagram of an example of the stand unit according to the embodiment.

Next, a stand unit will be described. As shown in FIG. 27A, the stand unit is constituted by a stage unit PS1, an arm unit PS2, and an arm head unit PS3. In the portion indicated by the reference symbol X in FIG. 27A, a first fitting unit as described above is formed, and the electronic device 1 and the stand unit are electrically and mechanically connected to each other via the first fitting unit. The stand unit has a rotation mechanism that enables the stage unit PS1 to rotate in a θ direction within a plane parallel to the ground contact face as shown in FIG. 26. For this reason, as shown in FIG. 26(b), an orientation of the electronic device 1 can be changed in the φ direction. Furthermore, the stand unit has another rotation mechanism that enables rotation of the connection portion of the arm unit PS2 and the arm head unit PS3 in a θ direction. For this reason, an orientation of the electronic device 1 can be changed in the θ direction as shown in FIG. 26(c).

Note that the rotation in the θ direction and the rotation in the φ direction may be manually performed by a user, or a mechanism that realizes automatic rotation may be mounted. In addition, the rotation in the θ direction may be configured to be locked by a predetermined locking mechanism to be a state of a rotation angle of 0° (the state of FIG. 26(a)) and to be a state of a rotation angle of 90° (the state of FIG. 26(c)). In addition, a mechanism that can accommodate the arm unit PS2 and the arm head unit PS3 in the stage unit PS1 may also be mounted on the stand unit in the order shown in FIGS. 27A to 27D. By mounting such an accommodation mechanism, the stand unit can be easily carried. Note that a detailed shape of the stand unit is as shown in FIGS. 28A to 28G Particularly, FIGS. 28B to 28G are the 6-face diagrams of the stand unit.

Figure 29A:
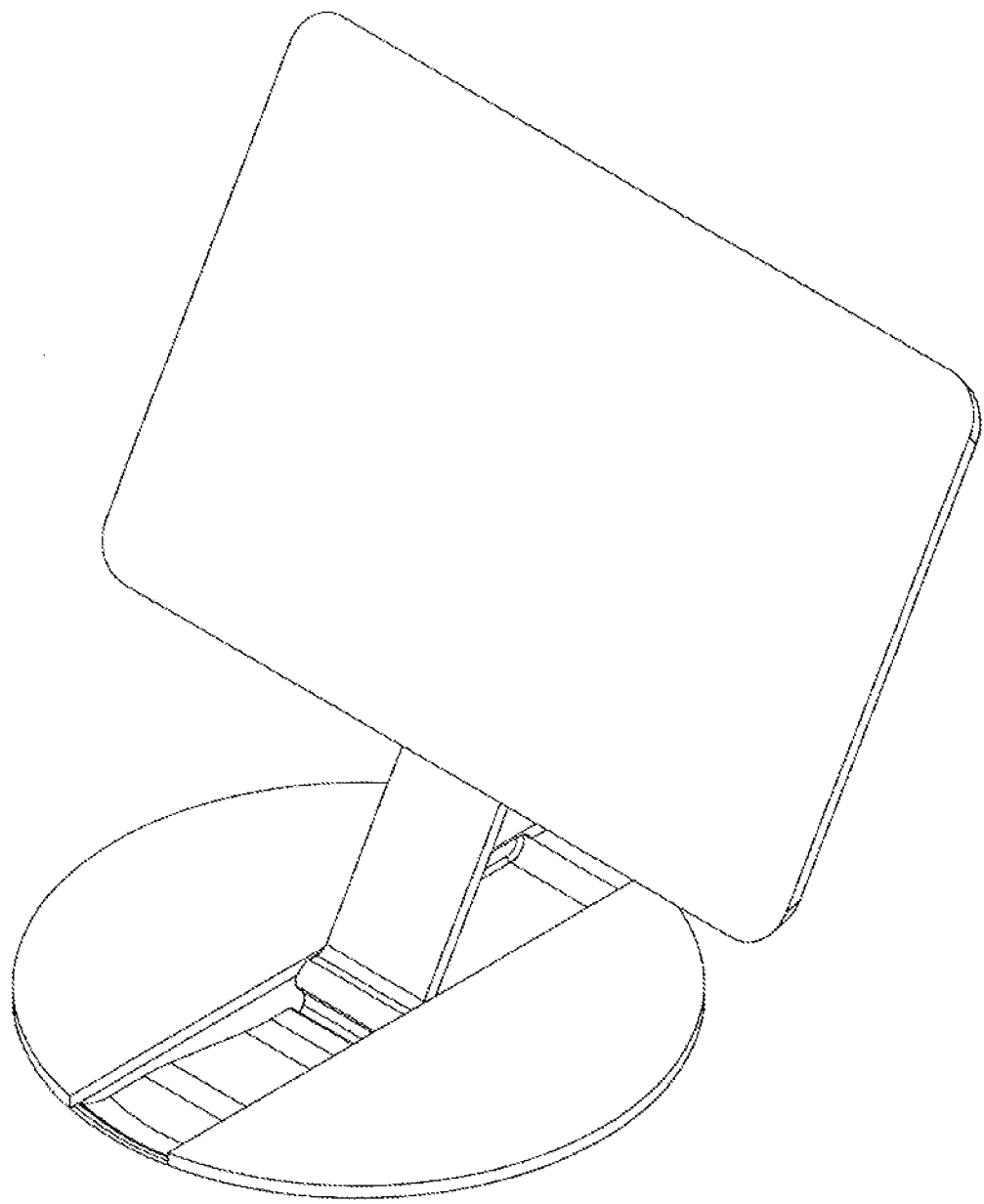
FIG. 29A is an exterior diagram of an example of another stand unit connected to the electronic device according to the embodiment.
Figure 29B:
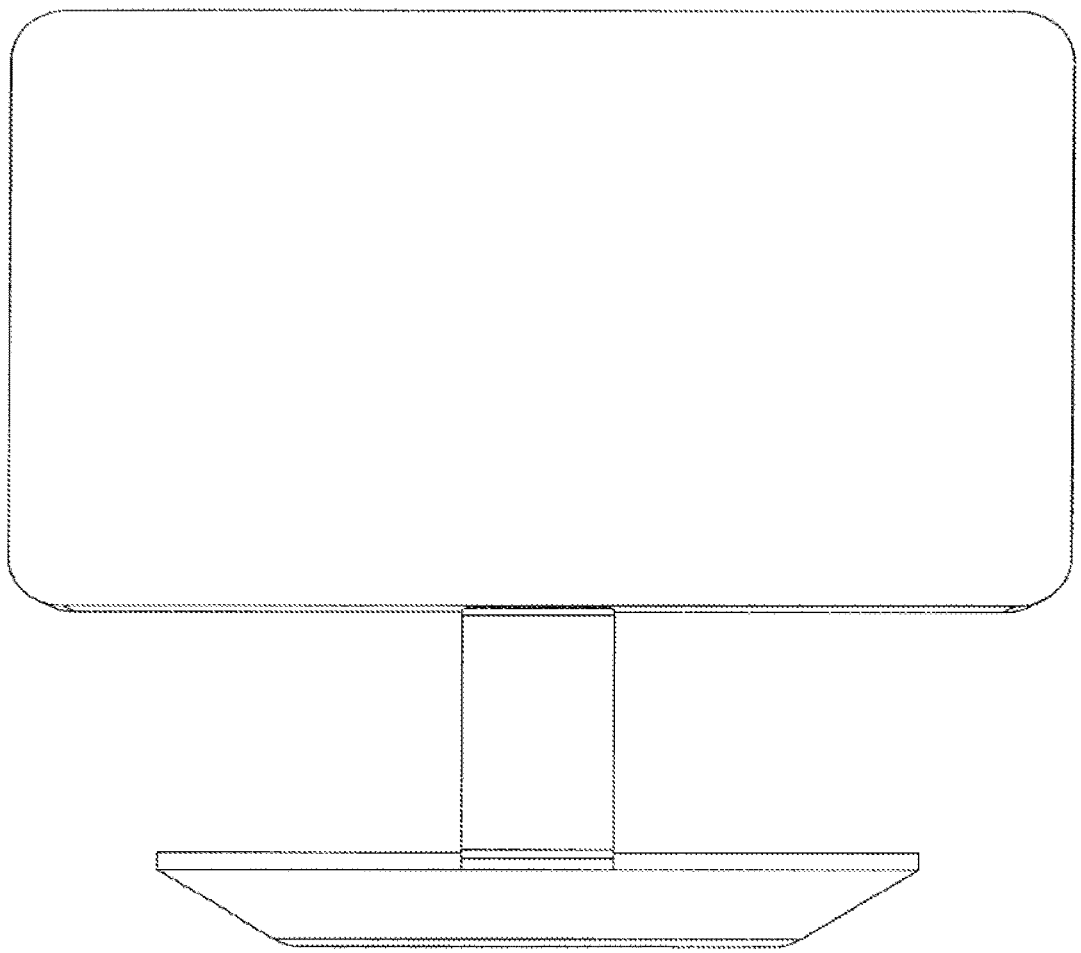
FIG. 29B is an exterior diagram of an example of another stand unit connected to the electronic device according to the embodiment.
Figure 29C:
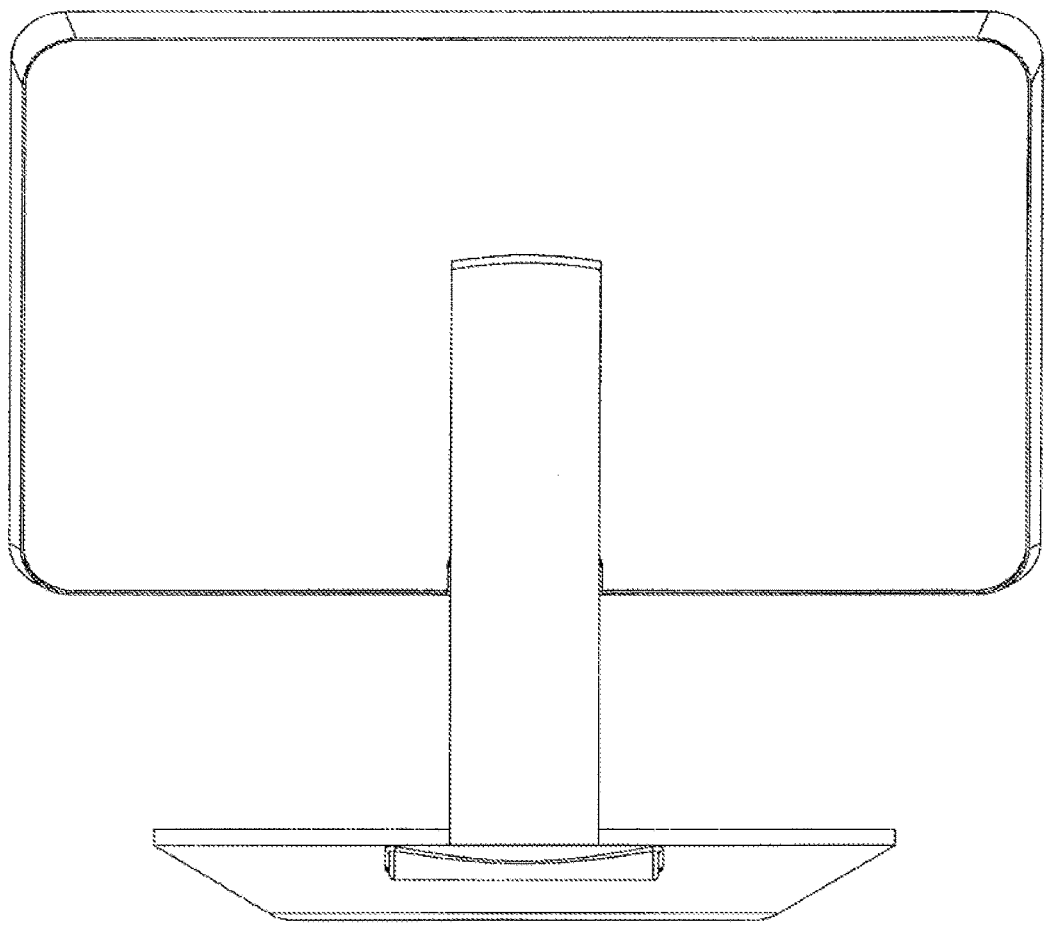
FIG. 29C is an exterior diagram of an example of another stand unit connected to the electronic device according to the embodiment.
Figure 29D:
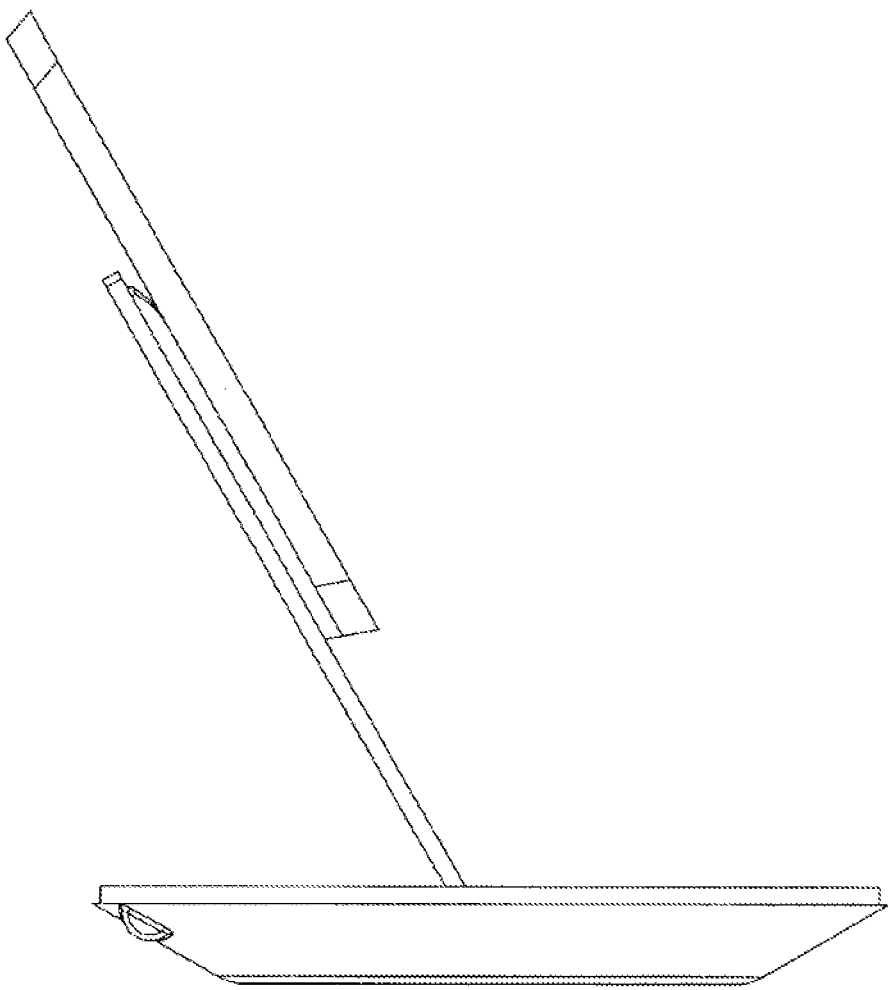
FIG. 29D is an exterior diagram of an example of another stand unit connected to the electronic device according to the embodiment.
Figure 29E:
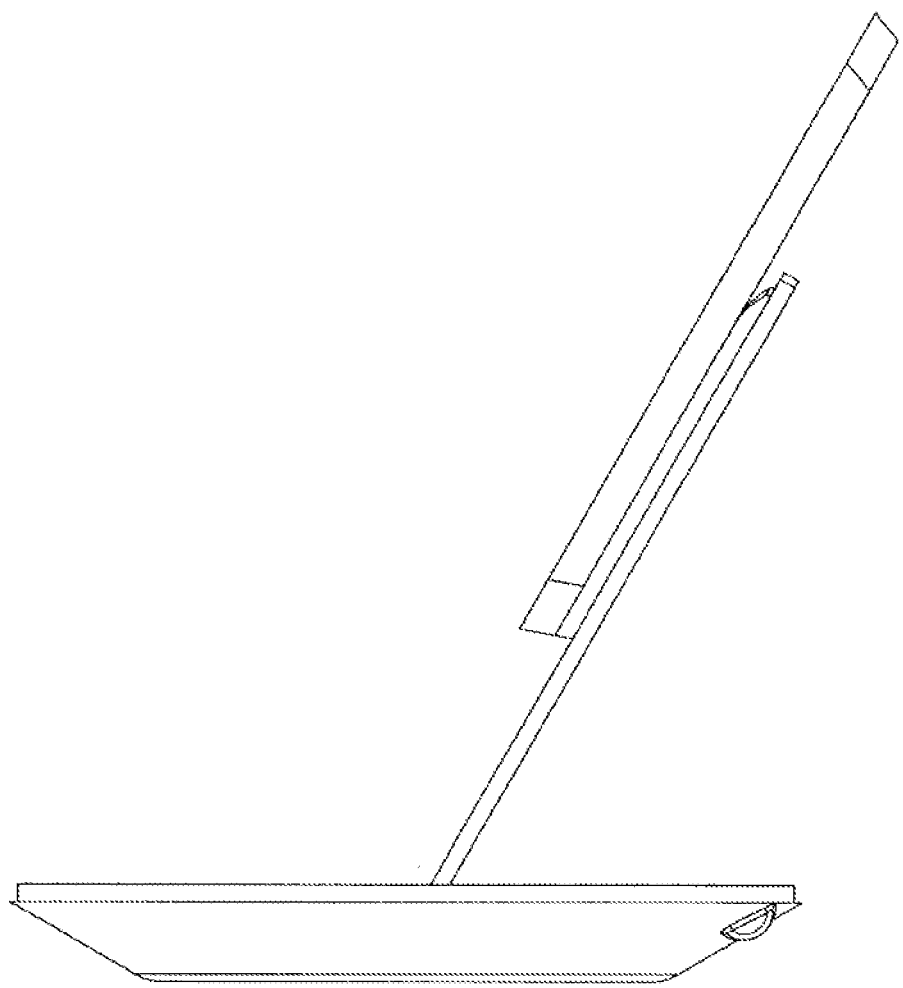
FIG. 29E is an exterior diagram of an example of another stand unit connected to the electronic device according to the embodiment.
Figure 29F:
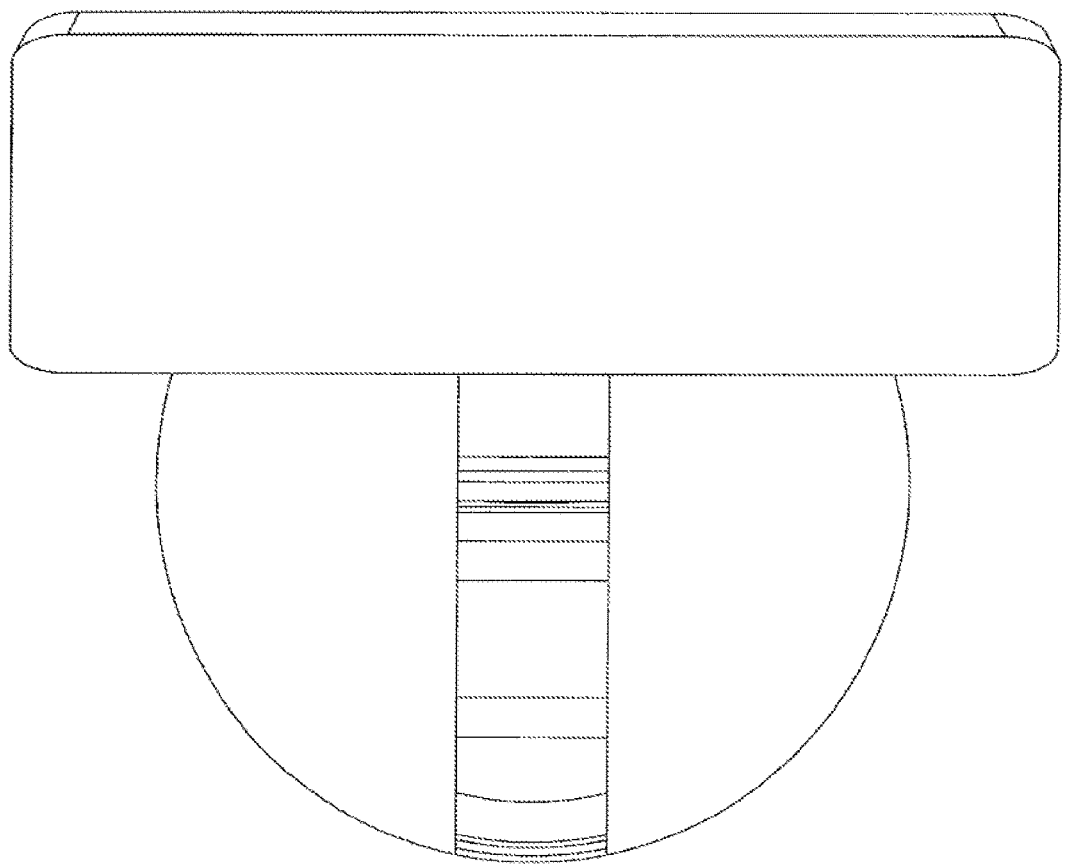
FIG. 29F is an exterior diagram of an example of another stand unit connected to the electronic device according to the embodiment.
Figure 29G:
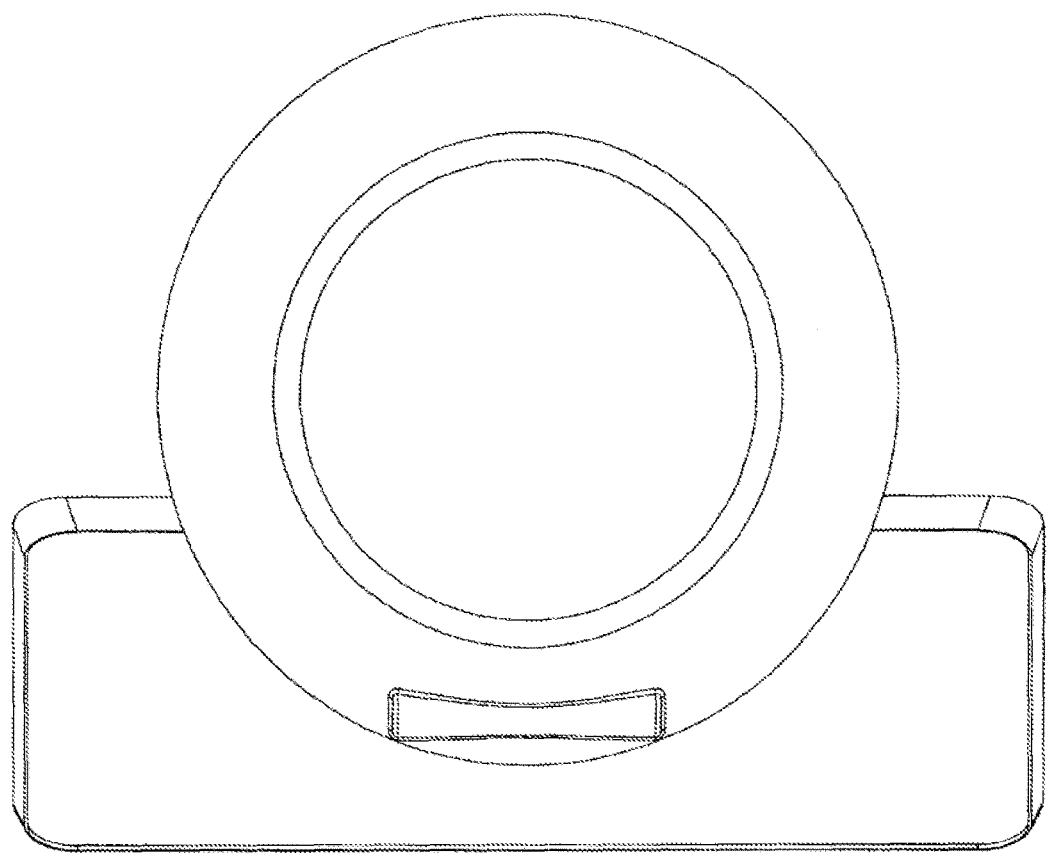
FIG. 29G is an exterior diagram of an example of another stand unit connected to the electronic device according to the embodiment.
Figure 30A:
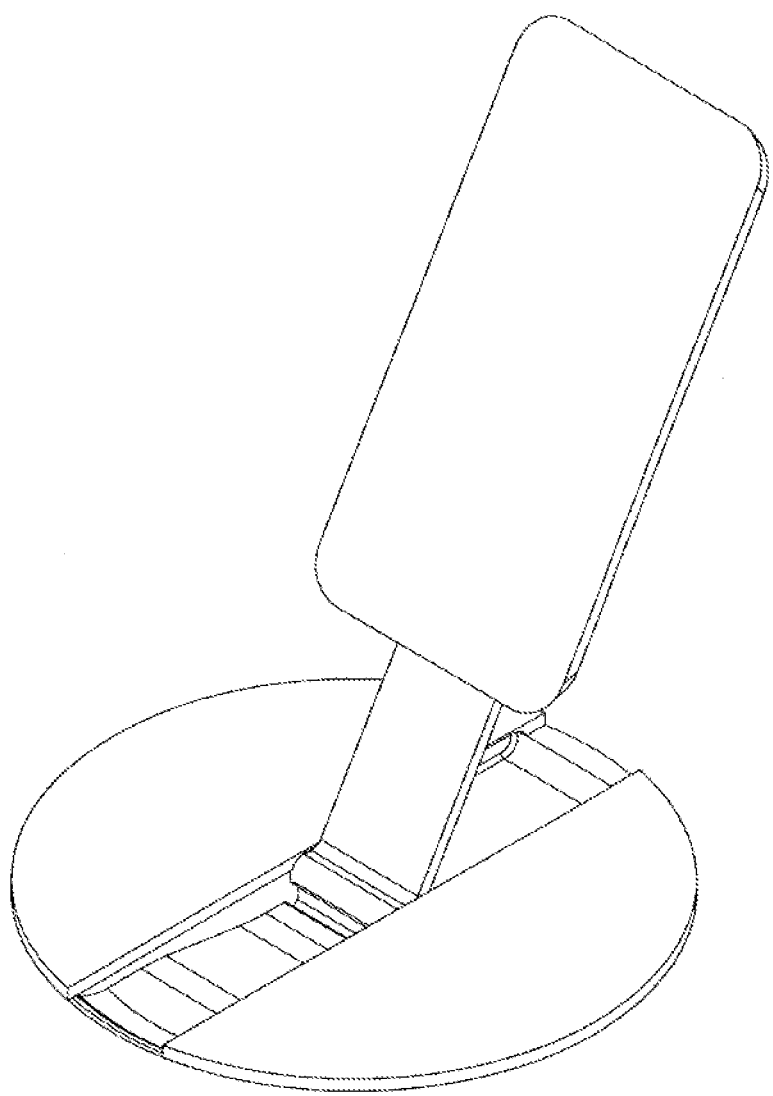
FIG. 30A is an exterior diagram of an example of another stand unit connected to the electronic device according to the embodiment.
Figure 30B:
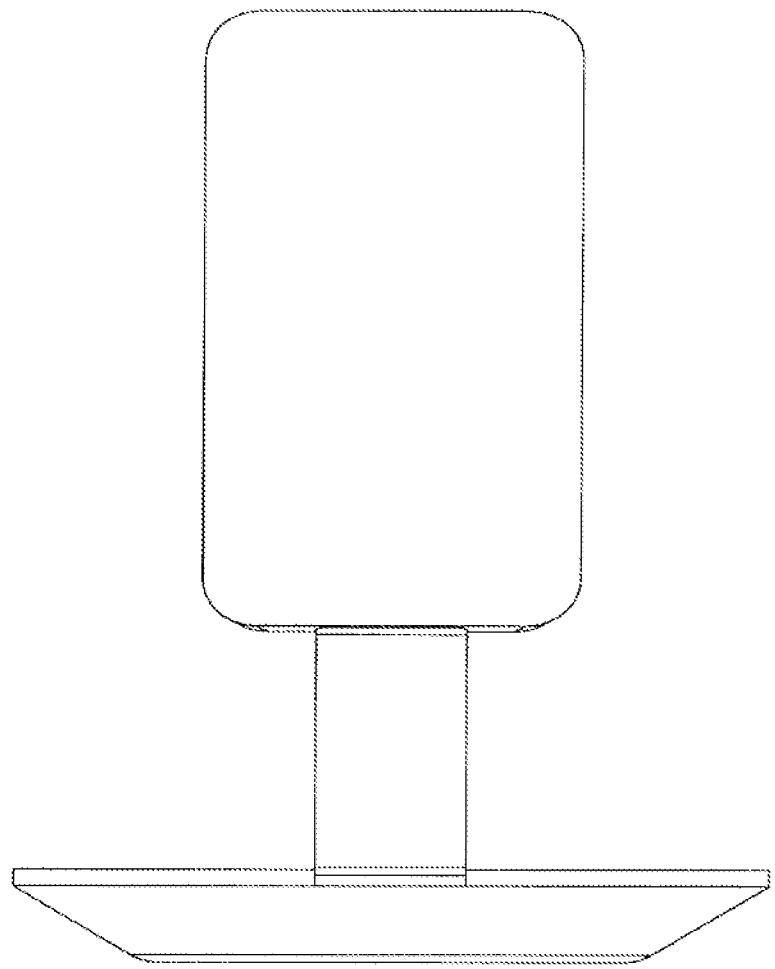
FIG. 30B is an exterior diagram of an example of another stand unit connected to the electronic device according to the embodiment.
Figure 30C:
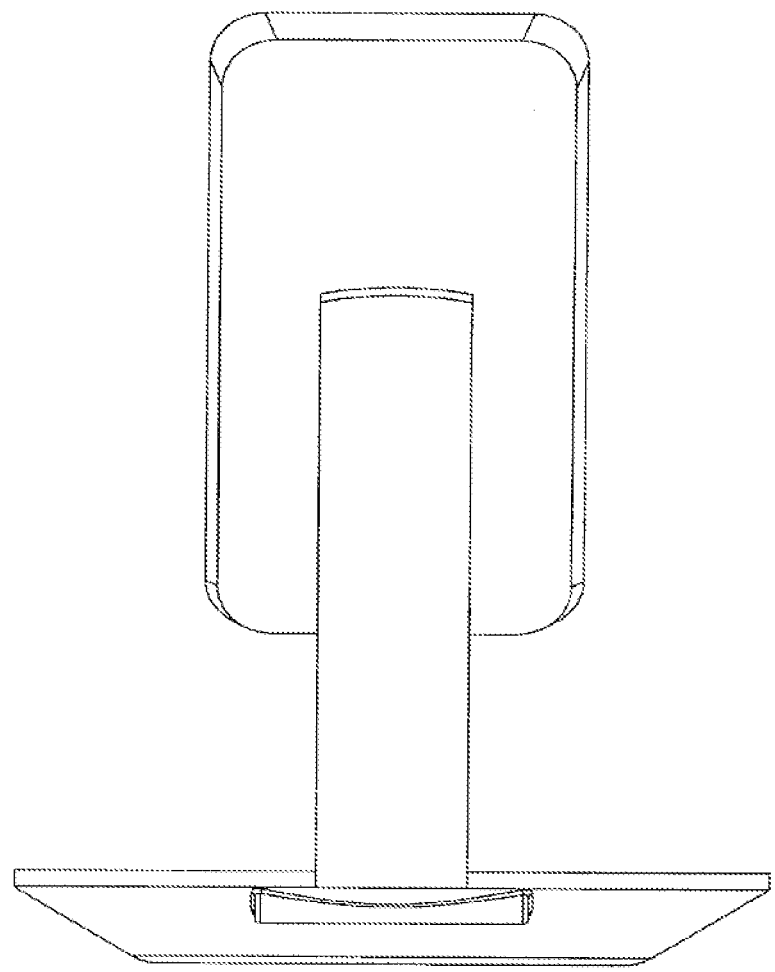
FIG. 30C is an exterior diagram of an example of another stand unit connected to the electronic device according to the embodiment.
Figure 30D:
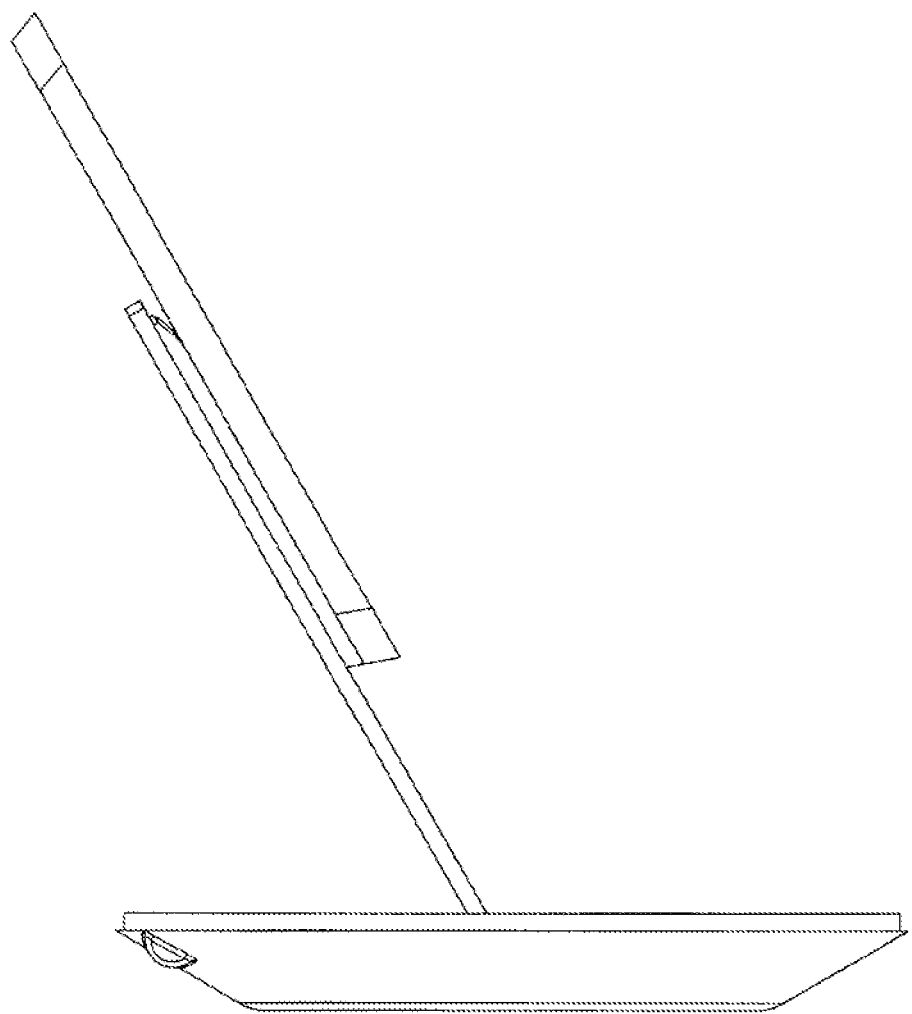
FIG. 30D is an exterior diagram of an example of another stand unit connected to the electronic device according to the embodiment.
Figure 30E:
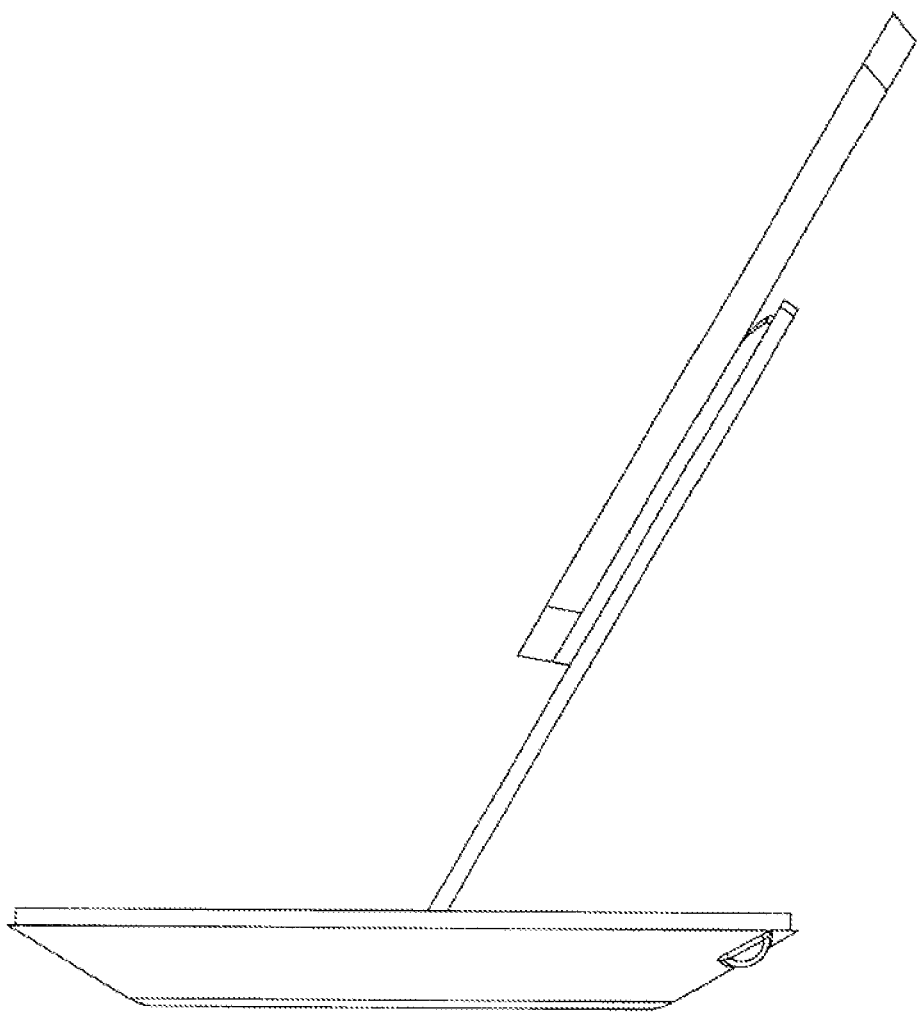
FIG. 30E is an exterior diagram of an example of another stand unit connected to the electronic device according to the embodiment.
Figure 30F:
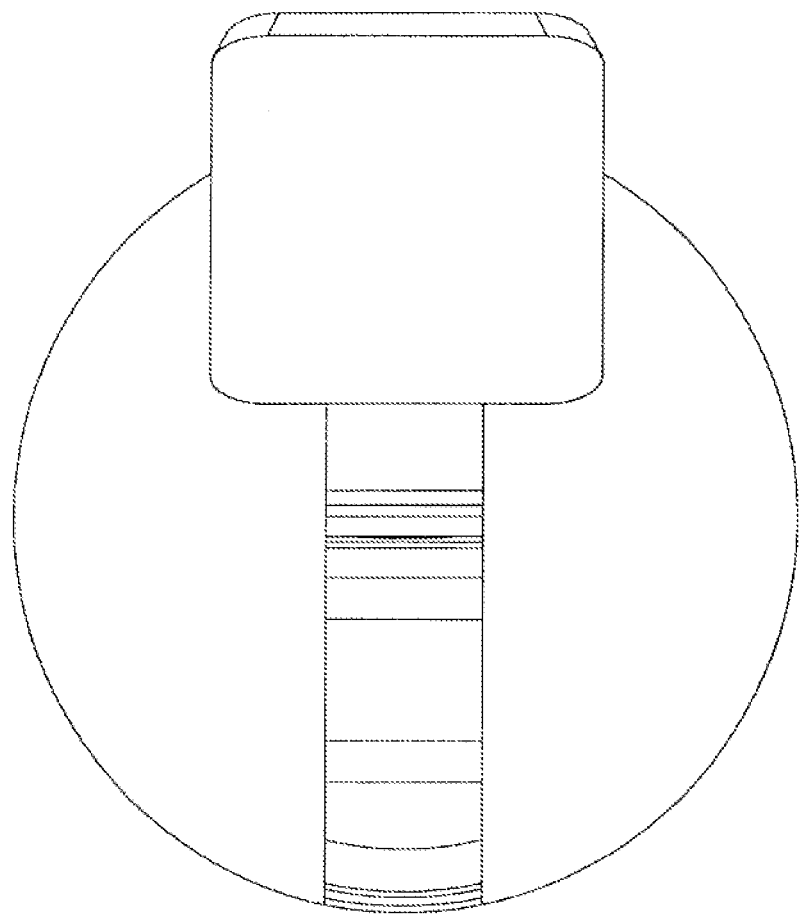
FIG. 30F is an exterior diagram of an example of another stand unit connected to the electronic device according to the embodiment.
Figure 30G:
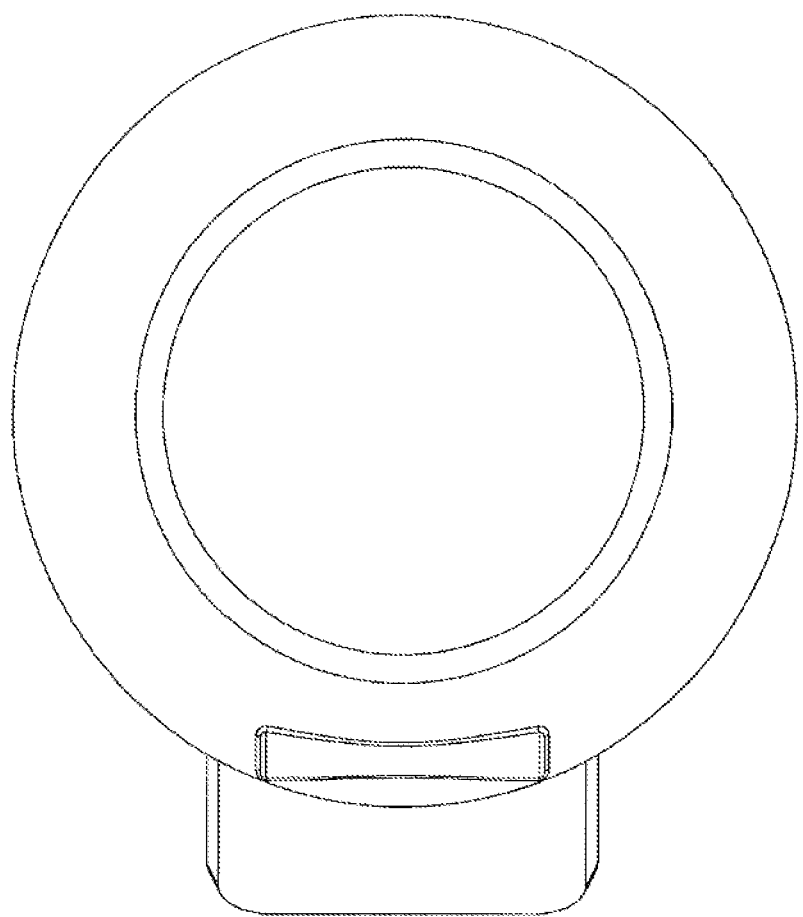
FIG. 30G is an exterior diagram of an example of another stand unit connected to the electronic device according to the embodiment.
Figure 30H:
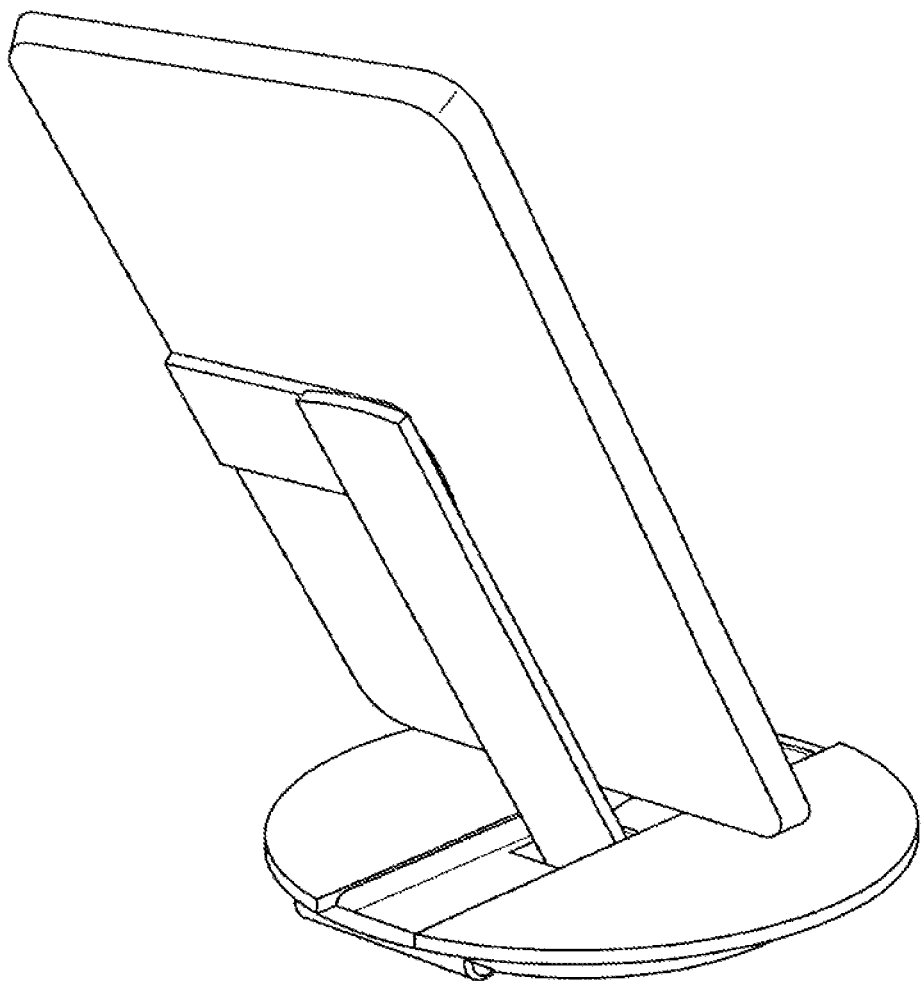
FIG. 30H is an exterior diagram of an example of another stand unit connected to the electronic device according to the embodiment.

In addition, states in which the electronic device 1 is connected to the stand unit described above are shown in FIGS. 29A to 30H. FIG. 29A is a perspective diagram when the electronic device 1 of which the first fitting unit is provided in a long side is connected to the stand unit. In addition, FIGS. 29B to 29G are 6-face diagrams corresponding to FIG. 29A. On the other hand, FIG. 30A is a perspective diagram when the electronic device 1 of which the first fitting unit is provided in a short side is connected to the stand unit. In addition, FIGS. 30B to 30G are 6-face diagrams corresponding to FIG. 30A. Note that, when the arm head unit PS3 is rotated 90° in the θ direction while the electronic device 1 of which the first fitting unit is provided in a long side is connected to the stand unit (which corresponds to FIG. 29A), the state shown in FIG. 30H is created.

Figure 31:
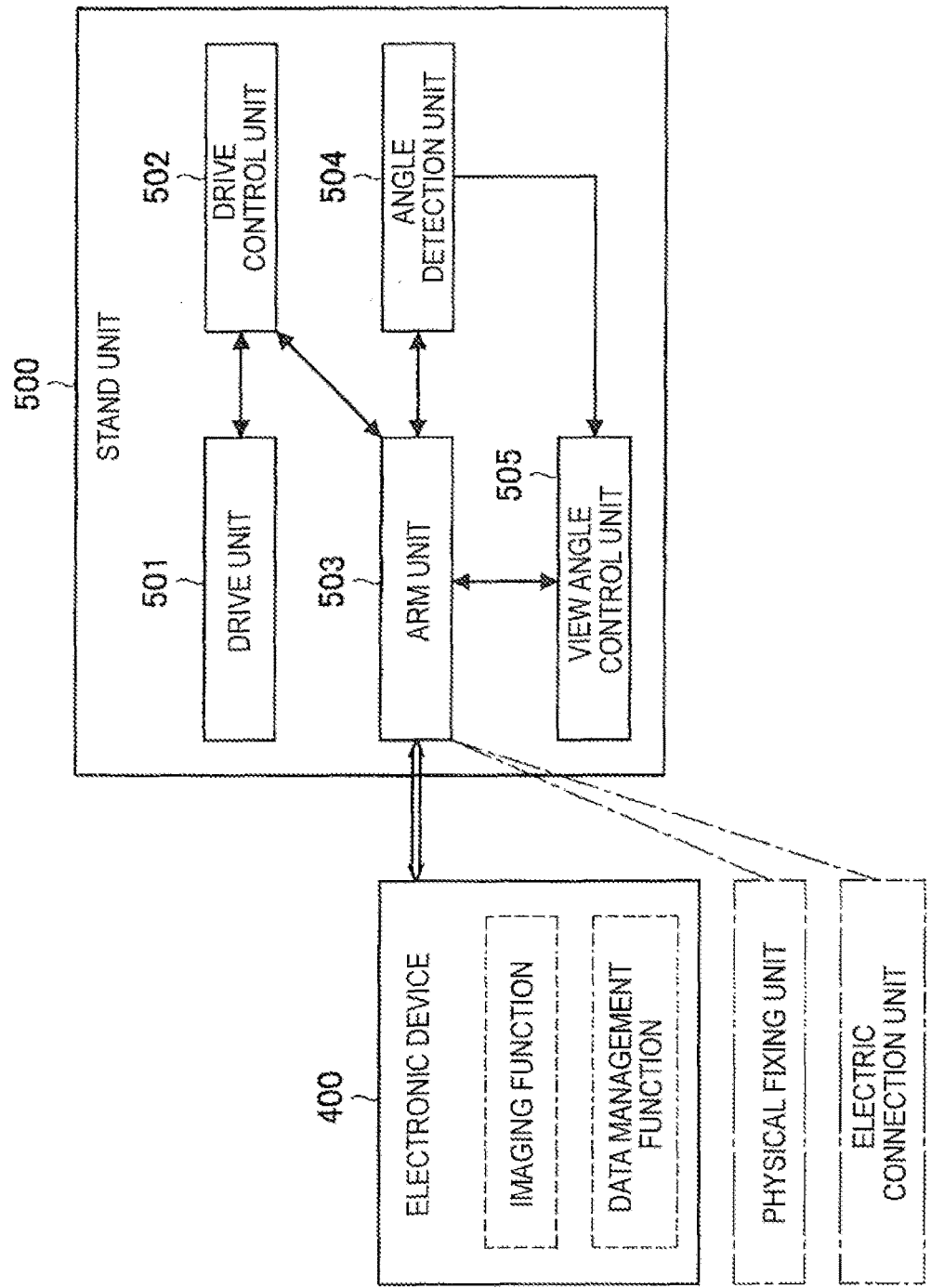
FIG. 31 is a block diagram showing an example of functions of the stand unit according to the embodiment.

Here, a functional configuration when the stand unit is controlled for automatic rotation will be described. In this case, the stand unit (stand unit 500) has a functional configuration as shown in FIG. 31. The stand unit 500 mainly has a drive unit 501, a drive control unit 502, an arm unit 503, an angle detection unit 504, and a view angle control unit 505 as shown in FIG. 31. The arm unit 503 is constituted by the arm unit PS2 and the arm head unit PS3 described above. In addition, the arm unit 503 is physically and electrically connected to an electronic device 400 via a first fitting unit provided in the arm head unit PS3. In other words, the first fitting unit functions as a physical fixing unit and electric connection unit.

The drive unit 501 drives rotation of the stage unit PS1 and rotates the stand unit 500 in the ϕ direction. The drive control unit 502 controls operations of the drive unit 501, and adjusts a rotation angle in the ϕ direction. In addition, when the arm head unit PS3 has a drive mechanism, the drive control unit 502 has a function of controlling rotation of the arm head unit PS3 in the θ direction. Consequently, the drive control unit 502 can control attitudes of the electronic device 400 connected to the arm unit 503. In addition, the angle detection unit 504 detects an angle of rotation of the arm head unit PS3. For example, the angle detection unit 504 detects whether the angle of rotation in the θ direction is 0° or 90°. This detection result is input to the view angle control unit 505.

When the angle detection unit 504 inputs the detection result, the view angle control unit 505 transmits a control signal for controlling an angle of view to the electronic device 400 via the arm unit 503. When, for example, the electronic device 400 of which a first fitting unit is provided in a long side is connected and the angle of rotation in the θ direction is 0°, a control signal indicating a horizontally long angle of view is transmitted. When the electronic device 400 of which the first fitting unit is provided in the long side is connected and the angle of rotation in the θ direction is 90°, a control signal indicating a vertically long angle of view is transmitted. In this manner, when the electronic device 400 of which the first fitting unit is provided in a short side is connected and the angle of rotation in the θ direction is 0°, a control signal indicating a vertically long angle of view is transmitted. When the electronic device 400 of which the first fitting unit is provided in the short side is connected and the angle of rotation in the θ direction is 90°, a control signal indicating a horizontally long angle of view is transmitted.

Modified Example

Figure 32:
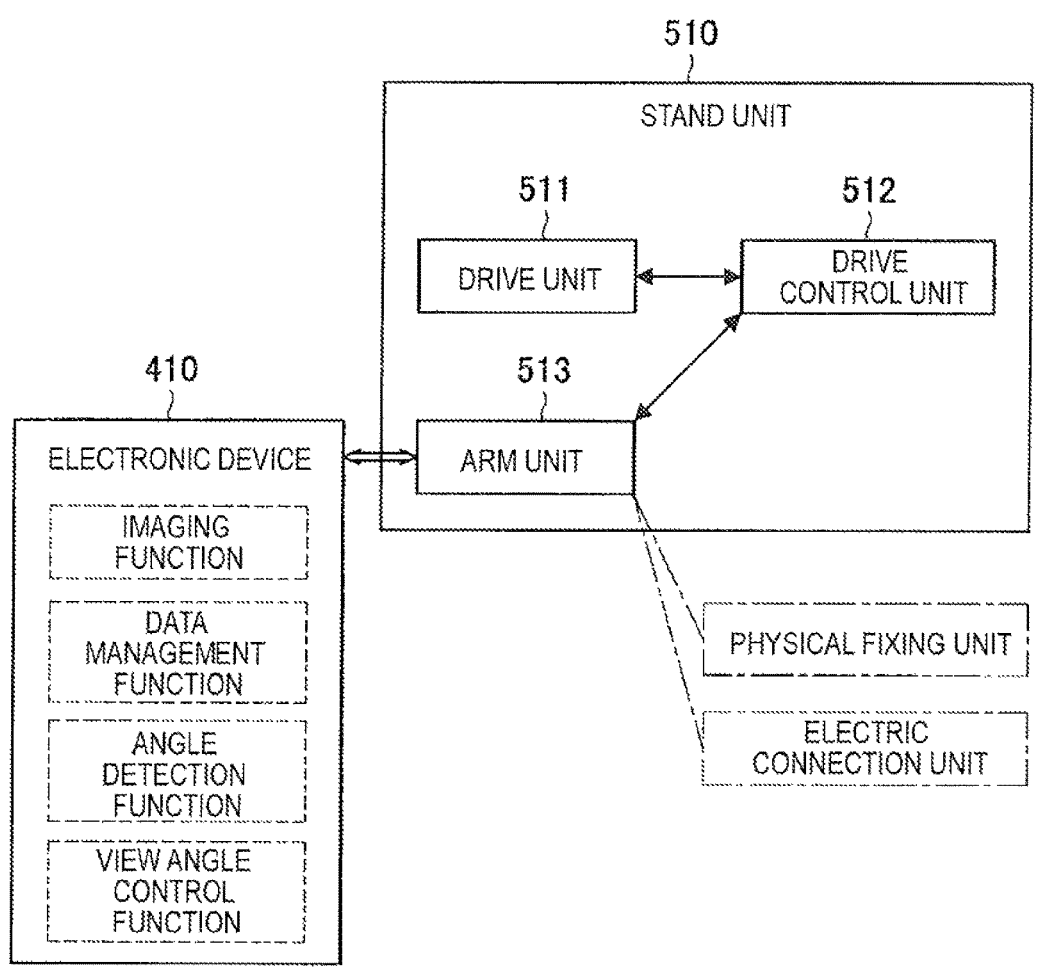
FIG. 32 is a block diagram showing an example of functions of the stand unit according to the embodiment.

The functional configuration of the stand unit 500 shown in FIG. 31 can also be modified to a functional configuration of a stand unit 510 shown in, for example, FIG. 32. The stand unit 510 is mainly constituted by a drive unit 511, a drive control unit 512, and an arm unit 513 as shown in FIG. 32. A difference from the stand unit 500 described above is that an angle detection function and a view angle control function of an electronic device 410 are used, rather than the angle detection function and the view angle control function being included in the stand unit 510 itself. In this case, the electronic device 410 detects its own attitude (rotation angle) using a built-in sensor such as an acceleration sensor or a gyro sensor. Then, the electronic device 410 controls an angle of view based on the detection result. Note that a method of controlling an angle of view is substantially the same as the configuration shown in FIG. 31. Such a modification belongs to the technical scope of the present embodiment as well.

Operation

Herein, an operation of the stand unit and the electronic device will be described with reference to FIG. 33. When the arm unit is rotated in the θ direction (S101), the angle of the rotation in the θ direction is detected through the angle detection function (S102) as shown in FIG. 33. Then, an angle of view is decided through the view angle control function according to the angle of the rotation detected through the angle detection function (S103). Then, the electronic device performs an imaging operation based on the angle of view decided in Step S103 (S104). Control over the angle of view is executed according to the flow described above. Various kinds of control can be performed using, for example, the method disclosed in JP 2010-147769A and the like.

Modified Example-2

Note that the operation of the stand unit and the electronic device described above can also be modified as below. In other words, controlling an angle of view of an image to be captured according to an angle of the electronic device has been described above, but after composition and an angle of view of an image to be captured are decided, drive control of the electronic device and the stand unit may be performed by associating the electronic device with the stand unit.

To be specific, by changing a known algorithm to decide composition of an image to be captured according to an attitude of the electronic device 1 itself (whether it is vertically long or horizontally long, or an angle of inclination thereof with respect to an installation face), the electronic device decides optimum composition for an image (still image or moving image) in which detected subjects will be photographed based on information with regard to the number of detected subjects, respective positions and sizes of the subjects, and the like. Then, the electronic device 1 decides a panning direction, a tilting direction, a zoom amount, an electronic device rotation amount, and the like necessary for realizing the decided composition, thereby deciding the angle of view of the image to be captured. Then, the image in which the detected subjects will be captured is imaged as the electronic device 1 outputs various control signals to the stand unit via the first fitting unit.

Herein, the composition is screen composition of an image to be captured, meaning how subjects are disposed within the frame of the image, and the angle of view means a range of photographed subjects in an image to be captured. In addition, the electronic device rotation amount described above means a rotation amount when the electronic device is rotated around an axis parallel to an optical axis connecting the electronic device 1 and a subject, which corresponds to, for example, the angle θ in FIG. 26(a).

The preferred embodiment of the present invention has been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

(1)

An external structure configured to be attached to or detached from an electronic device having a concave portion formed on a surface of a housing, and a connection connector provided in a position of the concave portion receding from the surface of the housing, the concave portion having a cross-sectional shape enabling locking of the external structure, the external structure including:

a first fitting unit configured to be fitted to the connection connector.

(2)

The external structure according to (1), wherein the concave portion is provided in at least a portion of the housing constituted by a first face and a second face facing each other on front and rear sides and side faces provided so as to face each other substantially orthogonally to the first face and the second face, and a joint of the first face or the second face and one of the side faces that is substantially orthogonal to the first face or the second face, wherein there is a portion in which a width of the concave portion is wider than a width of the joint on a cross-section obtained when the concave portion is cut in parallel to the side face provided in the concave portion, and wherein the first fitting unit is locked due to the shape of the cross-section.

(3)

The external structure according to (1) or (2), wherein the external structure is an electronic device holding stand configured to hold the electronic device, wherein the electronic device holding stand further includes at least one second fitting unit configured to be fitted to a portion of the electronic device different from a portion fitted to the connection connector, and a linking unit configured to link the first fitting unit and the second fitting unit, and wherein the first fitting unit is of a movable type.

(4)

The external structure according to (3), wherein the first fitting unit is not fitted to the connection connector when the first fitting unit is not fixed to the linking unit, and the first fitting unit is fitted to the connection connector when the first fitting unit is fixed to the linking unit.

(5)

The external structure according to (4), wherein the second fitting unit is further provided with a latching unit for latching the electronic device, and wherein, when the first fitting unit is fixed to the linking unit, the latching unit protrudes from the second fitting unit to latch the electronic device.

(6)

The external structure according to any one of (3) to (5), wherein the electronic device holding stand further includes a support unit configured to support the linking unit in which the first fitting unit and the second fitting unit are provided via a shaft unit, and wherein the linking unit is rotatable with respect to the shaft unit.

(7)

The external structure according to any one of (3) to (6), wherein a tilt angle formed by the linking unit and the support unit is changeable.

(8)

The external structure according to any one of (3) to (7), wherein the linking unit, the shaft unit, and the support unit are hollow, and wherein a wiring that causes electric connection to the connection connector is arranged in a hollow portion of the linking unit, the shaft unit, and the support unit.

(9)

The external structure according to any one of (3) to (8), wherein a portion of the linking unit configured to come into contact with the electronic device is formed using a member capable of locking the electronic device.

(10)

The external structure according to (1), the external structure being a speaker configured to output an audio signal from the electronic device.

(11)

The external structure according to (1), the external structure being a stand unit configured to cause the electronic device to automatically acquire an image by rotating the electronic device.

(12)

The external structure according to (1), the external structure being a game controller module configured to enable an operation of a game executed in the electronic device.

(13)

An electronic device including:

a concave portion formed on a surface of a housing; and a connection connector configured to be provided in a position of the concave portion receding from the surface of the housing, wherein the concave portion has a cross-sectional shape that enables locking of an external structure connected to the connection connector.

(14)

The electronic device according to (13), wherein the concave portion is provided in at least a portion of the housing constituted by a first face and a second face facing each other on the front and rear sides and side faces provided so as to face each other substantially orthogonally to the first face and the second face, and a joint of the first face or the second face and one of the side faces that is substantially orthogonal to the first face or the second face, and wherein there is a portion in which a width of the concave portion is wider than the width of the joint on a cross-section when the concave portion is cut in parallel to the side face provided in the concave portion.

REFERENCE SIGNS LIST 1 electronic device
11 housing
13 connector connection unit
15 concave portion
17 external structure connection connector (connection connector)
19 fixing portion
20 external structure
21 first fixing unit 23 second fixing unit
23A, 23B latching member
200 electronic device holding stand
201 linking unit
203 support unit
205 shaft unit
210 connector cap
211 external housing
213 connector fitting unit
215 contact point terminal
217 notch

The invention claimed is:

1. An external structure configured to one of attach to or detach from an electronic device, wherein the electronic device comprises a housing, a concave portion on a surface of the housing, and a connection connector in the concave portion that recedes from the surface of the housing, wherein the concave portion has a cross-sectional shape that enables the external structure to lock to the electronic device, the external structure comprising:
a first fitting unit configured to fit the connection connector,
a second fitting unit configured to fit a portion of the housing of the electronic device different from the concave portion,
a linking unit configured to link the first fitting unit and the second fitting unit, and
a support unit configured to support the linking unit via a shaft unit,
wherein the second fitting unit comprises a first latching member, a second latching member, and a third latching member,
wherein the first latching member is configured to latch to the portion of the housing of the electronic device, and
wherein the second latching member and the third latching member protrude from a first end of the first latching member and a second end of the first latching member, respectively, in a width direction of the electronic device, based on a movement of the first fitting unit in a direction towards the connection connector.

2. The external structure according to claim 1, wherein the housing comprises a first face, a second face that is opposite to the first face, and at least one side face that is orthogonal to each of the first face and the second face, and a joint of one of the first face or the second face and the at least one side face,
wherein a first width of a first portion of the concave portion is greater than a second width of a second portion of the concave portion.

3. The external structure according to claim 1, wherein the external structure is an electronic device holding stand configured to hold the electronic device.

4. The external structure according to claim 1, wherein the first fitting unit is one of disconnected from the connection connector based on the first fitting unit is detached from the linking unit or fitted to the connection connector based on the first fitting unit is fixed to the linking unit.

5. The external structure according to claim 1, wherein the linking unit is rotatable with respect to the shaft unit along a first axis, and a tilt angle between the linking unit and the support unit is variable along a second axis orthogonal to the first axis.

6. The external structure according to claim 1, wherein each of the linking unit, the shaft unit, and the support unit is hollow, and
wherein a wiring, configured to supply electricity to the connection connector, is arranged in a hollow portion of the linking unit, a hollow portion of the shaft unit, and a hollow portion of the support unit.

7. The external structure according to claim 1, wherein the linking unit comprises a member to lock the electronic device.

8. The external structure according to claim 1, the external structure being a speaker configured to output an audio signal from the electronic device.

9. The external structure according to claim 1, wherein the external structure is a stand unit configured to rotate the electronic device, and wherein the electronic device acquires an image based on the rotation of the electronic device.

10. The external structure according to claim 1, the external structure being a game controller module configured to enable an operation of a game executed in the electronic device.

11. An electronic device, comprising:
a concave portion on a surface of a housing; and
a connection connector in the concave portion that recedes from the surface of the housing,
wherein the concave portion has a cross-sectional shape that enables an external structure connected to the connection connector to one of attach to or detach from the electronic device,
wherein the external structure comprises:
a first fitting unit configured to fit the connection connector;
a second fitting unit configured to fit a portion of the housing of the electronic device different from the concave portion;
a linking unit configured to link the first fitting unit and the second fitting unit; and
a support unit configured to support the linking unit via a shaft unit,
wherein the second fitting unit comprises a first latching member, a second latching member, and a third latching member,
wherein the first latching member is configured to latch the portion of the housing of the electronic device, and
wherein the second latching member and the third latching member protrude from a first end of the first latching member and a second end of the first latching member, respectively, in a width direction of the electronic device, based on a movement of the first fitting unit in a direction towards the connection connector.

12. The electronic device according to claim 11, wherein the housing comprises a first face, a second face that is opposite to the first face, and at least one side face that is orthogonal to each of the first face and the second face, and a joint of one of the first face or the second face and the at least one side face, and
wherein a first width of a first portion of the concave portion is greater than a second width of a second portion of the concave portion.

13. The external structure according to claim 1, wherein a center axis of a cable, connected to the connection connector, is higher than a center axis of the connection connector.

14. The external structure according to claim 13, wherein a height of an upper end of the cable coincides with a height of an upper end of the housing of the electronic device at a connection portion of the cable.

* * * * *